(12) United States Patent
Hiroe

(10) Patent No.: US 10,475,440 B2
(45) Date of Patent: Nov. 12, 2019

(54) VOICE SEGMENT DETECTION FOR EXTRACTION OF SOUND SOURCE

(71) Applicant: SONY CORPORATION, Tokyo (JP)

(72) Inventor: Atsuo Hiroe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 317 days.

(21) Appl. No.: 14/766,246

(22) PCT Filed: Dec. 20, 2013

(86) PCT No.: PCT/JP2013/084202
§ 371 (c)(1),
(2) Date: Aug. 6, 2015

(87) PCT Pub. No.: WO2014/125736
PCT Pub. Date: Aug. 21, 2014

(65) Prior Publication Data
US 2016/0005394 A1    Jan. 7, 2016

(30) Foreign Application Priority Data
Feb. 14, 2013    (JP) ................................. 2013-026551

(51) Int. Cl.
*G10L 15/00* (2013.01)
*G10L 15/04* (2013.01)
(Continued)

(52) U.S. Cl.
CPC .............. *G10L 15/04* (2013.01); *G10L 15/28* (2013.01); *G10L 21/0272* (2013.01)

(58) Field of Classification Search
CPC ....................................................... G10L 15/00
(Continued)

(56) References Cited

U.S. PATENT DOCUMENTS 6,393,372 B1 *  5/2002  Rzyski ................... G01R 23/20
                                                               330/149
6,732,073 B1 *  5/2004  Kluender ................ G10L 15/02
                                                               704/200.1
(Continued)

FOREIGN PATENT DOCUMENTS

JP    2001-242883 A    9/2001
JP    2006-053203 A    2/2006
(Continued)

*Primary Examiner* — Michael C Colucci
(74) *Attorney, Agent, or Firm* — Chip Law Group

(57) ABSTRACT

There is provided an apparatus and a method for rapidly extracting a target sound from a sound signal where a variety of sounds are mixed generated from a plurality of the sound sources. There is a voice recognition unit including a tracking unit for detecting a sound source direction and a voice segment to execute a sound source extraction process, and a voice recognition unit for inputting a sound source extraction result to execute a voice recognition process. In the tracking unit, a segment being created management unit that creates and manages a voice segment per unit of sound source sequentially detects a sound source direction, sequentially updates a voice segment estimated by connecting a detection result to a time direction, creates an extraction filter for a sound source extraction after a predetermined time is elapsed, and sequentially creates a sound source extraction result by sequentially applying the extraction filter to an input voice signal. The voice recognition unit sequentially executes the voice recognition process to a partial sound source extraction result to output a voice recognition result.

20 Claims, 70 Drawing Sheets

(51) Int. Cl.
*G10L 15/28* (2013.01)
*G10L 21/0272* (2013.01)

(58) Field of Classification Search
USPC ........ 704/248, 275, 251, 249, 235; 707/706; 381/92, 22
See application file for complete search history.

(56) References Cited

U.S. PATENT DOCUMENTS

| | | | | |
|---|---|---|---|---|
| 7,117,145 | B1* | 10/2006 | Venkatesh | G10L 21/0208 704/200 |
| 8,280,087 | B1* | 10/2012 | Bacon | H04R 25/353 381/316 |
| 8,768,692 | B2* | 7/2014 | Hayakawa | G10L 15/20 704/226 |
| 2006/0164101 | A1* | 7/2006 | Fossion | H04L 43/50 324/539 |
| 2006/0185027 | A1* | 8/2006 | Bartel | C12N 15/111 800/14 |
| 2008/0228496 | A1* | 9/2008 | Yu | G06F 3/038 704/275 |
| 2009/0131065 | A1* | 5/2009 | Khandekar | H04W 72/082 455/452.1 |
| 2009/0298622 | A1* | 12/2009 | Roberts | A63B 24/00 473/455 |
| 2009/0323903 | A1* | 12/2009 | Cioffi | H04B 1/1027 379/32.01 |
| 2010/0128897 | A1* | 5/2010 | Saruwatari | G10L 21/028 381/94.3 |
| 2011/0051948 | A1* | 3/2011 | Boldt | G10L 25/48 381/73.1 |
| 2011/0112839 | A1* | 5/2011 | Funakoshi | G10L 15/083 704/249 |
| 2012/0155653 | A1* | 6/2012 | Jax | G10L 19/008 381/22 |
| 2012/0263315 | A1* | 10/2012 | Hiroe | G10L 21/0216 381/92 |
| 2013/0060571 | A1* | 3/2013 | Soemo | G10L 15/30 704/251 |
| 2014/0081633 | A1* | 3/2014 | Badaskar | G10L 15/26 704/235 |
| 2015/0046418 | A1* | 2/2015 | Akbacak | G06F 16/48 707/706 |

FOREIGN PATENT DOCUMENTS

| | | |
|---|---|---|
| JP | 2007-279517 A | 10/2007 |
| JP | 4182444 B2 | 9/2008 |
| JP | 2010-121975 A | 6/2010 |
| JP | 2011-033680 A | 2/2011 |
| JP | 2011-107602 A | 6/2011 |
| JP | 2011-107603 A | 6/2011 |
| JP | 2012-150237 A | 8/2012 |
| JP | 2012-226068 A | 11/2012 |
| JP | 2012-234150 A | 11/2012 |
| JP | 2014089249 A * | 5/2014 |
| WO | 2012/105385 A1 | 8/2012 |

* cited by examiner

| Segment information 172 | |
|---|---|
| (1) | Generated/held data |
| (2) | Internal state |
| (3) | Segment ID |
| (4) | Beginning frame number |
| (5) | Beginning frame number with hangover |
| (6) | Termination frame number |
| (7) | Termination frame number with hangover |
| (8) | "Registered" flag |
| (9) | Direction point counter |
| (10) | Average direction |
| (11) | Interrupted counter |
| (12) | Frame number to be ended |
| | Connectable direction point list (direction, direction ...) |

173 Sound source extraction unit

191 Filter estimation unit
192 Filter application unit
193 Unerased removing unit
194 Time frequency masking unit

| Generated/held data |
|---|
| (1) Extraction filter |
| (2) Whole dead corner space filter |
| (3) Filter application beginning frame number |
| (4) Filter application end frame number |

US 10,475,440 B2

VOICE SEGMENT DETECTION FOR EXTRACTION OF SOUND SOURCE

TECHNICAL FIELD

The present disclosure relates to a voice recognition apparatus, a voice recognition method and a program. More particularly, the present disclosure relates to a voice recognition apparatus, a voice recognition method and a program executing a voice segment detection and a sound source extraction and executing a voice recognition based on process results.

BACKGROUND ART

A voice recognition process is performed by analyzing a human speech content of an acquired sound from a microphone, for example. The voice recognition is available in a variety of apparatuses. For example, by disposing a voice recognition unit on an information process apparatus such as a mobile terminal and a television, and analyzing a user spoken word (a user's speech) on the apparatus, it is possible to execute a process based on the speech on the information process apparatus such as the mobile terminal and the television.

The acquired sound of the microphone includes not only a user's speech voice to be recognized (called as a target sound), but also undesired sounds (called as a noise, an environmental sound, a disturbing sound, etc.). It is difficult to extract the target sound, i.e., a specific user's speech, from a mixed signal including undesired sounds from a variety of sound sources. Under an environment where a lot of undesired sounds, a voice recognition accuracy is undesirably lowered. The greater the distance from the microphone to the user's mouth is, the easier the disturbing sound mixed is. The problem will become more difficult.

In addition, if the distance from the microphone to the user becomes great, it becomes difficult to install a button for explicitly designate the beginning and the end of the sound input. Therefore, other means are necessary to detect the beginning and the end of the speech.

In order to improve the voice recognition accuracy under the environment, it is effective to apply the following processes, for example, which has been suggested in the related art:
(a) A voice segment detection process for specifying a segment for the voice recognition process
(b) A sound source separation process or a sound source extracting process for extracting only the target sound from the sound signal where a variety of sounds are mixed generated from a plurality of the sound sources.

These processes are performed before the voice recognition process, thereby allowing the sound signal for the voice recognition to be temporally and spatially selected and to improve the recognition accuracy of the target sound.

The voice segment detection process is described, for example, in Patent Document 1 (Japanese Patent Application Laid-open No. 2012-150237) and Patent Document 2 (Japanese Patent No. 4182444).

The sound source separation process and the sound source extraction process are described in Patent Document 3 (Japanese Patent Application Laid-open No. 2011-107602).

The related art that discloses the voice recognition process is, for example, Patent Document 4 (Japanese Patent Application Laid-open No. 2001-242883), Patent Document 5 (Japanese Patent Application Laid-open No. 2006-053203), and Patent Document 6 (Japanese Patent Application Laid-open No. 2011-033680).

Patent Document 1: Japanese Patent Application Laid-open No. 2012-150237
Patent Document 2: 4182444
Patent Document 3: Japanese Patent Application Laid-open No. 2011-107602
Patent Document 4: Japanese Patent Application Laid-open No. 2001-242883
Patent Document 5: Japanese Patent Application Laid-open No. 2006-053203
Patent Document 6: Japanese Patent Application Laid-open No. 2011-033680

SUMMARY OF INVENTION

Problem to be Solved by the Invention

An object of the present disclosure is to provide a voice recognition apparatus, a voice recognition method and a program that achieve highly precise analysis of the target sound for the voice recognition.

An embodiment of the present disclosure provides a voice recognition apparatus, a voice recognition method and a program that achieve highly precise analysis of the target sound by executing a voice segment detection and a sound source extraction and performing a voice recognition process using the process results.

Means for Solving the Problem

A first feature of the present disclosure is a voice recognition apparatus, including:
a tracking unit for detecting a sound source direction and a voice segment to execute a sound source extraction process; and
a voice recognition unit for inputting a sound source extraction result from the tracking unit to execute a voice recognition process,
the tracking unit creating a segment being created management unit that creates and manages a voice segment per unit of sound source,
each segment being created management unit created
sequentially detecting a sound source direction to execute a voice segment creation process that sequentially updates a voice segment estimated by connecting a detection result to a time direction,
creating an extraction filter for a sound source extraction after a predetermined time is elapsed from a voice segment beginning, and
sequentially applying the extraction filter created to an input voice signal to sequentially create a partial sound source extraction result of a voice segment,
the tracking unit
sequentially outputting the partial sound source extraction result created by the segment being created management unit to the voice recognition unit,
the voice recognition unit
sequentially executing the voice recognition process to the partial sound source extraction result inputted from the tracking unit to output a voice recognition result.

According to an embodiment of the voice recognition apparatus according to the present disclosure, the tracking unit executes a voice segment creation process to connect collectively a plurality of sound source direction information detected in accordance with a plurality of different methods to a time direction in each segment being created management unit.

According to an embodiment of the voice recognition apparatus according to the present disclosure, the tracking unit immediately executes beginning or end determination process if it detects that a user's sign detected from an input image from an image input unit represents beginning or end of a voice segment.

According to an embodiment of the voice recognition apparatus according to the present disclosure, the segment being created management unit of the tracking unit creates an extraction filter for preferentially extracting a voice of a specific sound source from an observation signal by utilizing an observation signal inputted from a time before beginning of a voice segment to a time when a filter is created.

According to an embodiment of the voice recognition apparatus according to the present disclosure, the segment being created management unit of the tracking unit applies an extraction filter for preferentially extracting a voice of a specific sound source from an observation signal, estimates a whole dead corner space filter that attenuates a voice of all sound sources included in the observation signal used in the estimation of the extraction filter, and subtracts a result of applying the whole dead corner space filter from a result of applying the extraction filter to remove a disturbing sound not included in the observation signal and to create a sound source extraction result.

According to an embodiment of the voice recognition apparatus according to the present disclosure, the segment being created management unit of the tracking unit changes a mask that decreases a transmittance of the observation signal for each frequency and each time as a proportion of a sound other than a target sound is higher than a target sound in the observation signal corresponding to the segment being created, executes time frequency masking process that sequentially applies the mask to the observation signal, and extracts a sound source of the target sound.

According to an embodiment of the voice recognition apparatus according to the present disclosure, the voice recognition apparatus further includes an extraction result buffering unit for temporary storing the sound source extraction result generated by the tracking unit; and a ranking unit for determining a priority to output a plurality of the sound source extraction results corresponding to the respective sound sources stored in the extraction result buffering unit, the ranking unit setting a priority of the sound source extraction result corresponding to the voice segment having the beginning or the end determined based on a user's explicit sign.

According to an embodiment of the voice recognition apparatus according to the present disclosure, the tracking unit sets a "registered attribute" in order to identify a voice segment set based on a speaker's explicit sign provided based on an image analysis, and the ranking unit executes a process that sets a priority of the voice segment to which the registered attribute is set to high.

According to an embodiment of the voice recognition apparatus according to the present disclosure, the ranking unit determines a priority by applying the following scales:
(Scale 1) the segment having the attribute of "registered" has a priority, if there are a plurality of the segments having the attribute of "registered", the segment having the earliest beginning has a priority;
(Scale 2) as to the segment not having the attribute of "registered", the segment having the end already determined has a priority, if there are a plurality of the segments having the ends already determined, the segment having the earliest end has a priority;
(Scale 3) as to the segment having the end not determined, the segment having the earliest beginning has a priority.

According to an embodiment of the voice recognition apparatus according to the present disclosure, the voice recognition unit has a plurality of decoders for executing a voice recognition process, requests an output of a sound source extraction result generated by the tracking unit in accordance with availability of the decoders, inputs a sound source extraction result in accordance with the priority, and preferentially executes a voice recognition on a sound source extraction result having a high priority.

According to an embodiment of the voice recognition apparatus according to the present disclosure, the tracking unit creates a feature amount adapted to a form used in a voice recognition of the voice recognition unit in each segment being created management unit, and outputs the feature amount created to the voice recognition unit.

According to an embodiment of the voice recognition apparatus according to the present disclosure, the feature amount is a Mel-Frequency Cepstral Coefficient.

According to an embodiment of the voice recognition apparatus according to the present disclosure, the voice recognition apparatus further includes:
a sound input unit including a microphone array;
an image input unit having a camera;
a sound source direction estimation unit for estimating a sound source direction based on an inputted sound from the sound input unit; and
an image process unit for analyzing a sound source direction based on an analysis of an inputted image from the image input unit,
the tracking unit creating one integrated sound source direction information by applying sound source direction information created by the sound source direction estimation unit and sound source direction information created by the image process unit.

According to an embodiment of the voice recognition apparatus according to the present disclosure, the image process unit includes
a lip image process unit for detecting a movement of a speaker's lip area based on an analysis of an input image from the image input unit; and
a hand image process unit for detecting a movement of a speaker's hand area.

According to an embodiment of the voice recognition apparatus according to the present disclosure, the tracking unit
sets an "registered attribute" in order to identify a voice segment set based on a speaker's explicit sign inputted from the image process unit, and
performs a merge process between a voice segment having a registered attribute and a voice segment not having a registered attribute for integrating other voice segment into the voice segment having a registered attribute.

According to an embodiment of the voice recognition apparatus according to the present disclosure, the tracking unit
in the voice segment having a registered attribute, if sound source direction information is not inputted, direction information is automatically generated to execute a voice segment extension process.

According to an embodiment of the voice recognition apparatus according to the present disclosure, the voice recognition unit is configured to
include a plurality of recognition tasks each being a pair of a dictionary having a vocabulary to be recognized and a language model, and
execute a meaning estimation process for searching a task most adaptable to a user's speech among a plurality of difference tasks.

According to an embodiment of the voice recognition apparatus according to the present disclosure, the voice recognition apparatus further includes:
a configuration that a pointer is moved on a display unit by synchronizing with a speaker's hand movement provided based on an analysis of a captured image of the speaker, and beginning or end of a speech segment is determined depending on a movement of the pointer.

A second feature of the present disclosure is a voice recognition method executed by a voice recognition apparatus, the voice recognition apparatus, including:
a tracking unit for detecting a sound source direction and a voice segment to execute a sound source extraction process; and
a voice recognition unit for inputting a sound source extraction result from the tracking unit to execute a voice recognition process,
the tracking unit creating a segment being created management unit that creates and manages a voice segment per unit of sound source,
each segment being created management unit created
sequentially detecting a sound source direction to execute a voice segment creation process that sequentially updates a voice segment by connecting a detection result to a time direction,
creating an extraction filter for a sound source extraction after a predetermined time is elapsed from a voice segment beginning, and
sequentially applying the extraction filter created to an input voice signal to sequentially create a partial sound source extraction result of a voice segment,
the tracking unit
sequentially outputting the partial sound source extraction result created by the segment being created management unit to the voice recognition unit,
the voice recognition unit
sequentially executing the voice recognition process to the partial sound source extraction result inputted from the tracking unit to output a voice recognition result.

A third feature of the present disclosure is a program for executing a voice recognition method executed by a voice recognition apparatus, the voice recognition apparatus, including:
a tracking unit for detecting a sound source direction and a voice segment to execute a sound source extraction process; and
a voice recognition unit for inputting a sound source extraction result from the tracking unit to execute a voice recognition process, the program allows
the tracking unit to create a segment being created management unit that creates and manages a voice segment per unit of sound source,
each segment being created management unit created
to sequentially detect a sound source direction to execute a voice segment creation process that sequentially updates a voice segment by connecting a detection result to a time direction,
to create an extraction filter for a sound source extraction after a predetermined time is elapsed from a voice segment beginning, and
to sequentially apply the extraction filter created to an input voice signal to sequentially create a partial sound source extraction result of a voice segment,
the tracking unit
to sequentially output the partial sound source extraction result created by the segment being created management unit to the voice recognition unit,
the voice recognition unit
to sequentially execute the voice recognition process to the partial sound source extraction result inputted from the tracking unit to output a voice recognition result.

A program according to the present disclosure can be distributed by a storage medium or a communication medium that provides an image processing apparatus or a computer system executing a variety of program codes with the program in a computer readable format. By distributing the program in a computer readable format, processes based on the program can be performed in an information processing apparatus and a computer system.

Other features and advantages of the present disclosure will be apparent from a detailed description based on the following embodiments and the drawings. Note that a "system" in the specification is a logical aggregation structure of a plurality apparatuses, and the apparatuses thereof are not necessarily disposed within a same housing.

Effect of the Invention

According to an embodiment of the present disclosure, there is provided an apparatus and a method for rapidly extracting a target sound from a sound signal where a variety of sounds are mixed generated from a plurality of the sound sources.

Specifically, there is a voice recognition unit including a tracking unit for detecting a sound source direction and a voice segment to execute a sound source extraction process, and a voice recognition unit for inputting a sound source extraction result to execute a voice recognition process. In the tracking unit, a segment being created management unit that creates and manages a voice segment per unit of sound source sequentially detects a sound source direction, sequentially updates a voice segment estimated by connecting a detection result to a time direction, creates an extraction filter for a sound source extraction after a predetermined time is elapsed, and sequentially creates a sound source extraction result by sequentially applying the extraction filter to an input voice signal. The voice recognition unit sequentially executes the voice recognition process to a partial sound source extraction result to output a voice recognition result.

By the above-described configuration, it is possible to rapidly generate and output the voice recognition result without waiting for the detection of a voice segment end.

BRIEF DESCRIPTION OF DRAWINGS

FIG. 20 A drawing for explaining segment information.

FIG. 21 A drawing for explaining a sound source extraction unit 173.

MODE(S) FOR CARRYING OUT THE INVENTION

Figure 1:
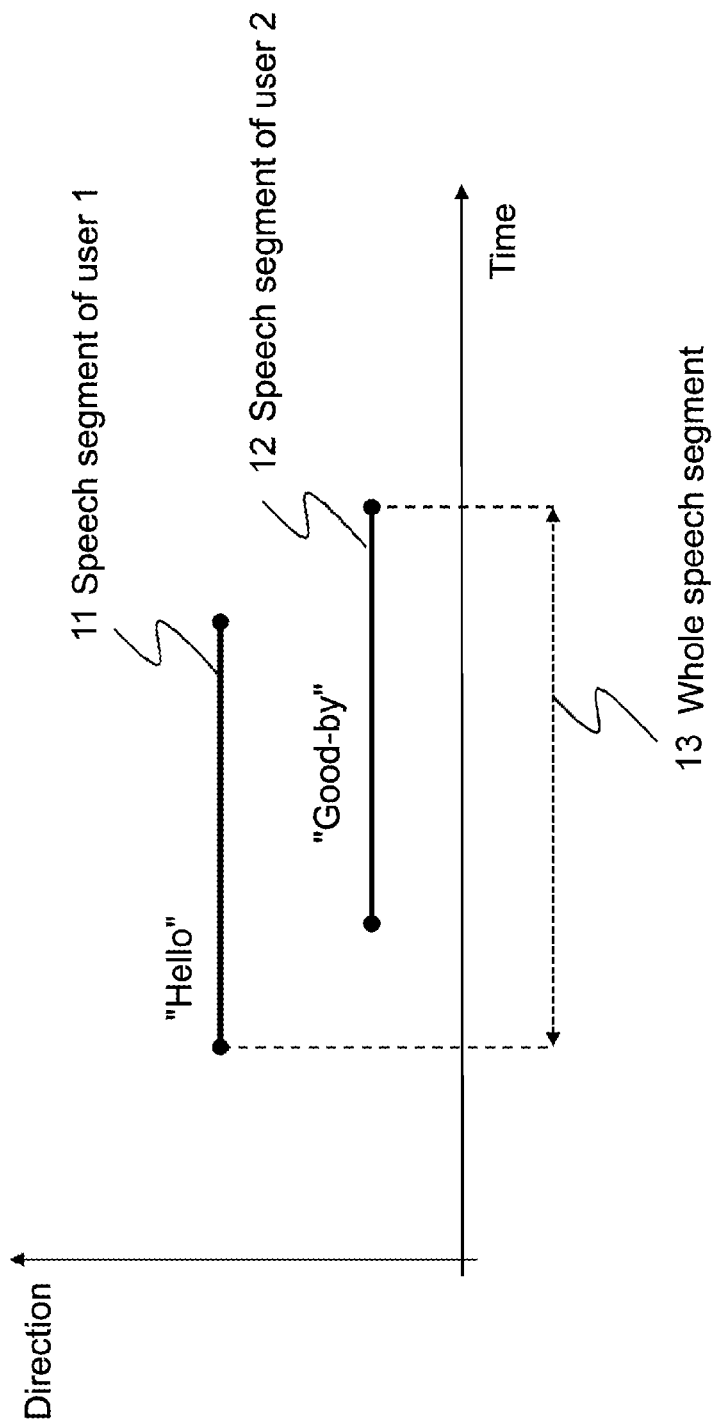
FIG. 1 A drawing for explaining an illustrative specific environment for a sound source extraction process.

Hereinafter, referring to the drawings, a voice recognition apparatus, a voice recognition method, and a program will be described in detail.

Before explaining a configuration and a process according to the present disclosure, expressions in this specification will be described.

The expressions used herein have the following means.

$A\_b$ represents that a subscript b is attached to A.

$A\char94 b$ represents that a superscript b is attached to A.

In addition, conj(X) represents a complex conjugate number of conjugate number X. In the formula, the complex conjugate number is represented by attaching an overbar to X.

hat(x) equals to "^" is attached over x.

Assignment of a value is represented by "=" or "←". If both sides do not have equality, "←" is used (for example, "x←x+1".

Next, terms used in the following description will be described.

A "sound (signal)" and a "voice (signal)" are used separately. The "sound" is used to include "audio" excluding a human voice and a sound other than human voice. The "voice" is used in a limited way to represent human vocalization such as a "speech".

Note that a "voice segment detection" means to detect the segment where not only a human voice but also a sound other than the human voice is sounded.

A "voice recognition system" represents a system configured of voice recognition in a narrow sense, voice segment detection and sound source extraction in combination.

"Applying a filter" equals to "filtering". Similarly, "applying a mask" equals to "masking".

Hereinafter, the configuration and the process according to the present disclosure will be described in detail by the following items.
1. Summary of Process according to Present Disclosure and Voice Segment Detection Process, Sound Source Extraction Process, Voice Recognition Process
1-1. Summary of Process executed by Voice Recognition Apparatus according to Present Disclosure
1-2. Difficulty of Voice Recognition Process under Various Environments and Problems in Related Art
1-2-1. Difficulty of Voice Recognition Process under Various Environments
1-2-2. Pre-process for improving Voice Recognition Process under Various Environments
1-2-3. Problems in Voice recognition process accompanied by Pre-process
1-2-3.(1) Trade-off of Delay and Accuracy in Sound Source Extraction
1-2-3.(2) Problems in Voice Segment Detection
1-2-3.(3) Trade-off of Delay and Resource in Voice Recognition if a plurality of Activities are overlapped
1-2-3.(4) Summary of Problems generated in Voice Recognition Process
2. Features of Voice Recognition Apparatus according to Present Disclosure
2-1. Novel Points of Sound Source Extraction Process
2-2. Novel Points of Voice Segment Detection Process
2-3. Novel Points of Voice Recognition Process
3. Specific Configuration and Process of Voice Recognition Apparatus according to Present Disclosure
3-1. Whole Configuration of Voice Recognition Apparatus according to Present Disclosure
3-2. Configuration and Process of Frond End Unit in Voice Recognition Apparatus according to Present Disclosure
3-3. Configuration and Process of Voice Recognition Unit in Voice Recognition Apparatus according to Present Disclosure
3-4. Configuration and Process of Image Process Unit in Voice Recognition Apparatus according to Present Disclosure
4. Detail about Process of Voice Recognition Apparatus according to Present Disclosure
4-1. Summary of Entire Process executed by Voice Recognition Apparatus according to Present Disclosure
4-2. Process of Front End
4-3. Block Consuming Transition
4-4. No Block Consuming Transition
4-5. Process of Voice Recognition Unit
4-6. Process of Image Process Unit
5. Alternative Embodiments
5-1. Alternative Embodiment 1: Configuration Embodiment using Meaning Estimation instead of Voice Recognition
5-2. Alternative Embodiment 2: Configuration Embodiment using Hand Pointer as Voice Detection Method
6. Summary of Features and Advantages about Configuration and Process of Voice Recognition Apparatus according to Present Disclosure
7. Summary of Configurations according to Present Disclosure Hereinafter, it will be described in accordance with the above-described items.

1. Summary of Process According to Present Disclosure and Voice Segment Detection Process, Sound Source Extraction Process, Voice Recognition Process Recognition Apparatus According to Present Disclosure Firstly, a summary of a process according to the present disclosure and general process contents of a voice segment detection process, a sound source extraction process and a voice recognition process.

1-1. Summary of Process Executed by Voice Recognition Apparatus

The voice recognition apparatus according to the present disclosure executes a voice segment detection process and a sound source extraction process (sound source separation process), for example, to apply these process results, thereby achieving highly precise voice recognition. In addition, a delay from user's speech end to a voice recognition result generation output can be shortened.

One of features of the voice recognition apparatus according to the present disclosure is to execute a process by unifying a tracking process that tracks a sound estimated from one sound source as time elapsed in voice segment detection and a sound source extraction process that extracts a component corresponding to the sound source from an observation signal. By the process, after a fixed period of time is elapsed from the speech beginning, a filter for a sound source extraction is estimated. Thereafter, until the speech end is detected, the estimation filter is applied to an input signal to sequentially generate a sound source extraction result.

By the process, the voice recognition process can be sequentially performed before the speech end and a recognition result can be generated at a substantially same time as the speech end. In other words, as compared with the related art where the sound source extraction and the voice recognition process are performed after the speech end, the delay can be significantly shortened.

The voice recognition apparatus according to the present disclosure is assumed to be used under the following environments. In other words, highly precise and low delay voice recognition is possible in a hands-free voice recognition apparatus (c) under the environments (a), (b), (d) and (e).

(a) An environment where there is a some distance from a user (speaker) to a microphone (far-field microphone).
(b) A noisy environment. Specifically, there are other sounds (hereinafter referred to as "disturbing sound") than the user's speech (hereinafter referred to as "target sound").
(c) An environment where the user (speaker) inputs an speech beginning time into the voice recognition apparatus using no switch (button) (hands-free).
(d) An environment where a position of the user (speaker) is indefinite. In other words, the user can speak to a microphone from a variety of directions.
(e) An environment where speeches by a plurality of users are overlapped temporally. Note that a plurality of the speeches can be individually and correctly recognized by applying the process according to the present disclosure.

The voice recognition apparatus according to the present disclosure achieves highly precise and rapid voice recognition even under the above-described environments (a) to (e).

The voice recognition apparatus according to the present disclosure can recognize the user's speech under a variety of environments, and can shorten a waiting time to generate a recognition result corresponding to the speech after the speech end.

1-2. Difficulty of Voice Recognition Process Under Various Environments and Problems in Related Art Hereinafter, specific examples of the above-described environments (a) to (e) and difficulty of the voice recognition process under the respective environments will be described. Next, execution examples of the voice recognition process in the related art are shown, and problems of the voice recognition process in the related art will be described.

1-2-1. Difficulty of Voice Recognition Process Under Various Environments (a) An environment where there is a some distance from a user (speaker) to a microphone (far-field microphone).

The environment (a) is a situation that a large scale television is operated by a voice (the television is equipped with a microphone) in a living room, or a situation that a robot is operated by a voice (not by a remote control) (the robot is equipped with a microphone), for example.

Such an environment is suffered less burden upon the user's speech, as compared with a situation that the microphone is positioned near a user's mouth. However, a probability to mix the disturbing sound is increased (environment (b)) or a probability to overlap with other speaker speech (environment (c)) is increased, which may result in a decreased recognition accuracy.

Also, under the environments, the target sound of the voice recognition is limited to a human speech sound, i.e., a voice, but the disturbing sound of the voice recognition is any type of a voice. In other words, if the signal inputted via the microphone is almost soundless or has a feature apparently different from the human voice, it can be easily determined that there is no target sound at the timing thereof, but not vice versa. Even if the signal inputted via the microphone has a voice-like feature, it may be the disturbing sound. This is also a factor to increase the difficulty of the problem.

(b) A noisy environment. Specifically, there are other sounds (hereinafter referred to as "disturbing sound") than the user's speech (hereinafter referred to as "target sound").

In general, the voice can be recognized with high accuracy under the environment only the target sound is present (=the disturbing sound can be ignored), but is recognized with significantly decreased accuracy once the disturbing sound is mixed into the target sound. In order to recognize the voice with high accuracy under the noisy environment, it demands a process that extracts the target sound from a signal recorded by the microphone (hereinafter referred to as an "observation signal"), i.e., to remove the disturbing sound. Here, the process is referred to as a "sound source extraction".

(c) An environment where the user (speaker) inputs an speech beginning time into the voice recognition apparatus using no switch (button) (hands-free).

In general, as the voice is recognized upon the speech segment in the observation signal provided by the microphone, the speech segment (speech segment) should be identified from the speech beginning to the speech end. A method of inputting speech segment information to a voice recognition apparatus by operating an operating unit (such as a switch and a button) is called as a "push-to-talk (PTT)". A method to input using no operating unit is called as hands-free. Note that a method to input only the speech beginning using no operating unit at the time of the speech end is included in the PTT.

In the hands-free voice recognition system, the speech segment should be detected automatically. An automated detection process of the speech segment is called as a "voice segment detection (speech detection)" or a "voice activity detection (VAD)".

The voice segment detection is a very important technology that directly affects usability of the voice recognition system. For example, the user's speech is failed to be detected, the user feels that the own speech is ignored. If the sound other than the target sound is detected by mistake, it may lead to a malfunction of the system. If the detected segment is longer or shorter than the actual speech, it may causes false recognition.

(d) An environment where a position of the user (speaker) is indefinite. In other words, the user can speak to a microphone from a variety of directions.

The direction means a direction of arrival (DOA) of the sound viewed from the microphone. If a user speak direction is fixed, a measure can be simplified. For example, if the user speaks only from a front of the microphone, a method to cut the sound other than that from the front using a superdirective microphone is enough. However, if the user can speak to the microphone from a variety of directions, the process becomes difficult as the above-described voice segment detection and the sound source extraction should correspond to a variety of the directions.

(e) An environment where speeches by a plurality of users are overlapped temporally.

The environment will be described referring to FIG. 1. FIG. 1 represents each speech segment if two users are in front of the voice recognition apparatus equipped with the microphone and one user speaks "hello" and the other speaks "good-by". It is assumed that the two speeches arrive from different directions each other viewed from the microphone attached to the voice recognition apparatus, and that the two segments are overlapped temporally. The way to recognize both of the two speeches correctly will be considered.

In FIG. 1, a vertical axis represents a speech direction (sound source direction) and a horizontal axis represents time. Heights of the respective segments are different. It simply represents that the respective speech arrives from different directions (the respective sound sources are present in the different directions). The difference in the heights does not represent a difference in actual directions. The same applies to the subsequent drawings as well.

In FIG. 1, when only a signal inputted to the microphone is focused, the both speech segments constitute a whole speech segment 13, which equals to a segment from a beginning of "hello" that is the speech segment 11 by the user 1 to an end of "good-by" that is the speech segment 12 by the user 2.

At a part of the whole speech segment 13, two voices are mixed. It should be appreciated that if a mixed signal is processed by the voice recognition during one segment, two correct recognition results cannot be provided. In order to provide the correct recognition results, individual speech segments, i.e., the speech segment 11 by the user 1 and the speech segment 12 by the user 2 should be correctly detected and the disturbing sound should be removed from the individual speech segments.

In other words, in the speech segment 11 by the user 1, "good-by" that is the disturbing sound should be removed and "hello" that is the target sound should be left, and, in the speech segment 12 by the user 2, "hello" that is the disturbing sound should be removed and "good-by" that is the target sound should be left. In addition, if there is "(d) the environment where the position of the user (speaker) is indefinite" as described above, the process should be done on the speeches from any directions.

Figure 2:
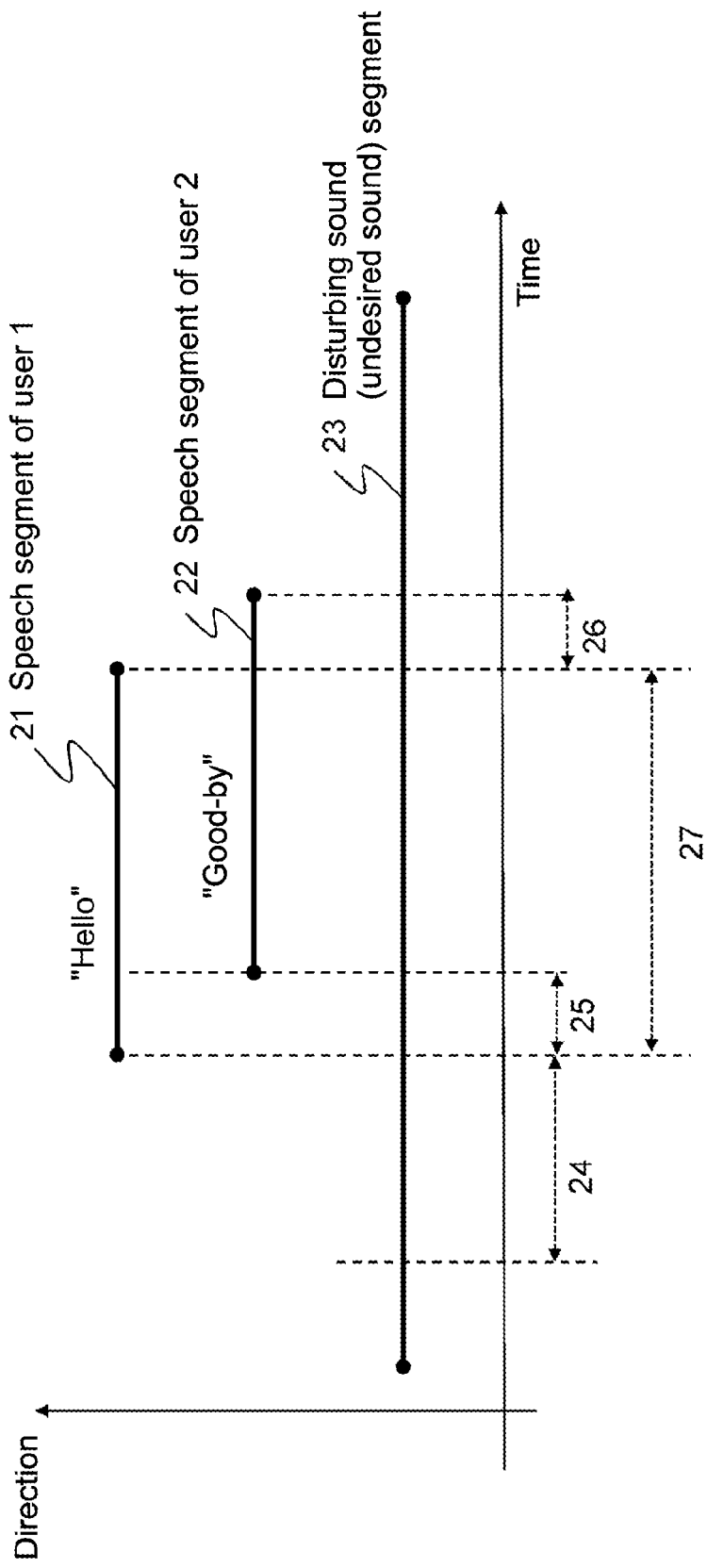
FIG. 2 A drawing for explaining an illustrative specific environment for a sound source extraction process.

Finally, FIG. 2 shows the case that the environments (b) and (e) occur at the same time.
(b) A noisy environment.
(e) An environment where speeches by a plurality of users are overlapped temporally.

These two environments occur in conjunction therewith.

In FIG. 2, similar to FIG. 1, a vertical axis represents a speech direction (sound source direction) and a horizontal axis represents time. A speech segment 21 by the user 1 and a speech segment 22 by the user 2 are overlapped temporally, as shown in FIG. 2. It is assumed that the speeches themselves are the same as the two speeches described referring to FIG. 1.

A disturbing sound segment 23 is not belonging to a human speech. In this embodiment, it is assumed that the disturbing sound is continuously generated from a fixed point. Examples of the sound source are radio and an air conditioner.

In the embodiment shown in FIG. 2, in order to recognize correctly "hello" in the speech segment 21 by the user 1, "good-by" and the disturbing sound should be removed from the speech segment 21 by the user 1. On the other hand, in order to recognize correctly "good-by" in the speech segment 22 by the user 2, "hello" and the disturbing sound should be removed from the speech segment 22 by the user 2. Accordingly, the process becomes more difficult than the configuration of the user's speech shown in FIG. 1.

[1-2-2. Pre-Process for Improving Voice Recognition Process under Various Environments]

Thus, the respective environments (a) to (e) make the voice recognition to be difficult. Under these environments, in order to increase voice recognition accuracy, it is effective to perform the following processes:

a voice segment detection process, and a sound source extraction process, as a preprocess of the voice recognition process, or as more accurate process.

Figure 3:
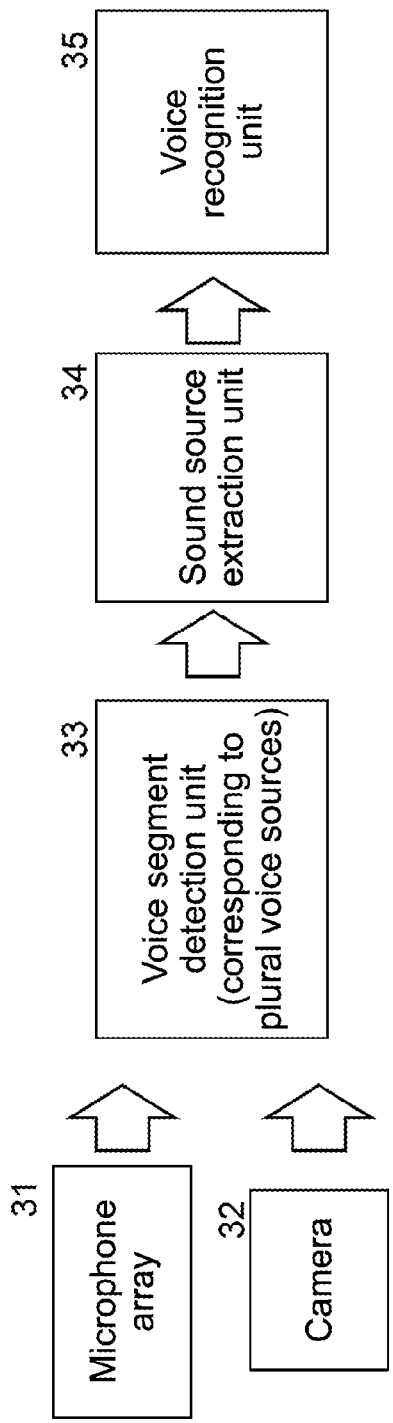
FIG. 3 A diagram for showing an illustrative apparatus configuration for a voice segment detection process and a sound source extraction process before a voice recognition process.

FIG. 3 shows an illustrative apparatus configuration for the voice segment detection process and the sound source extraction process before the voice recognition process.

As an input device, it includes a microphone array 31 and a camera 32, as appropriate. The microphone array has a configuration that a plurality of microphones are arrayed at a predetermined space. Acquired sounds of the respective microphones temporary misaligns depending on the sound source directions. In other words, the respective microphones acquire sound signal having phase differences depending on the sound source directions. By analyzing the phase difference signal, it becomes possible to identify the sound source directions.

The input signal from the input device such as the microphone array 31 and the camera 32 is firstly inputted to a voice segment detection unit 33.

The voice segment detection unit 33 detects the voice segment. In the voice segment detection, a start point (beginning) and an end point (termination) of a plurality of the sound sources are detected to determine the sound source direction.

For example, as described in the above referring to FIG. 1, if the speech activities by a plurality of the users are overlapped, the voice segment in each sound source is determined not by the whole speech segment 13, but by the speech segment 11 of the user 1 and the speech segment 12 of the user 2.

In the environment where a plurality of the speeches are overlapped, several methods to determine each voice segment (=speech segment) and the sound source direction have been suggested in the related art.

For example, International Publication No. WO 06/059806 and Japanese Patent Application Laid-open No. 2012-150237 suggest a method by analyzing the phase difference of the voice signal acquired by the respective microphones configuring the microphone array to estimate the sound source direction, and by applying sound source direction information estimated to detect the voice from the respective sound source directions.

Japanese Patent Application Laid-open No. 2011-191423 discloses a configuration that a camera acquired image is used to analyze an image of a human mouth area, i.e., a lip image, to identify individually the speech segment of each sound source (each user), thereby increasing the voice recognition accuracy.

Both of the method using an estimation of the sound source direction and the method using the lip image have configurations that the sound source direction of the speech segment can be acquired, once the speech segment is detected. For example, the method using the lip image can acquire the sound source direction from a human's lip position within the image. In other words, if a positional relationship between the camera and the microphone array is known, the lip position within the captured image can be determined as the sound source direction.

The voice segment of each speech and the sound source direction information detected by the voice segment detection unit 33 are inputted to the sound source extraction unit 34 together with the acquired sound by the microphone array 31 that is the input device. The sound source extraction unit 34 extracts the sound source. In other words, only the target voice of the voice recognition process is left, and the sound other than that is regarded as the disturbing sound and is removed.

Under use environments to be intended by the present disclosure, there are a variety of sound sources other than the speech for the voice recognition, which have the segment information including beginning, end and the sound source direction as sound generating (active) segments. Therefore, hereinafter a technology for detecting a sound source segment not limited to the human voice and to the target sound/disturbing sound may be called as voice segment detection.

As to the sound source extraction process for extruding the disturbing sound and extracting the target sound, new proposals have been made. For example, International Publication No. WO06/059806 and Japanese Patent Application Laid-open No. 2011-191423 disclose a sound source extraction process to which "Geometrical Source Separation (GSS)" is applied.

In addition, the present applicant has suggested that a method of using a time envelope of the target sound as a reference signal in Japanese Patent Application Laid-open No. 2012-234150 (Japanese Patent Application No. 2012-052548).

Every sound source extraction process method described therein has a configuration that calculates a filter for extracting the target sound (removing other sounds) using the information by a predetermined learning process:

an observation signal (a successive observation signal cut out from the beginning to the end of the speech) corresponding to the speech segment, and sound source direction information of the target sound. By applying the filter calculated to the acquired sound of the microphone, only the target sound can be extracted.

The learning process for calculating the filter disclosed in the above-described documents are executed in a batch process (a process executed for the signal delimited for a certain length). By applying the calculated filter to the observation signal corresponding to the speech segment, a sound source extraction result that is a clean target sound can be provided.

By applying the filter, the clean target sound (voice) from which the disturbing sound is removed is inputted to the voice recognition unit 35 shown in FIG. 3 and the voice recognition process is performed.

Thus, by performing the voice segment detection corresponding to a plurality of the sound sources and the sound source extraction process at a former step of the voice recognition, even under the environments where the disturbing sound is present, there are a plurality of the target sounds for the voice recognition and both of which are overlapped and generated, it is possible to detect the individual target sounds and perform the voice recognition with high accuracy.

[1-2-3. Problems in Voice Recognition Process Accompanied by Pre-Process]

As described referring to FIG. 3, as the pre-process of the voice recognition process, the voice segment detection process and the sound source extraction process are performed, thereby increasing the voice recognition accuracy.

However, the pre-process has the following problems:
(1) trade-off of delay and accuracy in the sound source extraction
(2) problems in the voice segment detection
(3) trade-off of delay and resource in the voice recognition if a plurality of the activities are overlapped.

Hereinafter, each of which will be described.

[1-2-3.(1) Trade-Off of Delay and Accuracy in Sound Source Extraction]

In the voice recognition apparatus to which the above-described sound source extraction process is incorporated, the sound source extraction process for extracting the target sound for the voice recognition is executed in a batch process. In other words, it is a sequence that the sound source extraction process begins only after the end of the speech is determined, an extraction result is generated and then the voice recognition process begins using the extraction result.

When the process is performed by the sequence, it arises the delay from the end of the speech to the generation of the voice recognition result.

Figure 4:
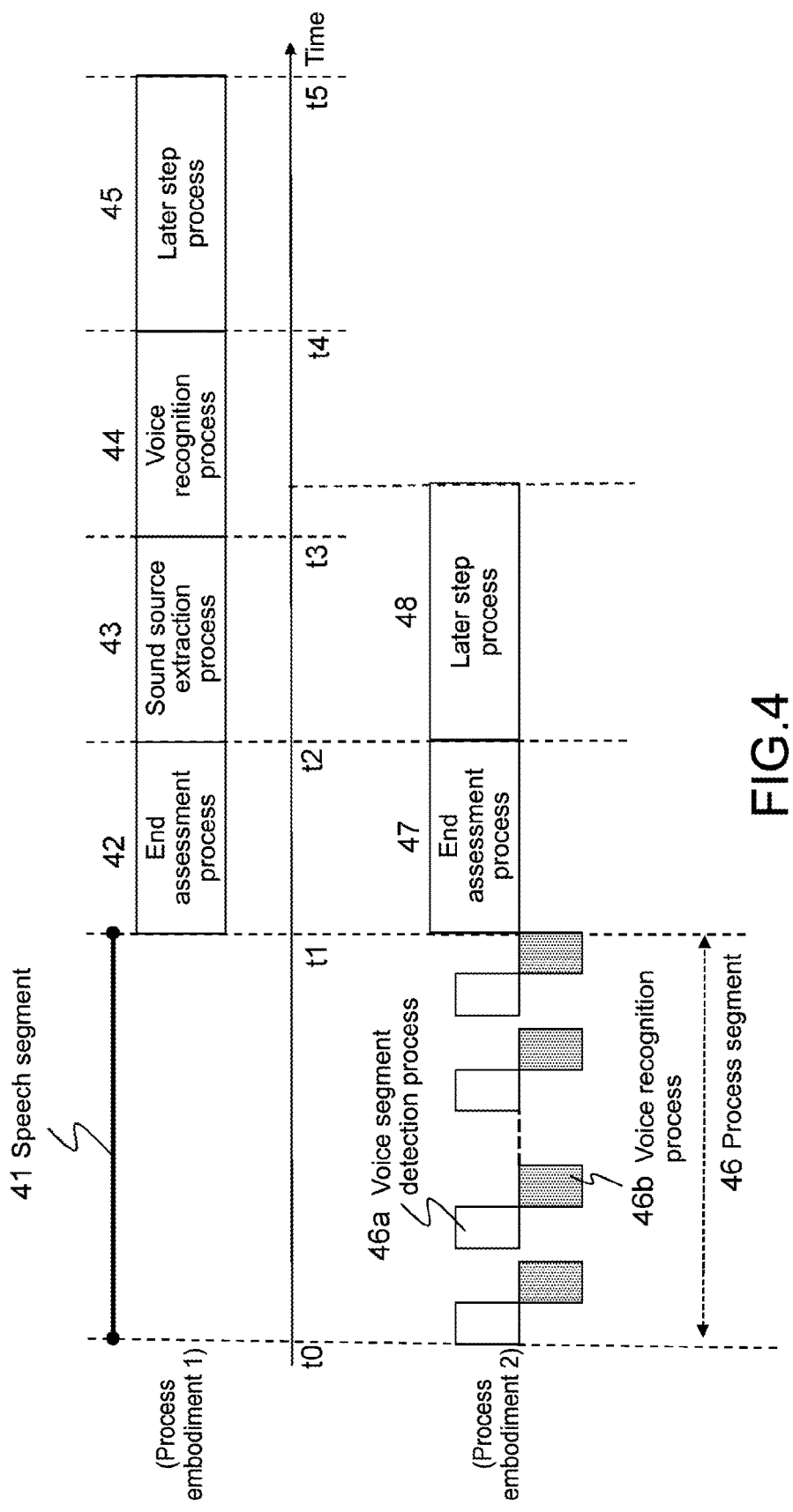
FIG. 4 A drawing for explaining a delay from speech end to a voice recognition result generation.

The delay will be described referring to FIG. 4. In FIG. 4, an elapsed time is represented from left to right, and the process along the elapsed time is shown. In FIG. 4, the speech segment of the voice to be recognized is a speech segment 41 at time t0 to t1.

The (process embodiment 1) shown in FIG. 4 is a process sequence that the sound source extraction process begins once the end of the speech is determined, the extraction result is then generated, and the voice recognition process is performed using the extraction result.

The end of the speech segment 41 cannot be determined at the same time of the speech end by the user. To determine the end, it should be distinguished from a short silence during the speech. It needs a certain length of time. For example, if the silence is within 0.3 seconds and the speech is serial, 0.3 seconds of a waiting time is necessary for determining the speech end. The end assessment process 42 at time t1 to t2 represents the waiting time, and is a part of the voice segment detection process.

After the speech end is determined at time t2, a sound source extraction process 43 is performed at time t2 to t3. Here, the process is executed as a batch process using the speech segment 41. Accordingly, the longer the speech is, the longer the process time is. At time t3, the sound source extraction process 43 is completed. Next, a voice recognition process 44 is executed for the sound source extraction at time t3 to t4. As to the voice recognition process 44, as the speech segment 41 is longer, the process time is longer, too.

In the system using the voice recognition, any process using the recognition result, i.e., a later step process 45 shown in FIG. 4 is performed. For example, if the user's speech of "change the channel to 1" for the television equipped with the voice recognition apparatus is recognized, a channel change is executed based on the recognition result as the later step process 45.

The later step process 45 begins after the voice recognition process 44 is ended, i.e., after time t4, and the result is provided after time t5. Accordingly, the time from time t1 to time t5 is a delay until the result from the system.

For comparison, a delay in the configuration that no sound source extraction is executed is described referring to the (process embodiment 2) as shown in FIG. 4. In other words, the process is such that the sound source extraction unit 34 is removed, and the voice segment detection unit 33 is directly connected to the voice recognition unit 35 in FIG. 3.

The voice segment detection and the voice recognition can be sequentially processed to each input signal. The sequential process of the voice segment detection and the voice recognition is described in Japanese Patent Application Laid-open No. 2012-150237 and Japanese Patent Application Laid-open No. 2001-242883, for example.

In the configuration that the voice segment detection unit is directly connected to the voice recognition unit and no sound source extraction is used, it may be possible to begin the voice segment detection substantially at the same time of the speech beginning (time t0 in FIG. 4), the voice segment detection is sequentially executed, and the voice recognition is sequentially executed.

The process segment 46 is the process segment where the voice segment detection process 46a and the voice recognition process 46b are sequentially and alternately executed. In the process segment 46, the process is performed every time a certain amount of the signal is inputted.

Note that the reason why there is a gap between the voice recognition process 46b and the next voice segment detection process 46a is caused by that the process time is shorter than the actual time of the speech. In other words, if the process time of each speech is shorter than the speech time, it should be waited until it reaches a certain amount of the input signal. The gap shown in the figure represents the waiting time.

In the (process embodiment 2), as the voice recognition process is performed within the speech segment 41, the voice recognition result is created soon after an end assessment process 47 is completed (time t2) and a later step process 48 can be performed so that a response timing of the system is time ta. As compared with the (process embodiment 1), the system can rapidly execute the process based on the speech.

In this way, if no sound source extraction process is performed, the process times not only of the sound source extraction process 43 but also of the voice recognition process 44 shown in the (process embodiment 1) can be skipped. However, if the sound source extraction process is skipped, the disturbing sound and the speech are not removed. It may result in the voice recognition process performed based on the sound signal including undesired sounds other than the target sound, thereby decreasing the recognition accuracy.

Next, the delay and the accuracy are considered is a variety of the sound source extraction process is applied.

A variety of the sound source extraction process to remove the disturbing sound from the acquired sound of the microphone and extract only the target sound for the voice recognition have been suggested until now.

Hereinafter, the delay and the accuracy of a variety of the sound source extraction process will be individually considered.

The methods of the sound source extraction are classified as follows:
(a) A method without adaptation and learning of an observation signal
  (a1) Delay-and-sum array
  (a2) Null beam former
  (a3) Time-frequency masking
(b) A method with adaptation and learning of an observation signal using a segment other than a target sound segment
  (b1) Minimum variance beam former
  (b2) Maximum SNR beam former (c) A method with adaptation and learning of an observation signal using a target sound segment
  (c1) Geometric constrained Source Separation (GSS)
  (c2) Reference signal base sound source extraction Hereinafter, each of the above-described methods will be briefly considered.

Examples of (a) the method without adaptation and learning of the observation signal includes:
  (a1) A process of applying a delay-and-sum array
  (a2) A process of applying a null beam former
  (a3) A process of applying a time-frequency masking.

The batch process is not indispensable in any of the methods, and sequential sound source extraction can be performed. However, an extraction accuracy is inferior.

In the process using the delay-and-sum array, a number of microphones are necessary in order to extract the sound in a designated direction with high accuracy. On the other hand, if a small number (for example, about four) of the microphones is used, the sound in the designated direction can be emphasized only to some degree. Accordingly, the process result still includes the disturbing sound, and the voice recognition accuracy is still decreased.

The process of applying a null beam former creates a filter having directivity (highly sensitive directivity) in the direction of the target sound and having a dead corner (less sensitive directivity) in the direction of the disturbing sound using all sound sources (the target sound and all disturbing sounds). However, if an error is present in the sound source direction, the extraction accuracy is decreased. In addition, although all of the disturbing sounds is not necessary detected under an actual environment (as described later), the disturbing sounds not detected (having unclear directions) are not capable of being removed.

The process using the time-frequency masking is to extract (emphasize) the target sound by masking the frequency where the disturbing sound is more dominant than the target sound (the transmittance of the signal is decreased) and sequentially changing the mask. However, in this method, there is a trade-off between a degree of the extraction and a sound distortion of the extraction result. In other words, if the time-frequency masking is strongly acted in order to remove the disturbing sound, the sound may be distorted and the voice recognition accuracy may be rather decreased.

Examples of the (b) method with adaptation and learning of an observation signal using a segment other than a target sound segment includes:
  (b1) A method using a minimum variance beam former (MVBF)
  (b2) A method of using a maximum SNR beam former In the sound source extraction process according to these methods, the estimation by the extraction filter is done using the observation signal in the batch process. The observation signal used in the batch process is not the speech segment of the target sound but other segment. In other words, the sound source extraction filter is already determined at the time of the speech beginning of the target sound, and the filter is applicable to the observation signal. Accordingly, the sequential sound source extraction is possible after the speech beginning of the target sound.

The method (b) corresponds to a series of methods referred to adaptive beam formers. However, it may be difficult to provide an adequate extraction filter at the time of the speech beginning under the actual environment, which may result in a decreased extraction accuracy. Hereinafter, the phenomenon occurred in each method will be described.

The (b1) minimum variance beamformer (MVBF) is a method to estimate (learn) the filter that forms the dead corner in the direction of the disturbing sound but does not emphasize nor attenuate in the direction of the target sound using the observation signal and the target sound direction. In the MVBF, if the target sound is included in the observation signal used for learning, the dead corner is tried to be also formed in the direction of the target sound, thereby decreasing the extraction accuracy. To overcome the problem, the segment where only the disturbing sound is sounded is detected and the observation signal in the segment is used to learn the filter, for example.

Figure 5:
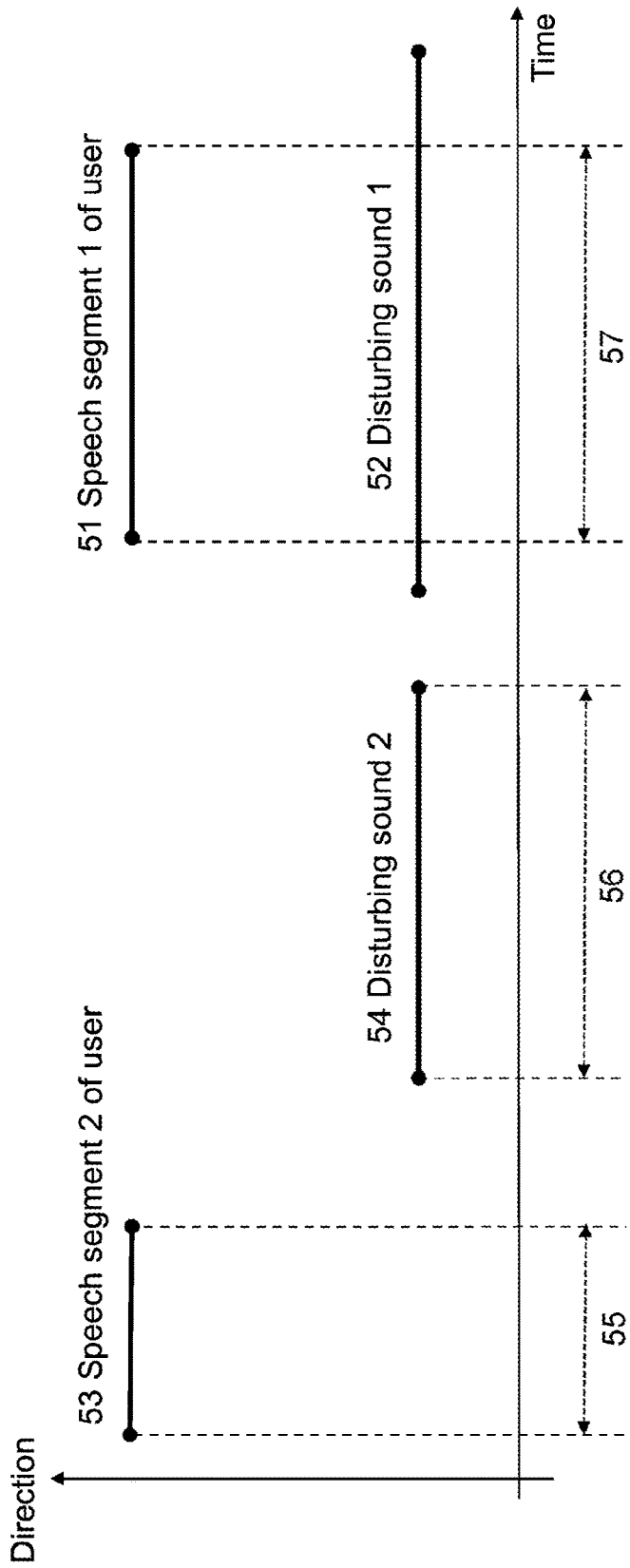
FIG. 5 A drawing for explaining a filter creation to which a minimum variance beamformer (MVBF) is applied FIG. 6 A drawing for explaining a problem of a merge process in voice segments.

Referring to FIG. 5, filter creation by applying the minimum variance beamformer (MVBF) will be described.

In FIG. 5, a horizontal axis represents time and a vertical axis represents a direction. In FIG. 5, if the filter for extracting the speech segment 1 of the user 51 from a segment 57 is tried to be estimated by the minimum variance beamformer (MVBF), an acquired sound in a segment 56 is used. In the segment 57, the user's speech and the disturbing sound are sounded at the same time. As the segment 57 includes the speech segment 1 of the user 51, the user's speech may form the dead corner.

In the sound source extraction method to which the minimum variance beamformer (MVBF) is applied, the segment where all sound sources other than the sound source to be extracted should be adequately detected. In other words, if no such a segment is present, the extraction is not adequately done.

For example, in FIG. 2 as described above, it is difficult to estimate the filter for extracting "hello" in the speech segment 21 of the user 1. Because the sound source from a direction of good-by" direction in the speech segment 22 by the user 2 is not present before the speech beginning of "hello", the filter for removing "good-by" is not capable of being estimated.

Note that as the segment 23 of the disturbing sound (the undesired sound) is present before "hello" in the speech segment 21 of the user 1, the disturbing sound can be removed by creating a filter to which a preceding segment is applied.

In addition, if the delay may be ignored, the filter is created in a segment 26 where the speech of "good-by" is present that is the speech segment 22 of the user 2 after "hello" in the speech segment 21 of the user 1 is completed, thereby creating the filter for removing both of "good-by" in the speech segment 22 of the user 2 and the disturbing sound.

In the other method, i.e., the maximum SNR beam former, the segment where only the target sound is sounded and only the disturbing sound is sounded are detected to estimate the filter using both segments.

For example, in FIG. 5, it is assumed that the filter for extracting the user's speech by the maximum SNR beam former under the situation that both of the target sound for the voice recognition of a speech segment 1 of a user 51 and a disturbing sound 1, 52 are sounded.

Therefore, a segment 55 and a segment 56 are detected: (1) the segment 55 being a speech segment 2 of a user where the user's speech that is the target sound is sounded from the same direction from the speech segment 1 of the user 51, (2) the segment 56 of a disturbing sound 2, 54 where only the disturbing sound sounded from the same direction from the disturbing sound 1, 52.

Thereafter, the sound source extraction filter is determined that a power is increased as great as possible in the segment 55 after the application and the power is increased as small as possible in the segment 56 after the application (maximum SN ratio). The filter thus calculated is applied for the acquired sound in the segment 57, whereby the disturbing sound is decreased from the acquired sound to extract the speech segment of the user 51 that is the target sound.

Note that under the situation that a plurality of the disturbing sounds is present, the segment where all disturbing sounds (all sound source excluding one of the target sounds) are sounded and the segment where only the target sound is sounded are necessary.

Thus, the maximum SNR beam former demands the segment where the target sound is sounded alone and the segment where the disturbing sound is sounded alone. Under the situation that the segments are not present, the filter is not capable of estimating appropriately. For example, under the situation shown in FIG. 2, as the disturbing sound segment 23 is present without breaking, the segment where only one of the target sound is sounded alone is not present. In this case, it is difficult to create the adequate filter.

In addition, as a problem common to the minimum variance beamformer (MVBF) and the maximum SNR beam former, it is necessary to correctly detect whether or not each sound source is sounded. If failed, the extraction accuracy is undesirably decreased. Under the actual environment, it is not capable of being detected correctly whether or not especially the disturbing sound is sounded (for more detail, see "voice segment detection").

Moreover, it is assumed that in the segment where the target sound and the disturbing sound are sounded at the same time and the segment where the disturbing sound is sounded alone, the directions of the respective sound sources are the same. Therefore, if the sound sources of the target sound and the disturbing sound are moved, it is necessary that the sound sources are detected adequately and the filter is estimated again.

These problems are derived from the fact that the speech segment itself that is the target sound is not capable of being used and a past segment is used in the filter estimation.

(c) A method with adaptation and learning of an observation signal using a target sound segment Next, the method (c) will be described. Examples of the method (c) includes:

(c1) Geometric constrained Source Separation (GSS)

(c2) Reference signal base sound source extraction

Furthermore, as the method (c), there is (Independent Component Analysis: ICA) as well as the above-mentioned GSS and "a method using a time envelope of the target sound as a reference signal". Any of which can estimate the filter for extraction from the speech segment itself. For example, the filter for extracting "hello" in the speech segment 21 of the user 1 in FIG. 2 can estimate it from the observation signal in the segment 27. As the segment 27 includes a part of "good-by" in the speech segment 22 of the user 2 and the disturbing sound, it is possible to create a highly precise filter that leaves "hello" and removes otherwise.

Different from the respective methods classified in the above-mentioned method (b), there is a feature that the speech segment itself can be used. Therefore, as long as the segment of the speech to be recognized at this time can be detected, a determination whether or not the segment is at the same position as before is unnecessary. In other words, the extraction filter may be estimated and applied every speech.

On the other hand, the estimation by the filter is the batch process using the whole speech segment. Therefore, the process after the sound source extraction is not capable of done serially. As a result, as described earlier referring to FIG. 4, the delay by the voice recognition in addition to the sound source extraction may undesirably occur.

[1-2-3.(2) Problems in Voice Segment Detection]

Next, possible problems of the voice segment detection that may arise when the voice segment detection is connected to the sound source extraction and the voice recognition will be described.

Firstly, the sound source is not always capable of being detected. This is particularly prominent in the disturbing sound.

For example, [(b) a method with adaptation and learning of an observation signal using a segment other than a target sound segment], i.e., the sound source extraction method to which the (b1) minimum variance beam former (MVBF) or the (b2) maximum SNR beam former is applied in the above-described sound source extraction method is based on the assumption that the segment of the disturbing sound is capable of being detected correctly. The above-described problem may disrupt the filter from estimating correctly. As a result, the extraction accuracy may be decreased.

The following situation is taken as an example: the hands-free voice recognition system is used in a place where a large indefinite number of people comes and goes. Specifically, there is a scene that a user has no dedicated microphone and acquires and analyzes speeches of a variety of users from a variety of directions by a microphone at a fixed position.

Under the environment of usage, the following situation may occur: the user speaks relatively near the microphone (but distant from the mouth) and a large indefinite number of people speak behind the user. In this case, the user's speech that is the target sound is detected relatively easily, but the speech segment of each person behind the user that is the disturbing sound is difficult to be detected correctly.

If the disturbing sound is single and has been continuously sounded, it holds the assumption that "when the target sound is not detected, the disturbing sound is sounded". However, the assumption is not held under the environment where a large indefinite number of people comes and goes.

Furthermore, in the voice segment detection using an image, it may be difficult to detect the disturbing sound by other reasons. For example, the sound source outside of an angular field of a camera is difficult to be detected. Even when the sound source is positioned within the angular field, the sound source may be difficult to be detected from the image. This is because the sound source of the target sound may be limited to a person in the voice recognition system such that the sound source is easily corresponded to an image of a human body site such as a face, a mouth and a hand. However, correspondence of the disturbing sound is generally difficult.

Secondly, there is a problem that may occur if a plurality of the voice segment detection methods is used. For example, it assumes that a method based on a sound source direction estimation (for example, as described in Japanese Patent Application Laid-open No. 2012-150237) is used in combination with a method using a lip image (for example, as described in Japanese Patent Application Laid-open No. 10-51889) as the voice segment detection method. If each method is worked independently, both methods detect the speech segment for one speech. This is called to as "multiple detection". If the subsequent process is done on both segments, there may occur a phenomenon that the system is reacted doubly for one speech even if the segments are correctly recognized.

In order to prevent the multiple detection, there may be a method that segments having similar beginning, end and direction are merged into one at the time when the end of each speech segment is determined, and the voice recognition process is performed on the one segment merged. However, if the segments are merged, the delay derived from the voice segment detection is increased. Even if the voice segment detection method having a low delay feature is used, its advantage is undesirably lost.

Figure 6:
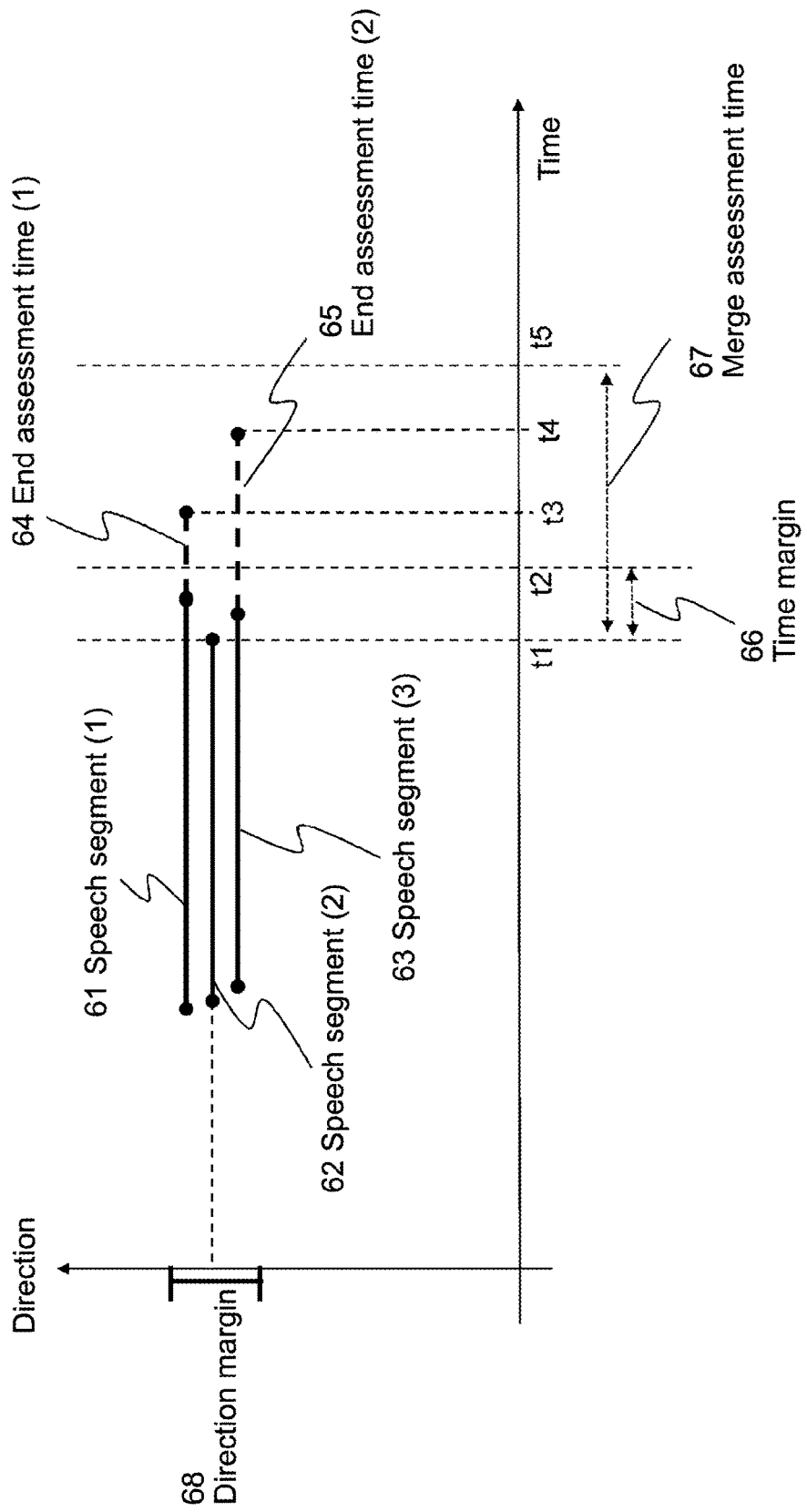

The problem of the merge process will be described referring to FIG. 6. FIG. 6 illustrates three types of the voice segment detection method in combination. A horizontal axis represents time and a vertical axis represents a direction. Speech segments 61 to 63 shown in FIG. 6 are voice segments(=speech segments) detected by three different voice segment detection methods.

For example, the three voice segment detection methods are as follows:
a method based on a sound source direction estimation,
a method using a lip image, and
a method using a detection of a hand shape (for example, as described in Japanese Patent Application
Laid-open No. 2012-203439).

In [* the method using a detection of a hand shape], the speaker, i.e., the user, changes a hand shape during the speech (for example, the hand shape is changed to clench a first during the speech).

The speech segments 61 to 63 shown in FIG. 6 are detected by the above-described three methods for one speech. Each of beginning, end and direction in each segment is similar but is different. Also, an end assessment time (corresponding to the end assessment process 42 in FIG. 4) is different in each method. In the method of detecting a speech segment (1) 61, a period from the end of the speech end to a time t3 corresponds to the end assessment time, and in the method of detecting a speech segment (3) 63, a period from the end of the speech end to a time t4 corresponds to the end assessment time. In the method of using the hand shape, the end assessment time can be ignored. A speech segment (2) 62 in FIG. 6 is detected by the method of using the hand shape. Accordingly, timings to determine the end of the respective speech segments 61 to 63 are time t3, time t1, and time t4.

Any of the three segments is generated from one speech. The speech is detected triply at the time of the detection. Then, these are merged into one. For this purpose, margins are set for a time and a direction. If the time of the end and the direction of the segment are within the defined range as to the certain segments, the segments satisfying the aforementioned problem are merged into one. For example, in FIG. 6, as end of a speech segment (2) 62 is firstly determined, a direction margin 68 centered at a direction of the speech segment (2) 62 and a time margin 66 beginning at the end of the speech segment (2) 62 are set. In the figure, as the remaining speech segment (1) 61 and the speech segment (3) 63 are within the both margins, these three segments are merged into one.

However, a method for merging the results from a plurality of the segment detection methods increases the delay as compared with a single segment detection method. This is because a time is necessary to determine whether or not the segments are merged and should be still longer than the longest end assessment time.

For example, in FIG. 6, the ends of all three speech segments (1) to (3) is determined at time t4. In other words, the determination whether or not to merge is done after time t4. A time from the determination of a first end to the determination of the merge is called as a merge assessment time. Times t1 to t5 shown in FIG. 6 are a merge assessment time 67.

In order to completely prevent the multiple detection by merging the speech segments, at least a sum of the time margin and the longest end assessment time is necessary as the merge assessment time. In other words, as the merge assessment time depends on the longer end assessment time, the method characterized by a short end assessment time does not take advantage thereof.

A third problem is a combination of the sequential sound source extraction. According to the present disclosure, a sequential sound source extraction process is possible irrespective of the batch process as described later. However, there is no disclosure about a process for effectively shorten the delay over the system in a combination of the serial process sound source extraction and a plurality of the voice segment detection methods.

[1-2-3.(3) Trade-Off of Delay and Resource in Voice Recognition if a plurality of Activities are Overlapped]

If the voice segment detection and the sound source extraction ideally function, other problem may arise in the voice recognition. Under the environment that the present disclosure assumes, the voice segments of the respective sound sources can temporally overlapped each other without distinguishing between the target sound and the disturbing sound. It is an important determination thing to preferentially select any of a plurality of the voice segments and to execute the voice recognition process. If a priority is misselected, the delay until the recognition result is generated is increased. On the other hand, if a plurality of the voice recognition runs in parallel, the delay can be shortened, but a large amount of resources such as a CPU use rate and a memory use amount is necessary.

Here, before the delay of the voice recognition is described, a voice recognition decoder (hereinafter referred to as a "decode") will be described.

Among the voice recognition processes, a process for determining a phonemic sequence and a word sequence corresponding to a sequence of a feature amount inputted is called as "decode" and a module therefor is called as a decoder.

Basically, one decoder can process only one input sequence. If there is only one decoder and a plurality of the segments are temporally overlapped, there occurs a phenomenon that one decode is forced to wait until the other decode is completed. This is called as a queue of the decode process.

The queue of the decode process will be described referring to FIG. 7 and FIG. 8. In each figure, a horizontal axis represents time, a vertical axis represents a direction and the sound source segment is similar to that in FIG. 2. In this embodiment, under the environment where the disturbing sound is sounded long time, two users speak temporally overlapped.

Figure 7:
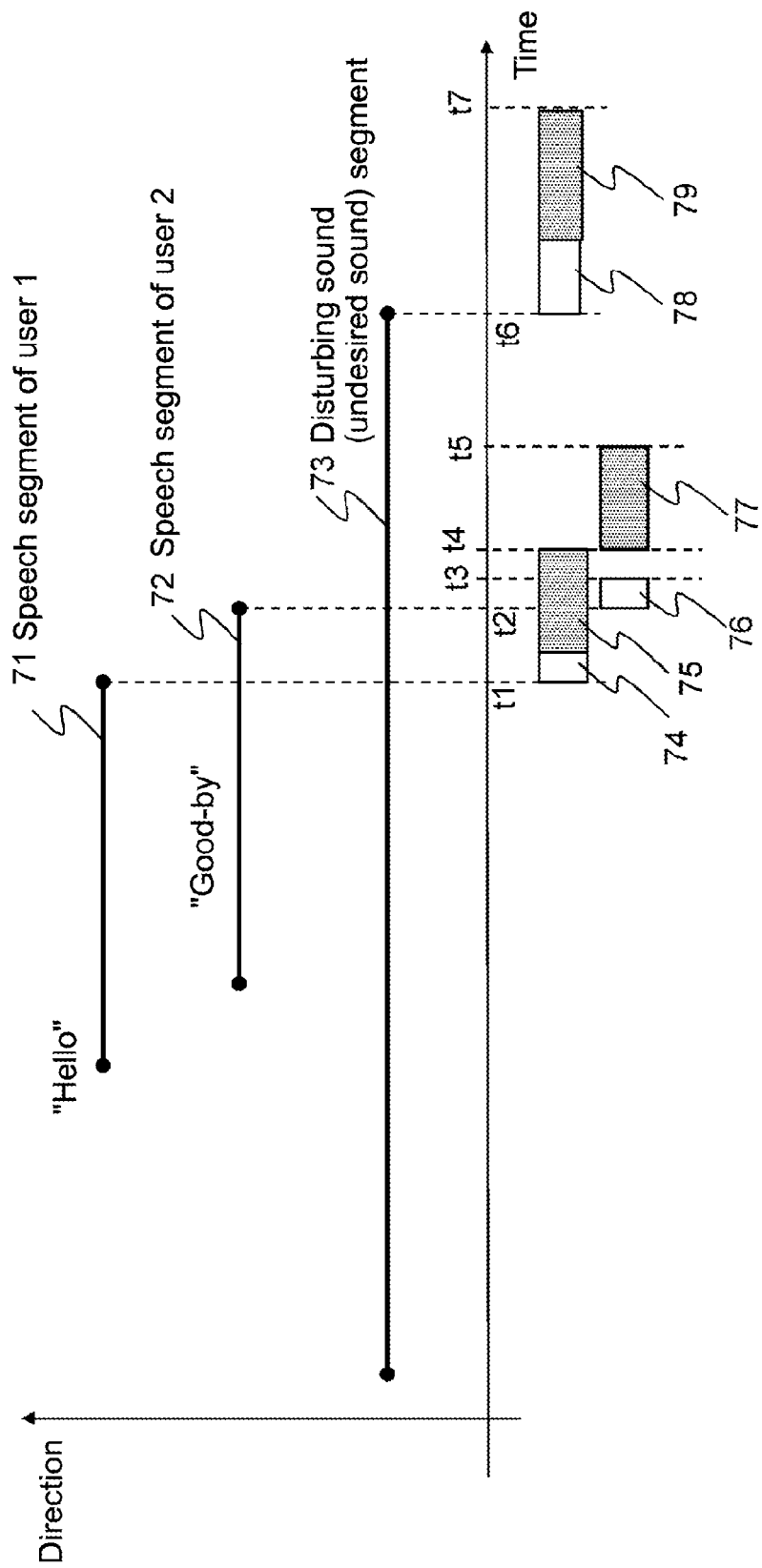
FIG. 7 A drawing for explaining a queue of a decode process as a voice recognition process.

FIG. 7 shows a timing where the sound source extraction process and the decode process (the voice recognition process) are performed if the sound source extraction and the voice recognition are combined in the batch process (not sequential process) in the related art. Three voice segments 71 to 73 are similar to the voice segment 21 to 23 as shown in FIG. 2. In each of these three segments, the sound source extraction is performed in the batch process and each result is decoded. Note the segment 73 is the disturbing sound and decode is normally not necessary. However, there is no choice but to use the method that all segments detected are basically decoded and, if scores and reliability degrees thereof are low, the sound is regarded as the disturbing sound except that the sound can be determined whether or not it is the disturbing sound by the image and a preliminary knowledge.

In FIG. 4 as described above, as a delay time, four types of the delay time of the end assessment process 42 to the later step process 45 are described. Here, for simplicity, the end assessment time 42 and the later step process 45 can be ignored, only the sound source extraction process 43 and the voice recognition process 44 are considered, and the decode process occupies substantially all time of the voice recognition process. Between different segments, the sound source extraction process and the decode process can be performed at the same time in parallel.

In FIG. 7, it is assumed that the sound source extraction process is executed as the batch process. Therefore, the sound source extraction process begins at a timing (t1) where the end of the speech segment 71 by the user 1 is determined. A process period 74 represents the sound source extraction process. Thereafter, the decode process begins. A process period 75 represents the decode process.

Here, it is assumed that the timing that the speech segment 72 by the user 2 is completed is almost same as the end of the speech segment 71 by the user 1, although it is a bit later. Then, the sound source extraction process of the speech segment 72 can begin at the time when the end of the speech segment 72 by the user 2 is determined as shown in the process period 76 (the sound source extraction and the decoder can be processed at the same time). However, at a timing (t3) where the sound source extraction process in the speech segment 72 by the user 2 is ended, the decode process (process period 75) of the speech segment 71 by the user 1 is likely to be continued. In this case, the timing where the decode of the speech segment 72 by the user 2 can begin is at the time when the decode of the speech segment 71 by the user 1 is ended, i.e., a time t4.

In other words, the decode of the speech segment 72 by the user 2 is forced to wait until the decode of the speech segment 71 by the user 1 is ended. The phenomenon is called as "a queue of a decode". If the queue of the decode is created, the delay of the voice recognition system is more and more increased.

As to the decode of the disturbing sound in the segment 73, the decode (a process period 79) can begin without waiting as long as a decode (a process period 77) of the speech segment 72 by the user 2 is ended before the end of the disturbing sound in the segment 73 is determined.

On the other hand, if the sound source extraction can be sequentially processed, it is normally possible to shorten the delay from the speech end to the voice recognition as described referring to a lower part (process 2) of FIG. 4. However, if the segments are overlapped temporally, there is only one decoder, and an allocation of preferential decode of the segments is not adequate, the delay may be rather increased. FIG. 8 illustrates the phenomenon.

Figure 8:
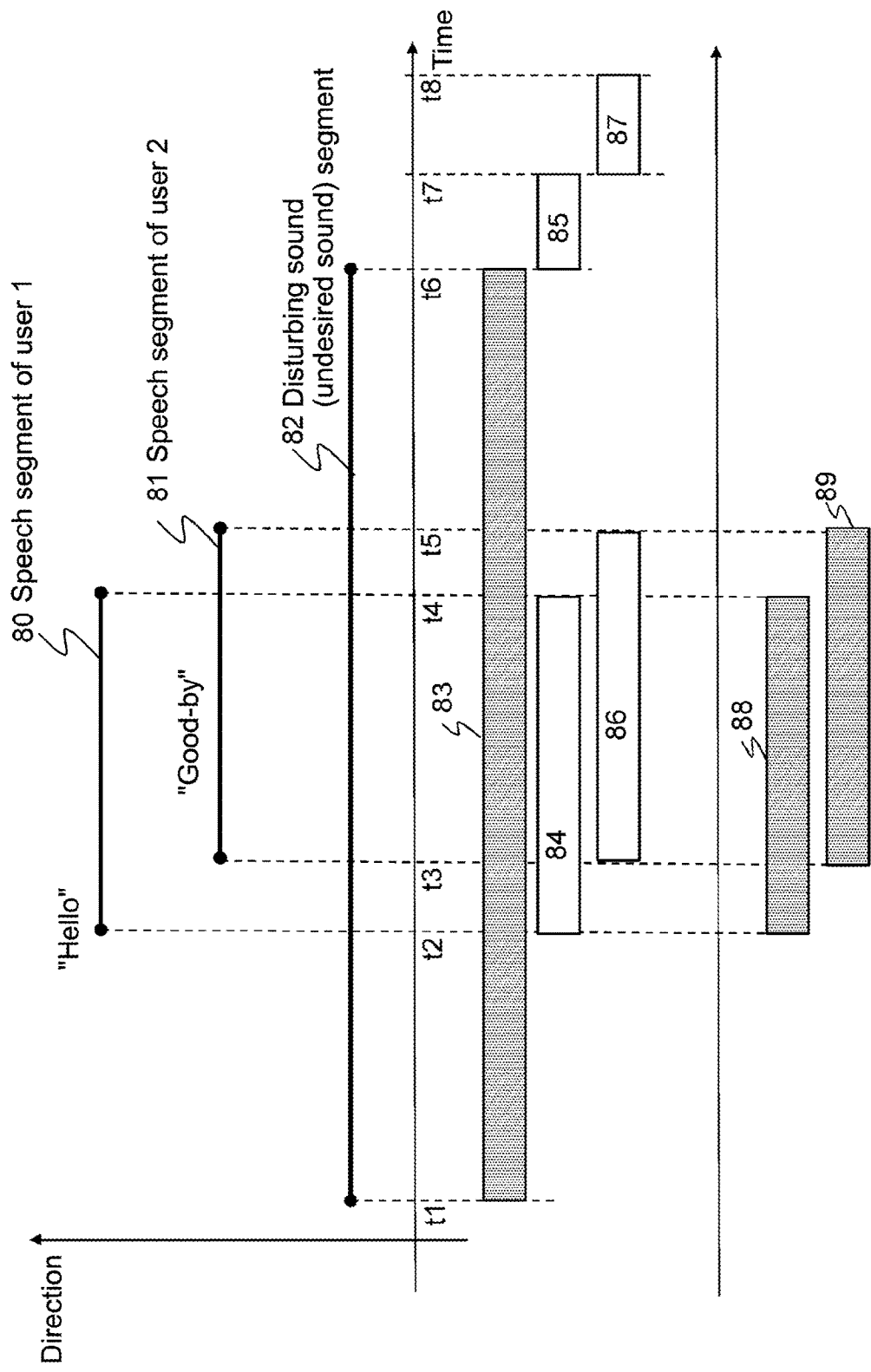
FIG. 8 A drawing for explaining a queue of a decode process as a voice recognition process.

In FIG. 8, voice segments 80 to 82 are the same voice segments as the three voice segments 21 to 23 shown in FIG. 2, and represent overlapped speeches and the disturbing sound. Any of the voice segment detection, the sound source extraction and the voice recognition (decode) allows the sequential process. It is assumed that if there is one segment, these three processes begin substantially at the same time at the beginning of the segment and is ended at the end.

When the three processes are preferentially allocated to the segment firstly begun, the three processes are firstly allocated to the segment 82 of the disturbing sound. The process period 83 represents that the voice segment detection/sound source extraction/voice recognition (decode) are sequentially performed on the segment 82 of the disturbing sound.

If limited to the segment, the voice recognition process is completed at a substantially same time as the end. Note that it is a desirable behavior that the segment 82 is rejected (no later step process) depending on a score and a reliability degree as a result of the voice recognition, as the segment 82 is the disturbing sound.

However, if the segment 82 of the disturbing sound is firstly decoded, the queue is created for the remaining segments, i.e., the speech segment 80 of the user 1 and the speech segment 81 of the user 2, and the delay in FIG. 8 is increased greater than that in FIG. 7. Since the decoder is occupied for the process of the segment 82 (the process period 83) during a period of the speech segment 80 of the user 1, the decode of speech segment 80 of the user 1 is not capable of starting, even if the speech segment 80 of the user 1 is ended.

As shown in a process period 84, even if the voice segment detection and the sound source extraction are executed in advance on the speech segment 80 of the user 1, as shown in a process period 85, the decode can begin after the decode process 83 (t3) on the segment 82 of the disturbing sound and the recognition result is generated at a timing of time t7.

Similarly, as to the speech segment 81 of the user 2, as shown in a process period 86, the voice segment detection and the sound source extraction are executed in advance. However, the decode can begin at time t7 and the recognition result is generated at a timing of time t8.

Specifically, the embodiment shown in FIG. 8, the recognition result is generated in the segment 82 of the disturbing sound is created earlier than the segment 73 of the disturbing sound shown in FIG. 7. The segment 82 is to be rejected and there is no advantage in a user's point of view. On the other hand, as the segment 82 of the disturbing sound is decoded earlier than the remaining segments, a start of decoding of the speech segment 80 of the user 1 and the speech segment 81 of the user 2 is forced to wait until the end of the decode of the segment 82. As a result, the user feels that the delay is increased as compared with the embodiment shown in FIG. 7.

Note that even in the embodiment shown in FIG. 8, as long as the decoders can be prepared as much as the overlapped segments, the voice segment detection/sound source extraction/voice recognition (decode) can be sequentially performed on the segments, thereby shortening the delay time. It is represented by process periods 88, 89 in a lower part of FIG. 8.

If three or more decoders are prepared, even when the segment 82 of the disturbing sound is being decoded (the process period 83), it is possible to decode other voice segments by remaining decoders.

The decode process on the speech segment 80 of the user 1 is represented as a process period 88 and the decode process on the speech segment 81 of the user 2 is represented as a process period 89. Thus, if a plurality of the decoders is used, no queue of the decoder is created. Accordingly, as to any of the three segments, the recognition result is created at a substantially same time of the determination of the end.

However, if a plurality of the decoders is prepared, resources such as a memory and a CPU are consumed instead. Therefore, there is an upper limit of the number of the decoders. In other words, it is not actual assumption that if an N number of the segments are temporally overlapped, an N number of the decoders can be constantly prepared.

The actual assumption may be that a plurality of, but a limited number of (for example, two), the decoders are prepared, and the segments may be generated exceeding the number of the decoders. Definitely, it assumes that the number of the decoders is greater than one and are lower than the number of the segments.

However, there is no effective solutions in the related art as to the following: Under the environment where a plurality of the segments are temporally overlapped as described above, there is a question about a decrease in the delay, depending on the way to allocate the decoders to the segments on the assumption that the number of the decoders is lower than the number of the segments used.

[1-2-3.(4) Summary of Problems Generated in Voice Recognition Process]

Here, problems generated in the voice recognition process are summarized. Under the environment to which the present disclosure is intended, a plurality of the sound sources may be sounded as the same time, and one or more of them may be the target sound(s). This feature causes the following problems on the voice segment detection/sound source extraction/voice recognition.

(Problem in Voice Segment Detection Process)

If a plurality of the methods is used in combination in order to detect the segments that can be temporally overlapped with high precision, either of the multiple detection or an increase of the delay may occur.

(Problem in Sound Source Extraction Process)

If the batch process is performed using the whole segments in order to extract the temporally overlapped segments with high precision, the delay from the end of the speech to the generation of the voice recognition result is increased.

If the sound source extraction method that allows the sequential process is used, the sound source extraction accuracy is decreased.

(Problem in Voice Recognition Process (Decode))

If the segments temporally overlapped are tried to be decoded by one decoder, the queue is creased in the decode process causing the increase of the delay.

It is difficult to always prepare the decoders having the same number of the overlapped segments in view of the limitation of the resources.

No solutions are provided by the related art concerning how to decrease the queue, if the limited number of the decoders is used, i.e., the number of the decoders greater than one and lower than the number of the segments are used.

2. Features of Voice Recognition Apparatus According to Present Disclosure

Next, features of the voice recognition apparatus according to the present disclosure will be described.

In the present disclosure, in order to solve the above-described problems, the voice segment detection, the sound source extraction and the voice recognition have novel points different from the process in the related art. The most important point is that the sound source extraction can be performed substantially serially while the extraction accuracy is kept high. Firstly, the novel points in the sound source extraction are described. Thereafter, the novel points of the voice segment detection and the voice recognition will be described.

2-1. Novel Points of Sound Source Extraction Process

Hereinafter, the novel points in the sound source extraction process executed in the voice recognition apparatus according to the present disclosure will be described.

Firstly, the extraction filter applied to the sound source extraction and filter estimation and application will be described specifically referred to the numerical formula.

By applying the short-time Fourier transform (SIFT) as described later to the observation signal acquired by the microphone, the observation signal in time frequency region is generated.

A frame number (or time) is represented by t, a frequency bin number (or frequency) is represented by ω, an observation signal acquired by the k-th microphone in the time frequency region is represented by $X_k(\omega,t)$.

Each observation signal is acquired from a plurality of the microphone disposed at predetermined positions. In other words, the observation signal has a plurality of input channels having the same number of the microphones.

A column vector including the observation signal for all channels (all microphones) is represented by $X(\omega,t)$ in the numerical formula [1.1]. The $X(\omega,t)$ is called as an observation signal vector.

[Numerical Formula 1]

$$X(\omega, t) = \begin{bmatrix} X_1(\omega, t) \\ \vdots \\ X_n(\omega, t) \end{bmatrix} \quad [1.1]$$

$$Y(\omega, t) = W(\omega)X(\omega, t) \quad [1.2]$$

$$W(\omega) = [W_1(\omega), \cdots, W_n(\omega)] \quad [1.3]$$

$$X_k(t) = \begin{bmatrix} X_{k1}(1, t) \\ \vdots \\ X_k(M, t) \end{bmatrix} \quad [1.4]$$

A filter for extracting the target sound to be processed by the voice recognition from the observation signal according to the present disclosure is a column vector $W(\omega)$ represented by the above-described numerical formula [1.3]. Applying the filter (filtering) is that the observation signal vector is multiplied by the filter as shown in the numerical formula [1.2].

By selecting the filter $W(\omega)$ adequately, a target signal can be extracted (emphasized) from the observation signal vector $X(\omega,t)$ and the other signals can be removed (attenuated). The filter is called as the extraction filter, and a filter application result $Y(\omega,t)$ is called as a (sound source) extraction result. The filter application result $Y(\omega,t)$ is a signal including a number of components of the target sound for the voice recognition and including less disturbing sound. By applying the filter application result $Y(\omega,t)$ to execute the voice recognition, a highly precise voice recognition result can be provided.

On the other hand, a process for determining an adequate extraction filter $W(\omega)$ is called as an estimation of the extraction filter. In particularly, an estimation process using the observation signal is called as learning. The filter estimation process is, for example, used in the filter estimation to which the above-described GSS (Geometrical Source Separation), the delay-and-sum array and a variety of beamformers are applied or the method described in Japanese Patent Application Laid-open No. 2012-234150 (Japanese Patent Application No. 2012-052548), which is the former patent application by the present applicant. An application of the filter (the numerical formula [1.2]) is common but the method of estimating (learning) the filter is different in each method.

In order to extract the target sound with high precision from the observation signal, it is desirable that the batch process using all speech segments is executed to estimate (learn) the extraction filter. However, after the end of the speech is detected, the batch process is performed, which may cause the delay as described above. Therefore, the extraction filter is estimated after a fixed period of time is elapsed from the speech beginning. From the time to the speech end, the extraction filter is fixed and only applied to the observation signal (the numerical formula [1.2]). The application itself of the filter can be sequentially, whereby the sound source extraction can be sequentially processed although in the batch process.

The sequential process of a sound source extraction will be described referring to FIG. 9. Also, in FIG. 9, similar to the figures as described above, a horizontal axis represents time and a vertical axis represents a direction. The target sound 91 is targeted by the voice recognition. The start point (beginning) is time t2. In the process according to the present disclosure, the estimation of the extraction filter begins after a period (t3) of a fixed time is elapsed from the beginning of the target sound. This is an "estimation of the extraction filter 95" shown in the figure.

In the estimation of the extraction filter 95, the filter is estimated using the observation signal from time t2 that is the start point (beginning) of the target sound 91 to time t3 or the observation signal from a certain point before time t2 (time t1) to time t2, and the direction of the target sound from time t2 to time t3. The estimation process of the extraction filter based on the observation signal can be executed by the known method. Specifically, the extraction filter can be estimated by the method described in Japanese Patent Application Laid-open No. 2011-191423.

The filter provided in the estimation of the extraction filter 95 is applied to the observation signal in the speech segment to generate the sound source extraction result. The process is roughly classified into two steps.

The first step is that the filter is applied to the observation signal from the speech beginning (t2) of the target sound 91 to an estimation beginning time (t3). An "application of the extraction filter (1) 96" shown in FIG. 9 shows the process.

At time t5, after the "application of the extraction filter (1) 96" is ended, a next step process begins. The process is a sequential filter application process to the observation signal after time t3. In other words, every time a certain amount of the observation signal is inputted, the filter is applied to a predetermined amount of the observation signal inputted to sequentially generate the extraction results.

One box in an "application of the extraction filter (2)" shown in the figure represents one time of the filter application.

Immediately after time t5 at which the "application of the extraction filter (1) 96" is ended, the filter application process is executed delayed to the observation signal inputted. Therefore, a successive filter application is performed without waiting time. With time, the filter application process catches up the observation signal inputted. Then, the filter application process is performed by intervening an appropriate waiting time 98.

In this manner, the sound source extraction is sequentially processed in the course of the speech, and the voice recognition process that is the later step is also sequentially processed. Accordingly, at substantially the same of the end of the time speech (time t6), it is possible to generate the voice recognition result.

When the speech is ended before time t6, the sound source extraction and the voice recognition are performed upon the speech end similar to the related art. In that case, there is no sequential process. In this embodiment, such process is limited to a speech shorter than time t2 to t3. As described above, the shorter the speech is, the shorter the process time in the sound source extraction and the voice recognition is. As long as it is limited to the short speech, the delay does not become a great problem even if the sequential process is not performed.

In this manner, by estimating the extraction filter on the way of the voice segment of the target sound, the delay problem of the sound source extraction can be solved, but the extraction accuracy may be decreased. Hereinafter, causes and solving methods of the decrease in the extraction accuracy are described.

There may be two causes of the decrease in the extraction accuracy by estimating the extraction filter on the way of the voice segment of the target sound for the voice recognition:
(1) The number of learning samples used for the estimation of the filter is decreased.
(2) The disturbing sound created after the filer estimation is not capable of being removed.

Hereinafter, the respective causes and their solving methods will be described.

Firstly, the cause and the solving means that "(1) the number of learning samples used for the estimation of the filter is decreased" are described. For example, if the extraction filter estimation is performed by applying the method described in Japanese Patent Application Laid-open No. 2011-191423, the number of learning data samples will be the number of frames of the observation signal used in the filter estimation. For example, in the embodiment shown in FIG. 9, only the observation signal from time t2 to t3 is used instead of the observation signal from time t2 to time t6 is used, the number of the learning sample is simply decreased and the filter may not be appropriately estimated in the learning.

In order to provide a sufficient number of the learning samples with certainty, the beginning of the observation signal that is the learning data may be set before time t2. For example, the beginning is set at a time point (time t1) when a fixed period of time is preceded from time t3. By setting the beginning of the learning data before the beginning of the segments, there is an advantage other than that the number of the learning samples is ensured. For example, if the disturbing sound is sounded before the target sound, i.e., if there is the disturbing sound 1, 92, the disturbing sound can be better removed.

Next, the cause and the solving means that "(2) the disturbing sound generated after the filter estimation is not capable of being removed" are described.

Figure 9:
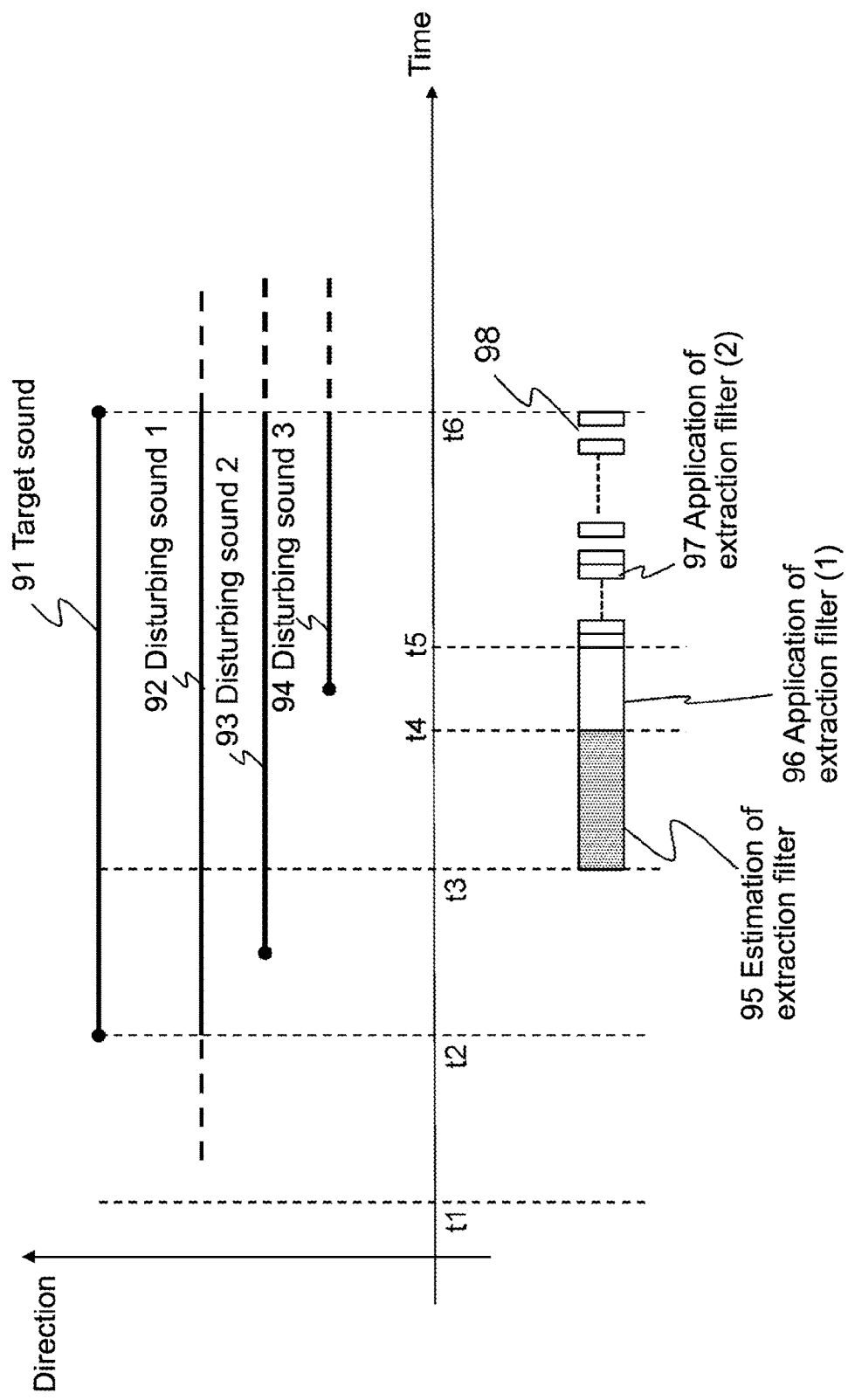
FIG. 9 A drawing for explaining a sequential process of a sound source extraction.

The disturbing sound generated after the filter estimation is the disturbing sound that begins to be sounded after time t3, for example, in the embodiment shown in FIG. 9, and corresponds to the disturbing sound 3, 94. If the filter is estimated using the observation signal from time t1 to time t3 as the learning data, the disturbing sound 1, 92 sounded before time t2 and the disturbing sound 2, 93 sounded between time t2 to t3 can or have possibility to be removed. However, the disturbing sound 3, 94 is not removed because the disturbing sound 3, 94 is not included in the learning data. Accordingly, in order to prevent the extraction accuracy due to the disturbing sound such as the disturbing sound 3, 94, other measure is necessary.

According to the present disclosure, the following two technologies are introduced, thereby preventing a decrease in the extraction accuracy caused by the disturbing sound such as the disturbing sound 3, 94 generated after the filter creation.
a) A whole dead corner space filter (for example, described in Japanese Patent Application Laid-open No. 2011-107602), and
b) A time frequency masking (for example, described in Japanese Patent Application Laid-open No. 2012-234150 (Japanese Patent Application No. 2012-052548) which is the former patent application by the present applicant). Hereinafter, each of which will be roughly described. Process details will be described later.

The "a) whole dead corner space filter" refers to a filter where the dead corners are formed all sound source directions included in the learning data. If the application result of the whole dead corner space filter is subtracted from the application result of the extraction filter, the sound that is not capable of being removed by the respective filters can be canceled out. Specifically, in the embodiment shown in FIG. 9, for example, if the whole dead corner space filter is estimated using the observation signal from time t1 to time t3 as the learning data is estimated, and the whole dead corner space filter estimated is applied to the observation signal in the segments from time t2 to time t6, the target sound 91, the disturbing sound 1, 92 and the disturbing sound 2, 93 are removed, but the disturbing sound 3, 94 not included in the learning data is not removed.

On the other hand, the extraction filter for extracting the target sound from the learning data that are the observation signal from the same time t1 to time t3 is estimated, and is also applied to the segments from time t2 to time t6. By the application of the extraction filter, the disturbing sound 1, 92 and the disturbing sound 2, 93 are removed and the target sound 91 and the disturbing sound 3, 94 remain.

In other words, the observation signal from time t1 to time t3 is used as the learning data to create the whole dead corner space filter and the extraction filter. If these two filters are individually applied to the observation signal in the segments from time t2 to time t6, the following two data is provided.
(a) An application result of the whole dead corner space filter: a residual sound=the disturbing sound 3, 94 (the target sound 91, the disturbing sound 1, 92 and the disturbing sound 2, 93 are removed)
(b) An application result of the extraction filter: a residual sound=the target sound 91, the disturbing sound 3, 94 (the disturbing sound 1, 92 and the disturbing sound 2, 93 are removed)

Accordingly, if the application result of the extraction filter is subtracted from the application result of the hole dead corner space filter, the disturbing sound 3, 94 is canceled out as long as scales of both results are adequate. As a result, only the target sound 91 can remain.

In other words,
(the application result of the extraction filter)−(the application result of the whole dead corner space filter)=(the target sound 91+the disturbing sound 3, 94)−(the disturbing sound 3, 94)=the target sound 91.

In this manner, two different filters are created and computing is performed using the application results of the respective filter, whereby the target sound can be extracted while excluding the effect by the disturbing sound that is not present upon the filter creation.

Next, the "b) time frequency masking" will be described.

In the time frequency masking, a mask is firstly created. The mask does not decrease and transmit the frequency within a region where the disturbing sound is less included using the observation signal and directional information about the target sound, but decreases the frequency within a region where the disturbing sound is much included.

Thus, the time frequency masking sequentially creates the mask that controls a transmitting signal depending on a frequency band per unit of short time, applies the mask created to the observation signal, and creates the signal where the disturbing sound is decreased.

The process to which the time frequency masking is applied is described in detail in Japanese Patent Application Laid-open No. 2012-234150 (Japanese Patent Application No. 2012-052548) which is the former patent application by the present applicant). Firstly, the extraction filter is applied to the observation signal. The time frequency masking is performed on the result. In this way, the sound arriving from a different direction of the target sound can be removed more effectively.

Thus, for example, as shown in FIG. 9, the disturbing sound 3, 94 that is created after the extraction filter creation process is not capable of being removed even if the extraction filter created at the estimation of the extraction filter 95 is applied but is capable of being decreased by the time frequency mask.

2-2. Novel Points of Voice Segment Detection Process

Next, novel points of the voice segment detection in the voice recognition apparatus according to the present disclosure will be described.

The voice recognition apparatus according to the present disclosure is characterized in that the sound source is extracted in the course of the voice segment in the target sound for the voice recognition. In order to achieve this, it is necessary to unifiedly perform the voice segment detection and the sound source extraction. At the same time, it means that even when a plurality of voice segment detection means is used, these means should be operated unifiedly. In other words, the following two points are necessary:
a) Unification of the voice segment detection and the sound source extraction
b) Unification of a plurality of the voice segment detection means Before explaining the above-described a) and b), methods of detecting the voice segment are classified. There are some methods of detecting the voice segment corresponding to a plurality of the sound sources. These are classified into the following two:
(Method 1) the Assessment Time of the Voice Segment End is Necessary A method using the sound source direction estimation (described in Japanese Patent Application Laid-open No. 2012-150237, for example)

A method using the lip image (described in Japanese Patent Application Laid-open No. 10-51889, for example)
(Method 2) the Assessment Time of the Voice Segment End is unnecessary A method using a change in the hand shape based on the image (described in Japanese Patent Application Laid-open No. 2012-203439, for example)

The change in the sound source direction estimated by the sound source estimation and the lip image may also be generated even at a timing and a direction not relating to the voice speech. In some cases, the segment may be temporary breaking in the course of the speech. Accordingly, in order to determine the beginning or the end of the voice segment, it requires the time for assessment corresponding to the end assessment process 42 as described earlier referring to FIG. 4. In other words, the delay is unavoidable.

On the other hand, in the method of determining the voice segment (the speech segment) from the change in the hand shape based on the captured image, i.e., in the setting that the speaker signs the beginning or the end of the speech by hand, it is possible to determine the beginning or the end of the speech segment from the image. By the configuration, the change in the hand shape can be determined without the assessment time. For example, if the speech segment is inputted such that "the user changes the hand shape from [Paper] to [Rock] upon the speech beginning, and returns from [Rock] to [Paper] upon the speech end, the beginning or the end of the segment can be determined without delay time.

As described above, the voice recognition apparatus according to the present disclosure operates the voice segment detection and the sound source extraction unifiedly.
a) Unification of the voice segment detection and the sound source extraction, and
b) Unification of a plurality of the voice segment detection means
are achieved.

Hereinafter, the above-descried a) and b) will be described.

Figure 10:
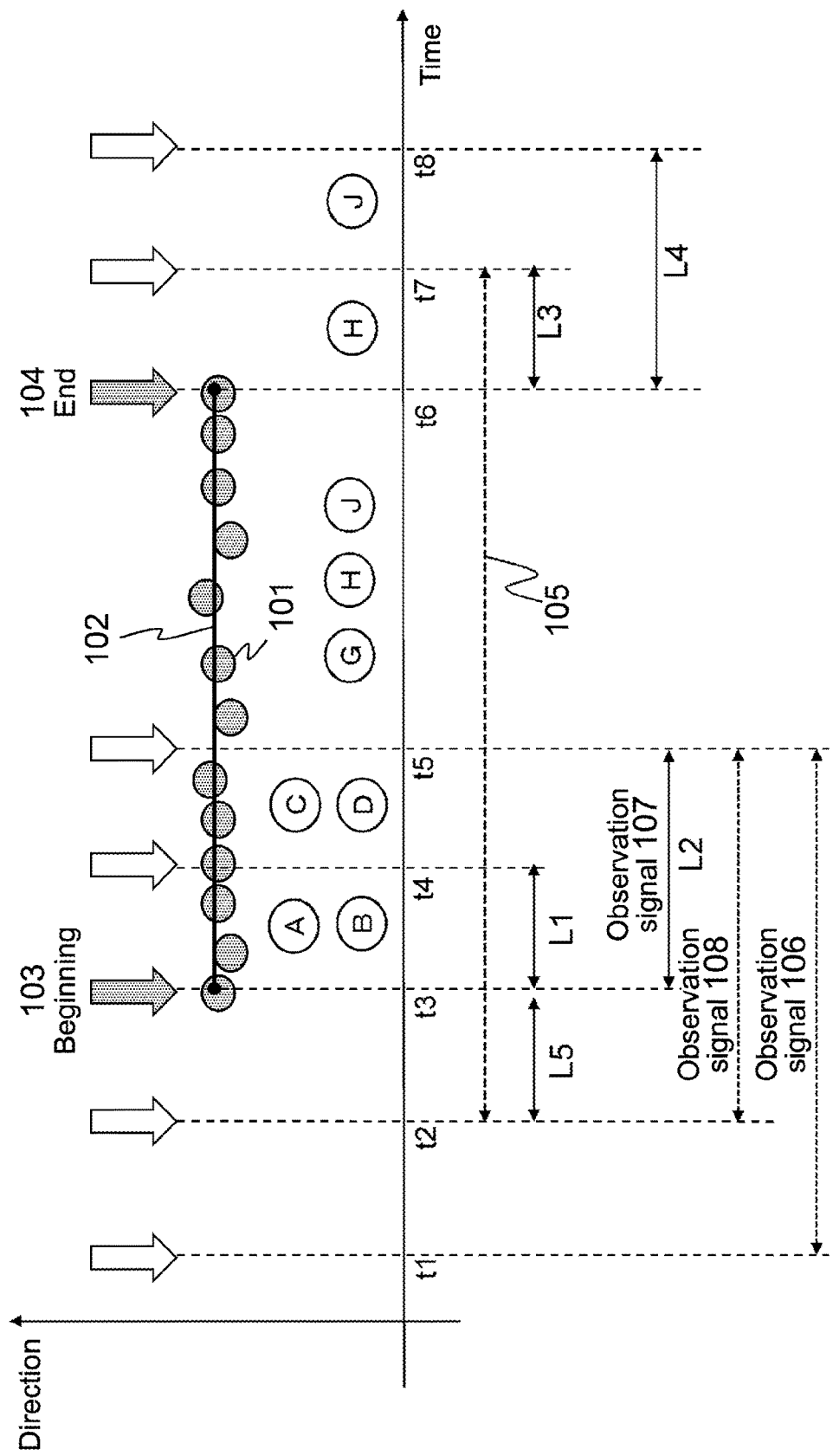
FIG. 10 A drawing for explaining unification of voice segment detection and a sound source extraction.

Firstly, the "unification of the voice segment detection and the sound source extraction" is described referring to FIG. 10. Also in FIG. 10, a horizontal axis represents time and a vertical axis represents a direction.

FIG. 10 is a drawing for explaining an embodiment of the voice segment detection process. In the figure, the voice segment detection process explained is substantially same as that described in Japanese Patent Application Laid-open No. 2012-150237. In other words, the sound source direction estimation is performed per fixed period of time. As a result of the sound source direction estimation, points that represent the sound source directions acquired are plotted. The points are called as "direction points" that are direction points 101 shown in FIG. 10. By connecting adjacent direction points each other in a time direction, thereby providing the speech segment 102. The process of connecting adjacent direction points is called as "tracking". The segment before the end is determined is called as the "segment being created".

Note that the process according to the present disclosure is different from the process described in Japanese Patent Application Laid-open No. 2012-150237 in that means for acquiring the direction point is not limited to the sound source direction estimation, and the direction point may be determined by analyzing the image about the position of the lip moving or the position of the hand having a specific shape. A plurality of means may be used in combination. In any event, the process that adjacent direction points are connected by tracking is unchanged.

The beginning of the voice segment 102 detected by tracking is beginning 103 and the end is end 104 shown in the figure. These points are not determined at once, and are determined after a predetermined delay called as the assessment time. The assessment time is described earlier referring to FIG. 4. A timing where the beginning 103 at time t3 is determined at t4, and a timing where the end 104 at time t6 is determined at t7.

In the combination of the voice segment detection and the voice recognition, it is known that the recognition accuracy is increased not by inputting the input signal in the segment detected into the voice recognition process unit, but by inputting the input signal in the segment detected and in the segment before and after the segment detected into the voice recognition process unit to execute the voice recognition process. Additions before and after the segment detected is called as hangover. In FIG. 10, the hangover at the beginning is a region from time t2 to t3, and the handover at the end is a region from time t6 to t7. The speech segment including the hangovers is a speech segment including the hangovers 105.

In other words, in the voice recognition apparatus according to the present disclosure, the sound source is extracted in the speech segment including the hangovers 105, and the voice is recognized based on the result.

The most important timing when the voice segment detection and the sound source extraction are unified is time t5 shown in FIG. 10. At the time tracking reaches time t5, the extraction filter is estimated.

As mentioned above, the extraction filter is the filter for extracting the target sound from the observation signal. The extraction filter can be created by the method known in the art. For example, the method described in the above-described Japanese Patent Application Laid-open No. 2012-234150 (Japanese Patent Application 2012-052548), which is the former patent application by the present applicant, i.e., the method for calculating the filter using the observation signal for learning and direction information of the target sound may be applied. If the method is applied, as to the observation signal, an observation signal 106 in the segment from time t1 to time t5 is used, and as to the direction information, an average direction acquired by the observation signal 107 from time t3 to time t5 is used. Time t1 is the same as time t1 described earlier in FIG. 9, and is a time point when a fixed period of time is preceded from an extraction filter creation point (t5).

After the extraction filter is estimated, the extraction filter created is applied to the observation signal 108 already inputted at the time point (t5) within the speech segment to generate the sound source extraction result. Thereafter, the filter is sequentially applied to the filter in response to the input. The sequential application is continued until time t6 that is the end of the speech segment is passed over and time t7 that is the end of end hangover is reached. The time from time t7 to t8 is a part of the assessment time that is necessary for determining the end 104 in the speech segment. If the direction point is generated again therebetween and is capable of being connected to a speech segment 102 being created, the aforementioned sequential application is restarted. If the direction point is not present, the sound source extraction result is not generated from time t7 to 8. When the tracking reaches time t8 that the assessment time is ended, the end 104 of the voice segment is determined. This means that there is no more input signal to which the voice recognition process should be applied. Therefore, the information is noticed to the voice recognition as necessary.

For comparison, a process combining the voice segment detection process described in Japanese Patent Application Laid-open No. 2012-150237, the sound source extraction process described in Japanese Patent Application Laid-open No. 2012-234150 (Japanese Patent Application No. 2012-052548) and the voice recognition process described in Japanese Patent No. 4600705 (Japanese Patent Application Laid-open No. 2001-242883) will be described briefly.

If the combined process is executed, the end 104 of the speech segment is determined at time t8 shown in FIG. 10, the segments of the observation signal 105 is cut at the timing (t8), and the sound source extraction and the voice recognition are performed in the segment.

In other words, the sound source extraction and the voice recognition are executed at time t8 or later after the end of the speech segment is determined. If the process is performed, it is unnecessary to take the estimation beginning of the extraction filter at time t5 and the end hangover at time t7 into consideration upon the tracking process for the voice segment detection. Accordingly, there is no description about the timings of t5 and t7 in the voice segment detection process of Japanese Patent Application Laid-open No. 2012-150237. In other words, the process at the timing of t5 and t7 is one of the novel process executed by the voice recognition apparatus according to the present disclosure.

Next, the above-descried the "b) unification of a plurality of the voice segment detection means" will be described. If the unification process of a plurality of the voice segment detection methods is performed, the following two factors should be considered.

One is that the direction point is detected in each method and the tracking of the direction point is performed as the common process in order to prevent the multiple detection by the plurality of the voice segment detection methods.

The other is that a dedicated procedure is prepared for determination of the beginning and the end of the segment, and the segment created by the procedure is processed preferentially upon the tracking in the voice segment detection that the assessment time is unnecessary, in order to avoid an increase of the delay concerning the end assessment of the voice segment by the combination of the plural methods.

Hereinafter, the above-described two factors that are should be considered in the "b) unification of a plurality of the voice segment detection means" will be described.

Figure 11:
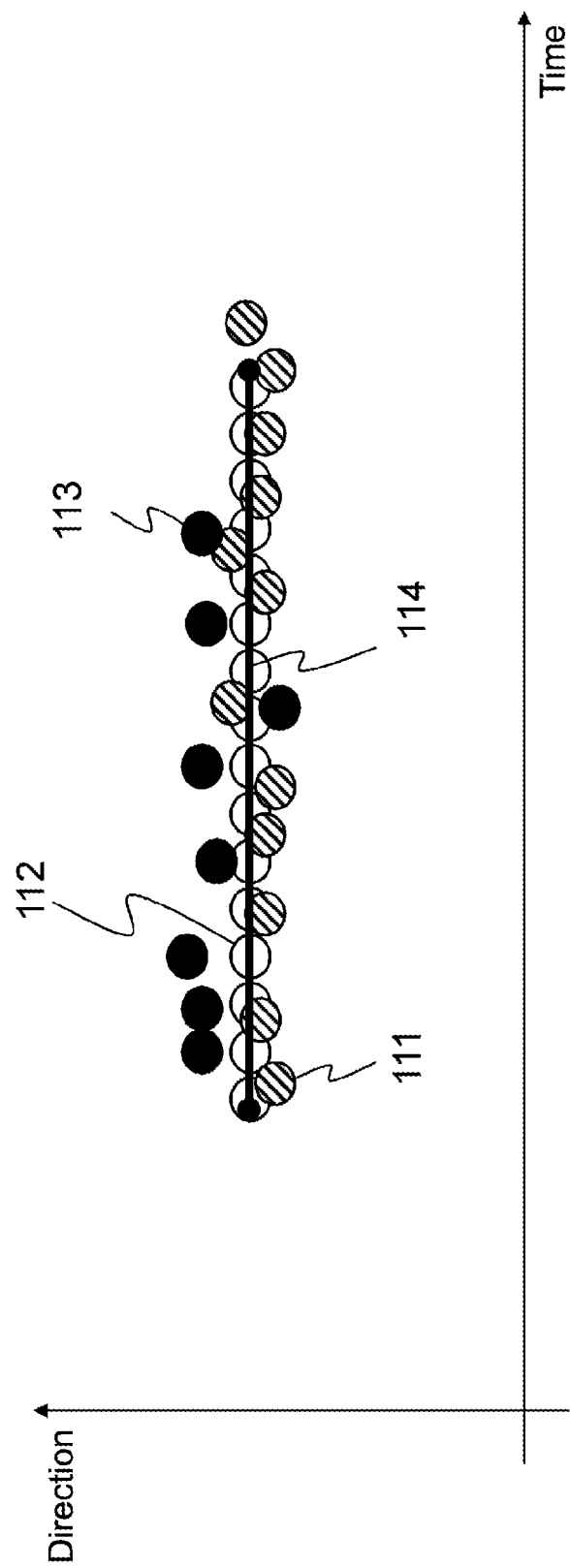
FIG. 11 A drawing for explaining a common tracking of direction points acquired by a plurality of voice segment detection methods.

FIG. 11 is a drawing for explaining a common tracking of the direction points acquired by a plurality of the voice segment detection methods. A horizontal axis represents time and a vertical axis represents a direction.

In FIG. 11, three types of the voice segment detection method are assumed. In each method, the direction point acquired is shown in a different way.

Each direction point shown in a hatched circle such as a direction point 111 is provided by the sound source direction estimation method in accordance with the analysis of the acquired sound by the microphone array, for example.

Each direction point shown in a white circle such as a direction point 112 is provided by the detection of the hand shape acquired by a camera captured image.

Each direction point shown in a black circle such as a direction point 113 is provided by the analysis of the lip image acquired by the camera captured image.

If the direction points provided by the three different voice segment detection methods are individually tracked per unit of each method, one speech may be triply detected at a maximum in this embodiment. However, as shown in the figure, by the one common tracking process, only a single voice segment 114 can be detected.

In this manner, if a plurality of different voice segment detection methods is combined, executing the common tracking provides the following advantages.

(Advantage 1) As merging of the adjacent segments is unnecessary after the end is determined, the delay derived from a merge assessment time (for example, a merge assessment time 67 shown in FIG. 6) can be prevented.

(Advantage 2) In the method where the adjacent segments are merged after the end is determined, if the lengths of the segments are greatly different, the segments are not adequately merged. The common tracking eliminates it. For example, in FIG. 11, the direction points 113 shown as the black circles acquired by the analysis of the lip image are breaking earlier than the direction points acquired by the other means. Therefore, the voice segments acquired by the tracking may be shorter (ended earlier) than the voice segments acquired by the other means and may be failed to merge the segments.

(Advantage 3) As the tracking itself is singly performed, the unification with the sound source extraction is easy. Conversely, mounting is tough if the tracking is performed per the voice segment detection means, and the voice segment detection means is unified with the sound source extraction per tracking.

As described above, in the voice segment detection by the change in the hand shape provided by the analysis of the camera captured image, the beginning and the end can be determined without the assessment time. Normally, the tracking is unnecessary in this means. However, according to the present disclosure, in order to prevent the multiple detection, the direction point is acquired actively by the change in the hand shape, and is to be tracked.

However, by only introducing the common tracking, the multiple detection can be eliminated, but the end assessment time is not eliminated. For example, the speech end can be detected at a low delay by the method using the change in the hand shape, but the end assessment time is necessary in the methods using the sound source direction estimation and the lip image. In order to determine the end using the common tracking, it is necessary to adopt the longest one among the three methods.

Then, in order to eliminate the delay, the following [Special Process] is performed in the method (specific method) where the beginning and the end of the voice segment can be determined without the assessment time such as the voice segment detection method based on the hand shape classification by the image, for example.

(1) At the time when the beginning of the voice segment is detected, a beginning registration process dedicated for the specific method is performed. For distinguishing from other the segments being created, the attribute of "registered" is added to the segment being created by the beginning registration process.

(2) During the tracking, if there is no direction point derived from the specific method, the direction point is automatically created to extend the segment being created.

(3) During the tracking, if the segments being created are merged, it forces the segment being created having the attribute of "registered" to absorb the other segments being created.

(4) At the time when the end of the voice segment is detected, the end registration process dedicated for the specific method is performed.

The [Special Process] will be described referring to FIG. 12. Also in FIG. 12, a horizontal axis represents time and a vertical axis represents a direction.

Figure 12:
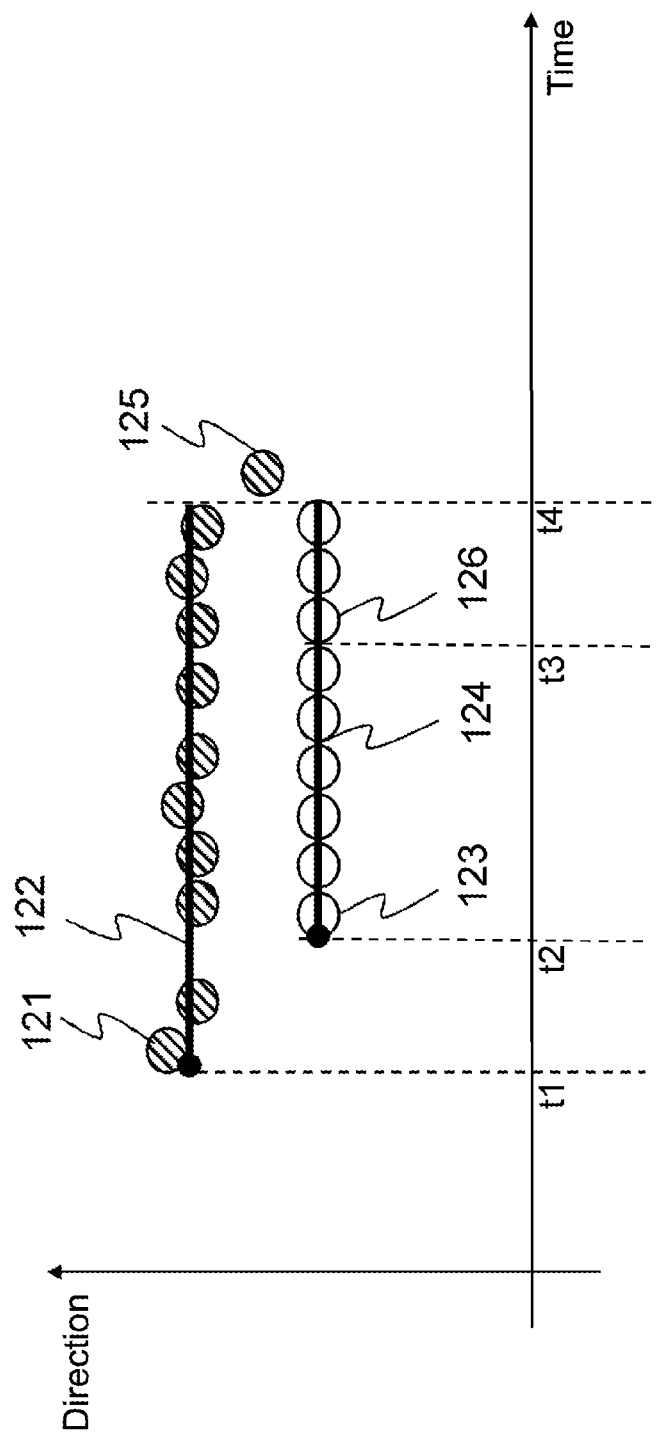
FIG. 12 A drawing for explaining a special process corresponding to a method that does not need a time to assess beginning or end of voice segments such as a voice segment detection method based on a hand shape classification by an image.

The direction point in a hatched circle such as a direction point 112 shown in FIG. 12 is provided based on the voice segment detection method where the assessment time of the beginning or the end of the voice segment is necessary.

The direction point in a white circle such as a direction point 123 is provided based on the voice segment detection method where the assessment time of the beginning or the end of the voice segment is unnecessary, e.g., the method based on the hand shape detection.

A voice segment 122 is the segment being created provided by tracing the direction point provided based on the voice segment detection method where the assessment time of the beginning or the end of the voice segment is necessary.

A voice segment 124 is the segment being created provided by tracing the direction point provided based on the voice segment detection method where the assessment time of the beginning or the end of the voice segment is unnecessary.

Here, it is assumed that the tracking proceeds to time t2, and the direction point 123 derived from the method where the assessment time is unnecessary is detected at the time. It also founds that the direction point is the beginning of the speech segment at the same time. According to the above-described [Special Process (1)], the beginning of the segment is registered. The segment being created by the register is the voice segment 124 having the attribute of "registered".

Next, the [Special Process (2)] will be described. For example, it is assumed that the tracking proceeds to time t3 shown in FIG. 12. As the voice segment 124 that is the segment being created has the attribute of "registered". A direction point 126 is automatically created in the same direction as the segment being created, and is connected to the segment being created. Thus, the segment derived from the method where the assessment time is unnecessary is prolonged without breaking on the way of the creation.

Next, the [Special Process (3)] will be described. Before that, the merge process of the voice segment disclosed in Japanese Patent Application Laid-open No. 2012-150237 will be described.

In the method described in Japanese Patent Application Laid-open No. 2012-150237, if a plurality of the segments being created is positioned close in the tracking, theses is merged into one segment.

Determination whether or not a plurality of the segments being created is merged is based on whether or not one direction point can be connected to a plurality of the segments being created. For example, in FIG. 12, if the tracking proceeds to time t4 and a direction point 125 is positioned sufficiently close to both of the two segments being created 122, 124 (a difference in the direction is smaller than a threshold value), the two segments being created are merged into one. In the method described in Japanese Patent Application Laid-open No. 2012-150237, other segments are merged into the most earliest beginning segment. Accordingly, the beginning of the segment after merging becomes time t1 similar to the voice segment 122 being created.

The segment being created 124 appears to be lost after the merge process. Note that the direction after merging is an average of the direction points in the both segments being created.

In contrast to the method, in the process according to the present disclosure, a plurality of the segments being created can be connected to one direction point. In addition, if the segment being created having the attribute of "registered" is present therein, other segments are merged into the segment being created having the attribute of "registered". The reasons thereof are the following two:

As the beginning and the end of the segment having the attribute of "registered" can be determined without assessment time, the segment having the attribute of "registered" may be much correct than other segments.

The segment having the attribute of "registered" is prevented from being lost.

For example, in FIG. 12, the direction point 121 at the beginning of the voice segment being created 122 is acquired by the sound source direction estimation or the lip image, and may be created not relating to the voice speech (but, near the speech direction by chance). In contrast, the direction point 123 at the beginning of the segment being created 124 is derived from the change in the user's hand shape. If the user moves the hand corresponding to the speech, the direction point 123 may have a high possibility of the beginning as compared with the direction point 121. Therefore, when the both are merged, the direction point 123 is expected to be adequate as the beginning as compared with the direction point 121.

The end of the segment being created having the attribute of "registered" is determined without assessment time by performing the dedicated process on the registration of the end. As the assumption, the segment being created having the beginning registered should remain at the time of registering the end. In view of this, it is desirable that, in the merge process, the segment being created having the attribute of "registered" 124 be left and the segment being created 122 be lost. Note that the direction of the segment being created after merging is an average of the direction points in the both segments.

If there are a plurality of the segments being created having the attribute of "registered" in the adjacent segments being created, it is processed as follows:

The segments being created having the attribute of "registered" are not merged

Other segments being created are merged into each segment being created having the attribute of "registered".

For example, it is assumed that four segments being created, A, B, C, D, are adjacent (all four segments being created can be connected to one direction point) in a certain timing. Among them, A and B have the attribute of "registered". In this case, two merges, A, C, D and B, C, D, are created. As a result, two segments being created, A and B, are left.

In this manner, in the voice segment detection method where the assessment time is unnecessary, the segments being created are created by the above-described [Special Process (1)]. In the course of the tracking, the above-described [Special Process (2)] and [Special Process (3)] are performed dedicatedly, thereby leaving the segments until the speech end (without breaking or merging) with certainty. Accordingly, at the time when the end is detected, an end determination process dedicated for the segment (the above-described [Special Process (4)]) can be performed, and the end assessment time becomes unnecessary.

In this manner, by performing the above-described Special Process (1) to (4), the multi detection can be prevented by the common tracking. In addition, in the segments derived from the voice segment detection method where the assessment time is unnecessary, the delay based on the end determination process can be avoided.

2-3. Novel Points of Voice Recognition Process

Next, novel points of the voice recognition process in the voice recognition apparatus according to the present disclosure will be described.

Note that the novel points described later are not the voice recognition itself, but an interface between the sound source extraction and the voice recognition.

The voice segment detection and the sound source extraction are processed unifiedly, thereby sequentially generating each extraction result even if the segments are temporally overlapped. However, if the number of the decoders is limited, there remains a problem that the extraction result of which segment is preferentially decoded in order to decrease the delay.

Figure 13:
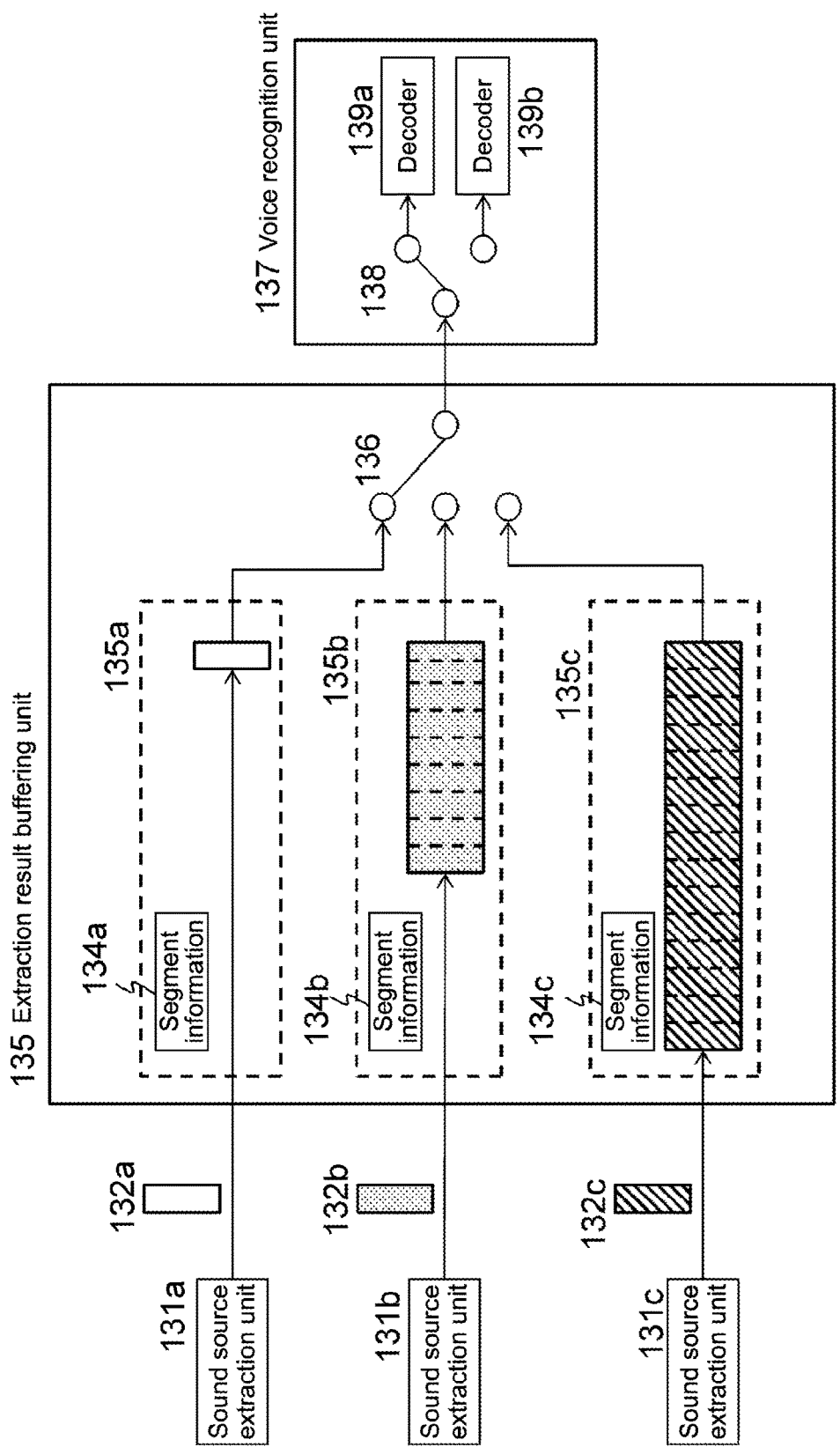
FIG. 13 A drawing for explaining an illustrative buffer configuration between a sound source extraction unit and a voice recognition unit.

In the voice recognition apparatus according to the present disclosure, a buffer having the configuration shown in FIG. 13, for example, is prepared between the sound source extraction unit and the voice recognition unit. Via the buffer, output data is selectively provided from the sound source extraction unit to the voice recognition unit, thereby responding to the problem.

Hereinafter, the buffer will be described. The process described referring to FIG. 13 is at the timing when the sounds are generated from the three sound sources at the same time as shown in FIG. 8 and FIG. 14, e.g. at the timing of time t3 shown in FIG. 14.

Figure 14:
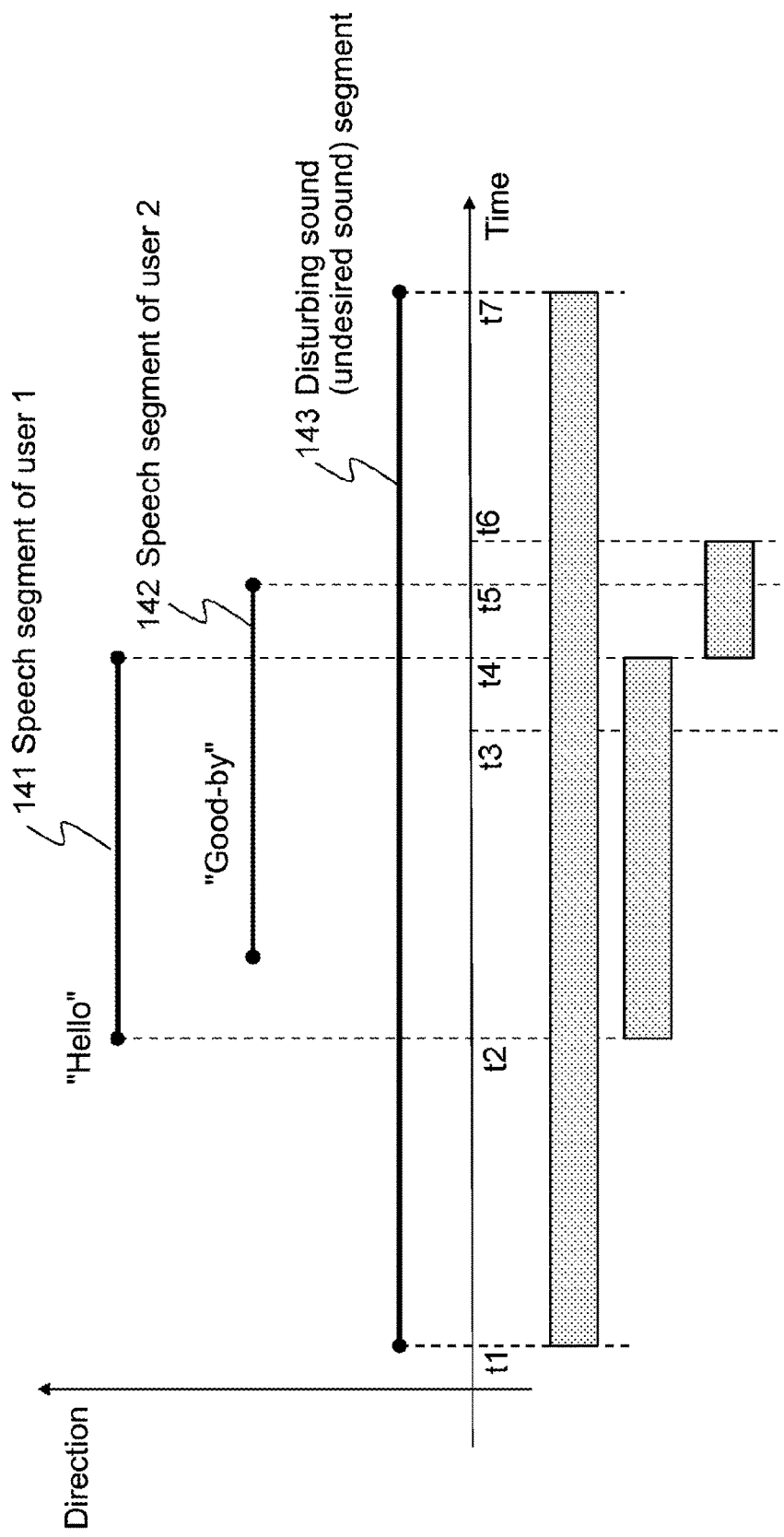
FIG. 14 A drawing for showing an illustrative setting of voice segments having a timing to vocalize simultaneously from three sound sources.

At time t3 shown in FIG. 14, three segments being created are present. Although the details are described later, the same number of the segments being created and the sound source extraction units is prepared according to the present disclosure. In other words, three sound source extraction units 131a to c are present, as shown in FIG. 13. Each of the sound source extraction units 131a to c sequentially generates the sound source extraction result (132a to c), and each of the extraction results are inputted to the extraction result buffering unit 135.

The extraction result buffering unit 135 has buffers 135a to c corresponding to each of the segments being created. Each of the buffers 135a to c has a First-In-First-Out (FIFO) structure. A latest extraction result that is new input data is added to a last (a left end in the figure) of each buffer. The extraction result is taken out from top (a right end in the figure). Each of the buffers 135a to c has segment information 134a to c such that it can be found out the segment being created from which the extracting result accumulated in each of the buffers 135a to c is derived.

In the voice recognition unit 137, the voice recognition process is performed by the decoder 139a, b. Each decoder performs the voice recognition of the voice segment from one sound source. The more the number of the decoders is, the more parallel processes of the voice segment are possible. However, as described above, a plurality of the decoders are prepared, resources such as a memory and a CPU are much consumed instead. Therefore, there is an upper limit of the number of the decoders. In other words, it is not actual assumption that if an N number of the segments is temporally overlapped, an N number of the decoders can be constantly prepared.

The voice recognition unit 137 shown in FIG. 13 has two decoders 139a, b. Specifically, only two voice segments can be processed at the same time. However, there are three voice segments to be processed.

The decoders 139a, b in the voice recognition unit 137 shown in FIG. 13 selects only two voice segments from the three voice segments stored in the extraction result buffering unit 135 and performs the voice recognition process.

The selection is made depending on a connection status of a switch 136 and a switch 138. Although the control of these switches is not shown in the figure, the control is executed by a control unit.

It is important how to switch the two switches 136, 137.

In order to address the problem, the voice recognition apparatus according to the present disclosure ranks the segments where the extraction results are present within the extraction result buffering unit 135 by the following scales:
(Scale 1) The segment having the attribute of "registered" has a priority. If there are a plurality of the segments having the attribute of "registered", the segment having the earliest beginning has a priority.
(Scale 2) As to the segment not having the attribute of "registered", the segment having the end already determined has a priority. If there are a plurality of the segments not having the attribute of "registered", the segment having the earliest end has a priority.
(Scale 3) As to the segment having the end not determined, the segment having the earliest beginning has a priority.

The control unit of the voice recognition apparatus according to the present disclosure controls the switches 136, 138 in accordance with the three scales, and outputs high priority voice segment data to the voice recognition unit 137.

The above-described (Scale 1) to (Scale 3) will be described.

In (Scale 1), the reason why the segment having the attribute of "registered" has a priority and if there are a plurality of the segments having the attribute of "registered", the segment having the earliest beginning has a priority is as follows: This is because the difference in the voice segment detection methods is reflected. The segment having the attribute of "registered" is by the method, as described above, that the assessment time of the voice segment end is unnecessary, e.g., the voice segment detection method based on the hand shape classification by the image.

In other words, it can be estimated that there is a possibility that the segment having the attribute of "registered" is the segment where the user wants to input the voice with certainty. Therefore, the segment by the method is decoded with the most priority to decrease the delay, thereby responding to the user's expectations. Note that the earliest beginning having a priority means that the segment having an earlier speech beginning time is processed first.

In (Scale 2), as to the segment not having the attribute of "registered", the segment having the end already determined has a priority. If there are a plurality of the segments not having the attribute of "registered", the segment having the earliest end has a priority.

The scale corresponds to the method where the assessment time of the beginning or the end of the voice segment is necessary. If the segments compete against each other, the segment where the end is determined has a priority in order to decrease the time from the speech end to the recognition result to the shortest.

In (Scale 3), as to the segment having the end not determined, the segment having the earliest beginning has a priority.

This scale is for the case that a plurality of the speech segments having the end when the speech is terminated not determined competes against each other. If the competition is created, the segment where the speech begins first has a priority.

If the decoders having the same number of the voice segments can be always prepared, applying only the scale allows the process to which each decoder is applied in earliest order of a beginning position of the voice segment, thereby minimizing the delay of the decoder. Using only Scale 3 is enough.

However, it is assumed that the number of the decoders is actually less than the number of the voice segments to be processed. Therefore, in the voice recognition apparatus according to the present disclosure, the above-described (Scale 1) and (Scale 2) are used in combination with (Scale 3) to achieve a priority process taking the user's demand into consideration.

If a plurality of the segments having the same beginning is present in (Scale 1), the scale similar to (Scale 2) is used to further rank the segments. If a plurality of the segments having the same rank is present in (Scale 1) to (Scale 3), the segment having a smaller direction value has expediently a priority.

The voice recognition unit 137 shown in FIG. 13 corresponds the extraction result per segment to the decoders 139$a$, $b$ in accordance with the rank. For example, if there is only one decoder, the extraction result of the segment ranked as top is acquired and decoded. If there is an N number of the decoders, the extraction results of the segments ranked as a top N number are corresponded to the decoders.

Note that the "segment" to be ranked in the extraction result buffering unit 135 is different from the segment being created to be tacked shown in FIG. 10 to FIG. 12, for example. Tracking is a process to find the beginning and the end of the segment. At the time when the end is determined, the segment is out of tracking. On the other hand, the buffers 135$a$ to $c$ included in the extraction result buffering unit 135 accumulate the extraction results of the respective segments per segment. Once the extraction results are accumulated in the buffers 135$a$ to $c$, the extraction results remain as long as the extraction results are not taken out from the extraction result buffering unit 135, even after the end of the segment is determined. The segment is to be ranked.

3. Specific Configuration and Process of Voice Recognition Apparatus According to Present Disclosure Hereinafter, a specific configuration and a process of the voice recognition apparatus according to the present disclosure.

Figure 15:
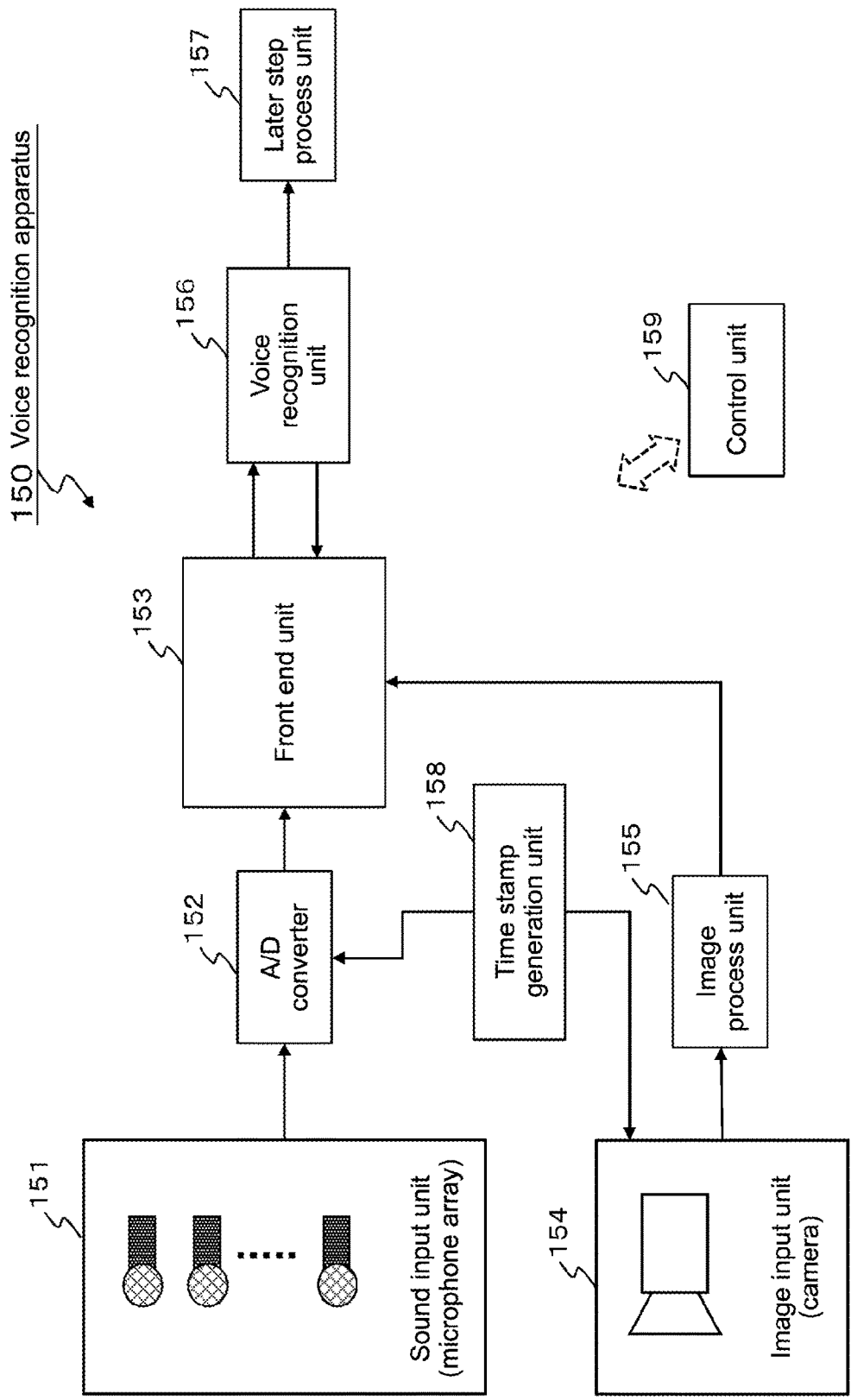
FIG. 15 A drawing for explaining a whole configuration of a voice recognition apparatus according to an embodiment of the present disclosure.

3-1. Whole Configuration of Voice Recognition Apparatus According to Present Disclosure FIG. 15 shows a whole configuration of the voice recognition apparatus according to one embodiment of the present disclosure. A voice recognition apparatus 150 shown in FIG. 15 includes an sound input unit 151 including a microphone array having a plurality of microphones disposed at different positions as an information input unit, and an image input unit 154 including a video camera for capturing an image.

A signal acquired by each microphone of the sound input unit 151 is converted into a digital signal in an analog/digital (A/D) converter 152. An output of the AD converter 152 is multi-channel sound data (wave form), which is called as an observation signal (of a time domain).

On the other hand, an acquired image of the image input unit 154 including the video camera is inputted into the image process unit 155. The image process unit 155 detects a lip area included in the captured image and a hand area, and provides information that can be used for detecting a voice speech segment such as the lip image and the hand shape. The details about the image process unit 155 will be described later.

The voice recognition apparatus 150 in the embodiment performs tracking using a plurality of sound source direction information, i.e., sound source direction information acquired based on an analysis of the sound data acquired by the sound input unit 151 including the microphone array, and sound source direction information acquired based on the direction of the lip or the hand provided by the analysis of the acquired image by the image input unit 154.

A positional relationship between the sound input unit 151 including the microphone array and the image input unit 154 including the video camera should be fixed. Therefore, it is desirably used a module where the microphone array and the video camera are unified.

Also, it is necessary to correspond the sound and the image generated at the same time. For this purpose, there is a time stamp generation unit 158. The time stamp generation unit 158 generates a time stamp that is time information in accordance with a clock signal, and provides the time information to the AD converter 152 and the image input unit 154. The AD converter 152 adds the time stamp as attribute information to the sound signal of each microphone inputted from the sound input unit 151. The image input unit 164 also adds the time stamp as attribute information to each frame of the captured image. In this manner, the time stamp is attached to the sound data and the image data. In the process in the front end unit 153 as described later, the process is possible by corresponding the sound and the image at the same time.

The front end unit 153 is a module for sequentially executing the voice segment detection and the sound source extraction as a unified process. The buffers described earlier referring to FIG. 13 and the module for converting the sound source extraction result into the feature amount for the voice recognition are included in the front end unit, which will be described later.

In the front end unit 153, the respective sound sources are divided per segment. If the sounds from a plurality of the sound sources are temporally overlapped, each segment is created as the segment where one sound source is extracted, i.e., the voice segment per extraction sound source unit. The sound source extraction result from each sound source is sequentially generated and outputted.

The voice recognition unit 156 determines word series corresponding to the sound source extraction result per segment outputted from the front end unit 153. If the voice recognition unit 156 includes a plurality of the decoders as necessary, as described earlier referring to FIG. 13, the delay until the recognition result is generated can be shortened, which will be described later.

At the output from the front end unit 153, the sound source extracted includes the target sound and the disturbing sound. The voice recognition unit 156 analyzes the signal corresponding to each sound source and calculates a score and a reliability in accordance with the prescribed rule upon decoding as the voice recognition process. If these values are lower than the prescribed threshold value, the voice is determined as the disturbing sound that is not for the voice recognition, and is rejected. The process prevents malfunction of the recognition result derived from the disturbing sound.

The recognition result provided at the voice recognition unit 156 is transmitted to a later step process unit 157. For example, as to a television that is operated by a voice, a channel is changed depending on the voice recognition result or a user demand program is searched.

The process in each process unit of the voice recognition apparatus 150 is controlled by the control unit 159.

The control unit 159 controls the process in each process unit of the voice recognition apparatus 150 in accordance with the data process program stored in a memory (not shown), for example.

3-2. Configuration and Process of Frond End Unit in Voice Recognition Apparatus According to Present Disclosure Next, the configuration and the process of the front end unit 153 will be described in detail referring to FIG. 16. The input to the front end unit 153 is the acquired sound of a plurality of the microphones of the sound input unit 151, and is the multi-channel sound data that is digitized into a signal at the AD converter 152. The number of the channels corresponds to the number of the microphones. The multi-channel sound data is inputted to the Short Time Fourier Transform: STFT) unit 161 and the voice/non-voice determination unit 162.

The STFT unit 161 applies the short time Fourier transform to the observation signal in the time domain to provide the observation signal (spectrum) in the time frequency region. The short time Fourier transform will be described later. Once a signal having a fixed length of the signal is inputted, the process is performed. The unit of the process is called as a frame. The process result is inputted to the observation signal buffering unit 164 and the sound source direction estimation unit 163.

The voice/non-voice determination unit 162 determines whether or not the inputted sound data is sound-like as a binary. As the determination process, the method of focusing signal periodicities as described in Japanese Patent No. 4182444, for example. The determination is made per unit of frame. The results are outputted and stored in the observation signal buffering unit 164.

The observation signal buffering unit 164 accumulates a set of the observation signal in the time frequency region created at the SIFT unit 161, a voice/non-voice determination result generated in the voice/non-voice determination unit 162, a frame number (index) and a time stamp to accumulate the fixed time (predetermined frame number), which will be later in detail. The module is also used for mutual conversion between the above-described time stamp and the frame number.

The observation signal accumulated in the observation signal buffering unit 164 is provided to the tracking unit 165.

The sound source direction estimation unit 163 uses the observation signal of the multi-channel in the time frequency region provided in the STFT unit 161 and estimates the sound source direction at that time.

The proceeding is executed in accordance with the voice segment detection method based on the sound source direction estimation as described in Japanese Patent Application Laid-open No. 2012-150237, for example.

The sound source direction estimation unit 163 executes the sound source direction estimation process every a fixed number of the frames is inputted. An aggregate of a plurality of the frames being an unit of estimation in the sound source direction is called as a block. The information generated is a point that represents the sound source direction in the block, which is called as a direction point. The direction point is shown in FIG. 10 to FIG. 12. The thus-obtained direction point is transmitted to the tracking unit 165.

The tracking unit 165 is one of the most important modules according to the present disclosure, and performs mainly the following processes, which will be described later in detail:
(1) To detect the segment where the sound source is sounded by tracking the direction point provided by a variety of the methods,
(2) To sequentially generate the sound source extraction result from the direction as the tracking proceeds, (3) To sequentially convert the sound source extraction result into the feature amount (features) for the voice recognition as the generation of the sound source extraction result.

The tracking unit 165 generates the feature amount (features) for the voice recognition in addition to the voice segment detection and the sound source extraction. The reason why the conversion into the feature amount is performed in the tracking unit 165 is that it is necessary that a cepstral mean and a standard deviation are held per segment if the cepstral mean normalization (described later) is performed upon conversion. The conversion into the feature amount can be performed independent of decoding of the voice recognition. The conversion into the feature amount has been done until the tracking, thereby decreasing the delay generated upon decoding.

The output from the tracking unit 165 is the feature amount converted from the sound source extraction result (for the voice recognition). Hereinafter, the feature amount is also called as the extraction result. The extraction result is transmitted to the extraction result buffering unit 166.

To the tracking unit 165, the information from the image process unit 155 is inputted, as shown in the figure.

The information is the direction point provided from the lip image, the beginning and the end of the segment provided from the hand shape change or the like.

As described above, the hand shape change is the information provided by the image analysis acquired by the image input unit 154 as data for clearly specifying the start point (beginning) and the end point (termination) of the speech. The image process unit 155 generates the information about the beginning and the end of the segment provided from the hand shape change based on the image analysis information and inputs the information into the tracking unit 165.

A request for erase of the specific segment is inputted from the voice recognition unit 156 to the tracking unit 165. From the tracking unit 165, segment update information is outputted to the voice recognition unit 156 as the notification of the segment. The segment update information is that the segments are lost or rejected during the tracking, which will be described later.

The extraction result buffering unit 166 is substantially similar to the extraction result buffering unit 135 described referring to FIG. 13, except that the data accumulated in the buffers 135*a* to 135*c* corresponding to the respective segments being created is the feature amount, because the tracking unit 165 converts the sound source extraction result into the feature amount. The segment information 134*a* to 134*c* held by the respective buffers has the same structure as the segment information 172 shown in FIG. 18 held by the tracking unit 165. The segment information will be described later in detail.

The extraction result buffering unit 166 inputs "request segment information" showing that the feature amount of which segment is requested from the voice recognition unit 156, and outputs the "feature amount" corresponding to the request segment to the voice recognition unit 156. The process is control process by the control unit 159, for example, and corresponds to the process by controlling the switches 136, 138 as shown FIG. 13.

A ranking unit 167 is to rank the segments where the feature amounts are saved in the extraction result buffering unit 166 based on the predetermined scales. The scales are the above-described (Scale 1) to (Scale 3), i.e., the following scales:

(Scale 1) The segment having the attribute of "registered" has a priority. If there are a plurality of the segments having the attribute of "registered", the segment having the earliest beginning has a priority.

(Scale 2) As to the segment not having the attribute of "registered", the segment having the end already determined has a priority. If there are a plurality of the segments not having the attribute of "registered", the segment having the earliest end has a priority.

(Scale 3) As to the segment having the end not determined, the segment having the earliest beginning has a priority.

Priority information generated by the ranking unit 167 based on the scales is outputted to the voice recognition unit 156. The voice recognition unit 156 outputs request segment information corresponding to the high priority segment in accordance with the priority information to the extraction result buffering unit 166.

Figure 17:
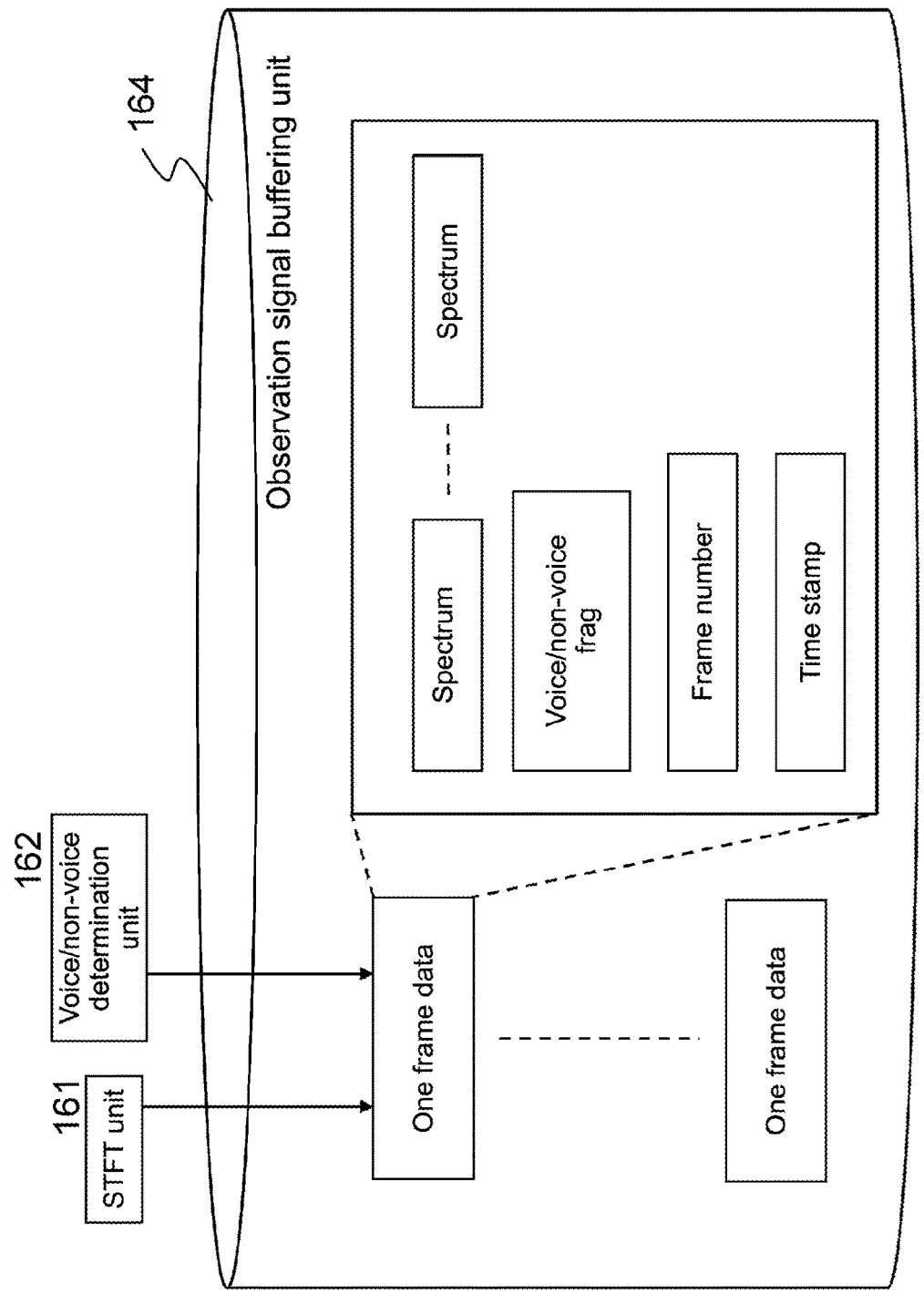
FIG. 17 A drawing for explaining a configuration of an observation signal buffering unit 164.

Next, a configuration of the observation signal buffering unit 164 will be described referring to FIG. 17. The observation signal buffering unit 164 inputs a spectrum from the STFT unit 161 and a voice/non-voice determination flag from the voice/non-voice determination unit 162.

As described above, the STFT unit 161 applies the short time Fourier transform to the observation signal in the time domain, and creates the observation signal (spectrum) in the time frequency region. A unit of process is called as a frame. The data per unit of frame is sequentially stored in the observation signal buffering unit 164. The buffer is first-in-first-out (FIFO) and has a limited size. If newest data is added and one frame data exceeds the predetermined number, the oldest data is discarded.

As shown in the figure in detail, the one frame data includes the following:

Spectrum,
Voice/non-voice flag,
Frame number,
Time stamp

The spectrum is the result of the STFT per one channel. The one frame data includes the spectra having the same number of the microphones in the sound input unit 151. The voice/non-voice flag is a determination result of the voice/non-voice determination unit 162 that is estimation result information about whether or not the data is estimated as voice or non-voice. The flam number and the time stamp are data added to the output of the STFT unit 161. By holding these values in sets per frame, it will be possible that a percentage of a "voice-like" frame in the speech segment is calculated and the calculation result is utilized for rejecting a non-voice-like segment, and the time stamp attached to the process result of the lip image is changed into the frame number and is used for common tracking.

Next, the tracking unit 165 will be described referring to FIG. 18.

The management unit 171 for the segment being created in the tracking unit 165 is a module for managing one of the segments being created (being tracked). The number of the management units 171 (171*a* to 171*n*) for the segments being created in the tracking unit 165 is created that equals to the number of the segments being created. Once the segments are determined, the management units disappear. As the segment being created becomes long, some steps should be passed through as described earlier referring to FIG. 10, for example. In order to manage a progress of the steps, the management unit 171 for the segment being created utilizes a state transition machine as shown in FIG.

19, for example. The segment information 172 holds a current state of the segment sequentially changed as identifiable information.

Each management unit 171 for the segment being created includes three modules. The segment information 172 handles information used in the tracking process itself (excluding the sound source extraction and the feature amount conversion) for one segment, and holds the frame number at beginning, and the length when the direction point is unbreaking or breaking, which will be described later in detail.

The sound source extraction unit 173 performs the process for estimating the extraction filter from the observation signal by learning and the process for generating the extraction result by applying the filter to the observation signal, which will be described later in detail.

The feature amount extraction unit 174 converts the extraction result generated into the feature amount for use in decoding the voice recognition. As necessary, the extraction result is converted into the wave form, which will be described later in detail.

Furthermore, the tracking unit 165 holds the number of the frame being processed (a current frame number 175) and the number of the block (a current block number 176). The value of the current frame number 175 equals to the values of the frame number of newest one frame data accumulated in the observation signal buffering unit 164 shown in FIG. 17. The block is a unit where a fixed number of frames is merged. In the process described in Japanese Patent Application Laid-open No. 2012-150237, the block is used as a unit for the direction estimation and the tracking. The methods of the direction estimation and the tracking of the process according to the present disclosure are in accordance with the process described in Japanese Patent Application Laid-open No. 2012-150237, the tracking unit holds the number of blocks, and the management units 171-1 to n for the segments being created refer the value, as necessary.

The direction point buffer 177 is a module for temporary storing the direction point used in a next tracking. The voice recognition apparatus according to the present disclosure uses a plurality of the voice segment detection methods, which generate respective direction points, which are collectively stored in the module. This mechanism prevents the multiple detection of one speech even when a plurality of the voice segment detection methods.

Note that the direction point derived from the method using the image may have the time stamp that is a future for the tracking unit. For example, as described later, the following cases are true: The voice process and the image process are operated in parallel and asynchronously. If the sound, the image and the image are inputted at the same time, the sound is processed later than the image. The direction point is regarded as a "reserved direction point" and is stored in a dedicated buffer, i.e., a buffer 178 for a reserved direction point as shown in the figure. When the tracking process is proceeded and the time reaches the time stamp attached to the direction point, the direction point is moved from the buffer 178 for a reserved direction point to the direction point buffer 177.

A direction point connection table 179 is a table where there is a description that each of the direction points detected in a certain block can be connected to which segment being created. As described earlier referring to FIG. 12, because a plurality of the segments may be connected to one direction point, the connectable segments are represented in a list form. The list is called as a "connectable segment list".

If no segment is connected, a blank list is described. If a plurality of the segments can be connected to one direction point, the tracking unit merges the segments the segments into one segment. If any of the segments are not connected, a new segment is created.

Next, segment information 172 held in the management unit 171 for the segment being created will be described. This utilizes a state transition model shown in FIG. 19. Firstly, the state transition model is described, and its specific configuration thereof is then described.

Figure 19:
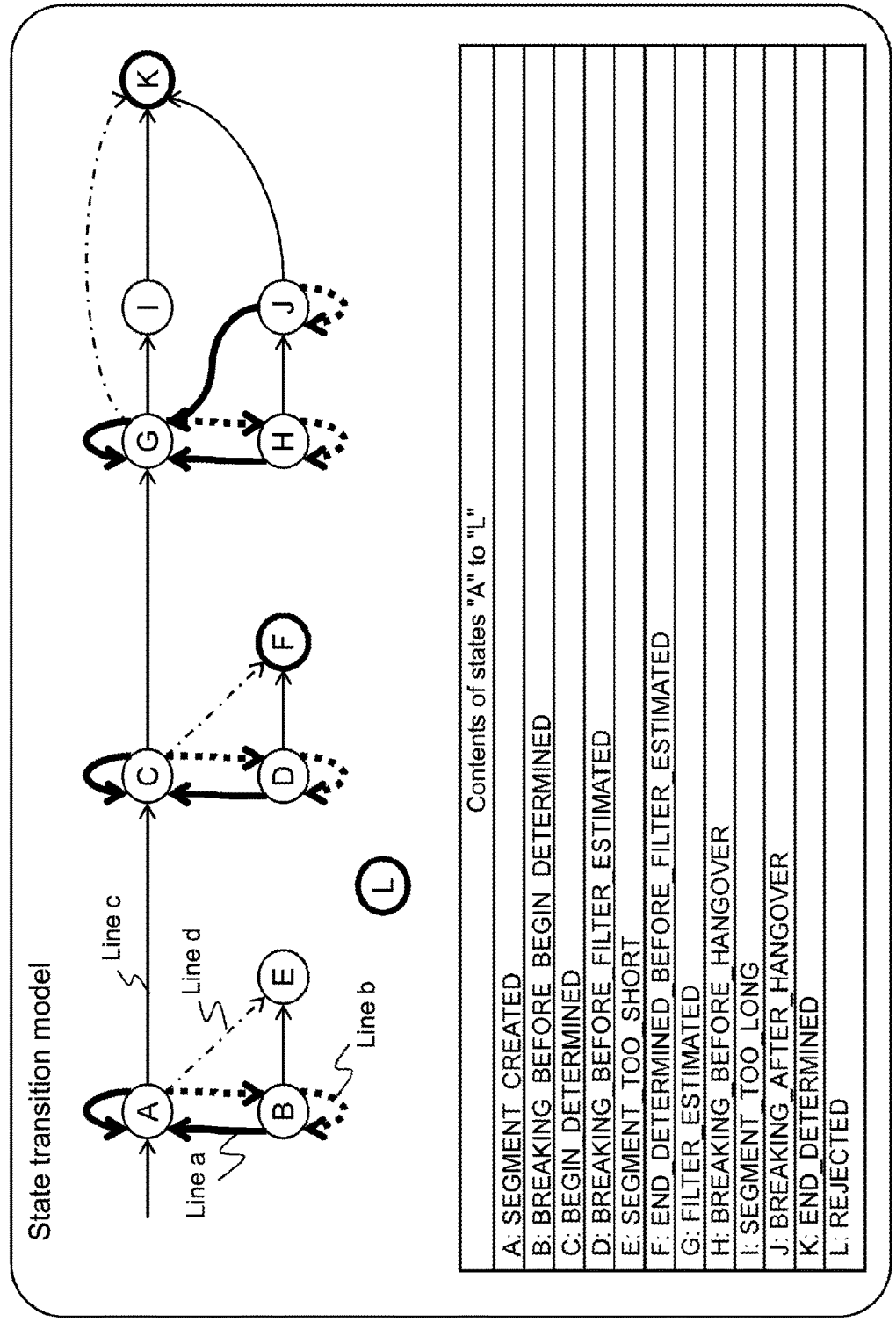
FIG. 19 A drawing for explaining segment information utilizing a state transition machine.

In FIG. 19, A to M are inside states showing the states of the segments. The beginning state is "A". The end states are three, "F", "K", and "L", which represent "termination determined (before the extraction filter estimation", "termination determined (after the extraction filter estimation)", and "rejected", respectively.

Each state represents the following:
A: segment created
B: breaking (before beginning determined)
C: beginning determined
D: breaking (before extraction filter estimation)
E: segment too short (specified length or less)
F: end determined (before extraction filter estimation)
G: extraction filter estimated
H: breaking (before end hangover)
I: segment too long (specified length or more)
J: breaking (after end hangover)
K: end determined (before extraction filter estimation)
L: rejected Arrows connecting the state "A" to "L" are state transition lines representing the state transition, and are classified into fours:
line a (wide solid line),
line b (wide dotted line),
line c (narrow solid line),
line d (narrow dashed-dot line).

Each state transition line has the following means:
line "a" (wide solid line) represents a state transition generated one time within one block where a connection of the direction line to the segment being created occurs.

line "b" (wide dotted line) represents a state transition generated one time within one block where a connection of the direction line to the segment being created does not occur.

line "c" (narrow solid line) represents a transition generated when the length of the segment being created, etc. reaches the predetermined value. The transition can be generated multiply in one block. The transition is called as a "no block consuming transition".

line "d" (narrow dashed-dot line) represents a transition generated in the end registration process to the segment having the attribute of "registered". The transition will be described later in detail.

In FIG. 19, although the transition lines are omitted, any state can transit to the state "L". The transition is also the "no block consuming transition".

The state transition model shown in FIG. 19 corresponds to each timing described earlier referring to FIG. 10. Hereinafter, a correspondence relationship will be described.

In FIG. 10, time t3 is the beginning of the speech. This is the timing when a single direction point not connecting to any segment being created occurs, or the timing when the beginning registration process dedicated for the voice segment detection method that the assessment time is unnecessary is invoked. At this point, the state transition model shown in FIG. 19 is created, and the inside state becomes "A".

The state "A" is called as "segment created".

The state "A" corresponds to the period from time t3 to t4 in FIG. 10. In other words, as long as the direction point is connected to a new segment being created, the sate "A" is self-looped to prolong the segment being created correspondingly. If the length of the segment exceeds the predetermined value (the length at time t3 to t4), the state transits to the state "C". Since the beginning of the segment being created is determined, the state "C" is called as "beginning determined".

On the other hand, the direction point for connection is not present, the state transits to the state "B". The state "B" also corresponds to the period from time t3 to t4 in FIG. 10.

The state "B" represents that the segment is breaking. This is called as "breaking (before beginning determined)" in order to be distinguished from other states representing "breaking". As long as no connectable direction point is present, the state "B" is self-looped. Once the self loop reaches the predetermined number of times, the state transits to the state "E". The predetermined number of times at the state "B" is the number of blocks corresponding to a time necessary for the end assessment (time t6 to t8 in FIG. 10).

The state "E" represents that the end is determined before the beginning is determined, in other words, that the segment is "too short". In this case, the state transits to the state "L" that represents "rejected".

In the state "B", when the direction point connecting to segment is present, the state returns to the state "A". If the length of the segment exceeds a beginning assessment time at the time of returning to the state "A" (is longer than time t3 to t4 in FIG. 10), the state transits to the state "C".

The state "C" corresponds to the period from time t4 to t5 FIG. 10. Similar to the state "A", if the direction point connecting to the segment is present, the state "C" is self-looped, and if the length of the segment exceeds the predetermined value (the length at time t3 to t5 in FIG. 10), the state transits to the state "G". At the timing of the transition, the extraction filter is estimated or filter is applied (to observation signal 108 shown in FIG. 10) first time. The state "G" is called as "the extraction filter estimated".

On the other hand, when the direction point for connection is not present in the state "C", the state transits to the state "D". The state "D" also corresponds to the period from time t4 to t5 in FIG. 10.

Similar to the state "B", the state "D" represents that the segment is breaking. As the beginning is already determined, this is called as "breaking (after beginning determined)". As long as no connectable direction point is present, the state "D" is self-looped. Once the self loop reaches the predetermined number of times, the state transits to the state "F". The predetermined number of times at the state "D" is similar to that of the state "B", and is the number of blocks corresponding to a time necessary for the end assessment.

In the state "D", if the direction point connecting to the segment is present, the state returns to the state "C". If the length of the segment exceeds the predetermined value (time t3 to t5 or more in FIG. 10) at the time when the state returns to the state "C", the state transits to the state "G".

As the end is determined before the extraction filter is estimated, the state "F" is called as "termination determined (before the extraction filter)". In this state, the end is determined. Based on a density of the direction points and the voice/non-voice determination flag stored in the observation signal buffering unit 164 described in FIG. 18, a percentage of "voice-like" frames is determined, and the segments are selected in accordance with the determination results. For example, once it is determined that there is no "voice-like" frame, the segment is rejected, i.e., the state transmits to the state "L". On the other hand, if the frame is determined as the "voice-like" and is received as a voice recognition target, the extraction filter is estimated, which is applied to the speech segment to generate the sound source extraction result.

The process after the state "G" is characteristic to the voice recognition apparatus according to the present disclosure.

The state "G" corresponds to the period from time t5 to t6 shown in FIG. 10. Similar to the states "A", "C", if the direction point connecting to the segment is present, the state "G" is self-looped. At this time, the extraction filter is applied to the observation signal corresponding to one time transition to sequentially generate the extraction results. Then, once the length of the segment exceeds the predetermined upper limit, the state transits to the state "I".

On the other hand, if the direction point for connection is not present in the state "G", the state transits to the state "Ti".

Note that the state "H" can be generated in the period from time t5 to t7 shown in FIG. 10. Also, if the state "G" transits to the state "Ti", the extraction filter is applied to the observation signal, thereby generating the extraction result. The state represents the breaking of the segment (after time t6 in FIG. 10). Even though there are the same breakings, the behavior is different before and after the end hangover (time t7 in FIG. 10) (before the end hangover, the extraction result is generated, but after the end hangover, the extraction result is not generated). The states are divided into two using the end hangover as a boundary.

In other words, the two different states are prepared:

the period from time t6 to t7 in FIG. 10 is the state "Ti", and the period from time t7 to t8 in FIG. 10 is the state "J".

The states are distinguished from each other such that the state "H" at the period from time t6 to t7 in FIG. 10 is "breaking (before the end hangover)", and the state "J" at the period from time t7 to t8 in FIG. 10 is "breaking (after the end hangover)".

In this manner, separating the breakings after the speech end into the two states is one of the characteristics of the process according to the present disclosure.

Note that the state "J" can be generated at time t5 to t6 and t7 to t8 in FIG. 10.

In the state "Ti", as long as the direction point for connection is not present, the state "H" is self-looped. Upon the self loop, the extraction filter is applied to the observation signal to generate the extraction results. Once the self loop reaches the predetermined number of times (the number of blocks corresponding to the length of time t6 to t7 shown FIG. 10), the state transits to the state "J". In this transition, no extraction result is generated.

In the state "Ti", if the direction point connecting to the segment appears again, it returns to the state "G". If the length of the segment at the time of returning to the state "G" exceeds the upper limit, the state transits to the state "I". Upon the transition from the state "H" to the state "J", the feature amount is generated for applying to the voice recognition.

Also in the state "J", as long as the direction point for connection is not present, the state "J" is self-looped. In the self loop, no extraction result is generated. If the self loop exceeds the predetermined number of times (the number of blocks corresponding to the length of time t6 to t7 shown FIG. 10), the state transits to the state "K".

In the state "J", if the direction point connecting to the segment appears again, it returns to the state "G". If the length of the segment at the time of returning to the state "G" exceeds the upper limit, the state transits to the state "I". Upon the transition from the state "J" to the state "G", the feature amount is generated.

The state "I" represents that the segment being created is too "longer" than the prescribed length. There are two ways upon the state transition depending on setting to the too longer segment. If the setting is such that the too longer segment is rejected, the state transits directly to the state "L". On the other hand, if the setting is such that the speech end is determined when the upper limit of the length is exceeded, the state transits to the state "K". Note that if the state transits to the state "K", the direction of the segment, the density of the direction points, and the percentage of the "voice-like" frame are determined. If the conditions are not satisfied, the state transits to the state "L". If the conditions are satisfied, special data representing that the segment is determined is transmitted to the voice recognition decoder instead of the extraction result, thereby promoting the determination of the voice recognition result.

Next, the transition along the line d represented by the narrow dashed-dot line in FIG. 19 will be described. Any of which represents the end registration process performed by identifying the "registered" segment, specifically, the speech segment based on a user's will such as the change in the hand shape of the speaker.

The transition from the state "A" to the state "E" is performed when the end registration process is invoked at time t3 to t4 shown in FIG. 10, i.e., the change in the hand shape of the user (speaker) is identified, for example. In this case, the segment is too "short", the state transits to the state "L" that represents "rejected".

The transition from the state "C" to the state "F" along the line d represented by the narrow dashed-dot line is performed when the end registration process is invoked at time t4 to t5 in FIG. 10. In this case, as the end is determined before the extraction filter is estimated, the extraction filter is estimated, which is applied to the speech segment to generate the sound source extraction result.

In addition the transition from the state "G" to the state "K" along the line d represented by the narrow dashed-dot line is performed when the end registration process is invoked at time t5 to t6 in FIG. 10. In this case, special data representing that the segment is determined is transmitted to the voice recognition decoder, thereby promoting the determination of the voice recognition result.

Next, data necessary for achieving the process along the state transition model shown in FIG. 19 will be described referring to FIG. 20.

FIG. 20 shows details of the segment information 172. The segment information includes the following:
(1) inside state,
(2) segment ID,
(3) beginning frame number
(4) beginning frame number with hangover
(5) end frame number
(6) end frame number with hangover
(7) "registered" flag
(8) direction point counter
(9) average direction
(10) breaking counter
(11) frame number to be ended
(12) connectable direction point list The (1) inside state represents the current state (A to L in FIG. 19) of the state transition model.

The (2) segment ID is an identification number uniquely attached to the segment being created.

Figure 18:
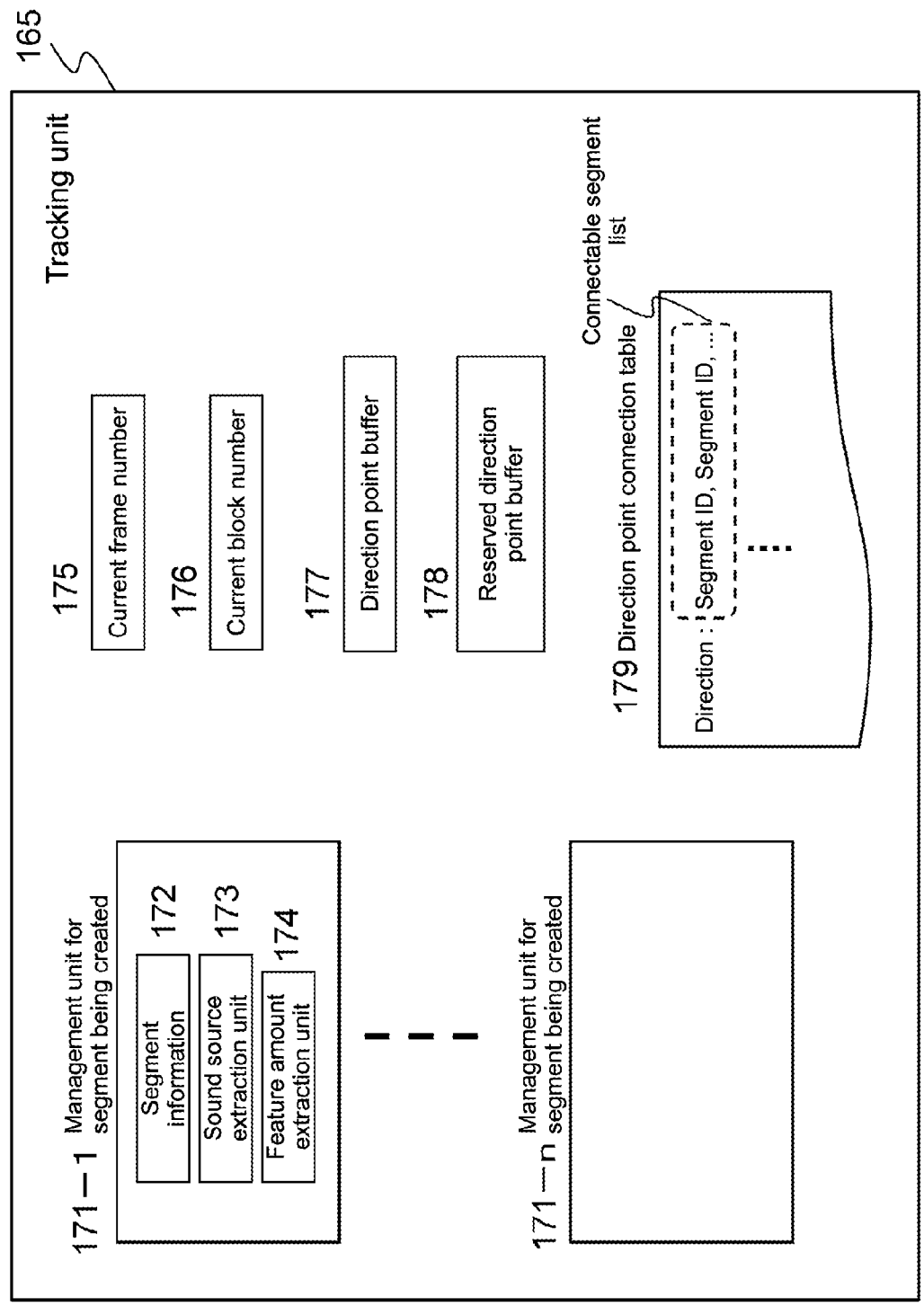
FIG. 18 A drawing for explaining a tracking unit 165.

The (3) beginning frame number and the (4) beginning frame number with hangover represent the frame number in a segment beginning at time t3 in FIG. 10 and the frame number at time t2 in FIG. 10, and the values of both are determined at the time when the segment being created management unit shown in FIG. 18 is created in the tracking unit 165. Basically, the (4) beginning frame number with hangover is subtracted a fixed value from the (3) beginning frame number. If the value becomes negative by subtracting the fixed value from the (3) beginning frame number immediately after the system starts up and the segment is created, the minimum value of the frame number (for example, 0) is assigned to the beginning frame number with hangover.

The (5) end frame number and the (6) end frame number with hangover are the frame numbers in the segment end at time t6 and the at time t7 in FIG. 10, respectively. Note that, during the tracking process, the values on the way are stored. Specifically, the current frame number 176 held by the tracking unit 165 in FIG. 18 is assigned to the (5) end frame number in the states "A", "C", "G" shown in FIG. 19, and the frame number 176 is also assigned to the (6) end frame number with hangover in the states "A", "C", "G", "Ti", thereby automatically determining both ends after the state transits to the state "Ti".

The (7) "registered" flag is prepared to distinguish the segment created by the beginning registration process dedicated for the voice segment detection method that the assessment time is unnecessary. The flag represents whether or not the above-described "registered attribute" is set. The segment flagged is subjected to a special process upon tracking.

The (8) direction point counter is the number of the direction points included in the segment being created. For example, 13 direction points are included in the segment described earlier shown in FIG. 10. In this case, the value of the direction point counter is "13". Using the value, the density of the direction point within the segment is calculated, and a weighted average of the direction is calculated.

The (9) average direction is an average value of the direction in each direction point. During tracking, a difference between this value and a value of a direction in a new direction point is calculated. If the absolute value thereof is lower than the predetermined value, the direction point is determined to be connectable to the segment.

The (10) breaking counter is for counting the number of self loop in the states "B", "D", "Ti", "J" described earlier in FIG. 19. The value may hold the number itself of the self loop (in other words, the number of blocks breaking), but may hold the value converted into the number of frames and the time (seconds or milliseconds).

The (11) frame number to be ended is a member used only in the end registration process to the "registered" segment. Here, if a value greater than the current frame number 176 held by the tracking unit (see FIG. 18) is set, "reservation" of the end registration process can be represented. In other words, if the value is set in the (11) frame number to be ended during the tracking, the end registration process is performed only after the current frame number 176 exceeds the (11) frame number to be ended. The reasons why the reservation of the end registration process are the following two:

(Reason 1) In order to achieve the end hangover even in the end registration process to the segment "registered"

(Reason 2) In order to deal with the case that sound process is delayed although the sound process and image process are performed in parallel (a time stamp attached to the image appears to a future time)

The (12) connectable direction point list represents the direction points connectable to the segment as a list, and is data where the keys and the values in the direction point connection table 179 held by the tracking unit 165 shown in FIG. 18 are inverted. If the list is blank, the segment is regarded as breaking. If the list includes plural components, one direction point that is the average value thereof is regarded to be connected.

Next, the sound source extraction unit 173 will be described referring to FIG. 21.

FIG. 21 shows each process unit of the sound source extraction unit 173 and data generated or held in the sound source extraction unit 173 (generated/held data in the figure). The data may be held within the sound source extraction unit 173, or may be held in a memory accessible to the sound source extraction unit 173.

The filter estimation unit 191 generates the (1) extraction filter and the (2) whole dead corner space filter shown in the "generated/held data" in the figure. The extraction filter is for extracting the target sound from the observation signal. The whole dead corner space filter is a filter where dead corners are formed in all sound sources included in the observation signal for use in learning, i.e., a filter for attenuating the voice of all sound sources included in the observation signal. The whole dead corner space filter has the properties similar to the filter described in Japanese Patent Application Laid-open No. 2011-107602.

A filter application unit 192 applies the extraction filter to the observation signal, and executes the sound source extraction process.

A (3) filter application beginning frame number and a (4) filter application end frame number in the "generated/held data" in FIG. 21 are frame identifiers for representing that application is done from what number to what number of the frames of the observation signal when the extraction filter or the like is next applied, and play an important function to achieve the sequentially sound source extraction.

For example, it takes an example that after the self loop at the state "J" [breaking (after the end hangover)] in FIG. 19, the state transits to the state "G" [the extraction filter estimated]. This means that although there is breaking, but the breaking is short, and it is regarded as on the way of the segment. However, as the state "J" does not generate the extraction result, when returning to the state "G", the extraction result should be generated for the short breaking corresponding to the state "J". Even in this case, if it saves the frame to which the extraction filter is applied last time, the extraction filter is applied to the observation signal from the next frame to the current frame, thereby preventing the extraction result from breaking.

An erasure residue removing unit 193 and a time frequency masking unit 194 in FIG. 21 are used for more removing the disturbing sound that is not completely removed by the extraction filter. The erasure residue removing unit 193 applies the whole dead corner space filter to the observation signal, and "subtracts" the application result from the extraction result (the result of applying the extraction filter to the observation signal). On the other hand, the time frequency masking unit 194 applies the time frequency mask based on a phase difference between the microphones to the extraction result. Both of which are described later.

Next, the feature amount conversion unit 174 of the management unit 171 for the segment being created within the tracking unit 165 in FIG. 18 will be described referring to FIG. 22. The feature amount conversion unit 174 converts the output from the sound source extraction unit 173 into the feature amount used in the voice recognition. As described later, the output from the sound source extraction unit 173 is a spectrum. On the other hand, the data for applying to the voice recognition by the decoder in the voice recognition unit 156, i.e., the feature amount, is generally the Mel-Frequency Cepstral Coefficient (MFCC). An MFCC generation unit 201 shown in FIG. 22 converts the spectrum outputted from the sound source extraction unit 173 into the Mel-Frequency Cepstral Coefficient (MFCC) that is the feature amount applied to the voice recognition.

It is also known that as to the Mel-Frequency Cepstral Coefficient (MFCC), the accuracy of the voice recognition accuracy is improved by performing normalization between the frames instead of using the value calculated from the spectrum directly for the voice recognition. There are two types of normalization frequently used. Cepstral Mean Normalization (CMN) is that the average of the MFCC is adjusted to 0. Cepstral Variance Normalization (CVN) is that dispersion (or standard deviation) is adjusted to 1.

In a general related art, after the end of the speech segment is determined, the sound source is extracted. The average and the dispersion (or the standard deviation) used in these normalizations are also calculated from the whole speech segment (for example, the data of the segment 105 in the embodiment shown in FIG. 10). In contrast, according to the present disclosure, along with the sequential process of the sound source extraction, the average and the dispersion (or the standard deviation) necessary for the normalization are also calculated in the eerily stage. Specifically, the timing is at the time t5 in the embodiment shown in FIG. 10.

In other words, the sound source extraction unit 173 estimates the extraction filter at the time t5, and applies the filter to the observation signal 108 at the time t2 to t5 to generate the extraction results. Immediately thereafter, the feature amount conversion unit 174 converts the extraction result into the Mel-Frequency Cepstral Coefficient (MFCC), and calculates the average and the standard deviation from the MFCC. Thus, along with the sound source extraction result sequentially generated at the sound source extraction unit 173, the feature amount conversion unit 174 sequentially coverts into the Mel-Frequency Cepstral Coefficient (MFCC), and subtracts the average from the Mel-Frequency Cepstral Coefficient (MFCC) or divides with the standard deviation, thereby sequentially generating the feature amount.

Figure 22:
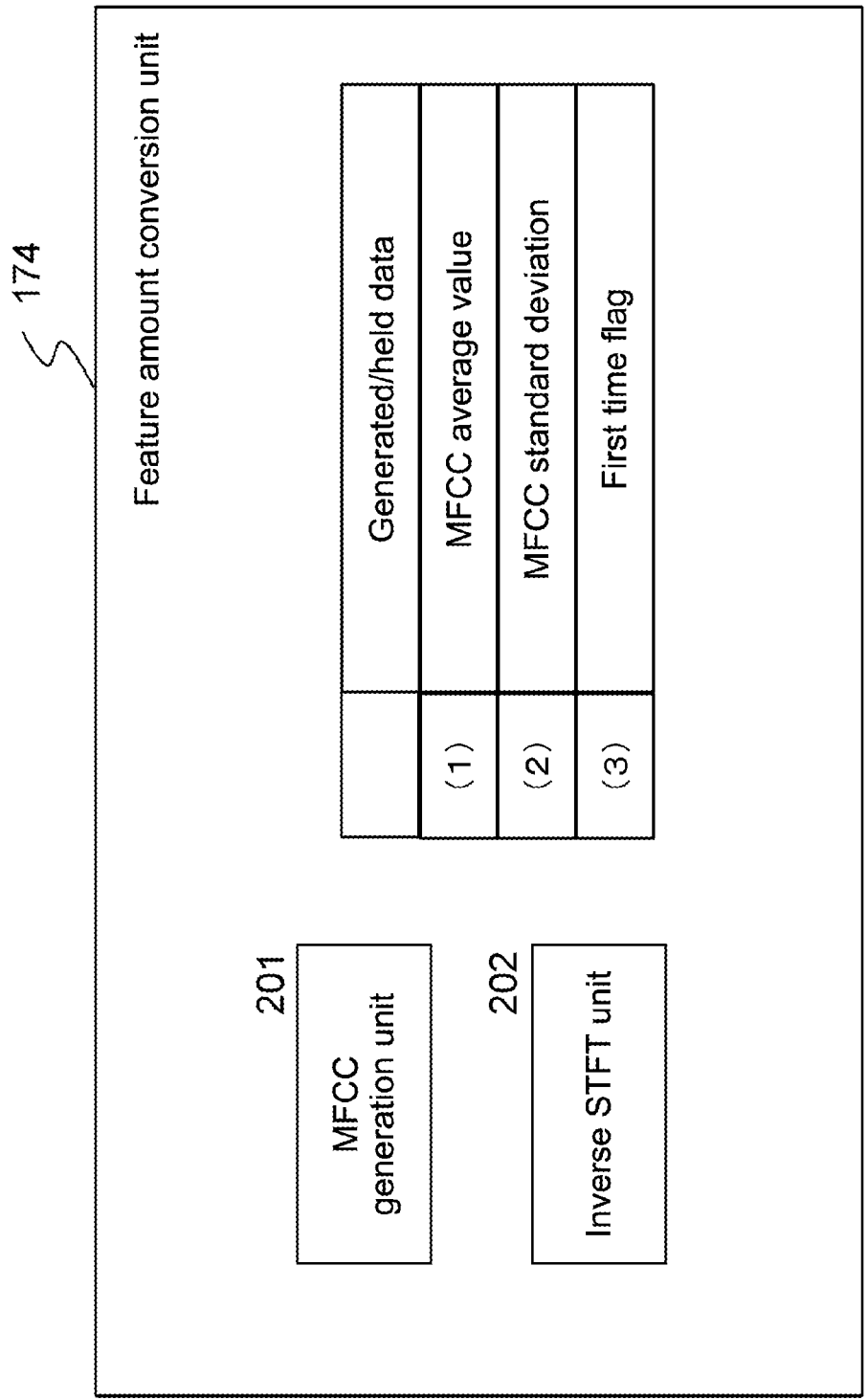
FIG. 22 A drawing for explaining a feature amount conversion unit 174 of a management unit 171 for segment being created within a tracking unit 165.

The feature amount conversion unit 174 has the configuration shown in FIG. 22. The MFCC generation unit 201 converts the spectrum that is the sound source extraction result generated by the filter application in the sound source extraction unit 173 into the Mel-Frequency Cepstral Coefficient (MFCC).

As described above, the feature amount conversion unit 174 of the voice recognition apparatus according to the present disclosure calculates the average and the standard deviation of the Mel-Frequency Cepstral Coefficient (MFCC) on the way of tracking the voice segment, e.g., at the time it reaches time t5 when the filter estimation process begins in the embodiment shown in FIG. 10. These are saved in the memory as the generated/held data shown in FIG. 22. The feature amount conversion unit 174 is accessible to the memory.

A (3) first time flag shown in the generated/held data in FIG. 22 is for distinguishing whether or not the Mel-Frequency Cepstral Coefficient (MFCC) is generated in the segment for the first time. If the management unit 171 for the segment being created is generated, a value (true) representing the first time is assigned. Once the MFCC is generated, a value (false) representing not the first time is assigned. There are two aims to prepare the flag as follows:
(Aim 1) In order to calculate the average and the standard deviation used for normalization of the feature amount only for the first time
(Aim 2) In order to generate the feature amount even at the top frame As the (Aim 1) is already described above, only the (Aim 2) is described here. It is known that the voice recognition accuracy is improved by using not only the MFCC itself but also the information representing the amount of change in the MFCC between frames adjacent as the feature amount used in the voice recognition. The information is called as a delta feature amount. According to the present disclosure, a vector including the MFCC and the delta feature amount is used as the feature amount for the voice recognition.

In other words, in order to generate the vector including the delta feature amount in the beginning frame of the segment, the Mel-Frequency Cepstral Coefficient (MFCC) itself has to be generated in the former frames. The same applies to the sound source extraction. Therefore, the flag for distinguishing whether or not it is the first time is prepared. If the flag is true, the range to which the extraction filter is applied in the sound source extraction unit is widened by a predetermined number of frames to the past. The extraction result is converted into the MFCC and the delta feature amount is calculated. Furthermore, the number frame at the top that no delta feature amount is incapable of calculating is erased. In this manner, the desirable feature amount vector is provided.

If the feature amount is generated in the segment for the second time or later, the Mel-Frequency Cepstral Coefficient (MFCC) in the former frames saved in the MFCC generation unit 201 as much as necessary are used to calculate appropriately the delta feature amount.

Furthermore, the feature amount conversion unit 174 includes an inverse SIFT (Inverse Short-Time Fourier Transform) unit 202 as appropriate, and the spectrum may be converted into a waveform. There are mainly two aims to perform the inverse SIFT as follows:
(Aim 1) In order to hear the extraction result by a person, as necessary
(Aim 2) As it is expected that most of voice recognition engines includes a mechanism for converting the waveform into the feature amount, the extraction result is converted once to the waveform, which will be available in a wide range of the voice recognition engines

3-3. Configuration and Process of Voice Recognition Unit in Voice Recognition Apparatus According to Present Disclosure Next, configurations of the voice recognition unit 156 will be described referring to FIG. 23.

Into a decode management unit 211, the following information is inputted.

The feature amount outputted from the extraction result buffering unit 166 (the sound source extraction result generated by the tracking unit 165)

Priority information as a ranking result in the segment outputted from the ranking unit 167

Segment update information such as a lost segment (or a rejected segment) outputted from the tracking unit 165

Each information described above is inputted.

The decode management unit 211 requests the extraction result buffering unit 166 to output the feature amount in the segment in the order of a high priority based on the priority information of the voice segment inputted from the ranking unit 165, receives the feature amount of the segment corresponding to the request, and sends it to decoders 212-1 to n. In addition, the decode management unit 211 inquires whether or not the segment being decoded at present is invalid (lost or rejected) to the tracking unit 165, and cancels the corresponding decode, if invalid.

The decoders 212-1 to n execute the voice recognition process for determining a word string most close to the target sound corresponding to the segment by applying the feature amount provided from the front end unit, while referring to a database such as an acoustic model 216, a dictionary 217 and a language model 218.

The apparatus according to the present disclosure includes a plurality of the decoders as necessary. Each decoder holds the segments ID213-1 to n such that which segment is being decoded. If no segment is decoded, an undefined value is assigned as the segment ID.

Figure 23:
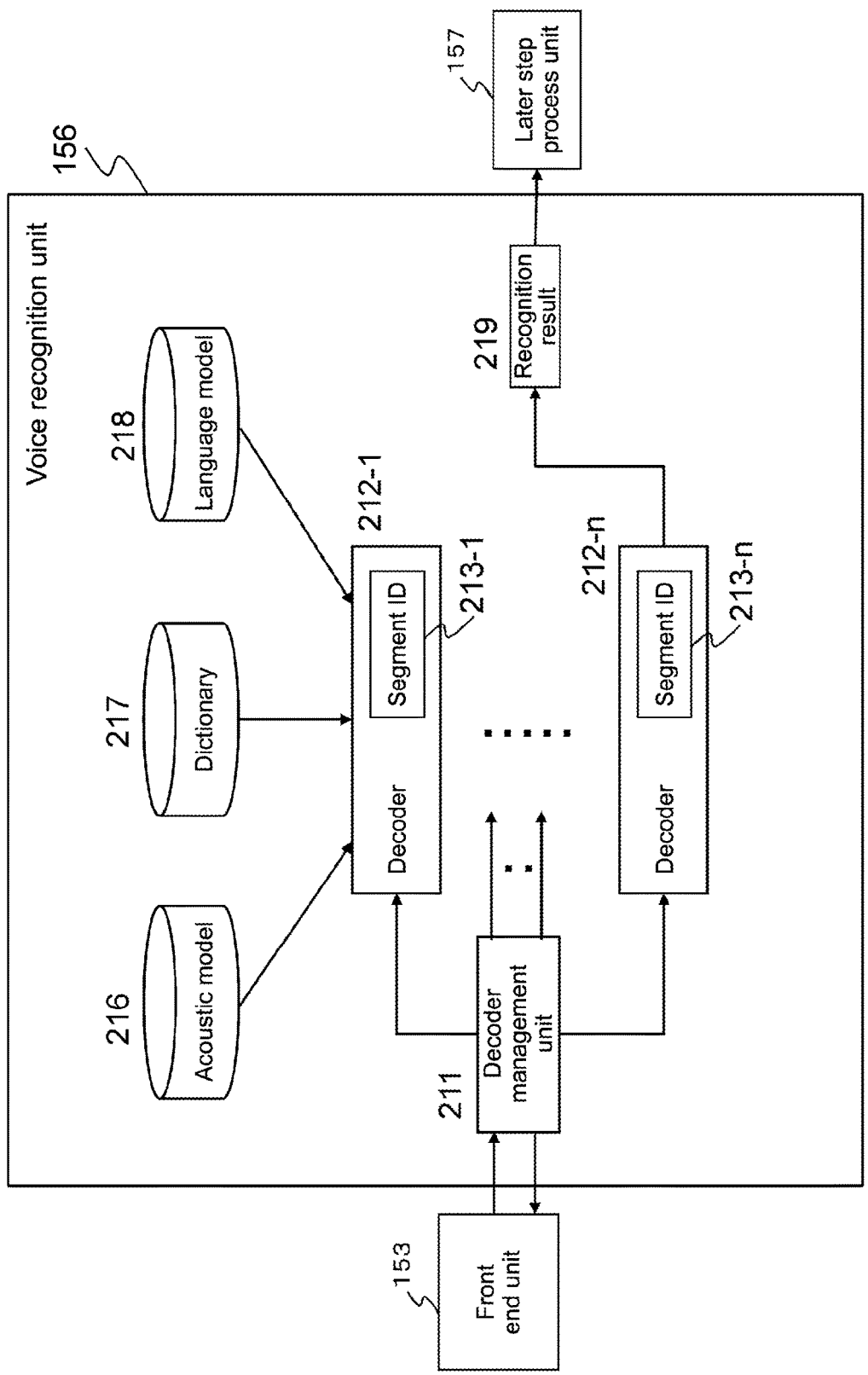
FIG. 23 A drawing for explaining a configuration of a voice recognition unit 156.

Although it is omitted in FIG. 23, similar to the decoder 212-1, decoders 212-2 to n execute the voice recognition process referring to the acoustic model 216, the dictionary 217 and the language model 218.

The acoustic model 216 stores a model representing an acoustic feature such as a phoneme and a syllable of the voice to be recognized. As the acoustic model, an HMM (Hidden Markov Model) can be used, for example.

The dictionary 217 stores a word dictionary where information about a pronunciation (a phoneme group) is described and a model where a linkage relationship between the phoneme and the syllable is described in relation to each word (phrase) to be recognized.

The language model 218 describes the information about how to link (connect) each word registered in the word dictionary of the dictionary 217. As the description method, a statistical word chain probability (n-gram) and a finite state automaton base grammar are available.

Each of the decoders 212-1 to produce a recognition result 219, which is used in a later step process unit 157.

3-4. Configuration and Process of Image Process Unit in Voice Recognition Apparatus According to Present Disclosure Next, the image process unit 155 will be described referring to FIG. 24.

The input to the image process unit 155 is an image acquired by an image input unit (camera) 154. The image is sent to a lip image process unit 221, a hand image process unit 223, and, as necessary, a face image process unit 222.

The lip image process unit 221 detects an area corresponding to a lip from the input image, compares the lip area with the former one. If a degree of change in the lip area exceeds the predetermined value, it is determined as "the mouth moves". The position of the lip in the image is converted into the sound source direction. A time stamp is attached to the value, which is sent to the front end unit 153 as a direction point.

The hand image process unit 223 detects an area corresponding to a hand from the input image, compares the area with the former one. A hand shape is identified by the method described in Japanese Patent Application Laid-open No. 2012-203439, for example.

In this module, for example, if the hand shape acquired from the former image is "Paper" and the hand shape acquired from the present image is "Rock", it is determined as the beginning of the speech. To the contrary, if the former is "Rock" and the present is "Paper", it is determined as the end of the speech. Once it is determined as the beginning of the speech, the sound source direction is calculated by correcting the position of the hand in the image as described later, and the time stamp is attached thereto. The sound source direction and the time stamp are notified to the front end unit 153 as speech end information. On the other hand, once it is determined as the end of the speech, the time stamp is attached to the sound source direction calculated similarly. Thereafter, it is similarly notified to the front end unit 153 as the speech end information.

Furthermore, the image process unit 155 includes a face image process unit 222, as necessary, and detects a face area from the input image. There are mainly two aims to detect the face area as follows:
(Aim 1) After the face area is detected, the lip image is detected, thereby limiting the search range and reducing the calculation amount
(Aim 2) When the sound source direction is calculated from a coordinate of the hand area, the sound source direction is calculated from a coordinate of the face area nearest the hand area The description about the configuration of the respective modules is ended.

4. Detail about Process of Voice Recognition Apparatus According to Present Disclosure Hereinafter, the process executed by the voice recognition apparatus according to the present disclosure will be described.

4-1. Summary of Entire Process Executed by Voice Recognition Apparatus According to Present Disclosure The process executed by the voice recognition apparatus are roughly classified into two systems.
(Voice process) A main process of the voice recognition process and a main process for generating the voice recognition result
(Image process) A process for generating the information based on the image for applying to the above-described voice recognition process The image process is executed by the image process unit 155 of the configuration shown in FIG. 15. For example, the change in the lip image and the hand shape is determined and the information applied for determination of the voice segment is generated based on the image inputted from the image input unit 154.

The voice process is mainly executed by the front end unit 155 and the voice recognition unit 156 in FIG. 15. The voice process executes the process to which the process result of the image process is applied.

Note that the process described referring to each flow chart hereinbelow is executable by each process unit of the voice recognition apparatus in accordance with the program stored in the memory within the voice recognition apparatus. Each process unit executes the process in accordance with the process sequence specified by the program.

Figure 25:
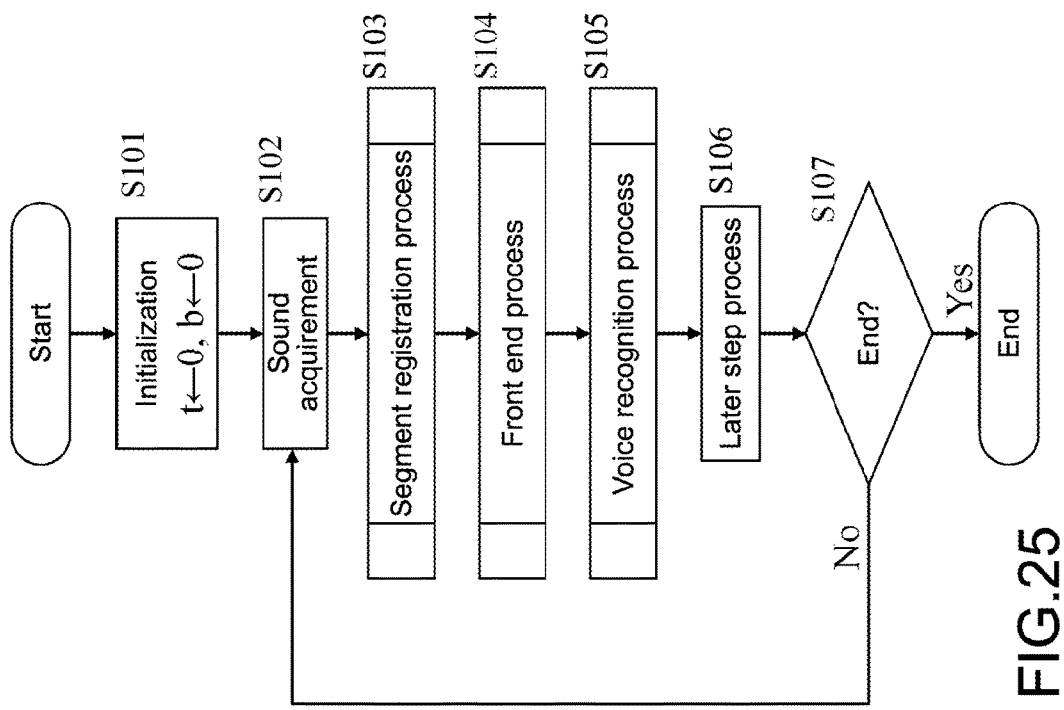
FIG. 25 A flow chart for showing a process sequence of a voice process.

FIG. 25 shows a flow chart for showing a process sequence of a voice process.

Figure 26:
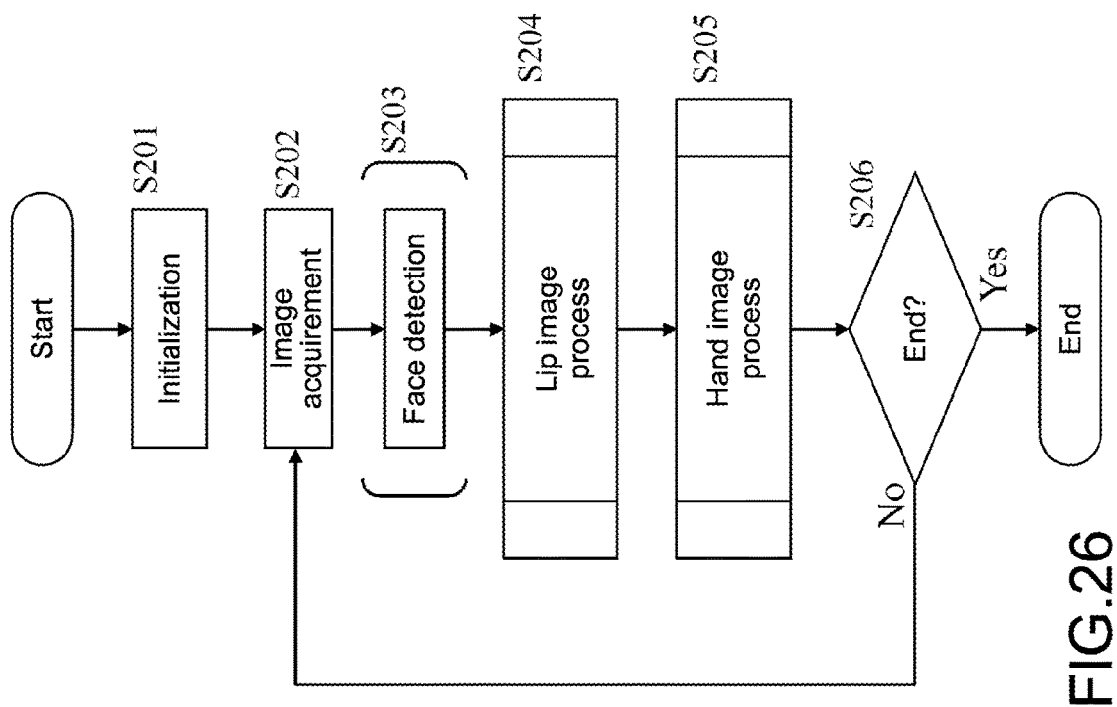
FIG. 26 A flow chart for showing a process sequence of an image process.

FIG. 26 is a flow chart for showing a process sequence of an image process.

The reason why the process systems are classified into two is a difference in temporal granularity of each data. For example, the voice process executes the process in accordance with the flow shown in FIG. 25 every time a sample for one shift of the short-time Fourier transform (STFT) signal is acquired (per $\frac{1}{100}$ seconds when a shift width is 160 sample and a sampling frequency is 16 kHz).

On the other hand, the image process executes the process in accordance with the flow shown in FIG. 26 every time one image is acquired (per $\frac{1}{30}$ seconds at 30 fps). Thus, the data units to be processed in the respective process systems are different. Therefore, two individual flows are shown.

Firstly, the voice process is described referring to the flow chart shown in FIG. 25.

In step S101, the modules relating to the voice process, for example, the front end unit 153 and the voice recognition unit 156 are initialized.

Each module holds a frame number, a block number and a segment ID as a parameter for identifying data to be processed, for example.

As an initial setting, a variable t representing the frame number is set to t=0, a variable b representing the block number is set to b=0, and the segment ID is set as undefined.

After the initialization is completed, the processes in steps S102 to S107 are repeated until the end.

In step S102, the front end unit 153 acquires the sound signal converted into the digital signal by the AD converter 152 for the necessary number of the channels and the samples.

The segment registration process in step S103 registers the beginning or the end of the voice segment by the information provided from outside, for example, the output from the image process unit 155. Among the voice segment detection methods, this process is invoked when the beginning or the end of the voice segment is detected by the method where the assessment time for the beginning or the end is unnecessary, for example, by the method utilizing the change in the hand shape that is the user's speech segment instruction information. The details are described later.

The front end process in step S104 detects the voice segment, extracts the sound source, and converts them into the feature amount using the sound data acquired in step S102. The details are described later.

The voice recognition process in step S105 uses the extraction result (the feature amount) per segment provided by the front end process in step S104 to determine the recognition result of the word string corresponding thereto. Other than the determination of the recognition result, the inputted sound is determined whether or not the sound is for operating the system by recognition reliability and the score. The details are described later.

Using the recognition result provided in step S105, the process corresponding to the recognition result is performed in the later step process in step S106. For example, if the user's speech asks for the change of the television channel, the channel is changed correspondingly. Alternatively, other than using the recognition result itself, any expression may be made using the process result at the front end process in step S104. For example, along with the sequential tracking, the information representing "Now, hearing the voice from this direction" may be displayed.

In step S107, the end of the voice process is determined, for example, based on the presence or absence of the voice segment to be processed. If the process is continued, it returns to step S102. If it is ended, the process is ended.

Before describing the details about the voice process, a summary of the image process will be described referring to the flow chart shown in FIG. 26.

In step S201, the image process unit 155 is initialized. Thereafter, the processes from step S202 to S206 are repeated until the end.

In step S202, a sheet of an image is acquired from the image input unit (camera) 154.

In step S203, a face detection process is performed on the image acquired as necessary to detect the face area from the image. This process is executed auxiliary as the process in step S204 and step S205, and may be skipped.

The lip image process in step S204 is to determine whether or not the lip is present in the image acquired in step S202 and, if present, whether or not the lip is moved. The details are described later.

The hand image process in step S205 is to determine whether or not the hand is present in the image and, if present, whether or not the hand is changed as prescribed corresponding to the beginning or the end of the speech. The details are described later.

In step S206, the continuation of the image process is determined based on the input or not of the image not yet processed. If continues, it returns to step S202. If desired, it ends.

4-2. Process of Front End

Next, each process of the voice process described referring to the flow in FIG. 25 is further described in detail. For convenience of description, the front end process in step S104 is firstly described. Then, the segment registration process in step S103 is described. Finally, the voice recognition process in step S105 is described in this order.

Firstly, the front end process in step S104 will be described referring to the flow chart shown in FIG. 27.

Figure 16:
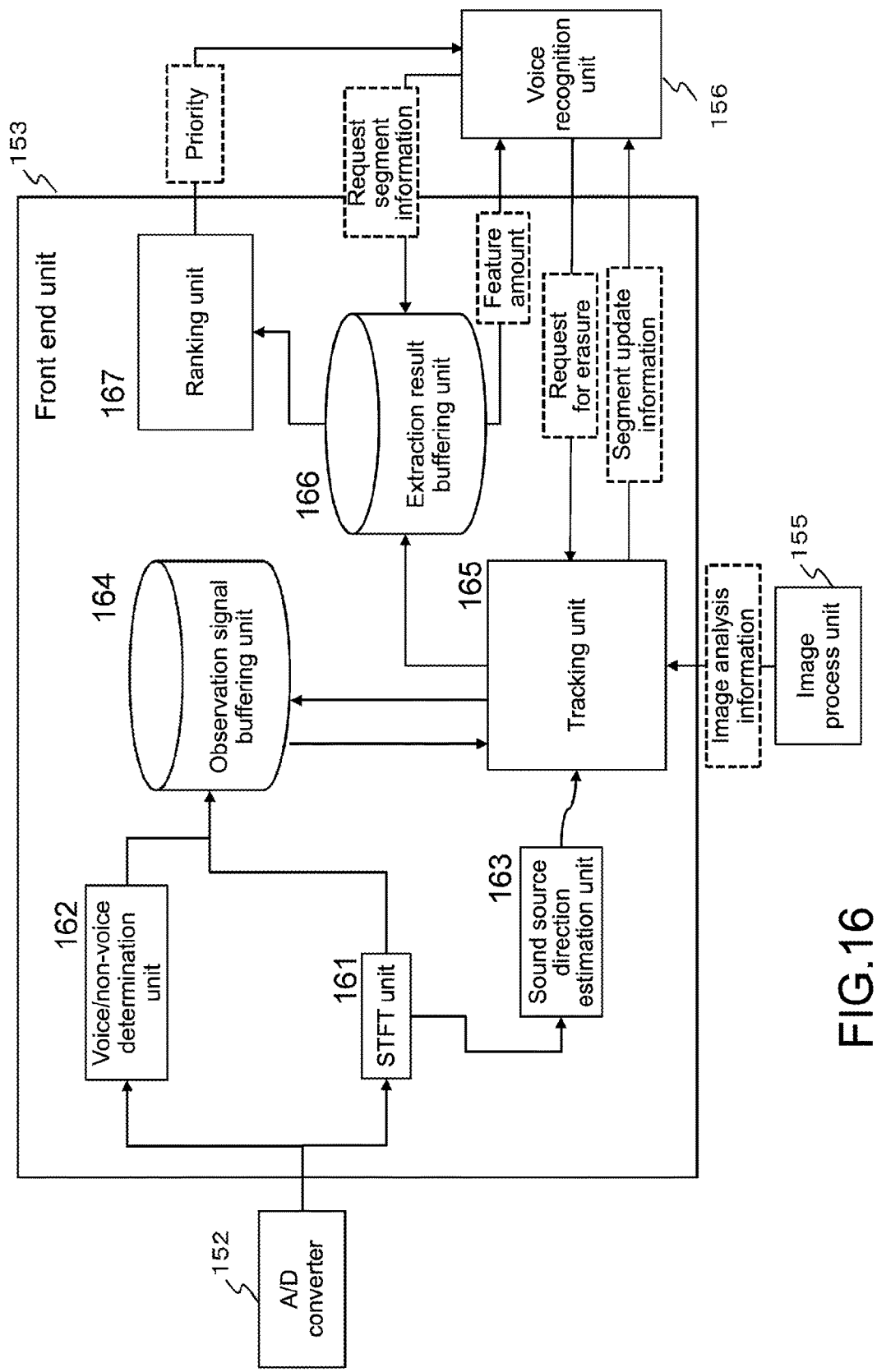
FIG. 16 A drawing for explaining a configuration and a process of a front end unit 153 in detail.
Figure 27:
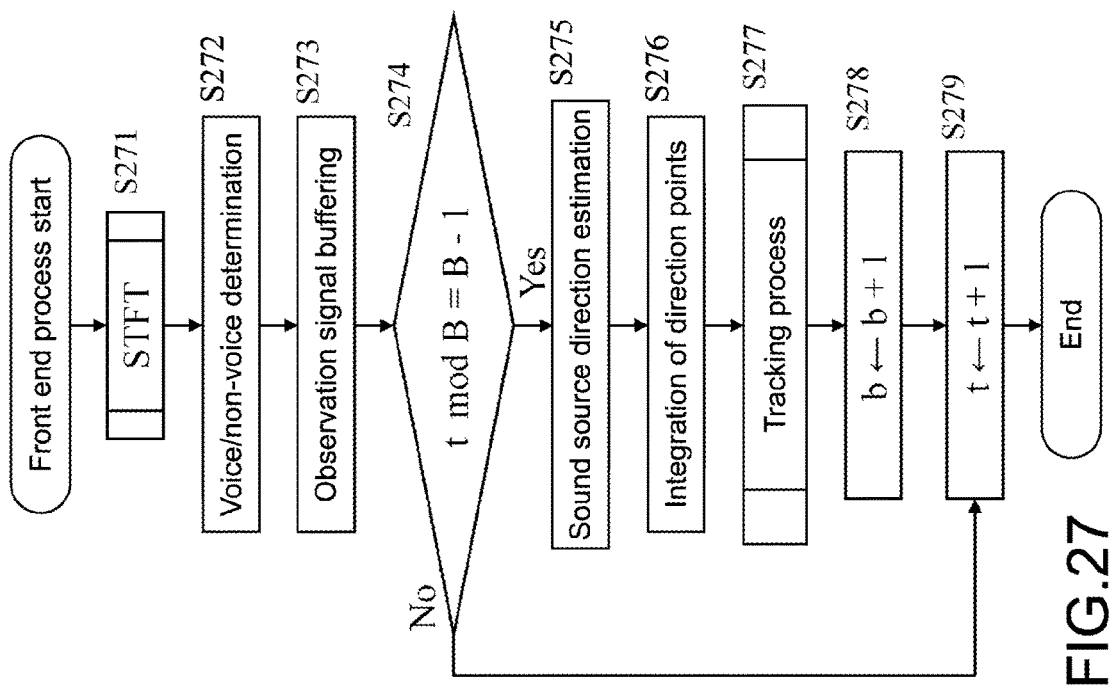
FIG. 27 A flow chart for showing a process sequence of a front end process.

The process in accordance with the flow shown in FIG. 27 is executed in the front end unit 153 described referring to FIG. 16.

The sound acquired in step S102 of the flow in FIG. 25 is inputted to the front end unit 153 via the AD converter 152.

In step S271, the SIFT unit 161 of the front end unit 153 shown in FIG. 16 applies the short-time Fourier transform (SIFT) to the sound data acquired. By the short-time Fourier transform (SIFT) process, the observation signal at the time frequency region is generated. The details are described later.

A unit of one time short-time Fourier transform (SIFT) process is called as a frame. A signal in the time frequency region for one frame is called as a spectrum. If the number of channels (the number of microphones) is set as n, an n number of the spectra is produced by this SIFT.

In step S272, the voice/non-voice determination process is executed. This process is executed by the voice/non-voice determination unit 162 of the front end unit 153 shown in FIG. 16, and determines whether or not the sound signal is sound-like as a binary. As the determination method, the method of focusing signal periodicities as described in Japanese Patent No. 4182444, for example, is used.

Next, the observation signal buffering process is executed in step S273. The observation signal buffering process is for storing a set of the frame number t to be processed, the spectra for a plurality of channels generated in step S271, the determination result in step S272, and the time stamp attached to the input signal in the observation signal buffering unit 164 as the "one frame data" described earlier referring to FIG. 17. Note that if the number of the data stored in the observation signal buffering unit 164 exceeds the predetermined value, the oldest frame data is discarded.

The processes from step S275 to S278 are executed at a certain frequency. For example, when it specifies the constant B=5 in step S274, it is executed at the frequency of one time per five frames. In step S274, "mod" is an operator for calculating a remainder of the division. For example, only when the frame number t is B-1, 2B-1, 3B-1, . . . , it proceeds to step S275, otherwise, to step S279. In other words, the processes in step S275 to S278 is performed using the B number of frames set in advance as a unit. The unit of process is called as a block.

The sound source direction estimation in step S275 is a process for acquiring 0 or more sound sources and the direction in one block. The result is represented as the direction point 101 shown in FIG. 10, for example. The sound source direction estimation process is described in Japanese Patent Application Laid-open No. 2012-150237, for example. In step S275, the existing method is applicable.

Integration of the direction points in step S276 is to merge the direction points determined in step S275 (the direction points determined from the sound signal) and the direction points determined, for example, by the lip image process in the image process unit. Basically, a sum set of a sum of the direction points is calculated. The result is stored in the direction point buffer 177 of the tracking unit 165 described referring to FIG. 18.

If the time stamp of the direction point derived from the image process is not matched with the time stamp held by the voice process, another process is performed taking it into consideration. In other words, the direction points derived from the image process to which the future time stamps for the voice process are attached are saved together with the time stamps (or the frame numbers) in the "reserved direction point buffer 178" shown in FIG. 18. Among them, the direction points that are considered as having the same time of this time voice process are taken out to add them to the direction point buffer 177.

The tracking process in step S277 connects the direction points having the similar directions to the time direction to determine the segment of the sound source. Together with the process, the sound source extraction result is generated, and the result is converted into the feature amount, sequentially. The details are described later.

After the processes are completed, the block number b is increased by only 1 in step S278.

Furthermore, the frame number t is increased by only 1 in step S279. The processes are executed every time.

Next, the short-time Fourier transform (STFT) executed in step S271 will be described referring to FIG. 28.

Figure 28:
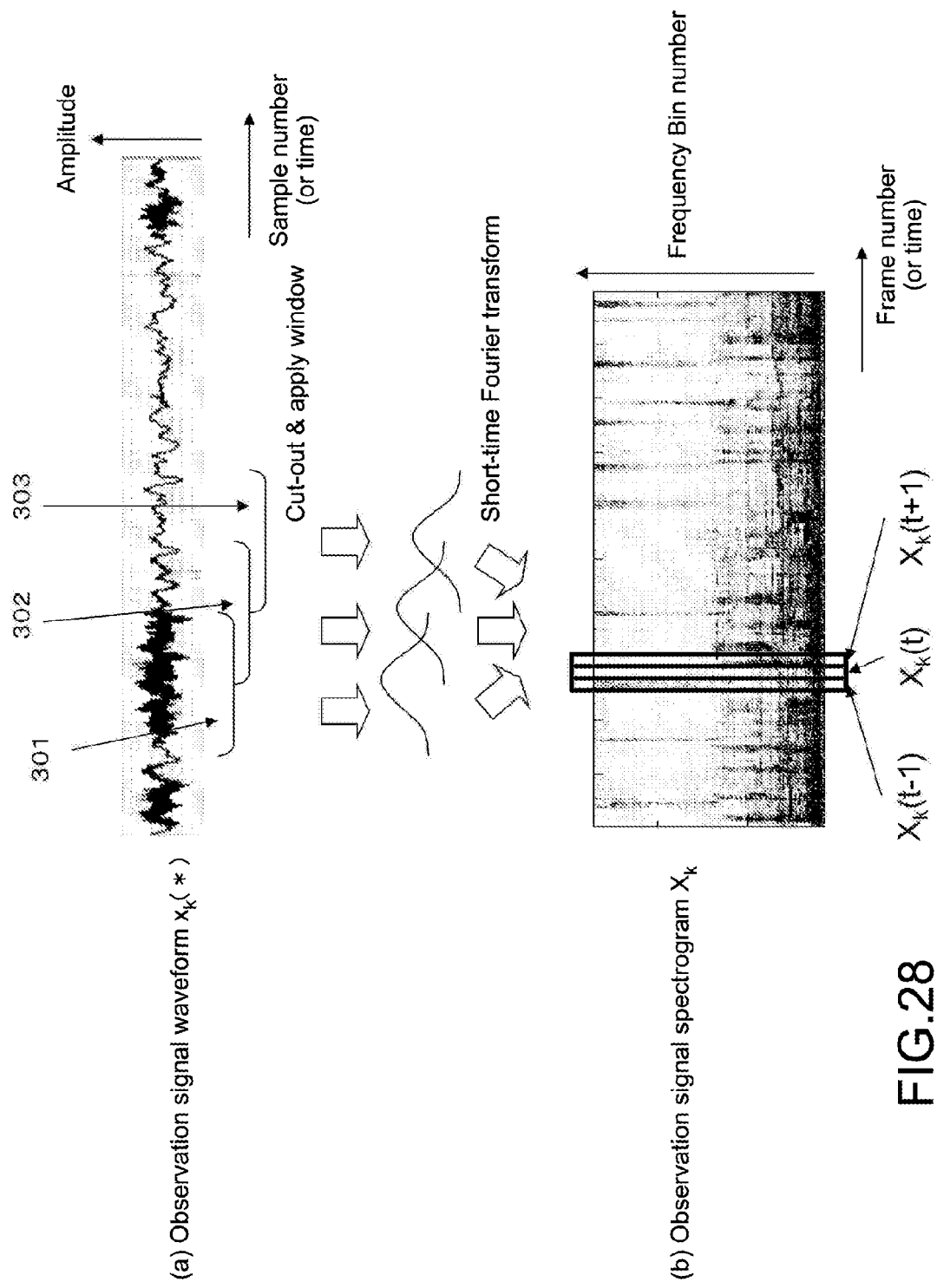
FIG. 28 A drawing for explaining a short-time Fourier transform (SIFT).

Samples each having a fixed length (for example, 512 samples) are cut out from a waveform $x_k(*)$ (where k represents the microphone number) of the observation signal at the time domain shown in FIG. 28 (a).

To each of the cut-out signals 301 to 303, a window function such as the Hanning window and the Hamming window is applied. A unit of cut-out is called as the frame. The short-time Fourier transform (STFT) is applied to the one frame data, thereby providing $X_k(\omega,t)$ (where $\omega$ is the frequency Bin number, and t is the frame number) that is the signal of the time frequency region.

Note that vector $X_k(t)$ including all frequency Bins as described in the former numerical formula [1.4] is called as the spectrum. In the numerical formula [1.4], M is the number of the frequency Bins. If the sample number within on flame is defined as c, the number M of the frequency Bins and the number of samples c have the relationship of M=c/2+1.

Specifically, when the number of one frame c=512, the number of the frequency Bins M=257.

As shown in FIG. 28, the cut-out frames 301 to 303 may be overlapped. With the overlapped areas, the spectra of the sequential frames $X_k$ (t−1) to $X_k$ (t+1) can be changed smoothly. The spectra arranged by the frame numbers is called as a spectrogram. FIG. 28 (*b*) is the spectrogram $X_k$ of the observation signal.

The voice recognition apparatus according to the present disclosure uses a plurality of the microphone as the sound input unit 151. If the number of the microphones is defined as n, the short-time Fourier transform (SIFT) is performed n times, and an n number of the spectra is generated.

Next, the tracking process in step S277 in the flow of FIG. 27 will be described referring to the flow chart shown in FIG. 29.

As described earlier referring to FIG. 12, the tracking is to check if the direction points of a new block are connectable to the respective segments being created, and to extend the segments, if connectable. In the process according to the present disclosure, along with the extension of the segments, the extraction filter is estimated and applied, and the result is converted into the feature amount.

The tracking process in each step shown in FIG. 27 will be described.

A connection check of the direction point in step S291 is for determining that each segment being created is connectable to each direction point within a new block. The details are described later. In this stage, checking is simply done. The segment is updated later.

If a plurality of segments being created is connectable to one direction point, the segments are merged in step S29. The details of the merge process are described later.

By an update process in step S293, the segment being created is connected to the direction point to extend the segments, or the end is determined when the state that no direction point connectable is present is continued for a predetermined time or more. As the segments are extended, each process described referring to FIG. 10 is performed. The details are described later.

In step S294, a new segment is created when a certain direction point is not connected to any segment being created, and the direction point is used as beginning to create the new segment. The details are described later.

At the end of the tracking process, an unnecessary segment is erased in step S295. This is done by erasing the segments rejected on the way or the segments merged into (absorbed by) other segments being created from the segments being created to be precluded from the tracking. The details are described later.

Figure 30:
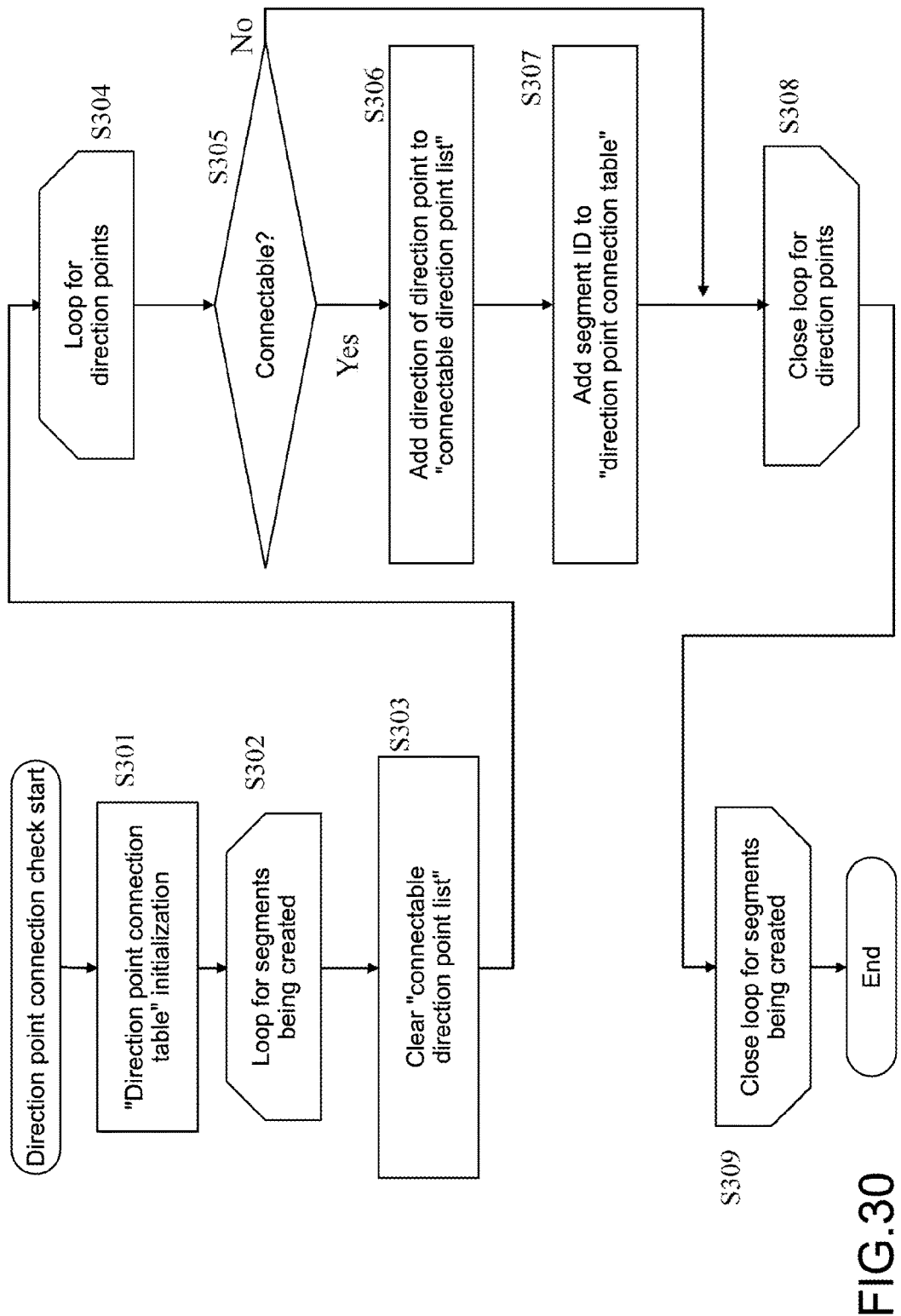
FIG. 30 A flow chart for showing a process sequence of a direction point connection checking process.

Next, the connection check of the direction point in step S291 will be described in detail referring to the flow chart shown in FIG. 30.

Figure 29:
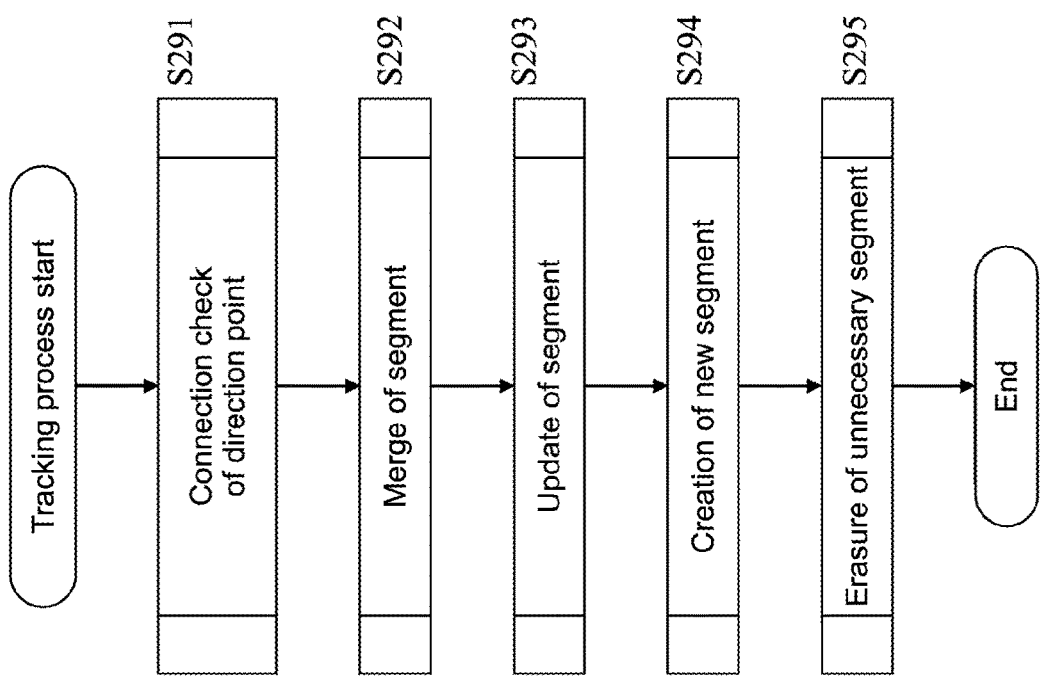
FIG. 29 A flow chart for showing a process sequence of a tracking process.

By the direction point connection checking process in step S291 during the tracking process shown in FIG. 29, all combinations of the segments being created and the direction points are checked if they are connectable, and the following two types of data are generated as a check result and are saved in the memory.
a) Data showing that each segment being created is connectable to which direction point
b) Data showing that each direction point is connectable to which segment being created The a) "data showing that each segment being created is connectable to which direction point" is held by each management unit 171 for the segment being created of the tracking unit 165 described referring to FIG. 18, and corresponds to the "(12) connectable direction point list" shown in the segment information 172 described referring to FIG. 20.

The b) "the data showing that each direction point is connectable to which segment being created" corresponds to "the direction point connection table 179" shown in the tracking unit 165 described referring to FIG. 18.

The process steps of the flow chart shown in FIG. 30 will be described.

In step S301, the content of "the direction point connection table" is initialized. Specifically, the direction point connection table 179 managed by the tracking unit 165 shown in FIG. 18 is initialized. Entries corresponding to the direction points are prepared. The process is executed by assigning an empty list to the list including the segment IDs.

Steps S302 to S309 are a loop for the segments being created. During the tracking, the management units 171-1 to n for the segments being created are created for the number of the segments being created in the tracking unit (FIG. 18). These management units 171-1 to n for the segments being created are a loop corresponding to each process.

In step S303, included in the segment information 172 of the management unit 171-1 for the segment being created shown in FIG. 18. The "connectable direction point list" ((12) in FIG. 20) is cleared. Specifically, the empty list is assigned.

Steps S304 to S308 are a loop for the direction points. Specifically, the loop is for each component (direction point) in the direction point buffer 177 of the tracking unit 165 shown in FIG. 18. Within the loop, all combinations of the segments being created and the direction points are checked for connectability.

In step S305, a certain segment being created and the direction point are checked for connectability. Specifically, a difference between the average direction of the segments being created ((9) of the segment information 172 in FIG. 20) and the direction of the direction points is calculated. If the difference is within the prescribed predetermined range, (for example, within the range from −10° to +10°), it is determined as connectable. If it is determined as connectable, steps S306 and S307 are executed. If it is determined as unconnectable, steps S306 and S307 are skipped. Even though the difference between the directions is within the predetermined range, if the value of the beginning frame number ((3) of the segment information 172 shown in FIG. 20) is greater than the current frame number (current frame number 175 in FIG. 18), it is regarded as unconnectable. This is for handling the case that the future time stamp is designated in the beginning registration process as described later.

Steps S306 and S307 are the process for generating the information corresponding to the above-described a) and b). In other words, the following data are generated and held.
a) Data showing that each segment being created is connectable to which direction point
b) Data showing that each direction point is connectable to which segment being created In step S308, the direction point loop is closed. In step S309, if the segment being created loop is closed, the data corresponding to the above-described a), b) are acquired and are held as management data of the tracking unit 165.

Figure 31:
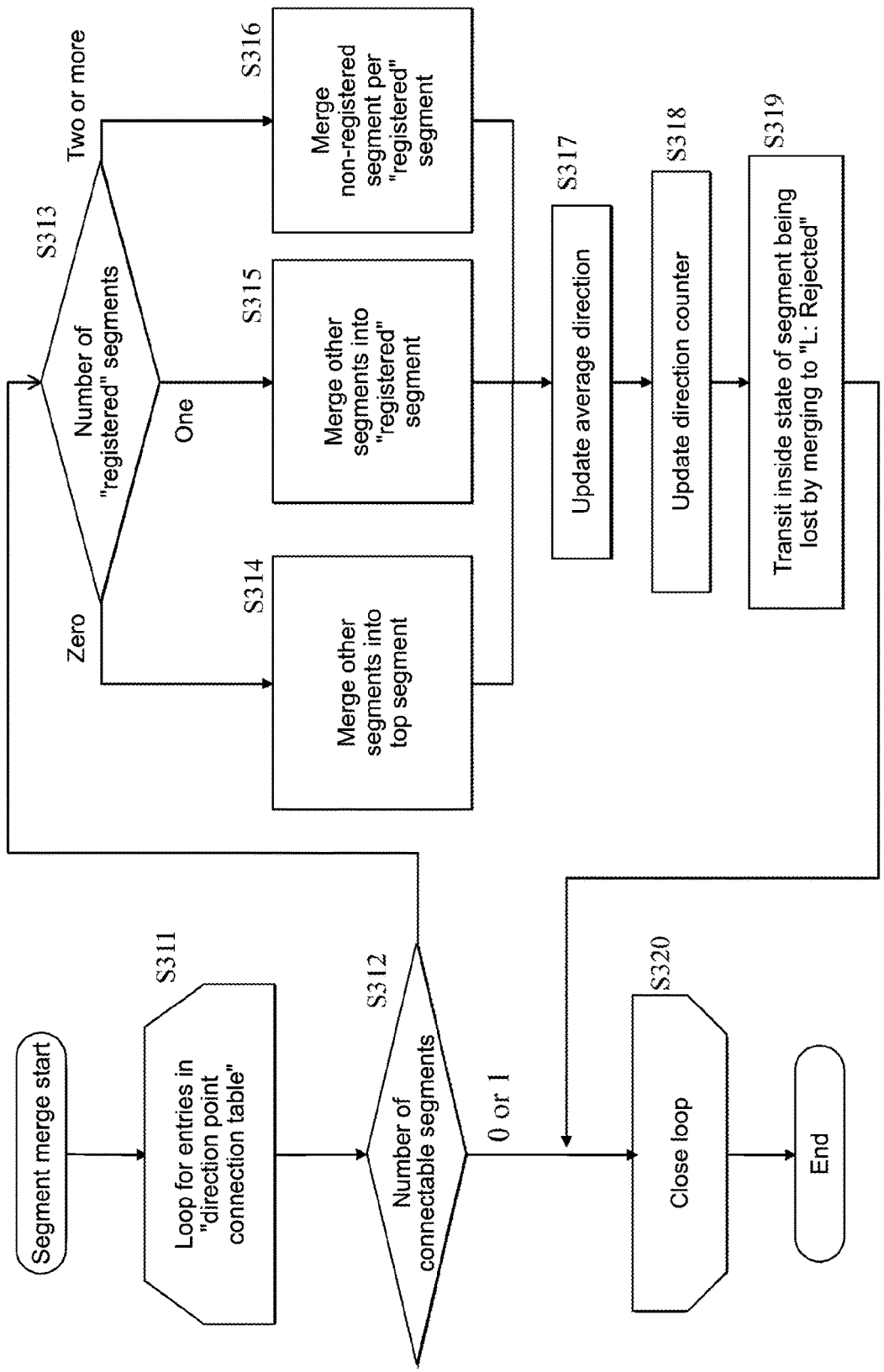
FIG. 31 A flow chart for showing a process sequence of a segment merge process.

Next, the segment merge process in step S292 of the tracking process shown in FIG. 29 will be described in detail referring to the flow chart shown in FIG. 31.

As described earlier referring to FIG. 12, the segment merge process is basically to merge a plurality of segments being created when the segments are connectable to one direction point. The behavior is different depending on whether or not the segments being created have "registered" attributes.

The process steps of the flow chart shown in FIG. 31 will be described.

Steps S311 to S320 are a loop for entries in the direction point connection table 179 managed by the tracking unit shown in FIG. 18. One entry of the direction point connection table 179 holds a connectable segment list showing that which segment being created is connectable to one direction point.

In step S312, it branches depending on the number of components in the connectable segment list of the direction point connection table 179. If the component is 0 (the segment connecting to the direction point is not present) or 1 (the segment connecting to the direction point is only one), merge is unnecessary. It proceeds to step S320. If the components are 2 or more, it proceeds to step S313.

In step S313, it branches depending on the number of the segments being created having the "registered" attributes of the components in the connectable segment list. This is done in order not to lose the segments having the "registered" attributes.

If the segments being created having the "registered" attributes are not present in the list, it proceeds to step 314.

In step S314, the segments being created included in the connectable segment list are sorted by the following scales.
(Scale 1) Long segments take precedence
(Scale 2) If a plurality of the segments having the same length is present, the segments having the smaller segment ID are conveniently take precedence The segment being created that gets the first place in the sort process to which each scale is applied merges (absorbs) the segment being created that gets the second place or later.

On the other hand, in the determination process in step S313, only one segment having the "registered" attribute is present, it proceeds to step S315.

In step S315, other segment is merged into the segment having the "registered" attribute.

Also, in the determination process in step S313, two or more segments having the "registered" attribute are present, it proceeds to step S316.

In step S316, the segment not having the "registered" attribute is merged into each segment having the "registered" attribute. For example, it is assumed that four segments of A, B, C, D are present in the connectable segment list, and A and B have the "registered" attribute. In this case, C and D are merged into A, and C and D are merged into B as well. As a result, two segments A and B remain.

After any of step S314 to S316 is ended, step S317 or later is executed commonly in the three steps.

In step S317, the average direction ((9) of the segment information 172 in FIG. 20) is updated. Specifically, a weighted average is determined by weighting the direction point counter ((8) of the segment information 172 in FIG. 20) between the segments being created to be merged. The resultant values are recorded as the average direction updated of the segment being created remained after merging.

Then, in step S318, the direction point counter ((8) of the segment information 172 in FIG. 20) is updated. Specifically, the direction point counters are totaled between the segments being created to be merged. The resultant values are recorded as the direction point counter updated of the segment being created remained after merging.

At the end of the loop, in step S319, the inside state of the segment being created absorbed by merging transits to "L: rejected". This is done in order to erase the segment being created absorbed by merging in step S295 of the tracking process shown in FIG. 29 by executing "unnecessary segments are erased".

Finally, in step S320, the loop is closed to end "segment merging".

Next, "segment update" executed in step S293 of the tracking process shown in FIG. 29 will be described in detail referring to the flow chart shown in FIG. 32. The "segment update" generates the state transition described earlier referring to FIG. 19 in the management unit 171 for the segment being created that manages the segment in accordance with the state transition model.

The state transition is roughly divided into the following two types:
Block consuming transition: transition is generated one time in one block
No block consuming transition: transition is generated any number of times in one block The "block consuming transition" is executed in step S322 of the flow shown in FIG. 32. The process corresponds to the state transition process represented by the wide solid line "a" and the wide dotted line "b" shown in the state transition model shown in FIG. 19.

Figure 32:
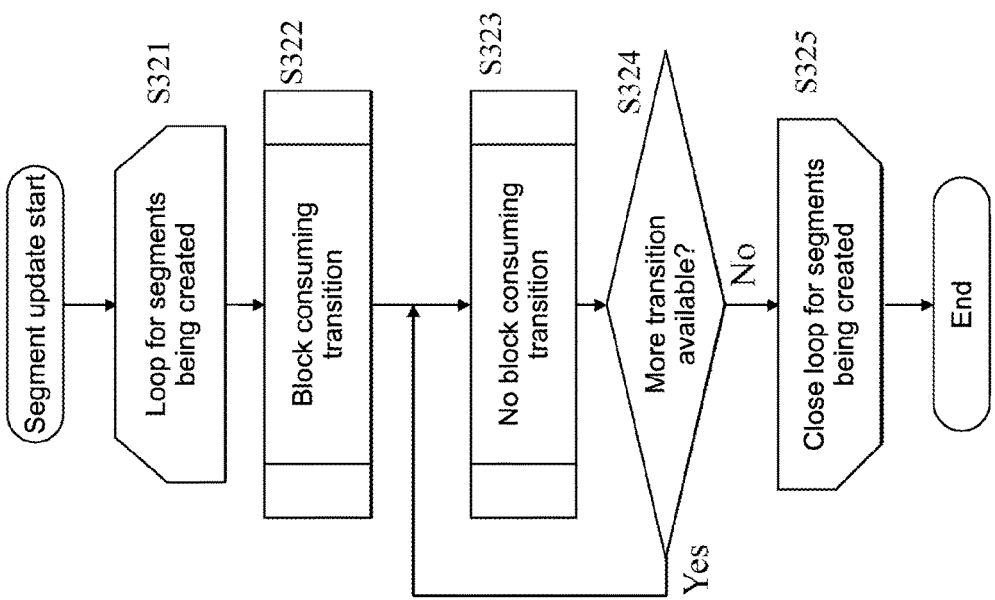
FIG. 32 A flow chart for showing a process sequence of a segment update process.

The "no block consuming transition" is executed in step S323 of the flow shown in FIG. 32. The process corresponds to the state transition process represented by the narrow solid line "c" and the narrow dashed-dot line "d" shown in the state transition model shown in FIG. 19, and to the transition from each state to the state "L".

The process steps of the flow chart shown in FIG. 32 will be described.

Steps S321 to S325 are for a loop of the segments being created, i.e., each of the management units 171=1 to n for the segments being created in the tracking unit 165 shown in FIG. 18. Within the loop, the block consuming transition in step S322 is generated only one time. As a result, the segment may be extended or the number of the self loop may be increased. Using the values, in steps S323 to S324, the "no block consuming transition" is repeated as much as possible.

In step S324, if it is determined that no more transition is available, the loop of the segment being created is finally closed in step S325.

4-3. Block Consuming Transition

Next, a detailed sequence of the "block consuming transition" in step S322 will be described referring to the flow chart shown in FIG. 33.

In step S331, it branches depending on the "(2) inside state" shown in FIG. 20 contained in the segment information 172 of the management unit 171 for the segment being created shown in FIG. 18.

The branching in step S331 executes the following process:
If the current state is in the state "A", "B", "C", "D", "G", "Ti", or "J", it proceeds to step S332. If the current state is in other state "E", "F", "I", "K" or "L", it does not proceed to step S332, and it means that the "block consuming transition" is ended.

If the current state is in the state "A", "B", "C", "D", "G", "H", or "J", it proceeds to step S332, and it means that the "block consuming transition" is executed in each state.

In other words,

If the current inside state is determined as the state "A" in step S331, it proceeds to step S332 and the "block consuming transition A" corresponding to the state "A" is executed.

If the current inside state is determined as the state "B" in step S331, it proceeds to step S332 and the "block consuming transition B" corresponding to the state "B" is executed.

Similar to other states "C", "D", "G", "H" and "J", it proceeds to step S332 and it means that the "block consuming transition" corresponding to each state is executed.

Note that when the inside state is "E", "F", "I", "K" or "L" in step S331, as can be understood from the state transition model, the "block consuming transition" represented by the lines "a" and "b" is not defined. Therefore, it does not proceed to step S332 and the process is ended.

Figure 33:
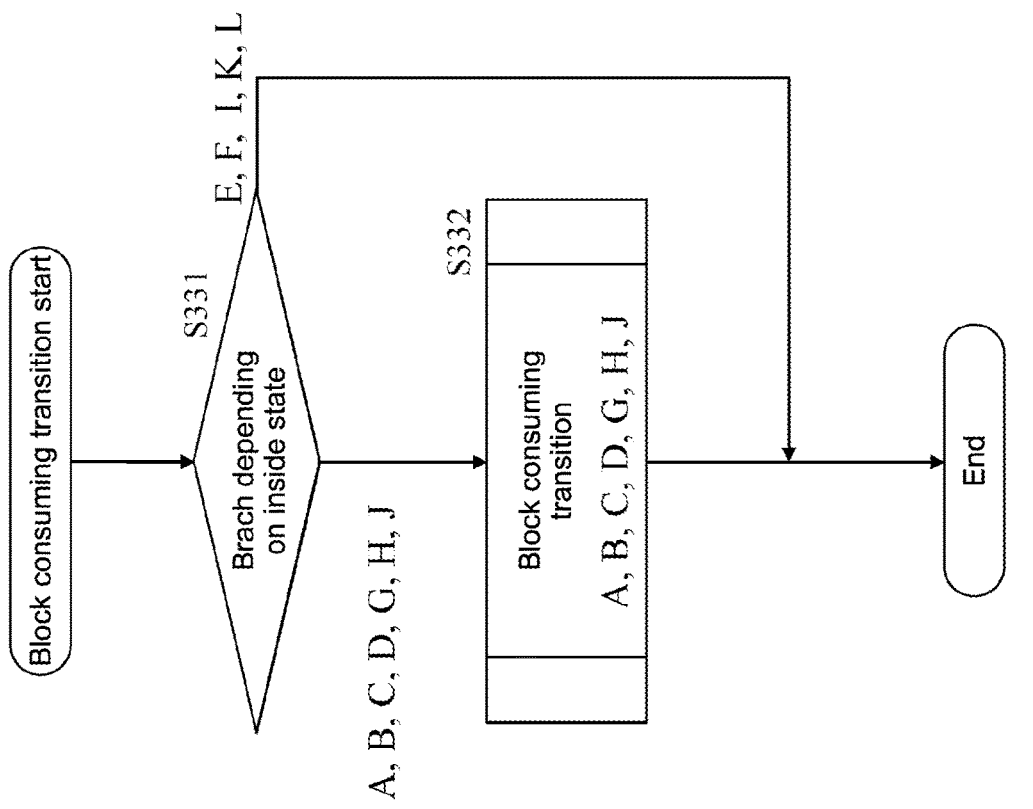
FIG. 33 A flow chart for showing a process sequence of a block consuming transition process.
Figure 34:
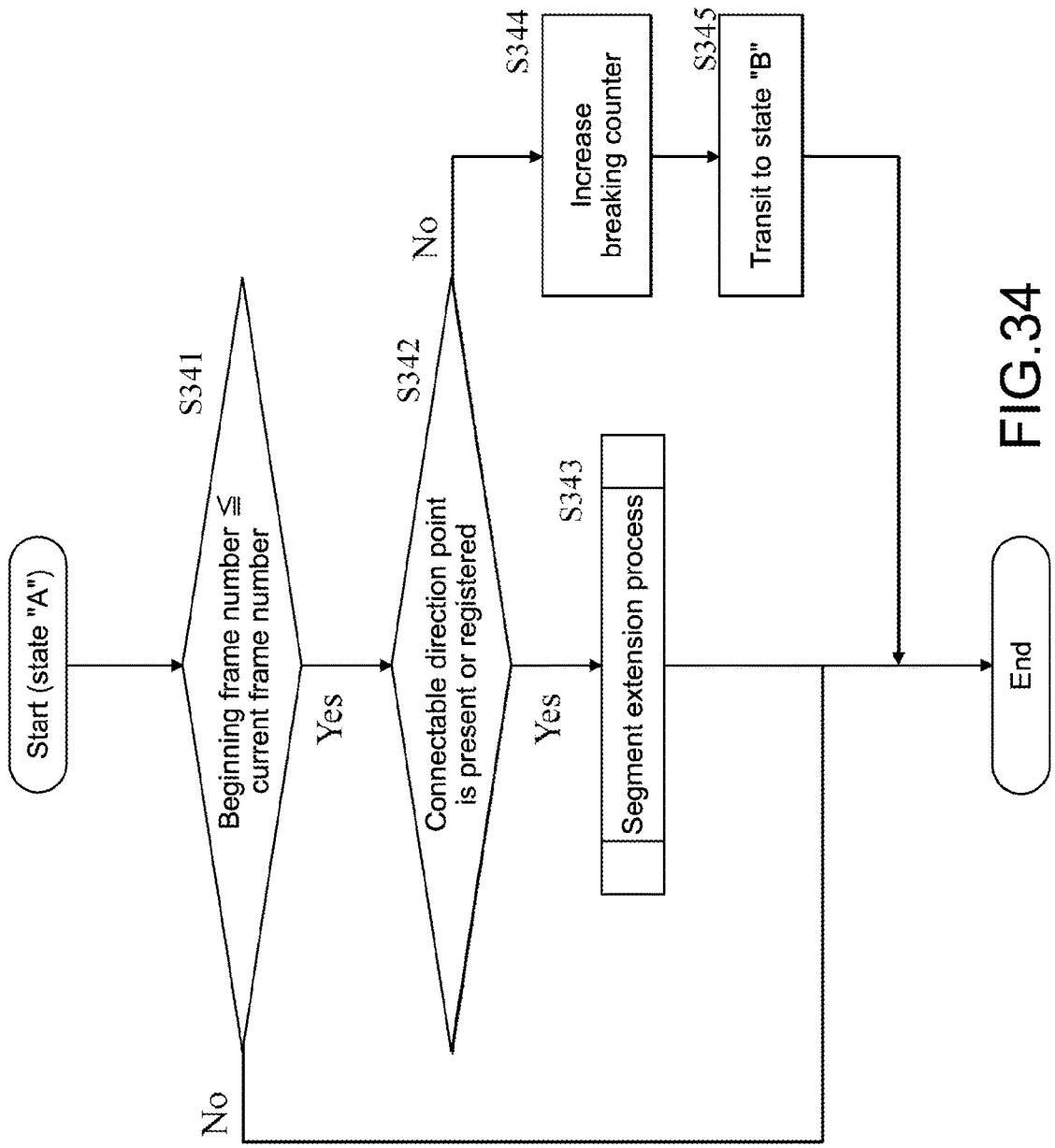
FIG. 34 A flow chart for showing a process sequence of block consuming transition A.
Figure 35:
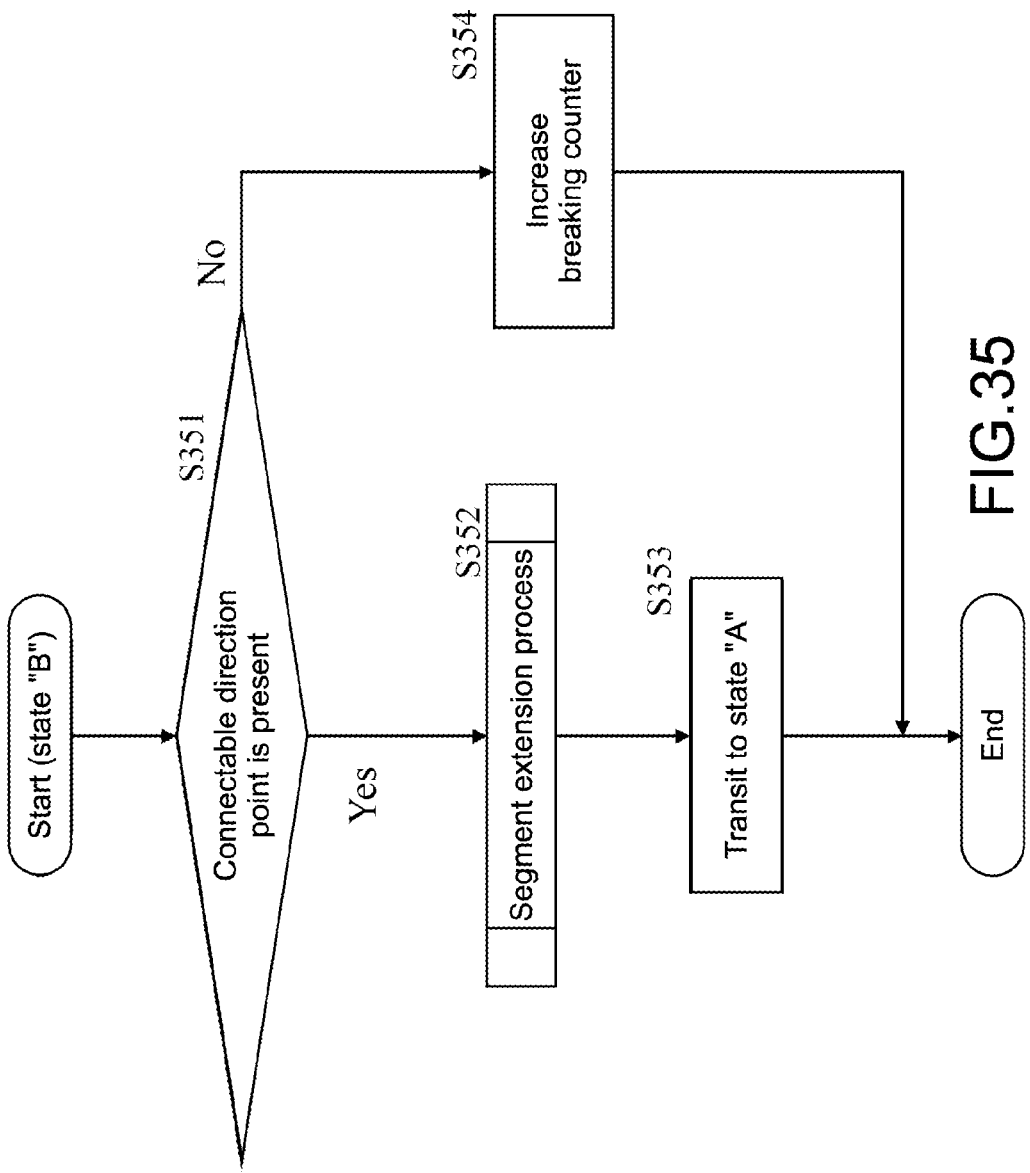
FIG. 35 A flow chart for showing a process sequence of block consuming transition B.
Figure 36:
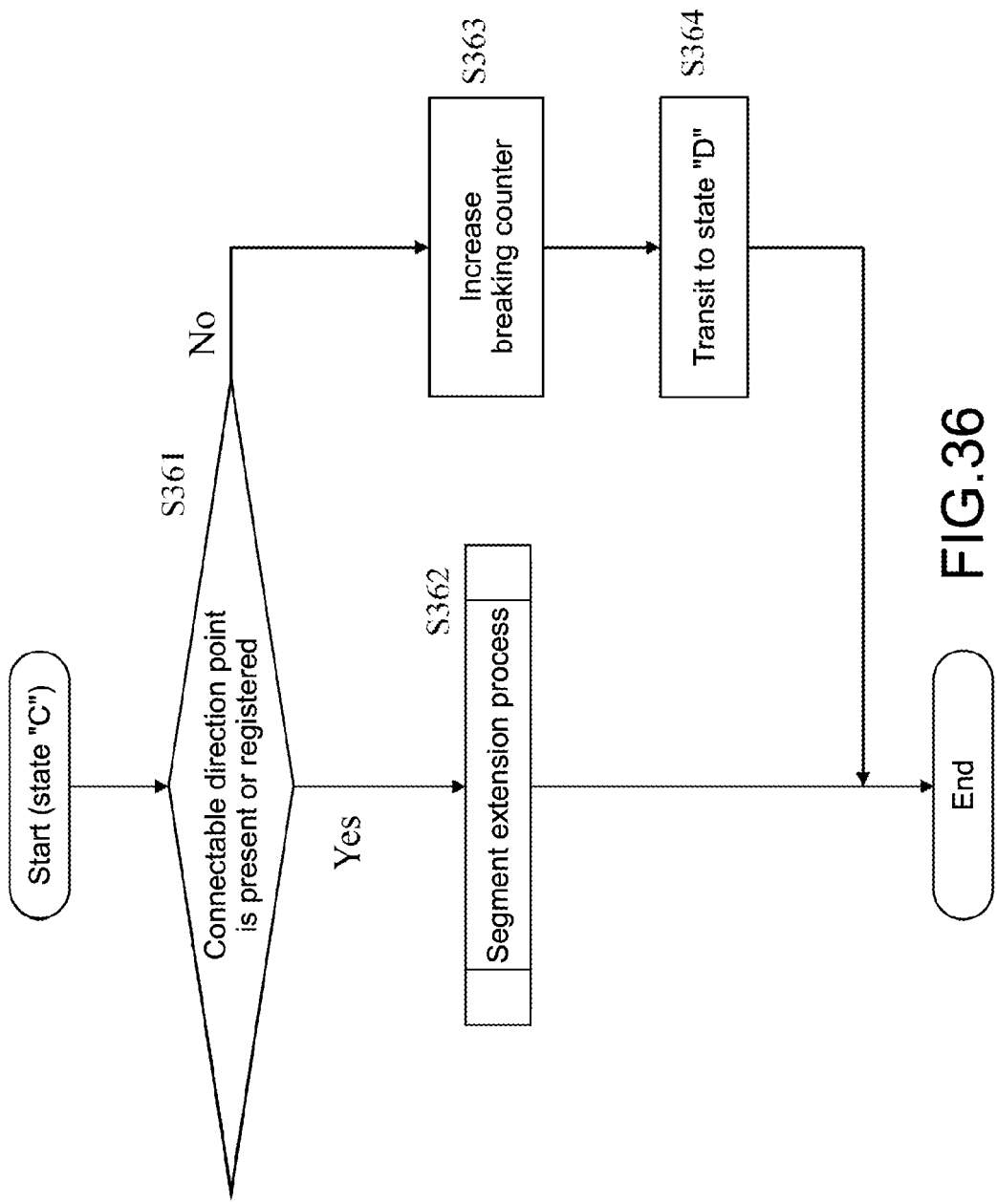
FIG. 36 A flow chart for showing a process sequence of block consuming transition C.
Figure 37:
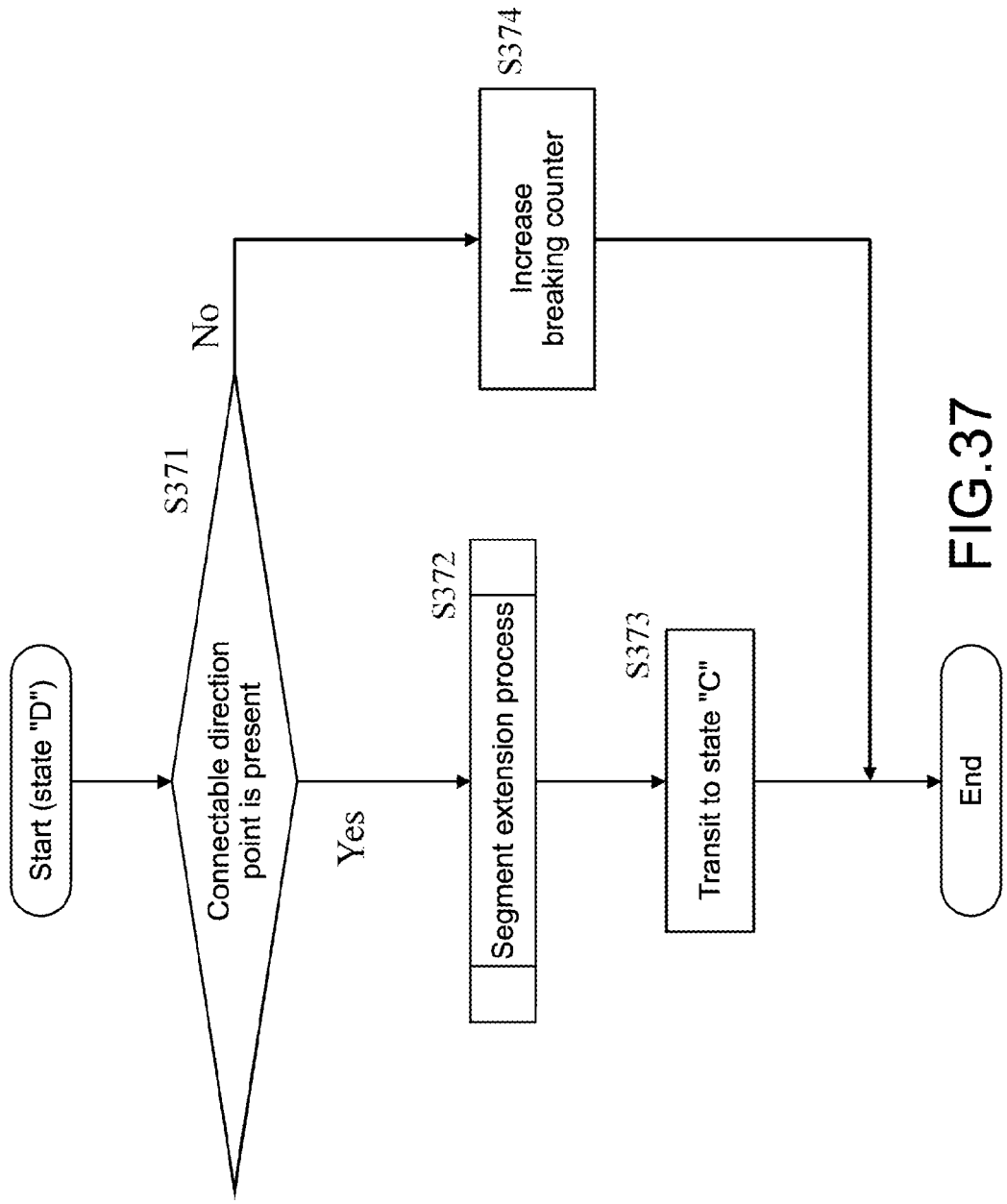
FIG. 37 A flow chart for showing a process sequence of block consuming transition D.
Figure 38:
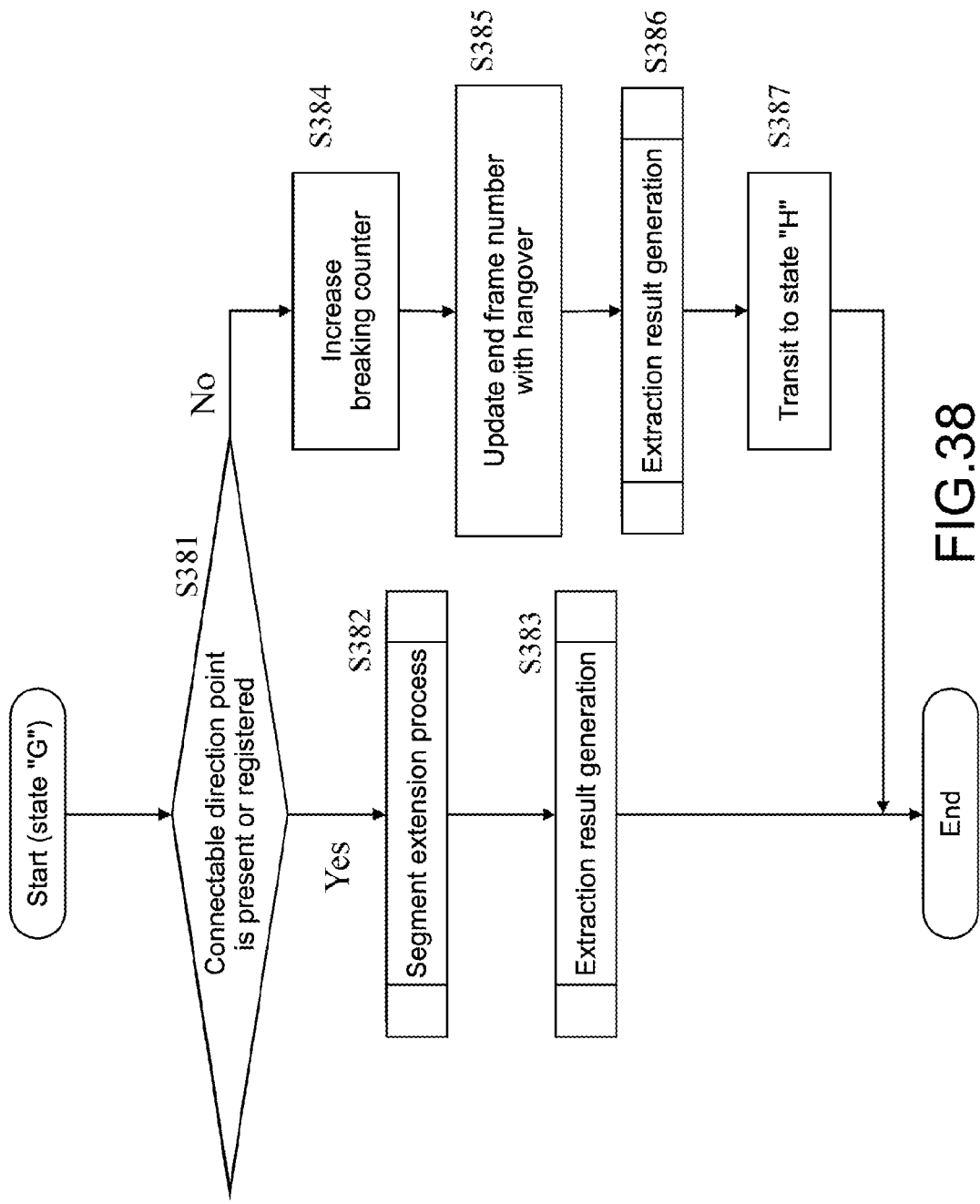
FIG. 38 A flow chart for showing a process sequence of block consuming transition G.
Figure 39:
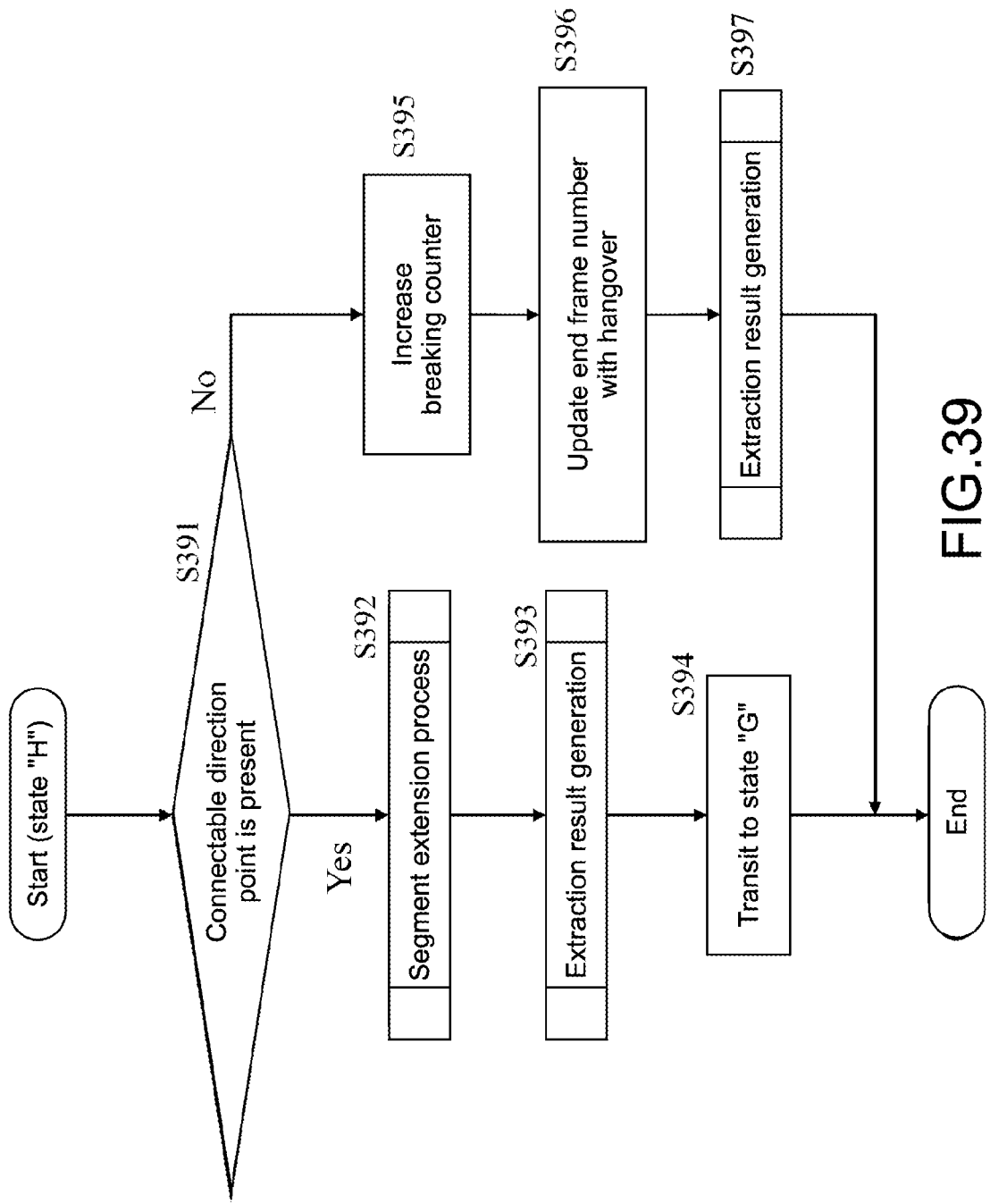
FIG. 39 A flow chart for showing a process sequence of block consuming transition H.
Figure 40:
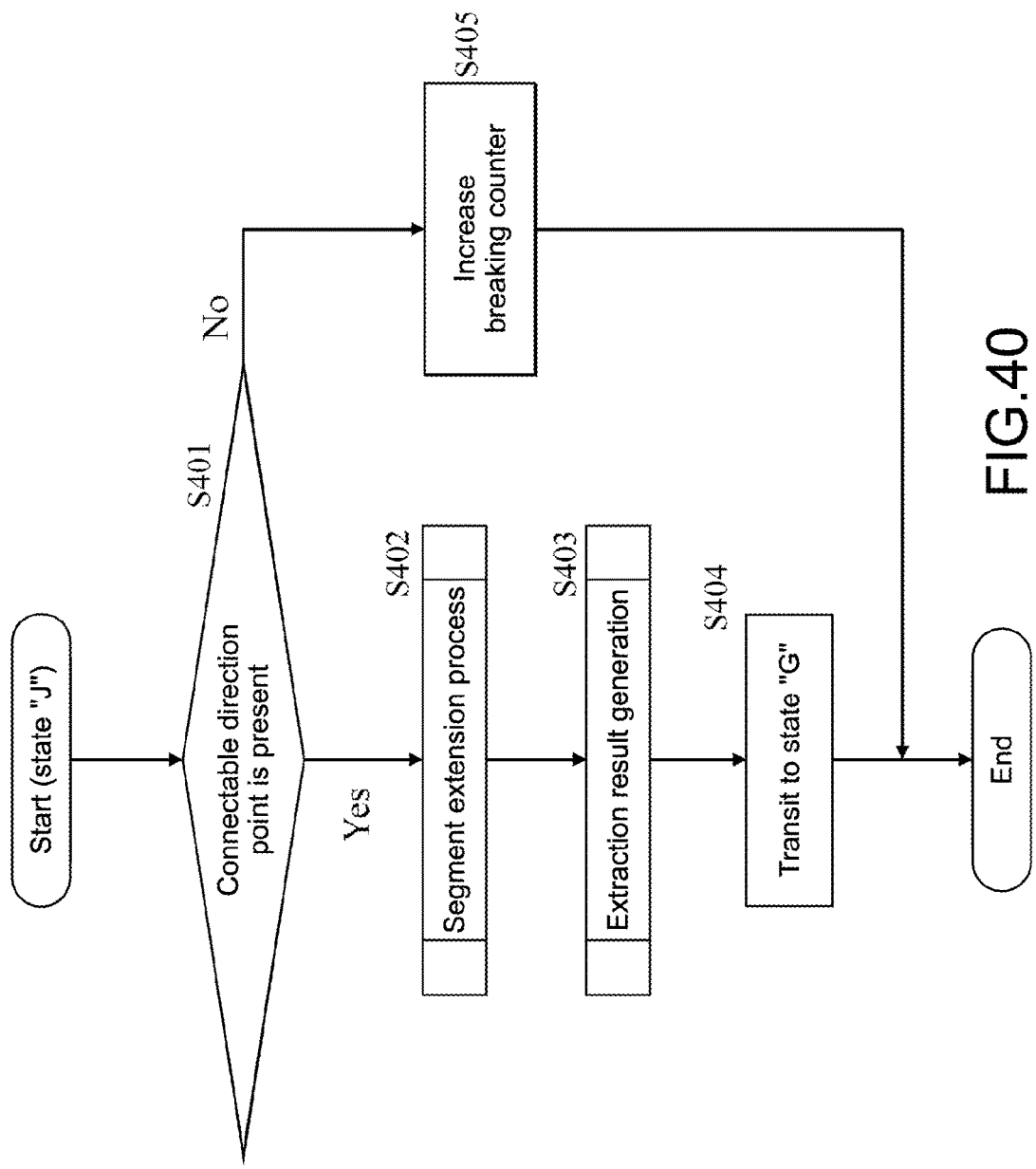
FIG. 40 A flow chart for showing a process sequence of block consuming transition J.

Next, in step S331 of the flow shown in FIG. 33, each transition determined as any of the inside state "A", "B", "C", "D", "G", "H" and "J" and executed in step S332 is sequentially described in accordance with each flow in FIG. 34 to FIG. 40:

(1) Block consuming transition A: FIG. 34,
(2) Block consuming transition B: FIG. 35,
(3) Block consuming transition C: FIG. 36,
(4) Block consuming transition D: FIG. 37,
(5) Block consuming transition G: FIG. 38,
(6) Block consuming transition H: FIG. 39,
(7) Block consuming transition J: FIG. 40.

Firstly, the sequence of the "block consuming transition A" will be described referring to the flow chart shown in FIG. 34.

The inside state "A" shows the [segment created] as described referring to FIG. 19.

Firstly, in step S341, the "(3) beginning frame number" registered in the segment information 172 in FIG. 20 is compared with the current frame number 175 that is the registration data of the tracking unit 165 in FIG. 18 to determine whether or not the following formula is held:

beginning frame number current frame number.

The determination process is for postponing the beginning of the segment, if the future time stamp is designated in the beginning registration process. Only when the current frame number exceeds the beginning frame number, it proceeds to step S342. If not, all processes are skipped and ended.

In step S342, it determines whether or not that the connectable direction point is present, or whether or not the segment has the "registered" attribute. Specifically, it is determined that the "(12) connectable direction point list" shown in FIG. 20 of the segment information 172 of the segment being created 171 of the tracking unit 165 shown in FIG. 18 is empty, or it is determined whether or not the "(7) registered" flag is true (the same is applied to the subsequent state transition).

In step S342, it is determined that either of the conditions is satisfied, it branches to the segment extension process in step S343. It corresponds to execute the self loop in the state "A" in the state transition model shown in FIG. 19.

In the segment extension process in step S343, the direction point is connected to the segment being created. The details are described later.

On the other hand, when it is determined that the "(12) connectable direction point list" is empty and the "(7) registered" flag is false in step S342, it branches to step S344. This corresponds to transit from the state "A" to the state "B" in FIG. 19.

In step S344, the value of the "(10) breaking counter" of the segment information 172 shown in FIG. 20 is increased. The value increased is different depending on what represented by the breaking counter. If the breaking counter represents the number of blocks, the value is "1". If the breaking counter represents the number of frames, the value is B (where B is the number of frames per one block).

Furthermore, in step S345, the "(1) inside status of the segment information 172 shown in FIG. 20 is changed to "B".

Next, the sequence of the "block consuming transition B" will be described referring to the flow chart shown in FIG. 35.

The inside state "B" shows the [breaking (before beginning determined)] as described referring to FIG. 19.

Firstly, in step S351, it determines whether or not that the connectable direction point is present. If present, it branches to the segment extension process in step S352. Thereafter, in step S353, it transits to the state "A". This transition corresponds to the transition from the state "B" to the state "A" in FIG. 19. The segment extension process in step S352 is described later.

On the other hand, in step S351, when it is determined that no connectable direction point is present, it branches to step S354. This corresponds to the self loop of the state "B" in the state transition model shown in FIG. 19. The process in step S354 is the same as the process in step S344 in FIG. 34.

Next, the sequence of the "block consuming transition C" will be described referring to the flow chart shown in FIG. 36.

The inside state "C" shows the [beginning determined] as described referring to FIG. 19. Although the process shown in FIG. 36 is similar to the "block consuming transition A" shown in FIG. 34, the branching corresponding to step S341 is unnecessary and is not done. In addition, the determination process corresponding to step S342 is the process in step S361 in FIG. 36.

In step S361, it determines whether or not that that the "(12) connectable direction point list" shown in the segment information 172 of the segment being created 171 of the tracking unit 165 shown in FIG. 18 is empty, or it is determined whether or not the "(7) registered" flag is true.

If either of the conditions is satisfied, it proceeds to step S362. This process corresponds to the self loop of the state "C" in FIG. 19.

On the other hand, when it is determined that the "(12) connectable direction point list" is empty and the "(7) registered" flag is false in step S361, it branches to step S363. This corresponds to transit from the state "C" to the state "D" in FIG. 19.

In step S363, the value of the "(10) breaking counter" of the segment information 172 shown in FIG. 20 is increased. The value increased is different depending on what represented by the breaking counter. If the breaking counter represents the number of blocks, the value is "1". If the breaking counter represents the number of frames, the value is B (where B is the number of frames per one block).

Furthermore, in step S364, the "(1) inside status of the segment information 172 shown in FIG. 20 is changed to "D".

Next, the sequence of the "block consuming transition D" will be described referring to the flow chart shown in FIG. 37.

The inside state "D" shows the [breaking (before extraction filter estimation)] as described referring to FIG. 19. The process shown in FIG. 37 is similar to the "block consuming transition B" shown in FIG. 37.

Firstly, in step S371, it determines whether or not that the connectable direction point is present. If present, it branches to the segment extension process in step S372. Thereafter, in step S373, it transits to the state "C". This transition corresponds to the transition from the state "D" to the state "C" in FIG. 19. The segment extension process in step S372 is described later.

On the other hand, in step S371, when it is determined that no connectable direction point is present, it branches to step S374 to increase a count value of the breaking counter. This corresponds to the self loop of the state "D" in the state transition model shown in FIG. 19. The process in step S374 is the same as the process in step S344 in FIG. 34.

Next, the sequence of the "block consuming transition G" will be described referring to the flow chart shown in FIG. 38.

The inside state "G" shows the [extraction filter estimated] as described referring to FIG. 19.

In step S381, it determines whether or not that the connectable direction point is present, or whether or not the segment has the "registered" attribute. If either of the conditions is satisfied, it proceeds to the segment extension process in step S382. This process corresponds to the self loop of the state "G" in FIG. 19.

After the segment extension process in step S382, the extraction result is generated in step S383. The details are described later.

On the other hand, in step S381, if it is determined that no connectable direction point is present and the segment has no attribute of "registered", it branches to step S384 to increase a count value of the breaking counter. This corresponds to the transition from the state "G" to the state "H".

Thereafter, in step S385, the current frame number 176 shown in FIG. 18 is assigned to the "(6) end frame number with hangover" of the segment information 172 shown in FIG. 20.

Furthermore, in step S386, the extraction result is generated. The details about the process are described later. Finally, in step S387, the "(1) inside state" of the segment information 172 shown in FIG. 20 is changed to the state "Ti".

Next, the sequence of the "block consuming transition H" will be described referring to the flow chart shown in FIG. 39.

The inside state "H" shows the [breaking (before end hangover)] as described referring to FIG. 19.

This process is breaking, but generates the extraction result different from the state "B" showing [breaking (before beginning determined)] and the state "D" showing [breaking (before extraction filter estimation)].

In step S391, it determines whether or not that the connectable direction point is present. If the conditions is satisfied, it branches to the segment extension process in step S392. This process corresponds to the transition from the state "H" to the state "G" in FIG. 19.

After the segment extension process in step S392, the extraction result is generated in step S393. The details are described later.

Thereafter, in step S394, the "(1) inside state" of the segment information 172 shown in FIG. 20 transits to the state "G".

On the other hand, in step S391, if it is determined no connectable direction point is present, it branches to step S395 to increase the breaking counter. This corresponds to the self loop in the state "H" in FIG. 19.

Thereafter, in step S396, the current frame number 176 shown in FIG. 18 is assigned to the "(6) end frame number with hangover" of the segment information 172 shown in FIG. 20.

Furthermore, in step S397, the extraction result is generated. The details about the process are described later.

Here, in step S381 of the "block consuming transition G" in FIG. 38 and in step S391 of the block consuming transition H" in FIG. 39, the processes after branching (step S384 to S387 in FIG. 38 and step S395 to S397 in FIG. 39) are supplementary described when the conditions for each step are satisfied.

In these processes, the "(6) end frame number with hangover" of the segment information 172 shown in FIG. 20 is updated, but the "(5) end frame number" is not updated. In other words, when the state "H" is passed, the end frame number is constant, but the value of the end frame number with hangover increases. When the state "H" transits to the state "J", the value of the "(6) end frame number with hangover" that proceeds by the predetermined value to the "(5) end frame number" is stored.

Next, the sequence of the "block consuming transition J" will be described referring to the flow chart shown in FIG. 40.

The inside state "J" is the inside state showing [breaking (after end hangover)] as described referring to FIG. 19.

This process is similar to the "block consuming H" described referring to FIG. 39, but is different in that no extraction result is generated in the self loop as the end hangover (time t7 in FIG. 10) is passed.

In step S401, it is determined whether or not the connectable direction point is present. If it is present, it branches to the segment extension process in step S402. This corresponds to the transition process from the state "J" to the state "G" in FIG. 19.

After the segment extension process in step SS402, the extraction result is generated in step S403. The details about the process are described later. The extraction result generated here is not limited to one block, and involves the self loop in the state "J". For example, when the state "J" transits to the state "G" after the self loop is done twice, the extraction result for three blocks (i.e., 3B frames) in step S403. Thereafter, the "(1) inside status" of the segment information 172 shown in FIG. 20 transits to the state "G" in step S404.

On the other hand, if it is determined no connectable direction point is present in step S401, it proceeds to step S405 to increase the breaking counter. This corresponds to the self loop in the state "J" in FIG. 19.

Figure 41:
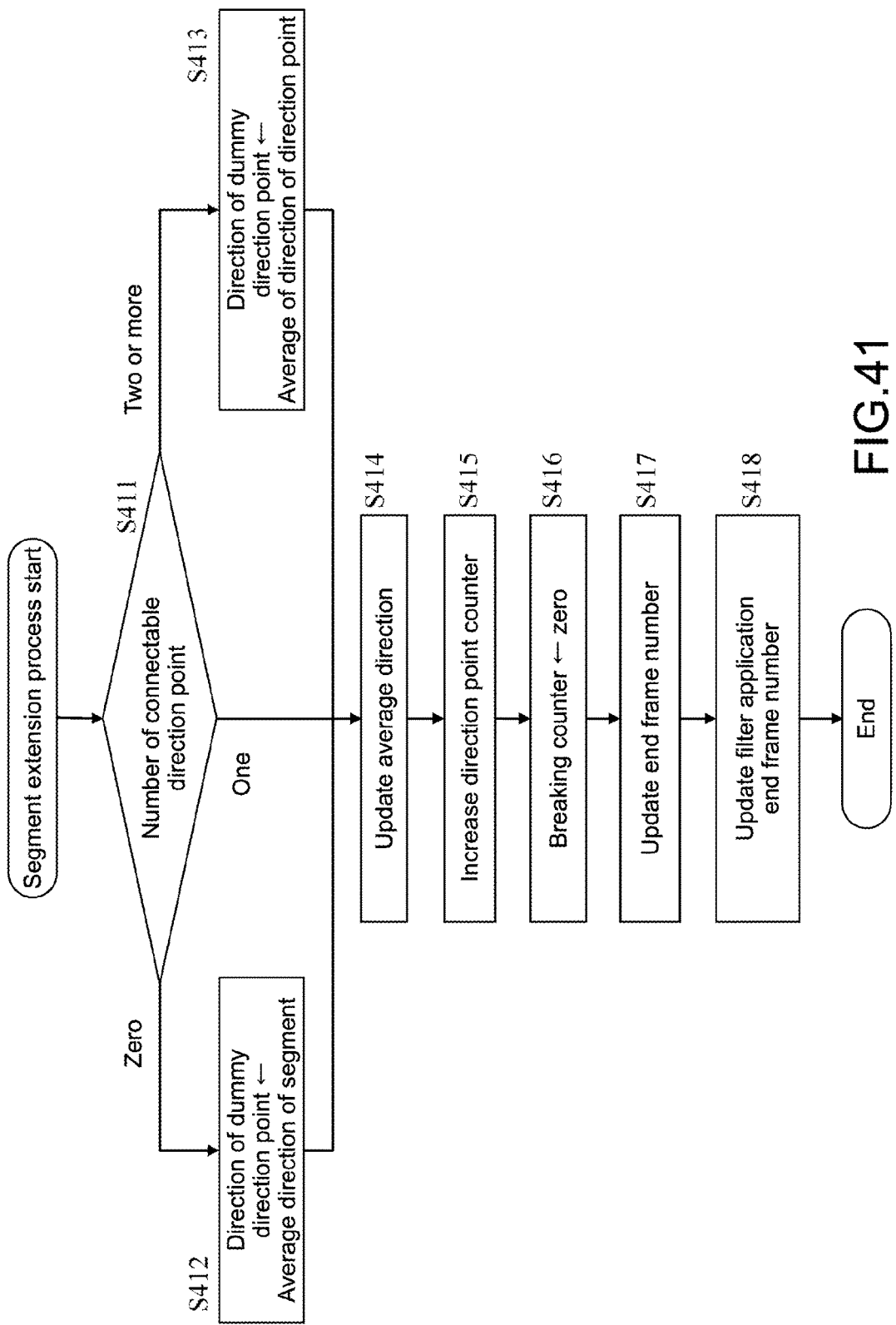
FIG. 41 A flow chart for showing a process sequence of a segment extension process.

Next, a detailed sequence of the "segment extension process" executed in the process in FIG. 34 to FIG. 40 will be described referring to the flow chart shown in FIG. 41.

The "segment extension process" is for connecting a new direction point to the segment being created. For this purpose, the connectable direction points should be put together in one.

In step S411, branching is made based on the number of the connectable direction points. Specifically, branching is made based on the number of components registered in the "(12) connectable direction point list" of the segment information 172 shown in FIG. 20. When the number of components is one, it directly proceeds to step S414. If the number of components is 0 or 2 or more, it branches to step S412 or step S413.

Branching to step S412 is limited to the case that the segment being created has the "registered" attribute. In this case, a dummy direction point having the same direction as an "(9) average direction" registered in the segment information 172 in FIG. 20. In other words, the segment having the "registered" attribute extends itself even if no connectable direction point is present, thereby preventing breaking the segment before the end registration process.

When it branches to step S413, the directions of the connectable direction points are averaged, and the dummy direction point is created using the averaged direction.

After the connectable direction points are put together in one by the processes in step S411 to S413, the "(9) average direction" registered in the segment information 172 in FIG. 20 is updated using the direction points in step S414. If the value till now in the average direction is represented by m, the direction in a new one direction point is represented by d, and the value of the direction point counter is represented by c, a new average direction m' can be shown by the following equations. The equations are different when the direction point counter represents the number of blocks and when the direction point counter represents the number of frames as follows: (If the direction point counter represents the number of blocks)

$$m'=(cm+d)/(c+1)$$

(If the direction point counter represents the number of frames)

$$m'=(cm+Bd)/(c+B)$$

where B is the number of frames per one block.

Next, in step S415, a "(8) direction point counter" registered in the segment information 172 in FIG. 20 is increased. An increased amount is 1 when the direction point counter represents the number of blocks, an increased amount is B, if the direction point counter represents the number of frames.

Next step S416 is to reset a "(10) breaking counter" registered in the segment information 172 in FIG. 20. In other words, so long as the transition including the segment extension process is performed, the breaking counter is held to [0].

In next step S417, the "(5) end frame number" and "(6) end frame number with hangover" registered in the segment information 172 in FIG. 20 are updated. Specifically, the current frame number 175 held by the tracking unit 165 in FIG. 18 is assigned to both.

Finally, in step S418, a "(4) filter application end frame number" held by the sound source extraction unit 173 shown in FIG. 21 is updated. Specifically, the current frame number 175 held by the tracking unit 165 in FIG. 18 is also assigned to the member.

Figure 42:
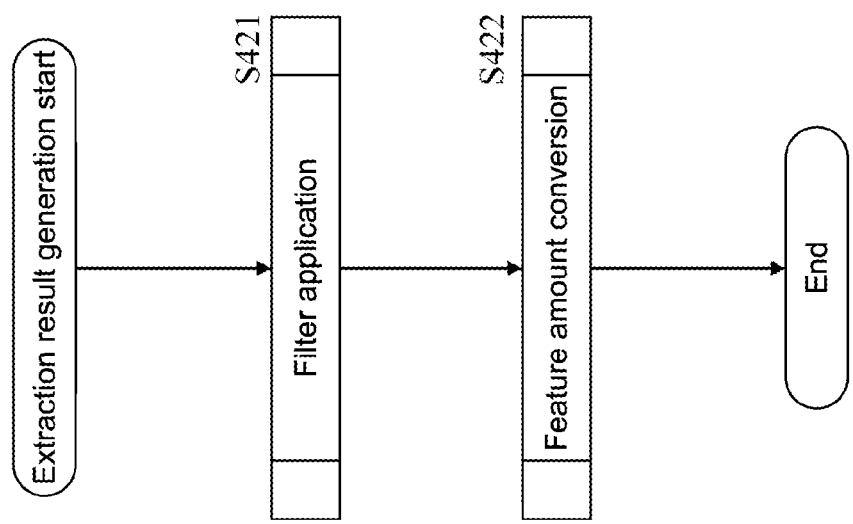
FIG. 42 A flow chart for showing a process sequence of an extraction result generation process.

Next, a detailed sequence of the "extraction result generation" process executed in the process in FIG. 38 to FIG. 40 will be described referring to the flow chart shown in FIG. 42.

Basically, in step S421, the extraction filter is applied to the observation signal from the "(3) filter application beginning frame number" to the "(4) filter application end frame number" registered as management information of the sound source extraction unit 173 shown in FIG. 21. The details are described later.

In step S422, the filter application result in step S421 is further converted into the feature amount. The details are described later.

Next, a sequence of the filter application process in step S421 will be described referring to the flow chart shown in FIG. 43. The range of the observation signal to which the filter is applied is basically from the "(3) filter application beginning frame number" to the "(4) filter application end frame number" registered as management information of the sound source extraction unit 173 shown in FIG. 21, as described above. Only when the filter is applied first time within the segment being created, in order to create the delta feature amount, the extraction results should be generated as many as several frames. Accordingly, the process is changed depending on a "(3) first time flag" managed by the feature amount conversion unit 174 shown in FIG. 22.

In step S341, referring to the value of the first time flag, the process is branched.

If the "(3) first time flag" managed by the feature amount conversion unit 174 shown in FIG. 22 is "true", i.e., the filter is applied for the first time, it branches to step S432. In this case, as the value for "begin_frame" of the application beginning frame number at this time, a value that a predetermined offset is subtracted from the "(3) filter application beginning frame number" registered as management information for the sound source extraction unit 173 shown in FIG. 21 is used. Note that if the offset is subtracted immediately after the system start and the value of the "begin_frame" becomes a negative value, "0" is assigned. The value of the offset is different depending on what is used for the delta feature amount. The value including an extra (for example, 10) may be used and the unnecessary frame may be removed in the feature amount conversion in step S422 that is a later step in the flow in FIG. 42.

In step S431, if the "(3) first time flag" managed by the feature amount conversion unit 174 shown in FIG. 22 is "false", i.e., the filter is applied for not the first time, it branches to step S433. In this case, the "(3) filter application beginning frame number" registered as management information of the sound source extraction unit 173 shown in FIG. 21 is assigned to "begin_frame".

In step S433, the "(4) filter application end frame number" registered as management information of the sound source extraction unit 173 shown in FIG. 21 is assigned to the application end frame number at this time "end frame".

In this way, the filter application range at this time is determined. Then, the filter is applied to the observation signal within the range.

In step S435, the extraction filter is applied to the observation signal. Specifically, the process in accordance with the numerical formula [1.2] is performed on the frame t and all frequency Bins ω satisfying "begin_frame≤t≤end_frame".

Note that in the numerical formula [1.2], W(ω) is the extraction filter. The estimation method of the filter is described later. X(ω,t) and Y(ω,t) are the observation signal and the extraction filter application result, respectively.

The extraction filter application result (ω,t) thus determined is such that the target sound in the segment is emphasized. As other components, an erasure residue of the disturbing sound is also included. For example, in the environment including sound reverberation, the sound reverberation of the disturbing sound is difficult to be removed. In the process according to the present disclosure, the extraction filter is estimated on the way of the speech segment. The disturbing sound begun to be sounded thereafter is not removed even if the extraction filter W(ω) is applied.

In order to further decrease the erasure residue, the processes from step S436 to S437 are performed as necessary. As steps S436 and S437 are independent processes each other, only one may be executed.

The removal of the erasure residue in step S436 involves the two steps: 1) estimation of the erasure residue, and 2) subtraction of the erasure residue.

The "estimation of the erasure residue" is for applying the whole dead corner space filter to the observation signal within begin_frame≤t≤end_frame.

Specifically, the process is performed in accordance with the following numerical formula [2.1]:

[Numerical Formula 2]

$$V(\omega, t) = N(\omega, \theta)X(\omega, t) \quad [2.1]$$

$$|Z(\omega, t)|^2 = \max(|Y(\omega, t)|^2 - |\alpha V(\omega, t)|^2, \beta Y(\omega, t)|^2) \quad [2.2]$$

$$Z(\omega, t) = |Z(\omega, t)| \frac{Y(\omega, t)}{|Y(\omega, t)|} \quad [2.3]$$

$$Z(\omega, t) \leftarrow M(\omega, t)Z(\omega, t) \quad [2.4]$$

In the above-described numerical formula, $N(\omega,t)$: Whole dead corner space filter $V(\omega,t)$: Result of applying whole dead corner space filter The method of estimating the whole dead corner space filter will be described later. The dead corner is formed in the filter in all sound source directions included in the observation signal used for learning. Accordingly, the application result includes a component derived from a sound source not included in the observation signal used for learning but included in the actual observation signal: $X(\omega,t)$, and a component being difficult to be removed such as the sound reverberation.

On the other hand, the subtraction of the erasure residue is to subtract the erasure residue $V(\omega,t)$ from the extraction filter application result $Y(\omega,t)$. If the subtraction is performed using a spectral subtraction method, the process is performed corresponding to the numerical formulae [2.2] and [2.3]. In other words, the subtraction result is represented by $Z(\omega,t)$. The magnitude of $Z(\omega,t)$ is squared as represented by the numerical formula [2.2]. $|Z(\omega,t)|$ determined in this way is multiplied by $Y(\omega,t)/|Y(\omega,t)|$ that is a phase of the extraction filter application result $Y(\omega,t)$, thereby providing $Z(\omega,t)$. Note that in the numerical formula [2.2], both of $\alpha$ and $\beta$ are positive real numbers. As the values, around 1 is used for $\alpha$, and around 0 is used for $\beta$. In numerical formula [2.2], max(a,b) is a function that employs the greater one between the two arguments, and is used for preventing the first argument from being too small (specifically, being a negative value).

The time frequency masking in step S437 is a process to estimate that the signal other than the target sound remains in the extraction filter application result $Y(\omega,t)$ to what extent in the respective frames/frequency Bins. A factor is multiplied depending on the extent. As a result, only the target sound remains. In other words, the factor approaching to 0 is multiplied to the frame/frequency Bin where the signal other than the target sound greatly remains. In contrast, the factor approaching to 1 is multiplied to the frame/frequency Bin where the signal other than the target sound little remains. The factor is called as a mask. Applying the mask is called as masking. The estimation method of the mask will be described later. If the value of the mask is represented by $M(\omega,t)$, the masking correspond to the numerical formula [2.4].

Note that if step S436 is skipped, the numerical formula [2.4] is applied after $Y(\omega,t)$ is assigned to $Z(\omega,t)$.

The description about the filter application process is ended.

Figure 44:
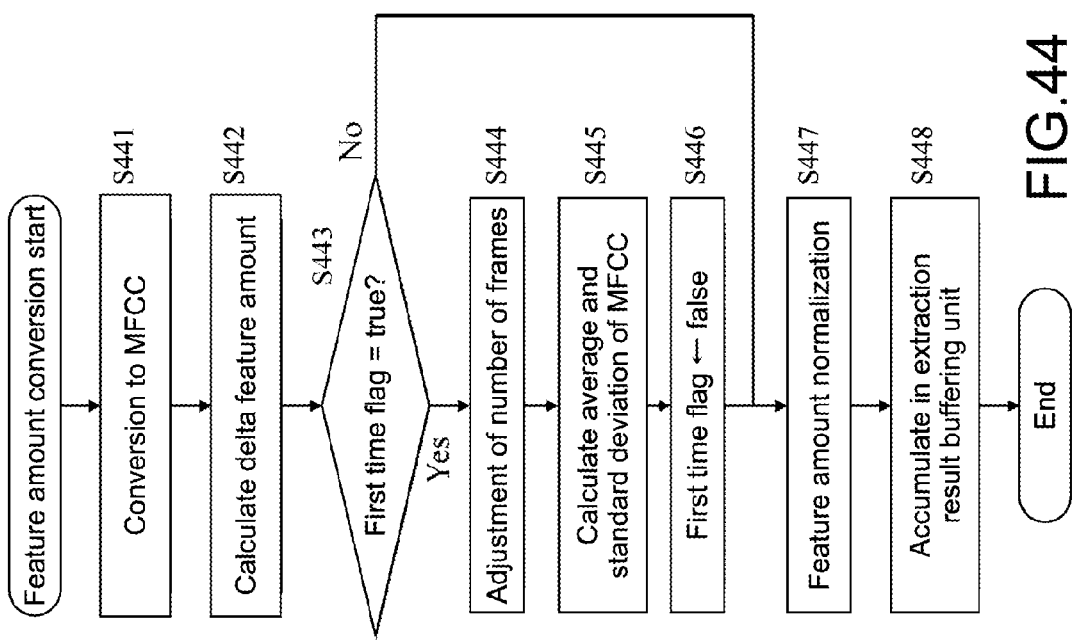
FIG. 44 A flow chart for showing a process sequence of a feature amount conversion process.

A detailed sequence of the feature amount conversion in step S422 showing in the flow chart of the extraction result generation process in FIG. 42 will be described referring to the flow chart shown in FIG. 44.

In step S441, the output from the sound source extraction unit 173 is converted into the feature amount used in the voice recognition. In other words, the spectrum that is the output from the sound source extraction unit 173 is converted into the Mel-Frequency Cepstral Coefficient: MFCC) that is the feature amount that the decoder in the voice recognition unit 156 is applied to the voice recognition. Conversion is done per frame. From the filter application results Z(1,t) to Z(M,t) in the frame t, the MFCCs for one frame, Cep(1,t) to Cep(K,t) are generated. Note that M and K are the number of the frequency Bins and a Cepstral dimension number, respectively.

Next, in step S442, the delta feature amount is calculated using the MFCC between adjacent frames. As to the frame around the beginning of the segment, the delta feature amount is not capable of being calculated, the frame itself is removed.

Steps S444 to S446 are executed only when the feature amount is converted first time in the segment being created. Therefore, in step S443, the value of the first time flag (the value of the "(3) first time flag" that is the management data of the feature amount conversion unit 174 shown in FIG. 22) is determined. Only when the value is [true] that represents that the value is provided for the first time, it proceeds to step S444. If not, it proceeds to step S447.

Figure 43:
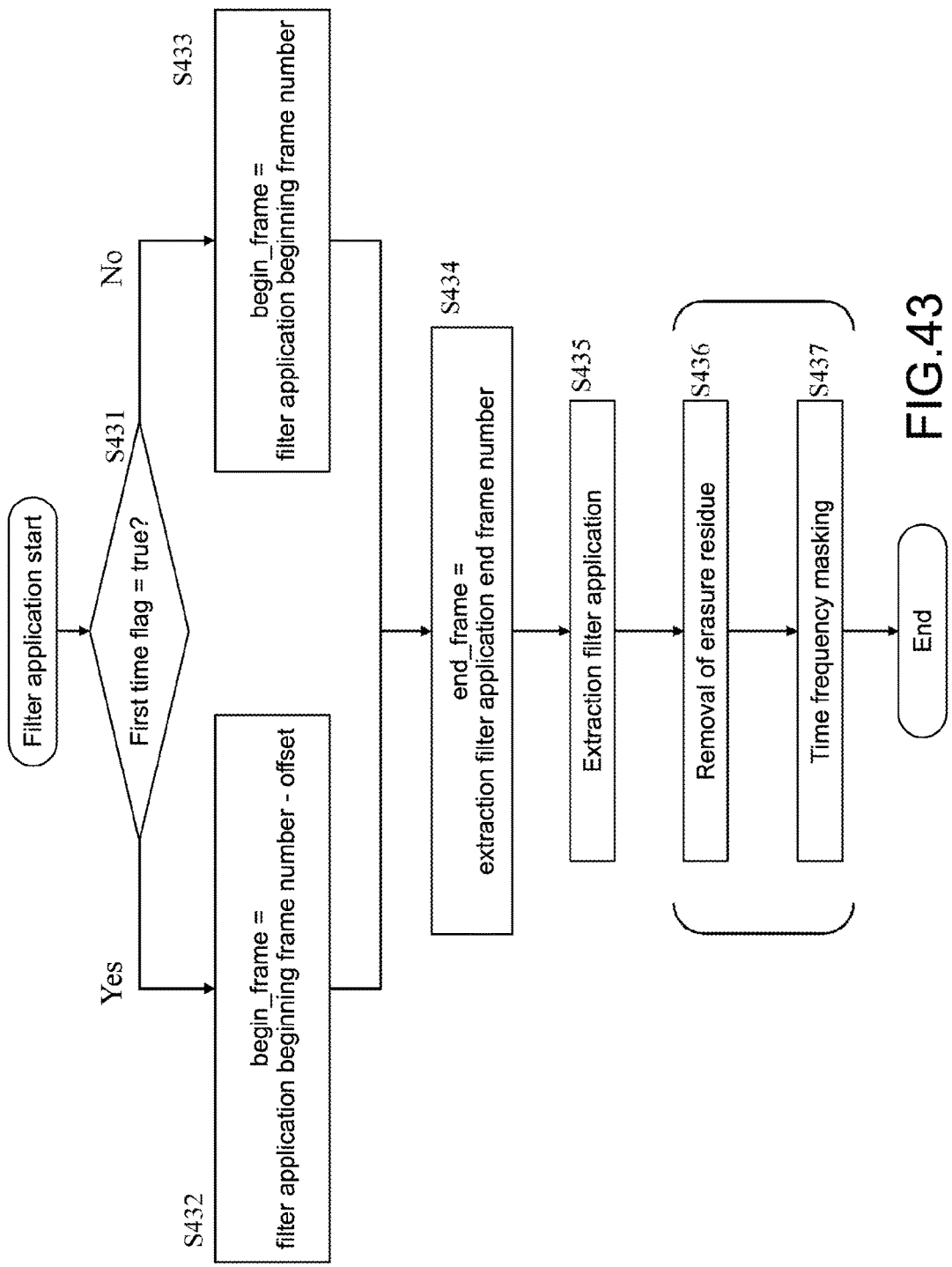
FIG. 43 A flow chart for showing a process sequence of a filter application process.

In step S444, "adjustment of the number of frames" is for removing the frames added by the filter application process executed for the first time as described referring to FIG. 43. For example, at the time of step S431, the number of frames from the filter application beginning frame number (see FIG. 21) to the filter application end frame number (see FIG. 21) is represented by T. For the first time, it branches to step S432. The number of frames increased to T+offset. Thereafter, in step S442, the frames where the delta feature amount is incapable of being calculated are removed. In step S444, the number of frames remain exceeding T, the number of frames is matched to T by removing the beginning frame.

Next, in step S445, the average and the standard deviation of the MFCC are calculated. The calculation results are recorded as the held data "(1) MFCC average value" and the "(2) MFCC standard deviation" of the feature amount conversion unit 174 shown in FIG. 22.

Note that the average and the standard deviation provided as the calculation results are also vectors, the dimension number is also K similar to case of the MFCC. The range of calculating the average and the standard deviation is the range of the observation signal 108 in the embodiment shown in FIG. 10, for example.

At the end of the first time limited process, the [false] value showing that it is not the first time is assigned to the first time flag (see FIG. 22) in step S446.

"Feature amount normalization" in step S447 is a process for subtracting the (1) MFCC average value held as the management data of the feature amount conversion unit 174 shown in FIG. 22 from the MFCC calculated in step S441 (Cepstral Variance Normalization) and dividing with the MFCC standard deviation (FIG. 22(2)) (Cepstral Variance Normalization). Only one of them may be executed, as necessary.

The feature amounts thus generated that are applied to the voice recognition, the Mel-Frequency Cepstral Coefficient (MFCC) and the delta feature amount are expressed as one vector per frame. The data is accumulated on the extraction result buffering unit 166 of the front end unit 153 shown in FIG. 16 in step S448. The configuration of the extraction result buffering unit 166 is as shown in the extraction result buffering unit 135 in FIG. 13, and has different buffers 135*a* to *c* per segment.

In step S448, the segment being created ((2) segment ID) held in the segment information 172 (FIG. 20) managed by the management unit 171 for the segment being created in the tracking unit 165 is compared with the segment IDs in the segment information 134*a* to *c* held by the respective buffers (135*a* to *c* in FIG. 13) of the extraction result buffering unit 166. If there is matched, the feature amount generated this time is added to the end of the buffer, and the segment information at the extraction result buffering unit 166 is updated. If there is not matched, a new buffer is generated in the extraction result buffering unit, and the feature amount and the segment information are stored therein.

All description about the "block consuming transition" is ended.

4-4. No Block Consuming Transition

Next, "no block consuming transition" in step S323 of the segment update process shown in FIG. 32 will be described referring to the flow chart shown in FIG. 45.

In step S451, it branches depending on the "(2) inside state" shown in FIG. 20 contained in the segment information 172 of the management unit 171 for the segment being created shown in FIG. 18.

The branching in step S451 executes the following process:

If the current state is in the state "A", "B", "C", "D", "G", "H", "I" or "J", it proceeds to step S452. If the current state is in other state "E", "F", "K" or "L", it does not proceed to step S452, and it means that the "no block consuming transition" is ended.

If the current state is in the state "A", "B", "C", "D", "G", "H", "I" or "J", it proceeds to step S452, and it means that the "no block consuming transition" is executed in each state.

In other words,

If the current inside state is determined as the state "A" in step S451, it proceeds to step S452 and "no block consuming transition A" corresponding to the state A is executed.

If the current inside state is determined as the state "B" in step S451, it proceeds to step S452 and "no block consuming transition B" corresponding to the state B is executed.

Similar to other states "C", "D", "G", "Ti", "I" and "J", it proceeds to step S452 and it means that the "no block consuming transition" corresponding to each state is executed.

Note that when the inside state is "E", "F", "I" or "K" in step S451, as can be understood from the state transition model, the "no block consuming transition" represented by the lines "c" and "d" is not defined. Therefore, it does not proceed to step S452 and the process is ended.

Figure 45:
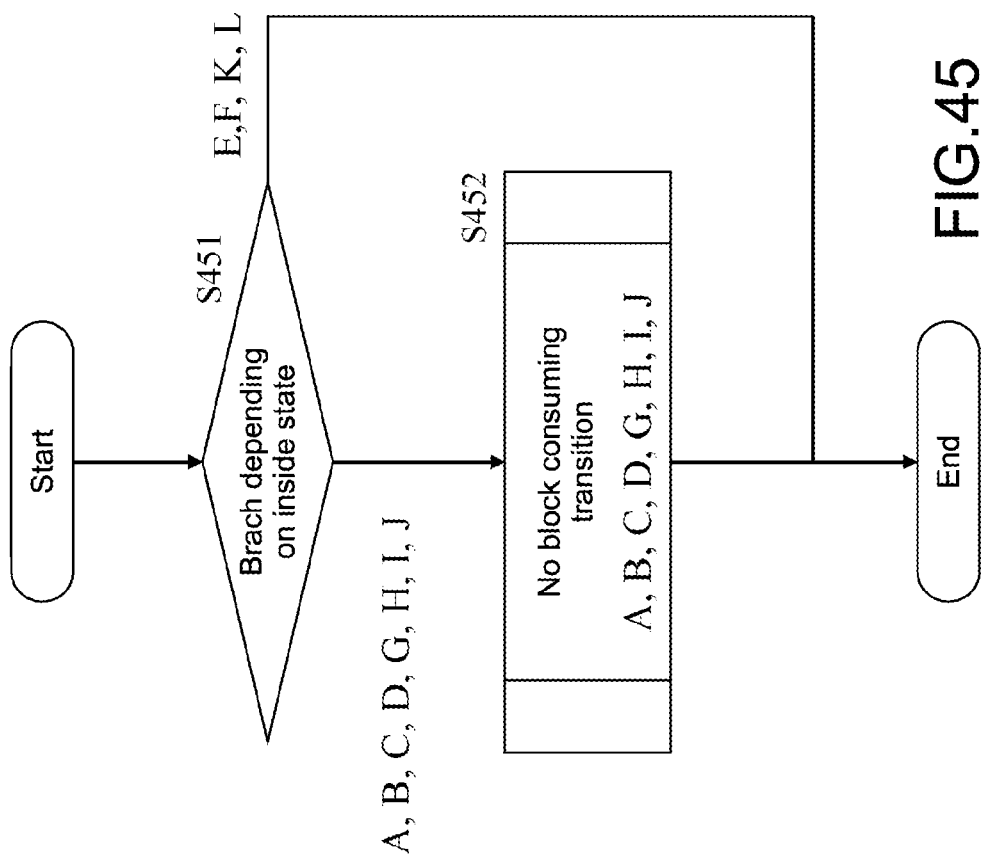
FIG. 45 A flow chart for showing a process sequence of a no block consuming transition process.
Figure 46:
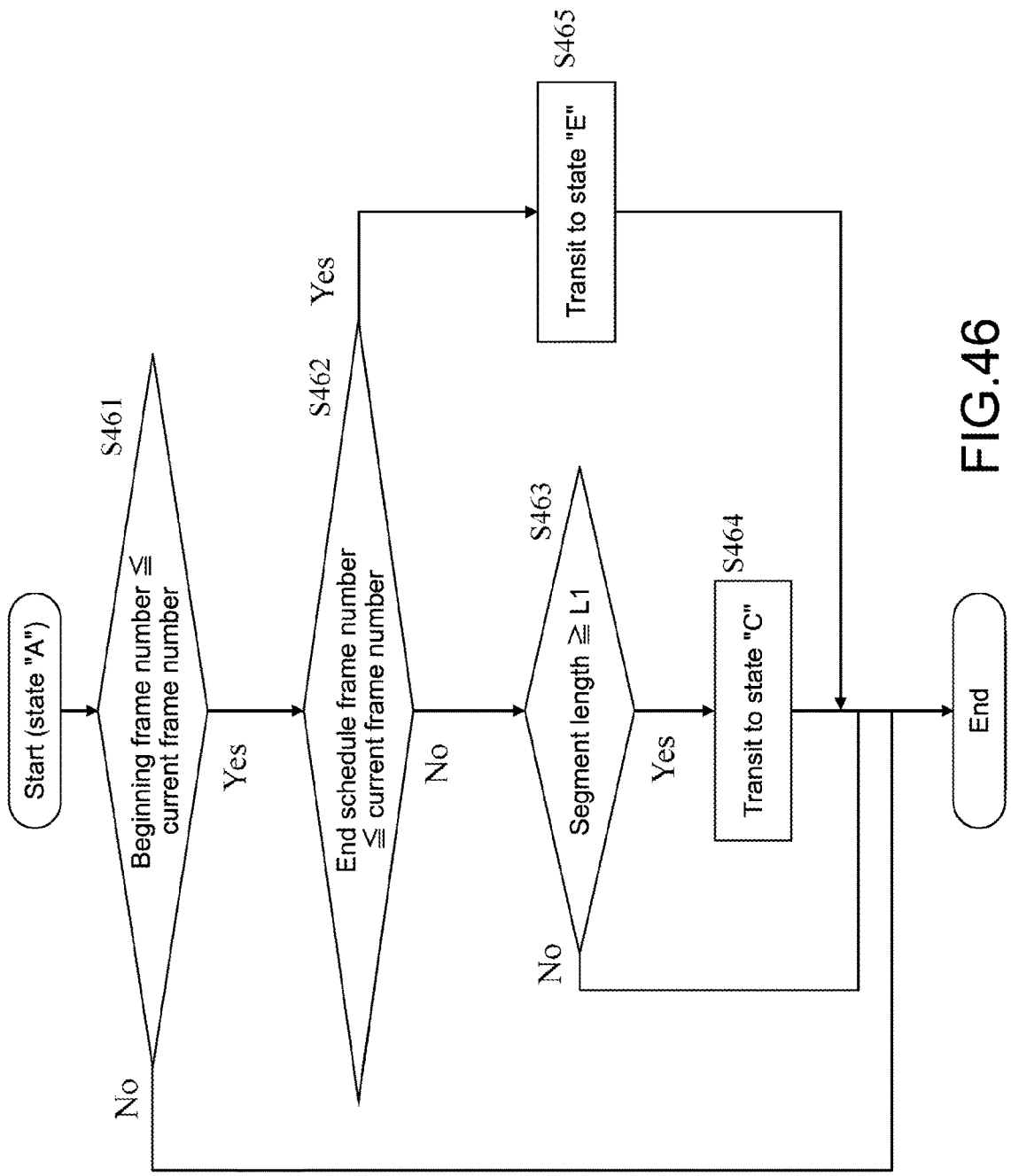
FIG. 46 A flow chart for showing a process sequence of no block consuming transition A.
Figure 47:
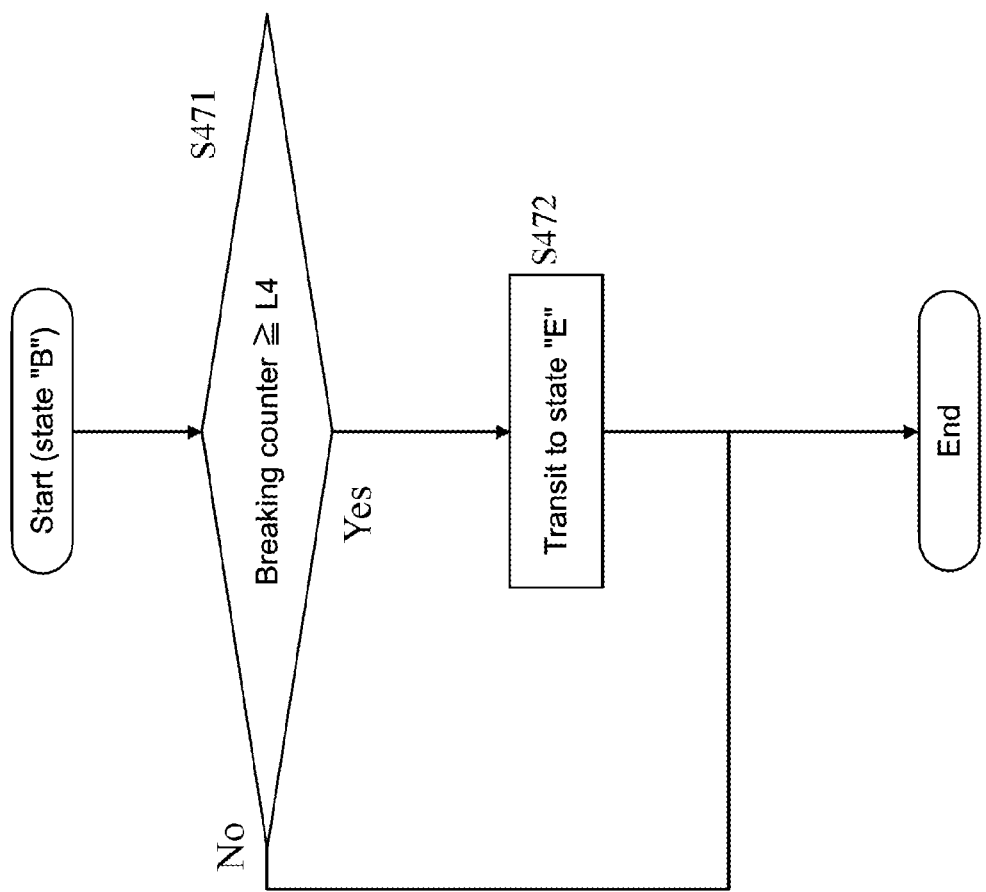
FIG. 47 A flow chart for showing a process sequence of no block consuming transition B.
Figure 48:
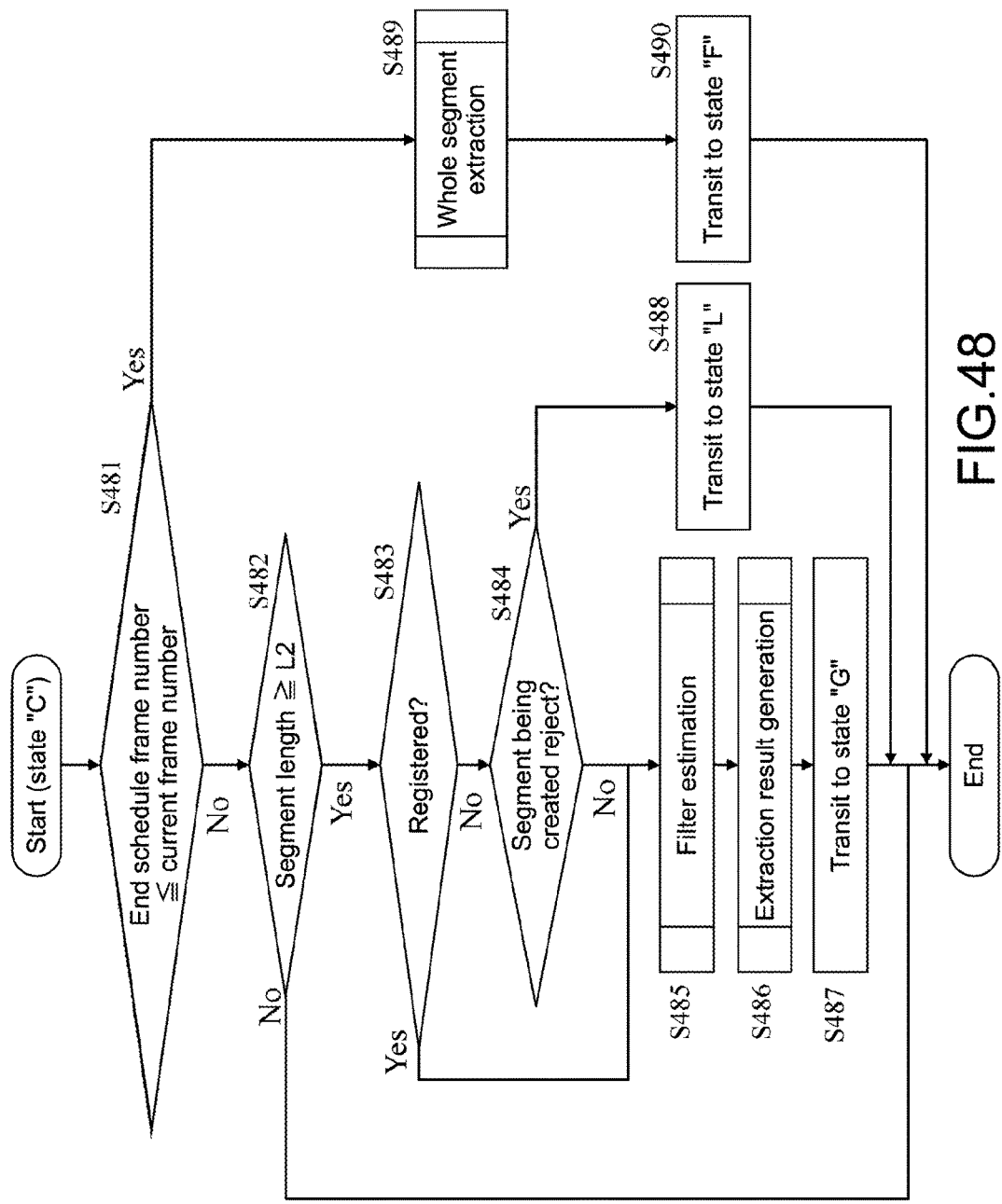
FIG. 48 A flow chart for showing a process sequence of no block consuming transition C.
Figure 49:
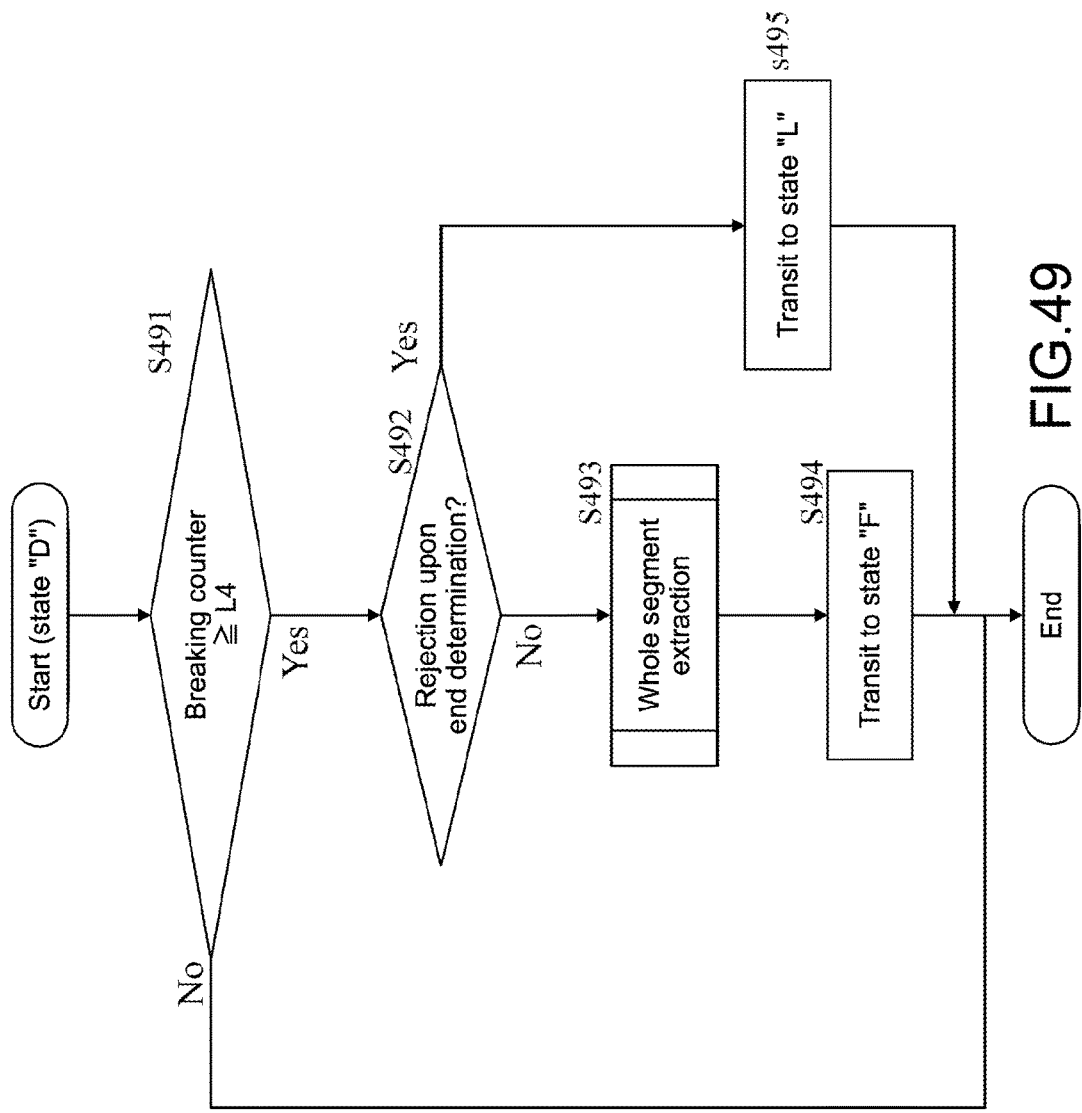
FIG. 49 A flow chart for showing a process sequence of no block consuming transition D.
Figure 50:
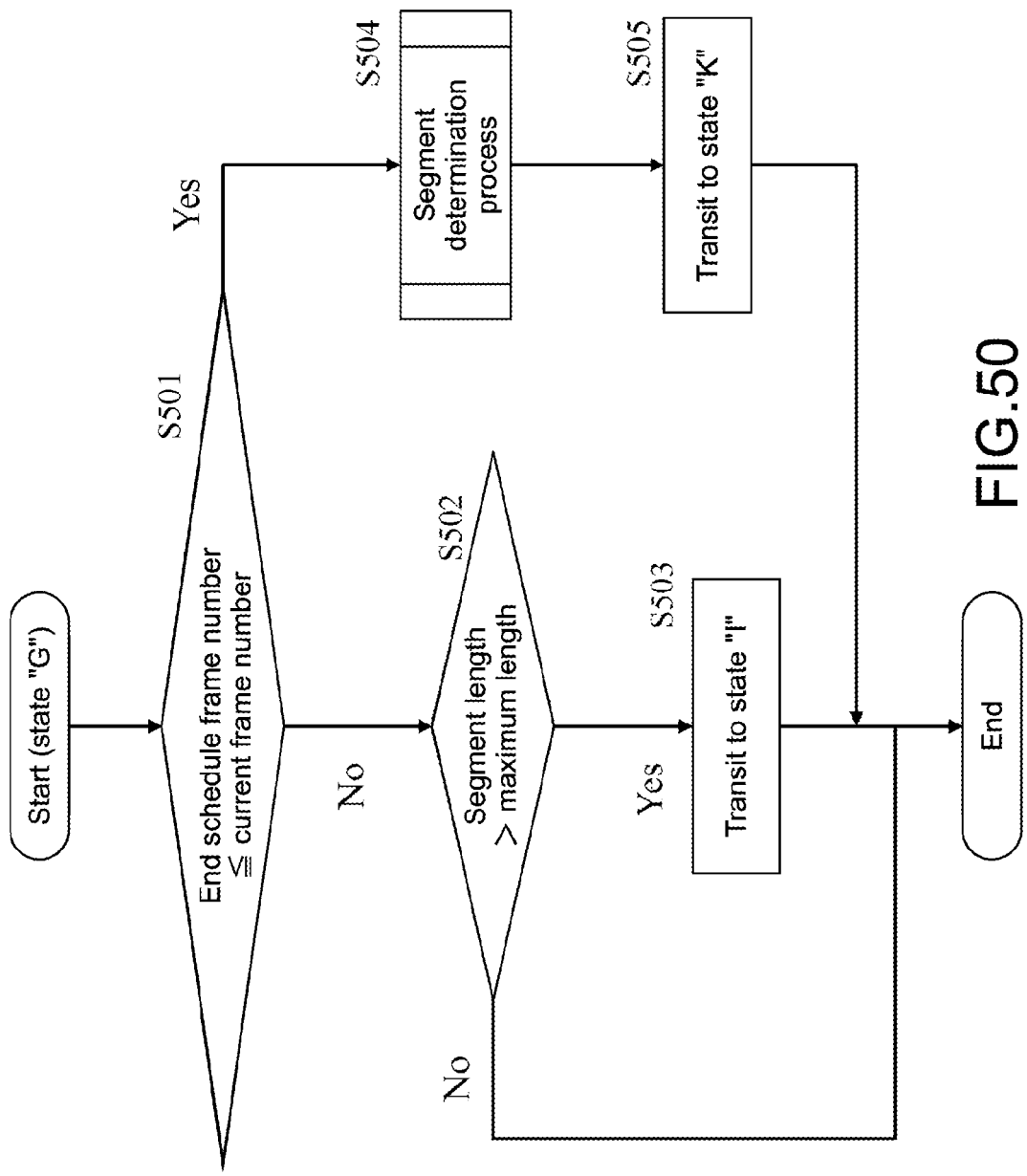
FIG. 50 A flow chart for showing a process sequence of no block consuming transition G.
Figure 51:
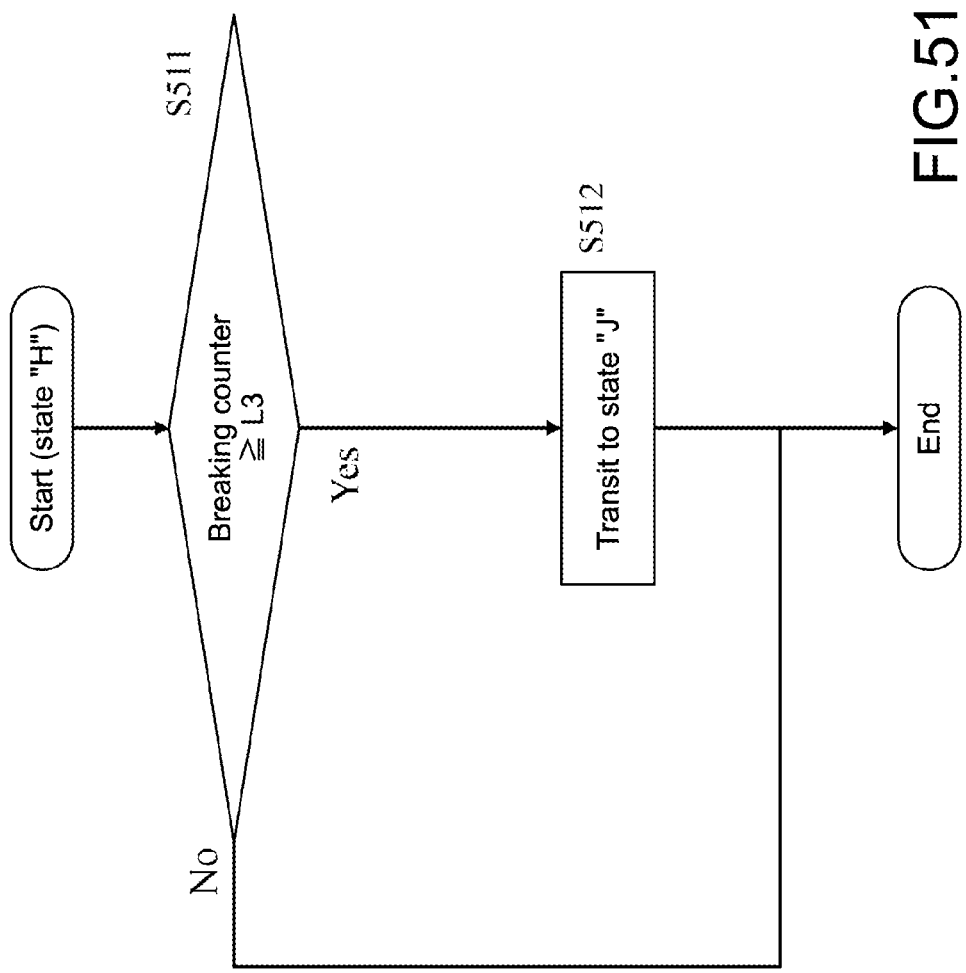
FIG. 51 A flow chart for showing a process sequence of no block consuming transition H.
Figure 52:
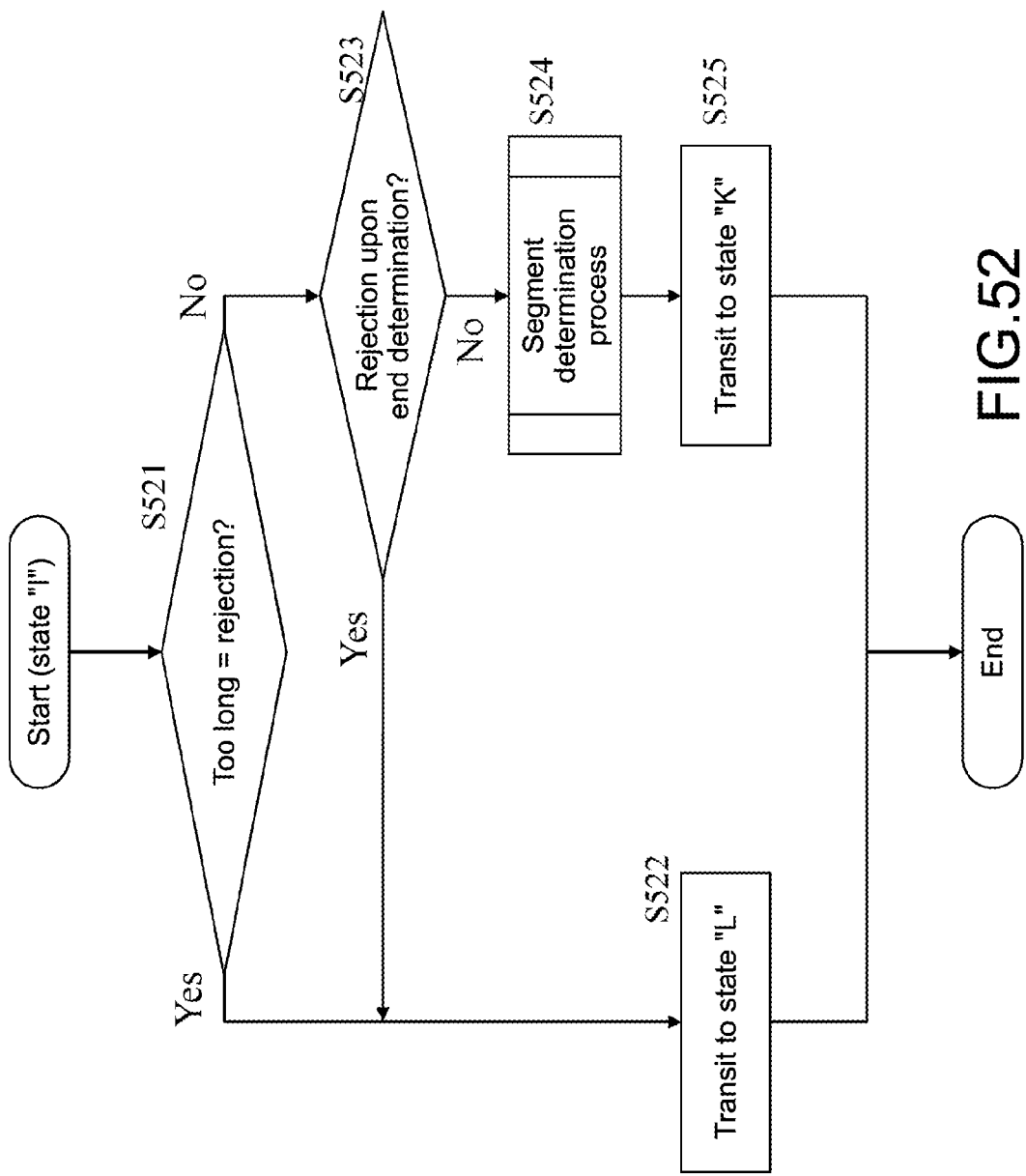
FIG. 52 A flow chart for showing a process sequence of no block consuming transition I.
Figure 53:
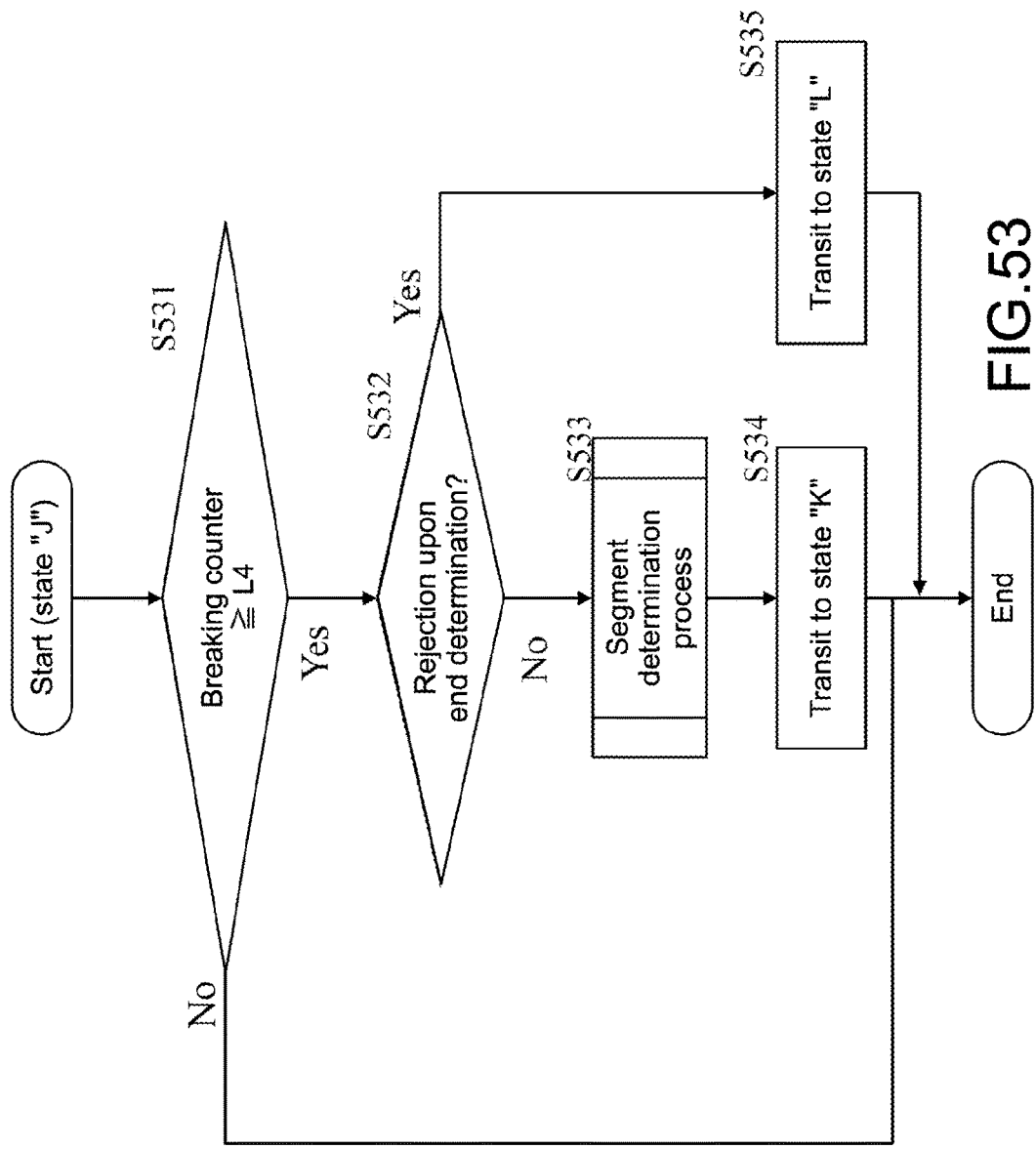
FIG. 53 A flow chart for showing a process sequence of no block consuming transition J.

Next, in step S451 of the flow shown in FIG. 45, each transition determined as any of the inside state "A", "B", "C", "D", "G", "H", "I" and "J" and executed in step S452 is sequentially described in accordance with each flow in FIG. 46 to FIG. 53:

(1) No block consuming transition A: FIG. 46,
(2) No block consuming transition B: FIG. 47,
(3) No block consuming transition C: FIG. 48,
(4) No block consuming transition D: FIG. 49,
(5) No block consuming transition G: FIG. 50,
(6) No block consuming transition H: FIG. 51,
(7) No block consuming transition I: FIG. 52, and
(8) No block consuming transition J: FIG. 53.

Firstly, the sequence of the "no block consuming transition A" will be described referring to the flow chart shown in FIG. 46.

The inside state "A" shows the [segment created] as described referring to FIG. 19.

Firstly, in step S461, the "(3) beginning frame number" registered in the segment information 172 in FIG. 20 is compared with the current frame number 175 that is the registration data of the tracking unit 165 in FIG. 18 to determine whether or not the following formula is held:

beginning frame number current frame number.

The determination process is for postponing the beginning of the segment, if the future time stamp is designated in the beginning registration process. Only when the current frame number exceeds the beginning frame number, it proceeds to step S462. If not, all processes are skipped and ended.

Step S462 checks whether or not "end registration process" (described later) is reserved. If an "(11) end schedule frame number" that is the registered information of the segment information 172 in FIG. 20 is an undefined value, the end is originally not reserved, it proceeds to step S463. Even if the value other than the undefined value is in the "(11) end schedule frame number" but the value is greater than the current frame number 175 that is the registered data of the tracking unit 165 in FIG. 18, it does not reach a scheduled end time. Similarly, it proceeds to step S463.

Only when the current frame number 175 that is the registered data of the tracking unit 165 exceeds the "(11) end schedule frame number" that is the registered information of the segment information 172 in FIG. 20, it proceeds to step S465. This represents the transition from the state "A" to the state "E" in FIG. 19. After the "(1) inside state" in the segment information in FIG. 20 is changed to the state "E", it proceeds to step S466.

On the other hand, if it proceeds to step S463, the length of the segment being created is compared with the prescribed "shortest length of the speech to be received: L1".

Note that the "shortest length of the speech to be received: L1" corresponds to the length L1 of time t3 to t4 shown in FIG. 10. The L1 is the same length as the length necessary to assess the beginning. Only when the length of the segment being created is L1 or more, it proceeds to step S464, and it transits to the state "C". If the length of the segment being created is not L1 or more, it does not proceed to step S464, and the "no block consuming transition A" is ended.

Note that the unit of L1 may be any of seconds, number of frames and number of blocks. In the comparison process executed in step S463, the length of the segment created is expressed by the same unit as L1.

The same applies to the units of L2 to L5 shown in FIG. 10.

Next, a sequence of the "no block consuming transition B" will be described referring to the flow chart shown in FIG. 47.

The inside state "B" shows the [breaking (before beginning determined)] as described referring to FIG. 19.

Firstly, in step S471, the "(10) breaking counter" of the segment information 172 shown in FIG. 20 is compared with the length L4 necessary to access the end.

Note that the length L4 necessary to access the end is L4 (seconds, number of frames, or number of blocks) of time t6 to t8 in the embodiment shown in FIG. 10.

Only when the breaking counter is L4 or more, it proceeds to step S472. Otherwise, the "no block consuming transition B" is ended.

Step S472 corresponds to the transition from the state "B" to the state "E" in FIG. 19. Upon the process, the "(1) inside state" of the segment information 172 shown in FIG. 20 is changed to the state "E".

Next, a sequence of the "no block consuming transition C" will be described referring to the flow chart shown in FIG. 48.

The inside state "C" shows the [beginning determined] as described referring to FIG. 19.

The process in step S481 is similar to the process in step S462 in FIG. 46 described earlier, and is a check whether or not the end is reserved by the "end registration process" (described later). If the "(11) end schedule frame number" that is the registered information of the segment information 172 in FIG. 20 is an undefined value, the end is originally not reserved, it proceeds to step S482. Even if the value other than the undefined value is in the "(11) end schedule frame number" but the value is greater than the current frame number 175 that is the registered data of the tracking unit 165 in FIG. 18, it does not reach a scheduled end time. Similarly, it proceeds to step S482. Only when the current frame number is the end schedule frame number or more, it proceeds to step S489.

The case of branching to step S482 is described in advance. In step S482, the length of the segment being created is compared with the length L2 (L2 of time t3 to t5 in FIG. 10) from the beginning of the voice segment to the beginning position of the filter estimation. If the length of the segment being created is L2 or more, it proceeds to step S483. If not, the "no block consuming transition C" is ended.

The processes in step S483 to S487 correspond to the transition from the state "C" to the state "G" in FIG. 19. In the process according to the present disclosure, upon the transition from the state "C" to the state "G", the segment being created is checked for rejection (step S484), the filter is estimated (step S485), and the extraction result of the observation signal (the observation signal 108 in the embodiment in FIG. 10) is generated (step S486). Hereinafter, these are described in this order.

Firstly, in step S484, the reason why the segment being created is checked for rejection will be described. In the related art such as Japanese Patent Application Laid-open No. 2012-234150, after the end is determined, the check for rejection has been performed. As to the segment rejected, the production of the feature amount applied to the voice recognition and the decoding are omitted.

On the other hand, in the process according to the present disclosure, the feature amount is generated before the end is determined, and it is decoded. Therefore, only with the rejection upon the end determination, the segment to be rejected is unnecessarily decoded. At the beginning position of the filter estimation, i.e., when the length of the segment reaches L2, the segment that has been found that it has been already unnecessary is rejected. This process prevents the unnecessary decode being performed.

The rejection determination in step S484 uses the following conditions, for example.

Condition a): Is the average direction (the (9) average direction registered in the segment information 172 in FIG. 20) at the time of the rejection determination (the beginning position of the filter estimation) is within the prescribed predetermined range?

Condition b): Does the percentage of the "sound-like" frame in the segment of the observation signal (the observation signal 108 in FIG. 10) to be filtered exceed the predetermined threshold value?

Condition c): Does the density of the direction points exceed the predetermined threshold value in the segment between the start point of the voice segment and the beginning position of the filter estimation (time t3 to t5 in FIG. 10)?

If all of the above-described conditions "a" to "c" are satisfied, it is determined that the segment being created is not rejected, and it proceeds to step S485. If any one of them is not satisfied, it is determined that the segment being created is rejected, and it proceeds to step S488.

The step S488 is rejection process of the segment being created. In the rejection process, the "(1) inside state" is changed to "L" the segment information 172 shown in FIG. 20.

Note that the segment being created having the "registered" attribute is basically not rejected during the tracking, and the rejection check in step S484 is skipped. This process is that the determination becomes Yes in step S483, and it proceeds to step S485.

In step S485, the filter estimation process is executed. In addition, in step S486, the extraction result is generated by the filter application. The details about the process are described later. Furthermore, in step S487, the "(1) inside state in the segment information shown in FIG. 20 is changed to the state "G".

Here, returning to step S481, the case of branching to step S489 is described. It represents that the end is determined by the end registration process before the extraction filter etc. is estimated. In this case, in step SS489, the whole segment extraction process is executed. Upon the process, the filter estimation and the extraction result generation are executed similar to step S485 to S486. The details about the process are described later. Finally, in step S490, it transits to the state "F". The state represents that the end is determined before the extraction filter is estimated.

Next, a sequence of the "no block consuming transition D" will described be referring to the flow chart shown in FIG. 49.

The inside state "D" shows the [breaking (before the extraction filter estimation)] as described referring to FIG. 19.

Step S491 is similar to step S471 described referring to FIG. 47. The "(10) breaking counter" of the segment information 172 shown in FIG. 20 is compared with the length L4 necessary to access the end.

Note that the length L4 necessary to access the end is L4 (seconds, number of frames, or number of blocks) of time t6 to t8 in the embodiment shown in FIG. 10.

Only when the breaking counter is L4 or more, it proceeds to step S492. Otherwise, the "no block consuming transition D" is ended.

Branching to step S492 represents that the end is determined before the extraction filter etc. are estimated, and corresponds to the state during the transit from the state "C" to the state "F" in FIG. 19.

In step S492, the check for rejection is performed. The rejection determination uses the following conditions, for example.

Condition a): Is the average direction (the (9) average direction registered in the segment information 172 in FIG. 20) at the time of the rejection determination is within the prescribed predetermined range?

Condition b): Does the percentage of the "sound-like" frame in the whole segment of the observation signal (time t2 to t8 in FIG. 10) to be filtered exceed the predetermined threshold value?

Condition c): Does the density of the direction points in the whole voice segment (time t3 to t8 in FIG. 10) exceed the predetermined threshold value?

If all of the above-described conditions "a" to "c" are satisfied, it is determined that the segment being created is not rejected, and it proceeds to step S493. If any one of them is not satisfied, it is determined that the segment being created is rejected, and it proceeds to step S495. Step S495 represents the rejection. In the rejection process, the "(1) inside state" is changed to "L" the segment information 172 shown in FIG. 20.

On the other hand, in the rejection determination process in step S492, if all of the above-described conditions "a" to "c" are satisfied, it determines that it is not rejected, it proceeds to step S493, and the whole segment is extracted. The details are described later. Finally, in step S494, it transits to the state "F".

Next, a sequence of the "no block consuming transition G" will described be referring to the flow chart shown in FIG. 50.

The inside state "G" shows the "extraction filter estimated" as described referring to FIG. 19.

Step S501 checks whether or not "end registration process" (described later) is reserved similar to step S481 in FIG. 48 and step S462 in FIG. 46.

If the "(11) end schedule frame number" that is the registered information of the segment information 172 in FIG. 20 is an undefined value, the end is originally not reserved, it proceeds to step S502. Even if the value other than the undefined value is in the "(11) end schedule frame number" but the value is greater than the current frame number 175 that is the registered data of the tracking unit 165 in FIG. 18, it does not reach a scheduled end time. Similarly, it proceeds to step S502. Only when the current frame number exceeds the end schedule frame number, it proceeds to step S504.

When it proceeds to step S502, it checks whether or not the length of the segment being created exceeds the maximum length of a receivable speech. If it does not exceed, the "no block consuming transition G" is ended. If it exceeds, it proceeds to step S503, and transits to the state "I".

Here, it returns to step S501, the case that branches to step S504 is described. In this case, it means that the current time reaches the scheduled end time designated by the end register process (described later) during the extraction result is sequentially generated.

In this case, in step S504, the segment determination process is performed. The details are described later. Thereafter, it transits to the state "K" in step S505. This state represents that the end is determined after the extraction filter estimation.

Next, a sequence of the "no block consuming transition H" will be described referring to the flow chart shown in FIG. 51.

The inside state "H" shows the [breaking (before end hangover)] as described referring to FIG. 19.

Step S511 checks whether or not the "(10) breaking counter" in the segment information 172 shown in FIG. 20 exceeds the length L3 of the end hangover. Note that L3 corresponds to L3 shown at time t6 to t7 in FIG. 10. If it does not exceed, the "no block consuming transition H" is ended. If it exceeds, it proceeds to step S512 and transits to the state "J".

Next, a sequence of the "no block consuming transition I" will be described referring to the flow chart shown in FIG. 52.

The inside state "I" shows the [segment too long] as described referring to FIG. 19. The state represents that the length of the segment being created exceeds the maximum length of the receivable speech. There may be two types of the behavior in the state.

a) The segment being created is rejected.
b) If it is not breaking, the end is determined.

For example, if the maximum length of the receivable speech is 3 seconds, a) it means that the speech having the length exceeding 3 seconds is rejected, and b) it means that the recognition result is generated from the voice from the first 3 seconds. Depending on the intended use, the behavior is selected.

Step S521 is branching if the segment being created reaches the maximum length of the receivable speech. If the a) is selected, it determines Yes in step S521, and it proceeds to step S522. If the b) is selected, it determines No in step S521, and it proceeds to step S504.

If the a) is selected, it proceeds to step S522 and transits to the state "L" that represents the rejection.

On the other hand, if the b) is selected, it proceeds to step S523 where it is checked whether or not it is rejected. The check of the rejection in step SS523 is the same as the process in step S492 in FIG. 49 described earlier. For the rejection determination, the following conditions are used, for example.

Condition a): Is the average direction (the (9) average direction registered in the segment information 172 in FIG. 20) at the time of the rejection determination is within the prescribed predetermined range?

Condition b): Does the percentage of the "sound-like" frame in the whole segment of the observation signal (time t2 to t8 in FIG. 10) to be filtered exceed the predetermined threshold value?

Condition c): Does the density of the direction points in the whole voice segment (time t3 to t8 in FIG. 10) exceed the predetermined threshold value?

If all of the above-described conditions "a" to "c" are satisfied, it is determined that the segment being created is not rejected, and it proceeds to step S524. If any one of them is not satisfied, it is determined that the segment being created is rejected, and it proceeds to step S522.

The step S522 is rejection process. In the rejection process, the "(1) inside state" is changed to "L" the segment information 172 shown in FIG. 20.

If all of the above-described conditions "a" to "c" are satisfied, it is determined that the segment being created is not rejected, and it proceeds to step S524 to perform the segment determination process. The details are described later. Finally, in step S522, it transits to the state "K".

Next, a sequence of the "no block consuming transition J" will be described referring to the flow chart shown in FIG. 53.

The inside state "J" shows the [breaking (after end hangover)] as described referring to FIG. 19.

Step S531 is similar to step S491 in FIG. 49 and step S471 in FIG. 47. The "(10) breaking counter" of the segment information 172 shown in FIG. 20 is compared with the length L4 necessary to access the end.

Note that the length L4 necessary to access the end is L4 (seconds, number of frames, or number of blocks) of time t6 to t8 in the embodiment shown in FIG. 10.

Only when the breaking counter is L4 or more, it proceeds to step S532. Otherwise, the "no block consuming transition J" is ended.

Proceeding to step S532 represents that the breaking length of the direction point reaches the assessment time L4, and the end is determined.

In step S532, the check for rejection is performed similar to step S492 in FIG. 49 and steep S523 in FIG. 52. The rejection determination uses the following conditions, for example.

Condition a): Is the average direction (the (9) average direction registered in the segment information 172 in FIG. 20) at the time of the rejection determination is within the prescribed predetermined range?

Condition b): Does the percentage of the "sound-like" frame in the whole segment of the observation signal (time t2 to t8 in FIG. 10) to be filtered exceed the predetermined threshold value?

Condition c): Does the density of the direction points in the whole voice segment (time t3 to t8 in FIG. 10) exceed the predetermined threshold value?

If all of the above-described conditions "a" to "c" are satisfied, it is determined that the segment being created is not rejected, and it proceeds to step S533. If any one of them is not satisfied, it is determined that the segment being created is rejected, and it proceeds to step S535. Step S535 represents the rejection process. In the rejection process, the "(1) inside state" is changed to "L" the segment information 172 shown in FIG. 20.

If it is not rejected, the segment determination process is performed in step S533. The details about the process are described later. Finally, in step S534, it transits to the state "K".

Figure 54:
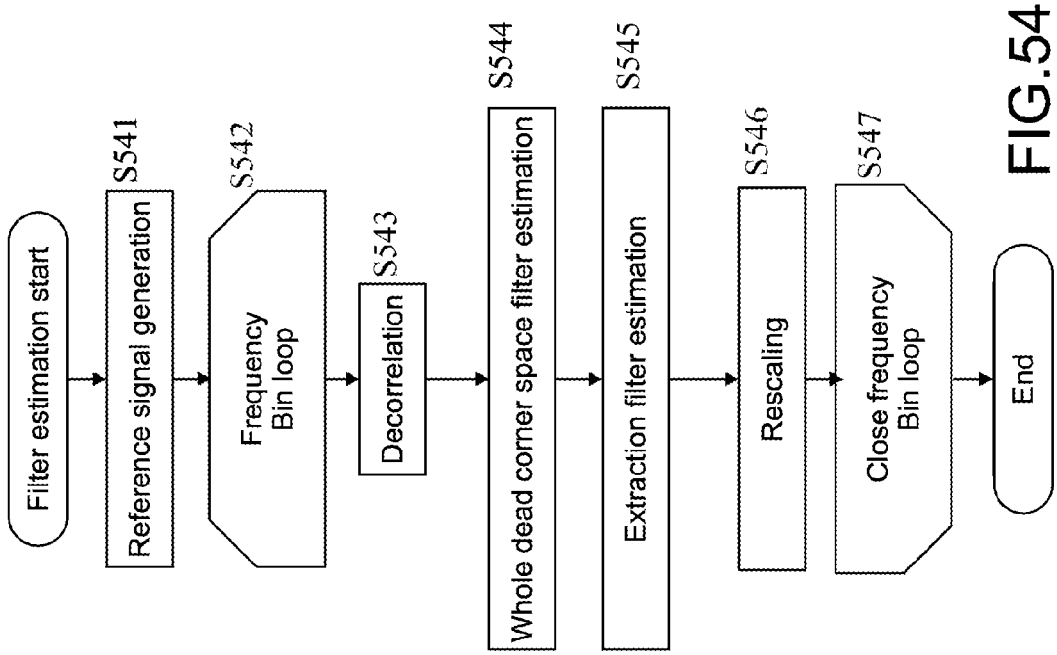
FIG. 54 A flow chart for showing a process sequence of a filter estimation process.

Next, a detailed sequence of the filter estimation process executed in step S485 of "no block consuming transition C" described referring to FIG. 48 will be described referring to the flow chart shown in FIG. 54.

In the process according to the present disclosure, the filter estimation process uses the observation signal 106 at time t1 to t5, for example, in the embodiment shown in FIG. 10 (to a point when a fixed time is preceded from time t5).

Process in each step of the flow shown in FIG. 54 will be described.

In step S541, the following numerical formula is used to generate the reference signal.

[Numerical Formula 3]

$$q(\theta) = \begin{bmatrix} \cos\theta \\ \sin\theta \\ 0 \end{bmatrix} \quad [3.1]$$

$$S_k(\omega, \theta) = \exp\left(j\pi \frac{(\omega-1)F}{(M-1)C} q(\theta)^T (m_k - m)\right) \quad [3.2]$$

$$S(\omega, \theta) = \frac{1}{\sqrt{n}} \begin{bmatrix} S_1(\omega, \theta) \\ \vdots \\ S_n(\omega, \theta) \end{bmatrix} \quad [3.3]$$

$$U(\omega, t) = \frac{1}{\sqrt{n}} \begin{bmatrix} X_1(\omega, t)/|X_1(\omega, t)| \\ \vdots \\ X_n(\omega, t)/|X_n(\omega, t)| \end{bmatrix} \quad [3.4]$$

$$M(\omega, t) = |S(\omega, \theta)^H U(\omega, t)|^J \quad [3.5]$$

$$\Omega = \{\omega_{min}, \omega_{min}+1, \cdots, \omega_{max}\} \quad [3.6]$$

$$r(t) = \{\langle M(\omega, t)^L \rangle_{\omega \in \Omega}\}^{1/L} \quad [3.7]$$

In the numerical formula [3.1], $q(\theta)$ is a three-dimensional vector corresponding to the sound source direction (speech direction), and $\theta$ is a value of the average direction (the "(9) average direction" in the segment information 172 shown in FIG. 20). Using these vector and the numerical formula [3.2] and the numerical formula [3.3], a sterling vector $S(\theta)$ corresponding to the direction $\theta$ is calculated.

In the numerical formula [3.2], m_k is a position of a k-th microphone, m is an average position of all microphone positions, F is a sampling frequency, C is a sound speed, j is an imaginary unit. The steering vector represents a phase difference of the signal observed by each microphone in the time frequency region about the sound arriving from the direction $\theta$.

In the numerical formula [3.4], $U(\omega, t)$ represents the phase difference between the microphones about the observation signal vector $X(\omega, t)$.

In the numerical formula [3.5], the time frequency mask $M(\omega, t)$ is calculated from $S(\theta)$ and $U(\omega, t)$. The superscript H represents the Hermitian transpose (conjugate transpose).

When the observation signal $X(\omega, t)$ is configured of only the sound arriving from the direction $\theta$, the time frequency mask $M(\omega, t)$ will be the maximum. If the observation signal $X(\omega, t)$ includes no sound arriving from the direction $\theta$, the time frequency mask $M(\omega, t)$ will be the minimum.

J is a positive real number for adjusting the masking effect. The greater J is, the greater the effect of the masking is.

Finally, in the numerical formula [3.7], the time number frequency mask $M(\omega, t)$ is averaged in the direction of the frequency Bin, thereby providing the reference signal r(t) corresponding to the t-th frame. In this numerical formula, L is the positive value, for example, L=2. In $\langle \cdot \rangle\_\{\omega \in \Omega\}$, a set $\Omega$ includes a plurality of the frequency Bin numbers and an average is calculated among the frequency Bins belonging to $\Omega$. The set $\Omega$ is represented by the numerical formula [3.6], for example. The set means that the average is calculated from $\omega\_\{min\}$ to $\omega\_\{max\}$ of the frequency Bins.

The above-described numerical formulae [3.1] to [3.7] are calculated about the frame number t corresponding to the observation signal 106 shown in FIG. 10, for example, thereby providing the reference signal r(t) on which the segment and the direction are reflected.

If the end 104 is determined before the length of the segment reaches L2 in FIG. 10, i.e., if the end 104 is before time t5 on the time axis at which the filter estimation is begun in this process embodiment, the reference signal is calculated to a time point when a fixed time is preceded from the end similar to the related art. Similarly, the average is calculated among the frames thereafter.

Steps S542 to S547 are a loop for the frequency Bins. For each frequency Bin, the processes in steps S543 to S546 are performed.

Decorrelation in step S543 is to convert the observation signal vector X(ω,t) into X'(ω,t) by applying the following the numerical formula [4.1]. X'(ω,t) satisfies the numerical formula [4.2].

[Numerical Formula 4]

$$X'(\omega, t) = P(\omega)X(\omega, t) \quad [4.1]$$

$$\langle X'(\omega, t)X'(\omega, t)^H \rangle_t = I \quad [4.2]$$

$$R(\omega) = \langle X(\omega, t)X(\omega, t)^H \rangle_t \quad [4.3]$$

$$R(\omega) = V(\omega)D(\omega)V(\omega)^H \quad [4.4]$$

$$V(\omega) = [V_1(\omega), \cdots, V_n(\omega)] \quad [4.5]$$

$$D(\omega) = \begin{bmatrix} d_1(\omega) & & 0 \\ & \ddots & \\ 0 & & d_n(\omega) \end{bmatrix} \quad [4.6]$$

$$P(\omega) = D(\omega)^{-1/2} V(\omega)^H \quad [4.7]$$

$$N(\omega) = d_n(\omega)^{-1/2} V_n(\omega)^H \quad [4.8]$$

The set P(c) in the above-described numerical formula [4.1] is called as a covariance matrix. Hereinafter, the method of calculating the covariance matrix will be described.

The R(c) in the numerical formula [4.3] is the covariance matrix of the observation signal. In this numerical formula, <·>_t means that the average of the segment of the observation signal 106 shown in FIG. 10 that is applied to the filter estimation is calculated. Then, an eigenvalue decomposition is applied to the covariance matrix R(ω) of the observation signal and decomposes into the product at right side of the numerical formula [4.4].

In the numerical formula [4.4],

V(ω) is a matrix having an eigenvector of the covariance matrix R(ω) of the observation signal (the numerical formula [4.5]).

D(ω) is a diagonal matrix having an eigenvalue of the covariance matrix R(ω) of the observation signal (the numerical formula [4.6]).

The maximum eigenvalue is d1(ω) and the minimum eigenvalue is dn(ω). Then, according to the numerical formula [4.7], the covariance matrix P(ω) is provided.

Next, in step S544, the whole dead corner space filter N(ω) is estimated. The method of calculation is described, for example, in Japanese Patent Application Laid-open No. 2011-107602. If the eigenvalue decomposition is applied to the observation signal, it can be easily determined by the above-described numerical formula [4.8]. However, the whole dead corner space filter N(ω) in the numerical formula [4.8] is not yet rescaled. In step S546, rescaling is applied.

Next, in step S545, the extraction filter W(ω) is estimated. The method of calculation is shown below.

[Numerical Formula 5]

$$G(\omega) = \left\langle \frac{X'(\omega, t)X'(\omega, t)^H}{r(t)} \right\rangle_t \quad [5.1]$$

$$W(\omega) = \arg\min_{W(\omega)} W(\omega)G(\omega)W(\omega)^H \quad [5.2]$$

$$G(\omega) = A(\omega)B(\omega)A(\omega)^H \quad [5.3]$$

$$A(\omega) = [A_1(\omega), \cdots, A_n(\omega)] \quad [5.4]$$

$$B(\omega) = \begin{bmatrix} b_1(\omega) & & 0 \\ & \ddots & \\ 0 & & b_n(\omega) \end{bmatrix} \quad [5.5]$$

$$W(\omega) = A_n(\omega)^H \quad [5.6]$$

The G(ω) in the numerical formula [5.1] is a weighted covariance matrix of a decorrelated observation signal where an inverse number of the reference signal r(t) is weighted. In this numerical formula, the average is calculated for the segment of the observation signal 106 shown in FIG. 10 that is applied for the filter estimation.

The extraction filter W(ω) is a solution of a minimization problem of the numerical formula [5.2]. The problem can be solved by applying the eigenvalue decomposition to G(ω).

The eigenvalue decomposition of G(ω) is represented by the numerical formula [5.3]. In this numerical formula, A(ω) is a matrix having the eigenvector of G(ω), and B(ω) is a diagonal matrix having the eigenvalue of G(ω).

If the eigenvector corresponding to the minimum eigenvalue bn(ω) is defined as An(ω), the extraction filter W(ω) is represented by the numerical formula [5.6]. However, the extraction filter W(ω) in this numerical formula is not yet rescaled. In step S546, rescaling is applied.

Next, in step S546, the extraction filter W(ω) and the whole dead corner space filter N(ω) are rescaled. Rescaling is an operation to adequately adjust the scale of the extraction result per frequency Bin. According to the present disclosure, rescaling is used before the subtraction in order to match the scales between the erasure residue contained in the application result of the extraction filter and the erasure residue estimated by the application of the whole dead corner space filter. The rescaling is shown in the following the numerical formula.

[Numerical Formula 6]

$$g(\omega) = S(\omega, \theta)^H R(\omega) \{W(\omega)P(\omega)\}^H \quad [6.1]$$

$$W(\omega) \leftarrow g(\omega)W(\omega)P(\omega) \quad [6.2]$$

$$N(\omega) \leftarrow g(\omega)N(\omega) \quad [6.3]$$

This numerical formula is to match the scale of the target sound contained in the application result of the extraction filter to the target sound contained in the application result of the delay-and-sum array. By the numerical formula [6.1], a rescaling factor g(ω) is calculated, which are reflected to the extraction filter W(ω) shown in the numerical formula [6.2] and the whole dead corner space filter N(ω) shown in the numerical formula [6.3].

Steps S543 to S546 are performed for all frequency Bins, thereby generating the extraction filter and the whole dead corner space filter.

The description about the filter estimation process is ended.

Figure 55:
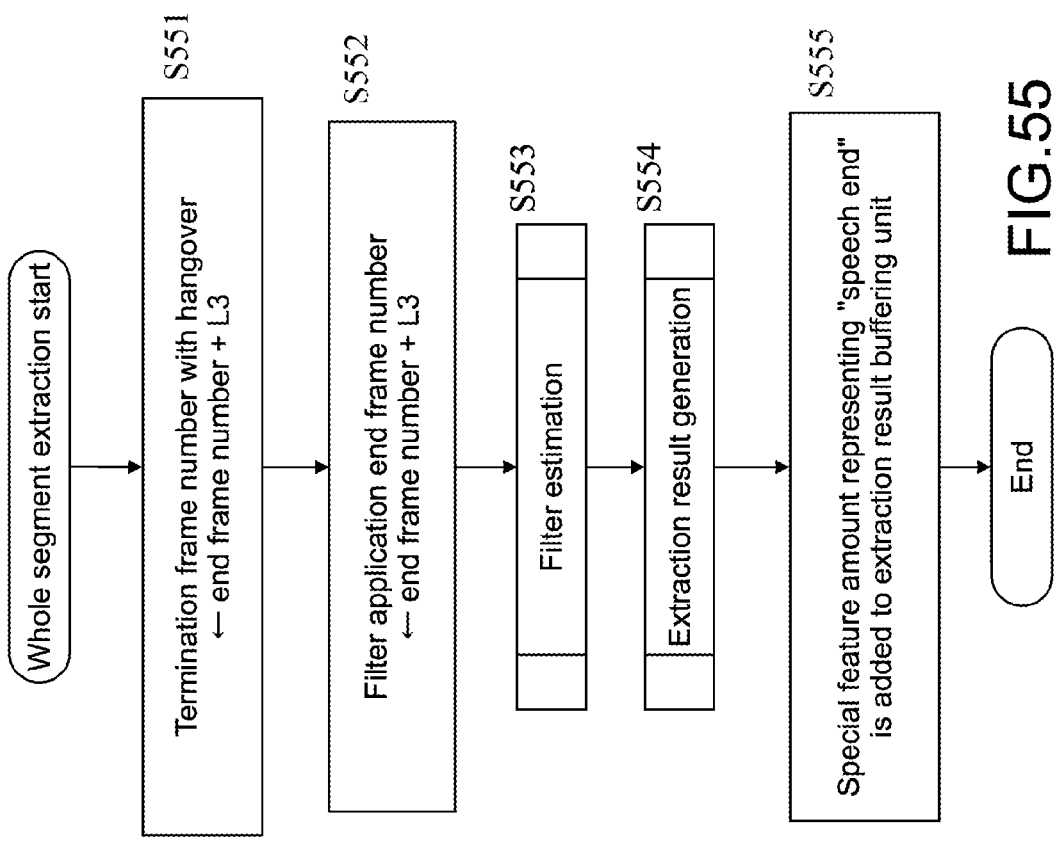
FIG. 55 A flow chart for showing a process sequence of a whole segment extraction process.

Next, the whole segment extraction process executed in step S486 of the "no block consuming transition C" described referring to FIG. 48 and in step S493 of the "no block consuming transition D" referring to FIG. 49 will be described referring to the flow chart shown in FIG. 55. This process is executed in the transition from the states "C" and "D" to the state "F" in FIG. 19. In the whole segment extraction process, the filter is estimated and the extraction result is generated after the end is determined.

In step S551, the beginning and the end of the segment being created are determined. At this point, only the end frame number with hangover ((6) in the segment information 172 in FIG. 20) within generated/saved data in FIG. 20 is not yet determined. To the end frame number with hangover ((6) in the segment information 172 in FIG. 20), a value where L3 (the length at the segment end from time t6 to t7 in FIG. 10) is added to the end frame number((5) in the segment information 172) is assigned.

In step S552, the range to which the extraction filter is applied is determined. At this point, only the filter application end frame number (the "(4) filter application end frame number" that is the management data of the sound source extraction unit 173 shown in FIG. 21) is not yet determined. Similar to the end frame number with hangover, a value where L3 (the length at the segment end from time t6 to t7 in FIG. 10) is added to the end frame number ((5) in the segment information 172) is assigned thereto.

In step S553, the filter is estimated. The filter estimation process is similar to that described earlier referring to the flow chart in FIG. 54.

In step S554, the extraction result is generated. The extraction result generation process is similar to those described earlier referring to each flow in FIG. 42 to FIG. 44.

Finally, in step S555, a special feature amount representing the "speech end" is added to the extraction result buffering unit 166 of the front end unit 153 shown in FIG. 16.

Figure 56:
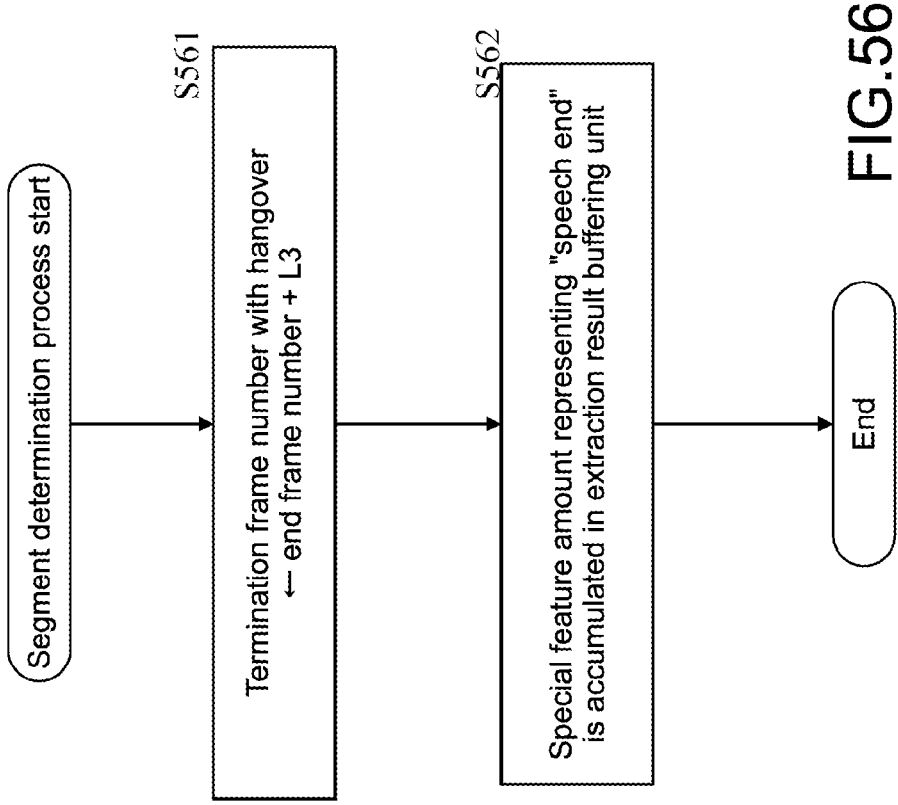
FIG. 56 A flow chart for showing a process sequence of a segment defining process.

Note that the process is identical with the process in step S562 described referring to FIG. 56. The meaning of the process will be described later.

Next, a detailed sequence of the segment determination process executed in step S504 of the "no block consuming transition G" in FIG. 50, in step S524 of the "no block consuming transition I" in FIG. 52, and in step S533 of the "no block consuming transition J" in FIG. 53 will be described referring to the flow chart shown in FIG. 56.

The process is executed in the transition from the states "G", "I" and "J" shown in FIG. 19 to the state "K".

In step S561, the beginning and the end of the segment being created are determined. At this point, only the end frame number with hangover ((6) in the segment information 172 in FIG. 20) within generated/held data in FIG. 20 is not yet determined (except for the transition from the state "J" to the state "K"). To the end frame number with hangover ((6) in the segment information 172 in FIG. 20), a value where L3 (the length at the segment end from time t6 to t7 in FIG. 10) is added to the end frame number ((5) in the segment information 172) is assigned.

Finally, in step S562, a special feature amount representing the "speech end" is added to the extraction result buffering unit 166 of the front end unit 153 shown in FIG. 16. The meaning of the process will be described.

According to the process of the present disclosure, the feature amount is sequentially generated as the extraction result. The decode is also sequentially performed as the voice recognition process to which the feature amount is applied. Therefore, the decoder cannot determine the segment on the way or the end of the segment only with the feature amount. Once the end of the segment being created is determined, it is necessary to notify the decoder that the feature amount for the segment is no more generated. As the means for notification, according to the present disclosure, the feature amount representing the "speech end" is prepared, and is added to the extraction result buffering unit 166 of the front end unit 153 shown in FIG. 16. From the same reason, also in the whole segment extraction (FIG. 55), the feature amount representing the "speech end" is added in final step S555.

The descriptions about the segment determination process and the segment update (step S293 in FIG. 29) are ended.

Again, it returns to the description about the tracking process shown in FIG. 29.

A new segment creation process in step S294 in the flow of the tracking process shown in FIG. 29 will be described using the flow chart shown in FIG. 57.

In this process, when there is a direction point to which any segment being created is connected, a new segment is created using the direction point as the beginning.

Steps S571 to S577 are a loop for entries in the direction point connection table 179 that is the management data of the tracking unit 165 shown in FIG. 18. One entry of the direction point connection table 179 holds a connectable segment list showing that which segment being created is connectable to one direction point.

In step S572, it is determined whether or not the segment being created connectable to the direction point is present. If the connectable direction point list has one or more components, the segment being created connectable is present, steps S573 to S576 are skipped. Only when the connectable direction point list has no components, it proceeds to step S573.

In step S573, it creates the segment being created management unit (the management unit 171 for the segment being created of the tracking unit 165 shown in FIG. 18) corresponding to one segment being created. This module has three modules of the segment information 172, the sound source extraction unit 173, and the feature amount conversion unit 174 as shown in FIG. 18. In steps S574 to S576, each of which is initialized. Detailed initialization of each will be described later.

Finally, the loop is closed in step S577.

Next, segment information initialization in step S574 will be described referring to the flow chart shown in FIG. 58. In this process, an initial value is assigned the segment information (see FIG. 20) to each member.

In step S581, the state "A" is set to the inside state ((1) in FIG. 20).

In step S582, a predetermined identification value is set to the segment ID ((2) in FIG. 20) For example, a value of the segment ID previously issued plus 1 may be used.

In step S583, the beginning frame number ((3) in FIG. 20) and the beginning frame number with hangover ((4) in FIG. 20) are set individually.

When the number of frames per block is set to B, a value where (B-1) is subtracted from the current frame number 175 (see FIG. 18) is assigned to the beginning frame number.

To the beginning frame number with hangover, a value where the hangover segment length L5 (a segment L5 of time t2 to t3 in FIG. 10) is subtracted from the current frame number is assigned. If it becomes the negative value when a fixed value is subtracted from the beginning frame number such as the case that the segment is created immediately after the system starts up, the minimum value (for example, 0) of the frame number is set as the beginning frame number with hangover.

In step S584, the end frame number ((5) in FIG. 20) and the beginning frame number with hangover ((6) in FIG. 20) are set. Specifically, the current frame number 175 (see FIG. 18) is assigned to the both.

As the segment information generated in the "segment information initialization" has no "registered" attribute, a value (false) showing that it is not registered is assigned to the registered flag ((7) in FIG. 20) in step S585.

In step S586, the direction point counter ((8) in FIG. 20) is set. At this point, as one direction point is included during the creation, the value corresponding thereto is assigned. Specifically, if the direction point counter represents the number of blocks, 1 is assigned, and if the direction point counter represents the number of frames, B is assigned.

In step S587, the direction having the direction point is assigned to the average direction ((9) in FIG. 20). At this point, the segment is not interrupted, 0 is assigned to the breaking counter ((10) in FIG. 20).

The segment information generated by the "segment information initialization" has no "registered" attribute, and is therefore not intended to the end registration process. In step S589, an undefined value is assigned to the frame number to be ended ((11) in FIG. 20).

Finally, in step S590, the blank list is assigned to the "connectable direction point list" ((12) in FIG. 20). This represents that the direction point is not yet connected to the segment being created immediately after the generation.

Next, the sound source extraction unit initialization executed in step S575 of the flow shown in FIG. 57 will be described referring to the flow chart shown in FIG. 59.

Step S591 is for initialization of the filter application beginning frame number (the management data (3) of the sound source extraction unit 173 in FIG. 21), and the same value as the beginning frame number with hangover ((4) in FIG. 20) is assigned.

Step S592 is for initialization of the filter application end frame number ((4) in FIG. 21), and the same value as the current frame number 175 (see FIG. 18) is assigned.

Next, initialization of the feature amount conversion unit executed in step S576 in FIG. 57 will be described referring to the flow chart shown in FIG. 60.

In step S601, the MFCC generation unit 201 within the feature amount conversion unit 174 shown in FIG. 22 is initialized. The MFCC generation unit 201 generates the Mel-Frequency Cepstral Coefficients (MFCC) that is the feature amount applied to the voice recognition. It indicates that not only the memory is assured, but also the MFCC saved in the past within the module for creating the delta feature amount is discarded.

Next, in step S602, the MFCC average value ((1) in FIG. 22) and the MFCC standard deviation ((2) in FIG. 22) that are the members recorded by the feature amount conversion unit 174 shown in FIG. 22 as the data for normalizing the feature amount are cleared.

Next, in step S603, a value (true) showing the first time to the first time flag ((3) in FIG. 22) is assigned. By the assignment, it is possible to perform special process when the extraction result is generated at the first time (the processes shown in FIG. 42 to FIG. 44) in the segment being created.

Finally, in step S604, as necessary, the inverse SIFT unit 202 of the feature amount conversion unit 174 shown in FIG. 22 is initialized. This process is performed only when the inverse SIFT unit 202 is included.

Again, returning to the tracking process shown in FIG. 29, erasure of the unnecessary segments shown in step S295 of the flow in FIG. 29 will be described.

By the processes in steps S291 to S294, the end is determined in one segment being created, and the other segment being created is rejected. The erasure of the unnecessary segments is to erase the segments and to preclude the segments from the subsequent tracking.

Figure 61:
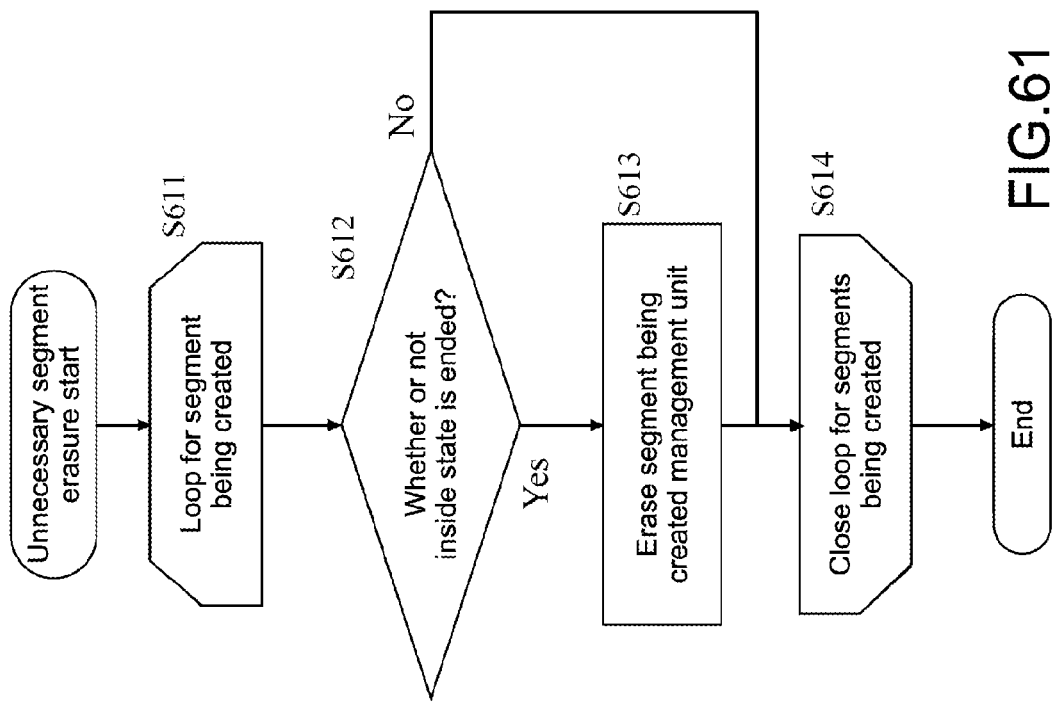
FIG. 61 A flow chart for showing a process sequence of an unnecessary segment erasing process.

The erasure of the unnecessary segments will be described in detail referring to the flow chart shown in FIG. 61.

Steps S611 to S614 are a loop for the segment being created, i.e., a loop for the management unit 171 for the segment being created in the tracking unit 165 shown in FIG. 18.

In step S612, it determines whether or not the inside state of the segment being created is ended. The end state is any of three states of the state "F" (the end is determined before the filter estimation), the "K" (the end is determined after the filter estimation) or the sate "L" (the end is determined before the filter estimation) in FIG. 19.

If the inside state is any of the three states, it proceeds to step S613, and the segment being created is erased. If the inside state is not in the end state, step S613 is skipped. Finally, the loop is closed in step S614.

The description about the tracking process (FIG. 29) and the front end process (step S254 in the flow of FIG. 25) is ended.

Next, returning to the voice process described referring to FIG. 25, the description about the segment registration process in step S253 skipped in FIG. 25 is described. The beginning or end registration of the segments is performed by information added externally. If the beginning or end is detected by the voice segment detection method where the assessment time is unnecessary among the voice segment detection methods, this process is executed.

The segment registration process will be described referring to the flow chart shown in FIG. 62.

In step S621, it determines whether or not the beginning is notified. The "beginning is notified" by the voice segment detection method where the assessment time is unnecessary. Specifically, it is an event occurred when the beginning of the segment is detected by the voice segment detection process based on the hand image executed in step S265 in the flow of FIG. 26. If the notification is present, it proceeds to step S622. If the notification is not present, step S622 is skipped. The beginning register process in step S622 will be described later.

The "end is notified" in step S623 is an event occurred when the end of the segment is detected by the method where the assessment time is unnecessary such as the method of detecting the hand image, as described above. If the notification is present, it proceeds to step S624. If the notification is not present, step S624 is skipped. The end register process in step S624 will be described later.

Next, the "beginning registration process" in step S622 will be described referring to the flow chart shown in FIG. 63. This process is similar to the process executed in the "new segment creation" described earlier referring to FIG. 57 except that set values are different in a part of the members.

Figure 57:
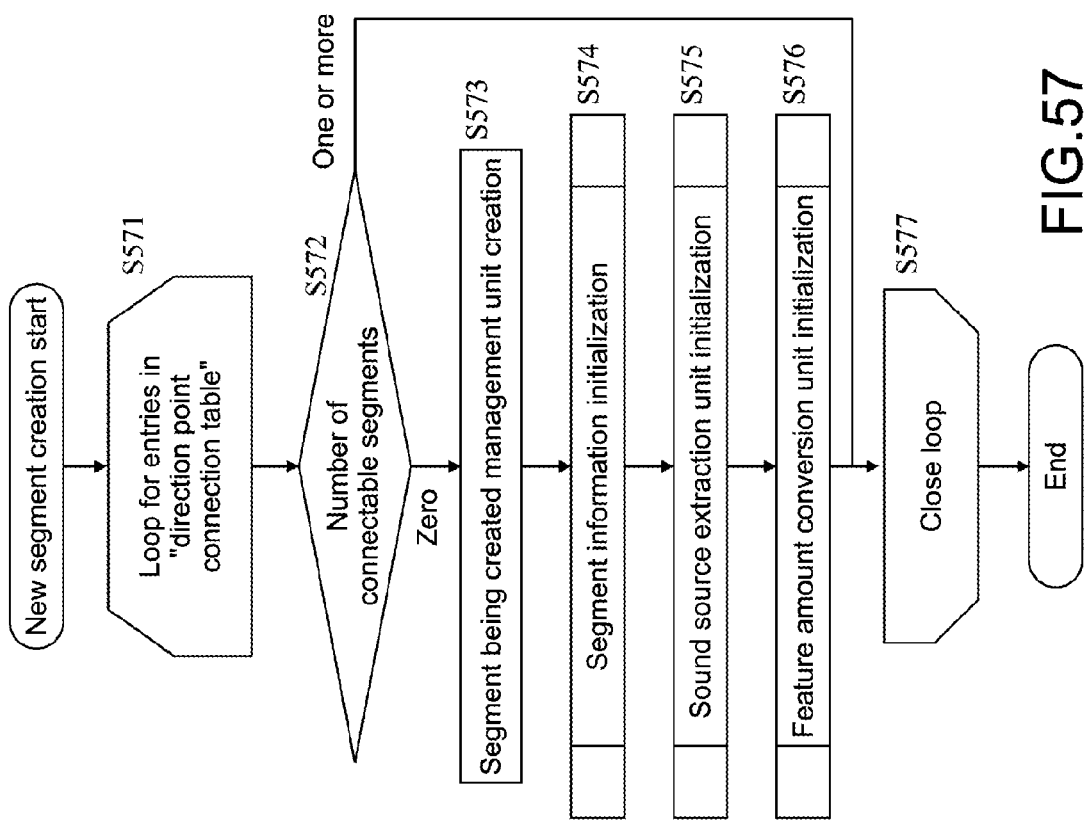
FIG. 57 A flow chart for showing a process sequence of a new segment creation process.

In step S631, the segment being created management unit is created as in step S573 of FIG. 57. This is a process to create the segment being created management unit corresponding to one segment being created (the management unit 171 for the segment being created of the tracking unit 165 shown in FIG. 18). This module has a segment information 172, a sound source extraction unit 173 and a feature amount conversion unit 174 as shown FIG. 18.

In step S632, for example, the time stamp added to the notification transmitted from the hand image process unit 223 (FIG. 24) in the image process unit within the voice recognition apparatus 150 in FIG. 15 is converted into the frame number. The information within the observation signal buffering unit (FIG. 17) is referred, as necessary. The frame number determined here is represented as frame determination information [frame_idx].

Figure 58:
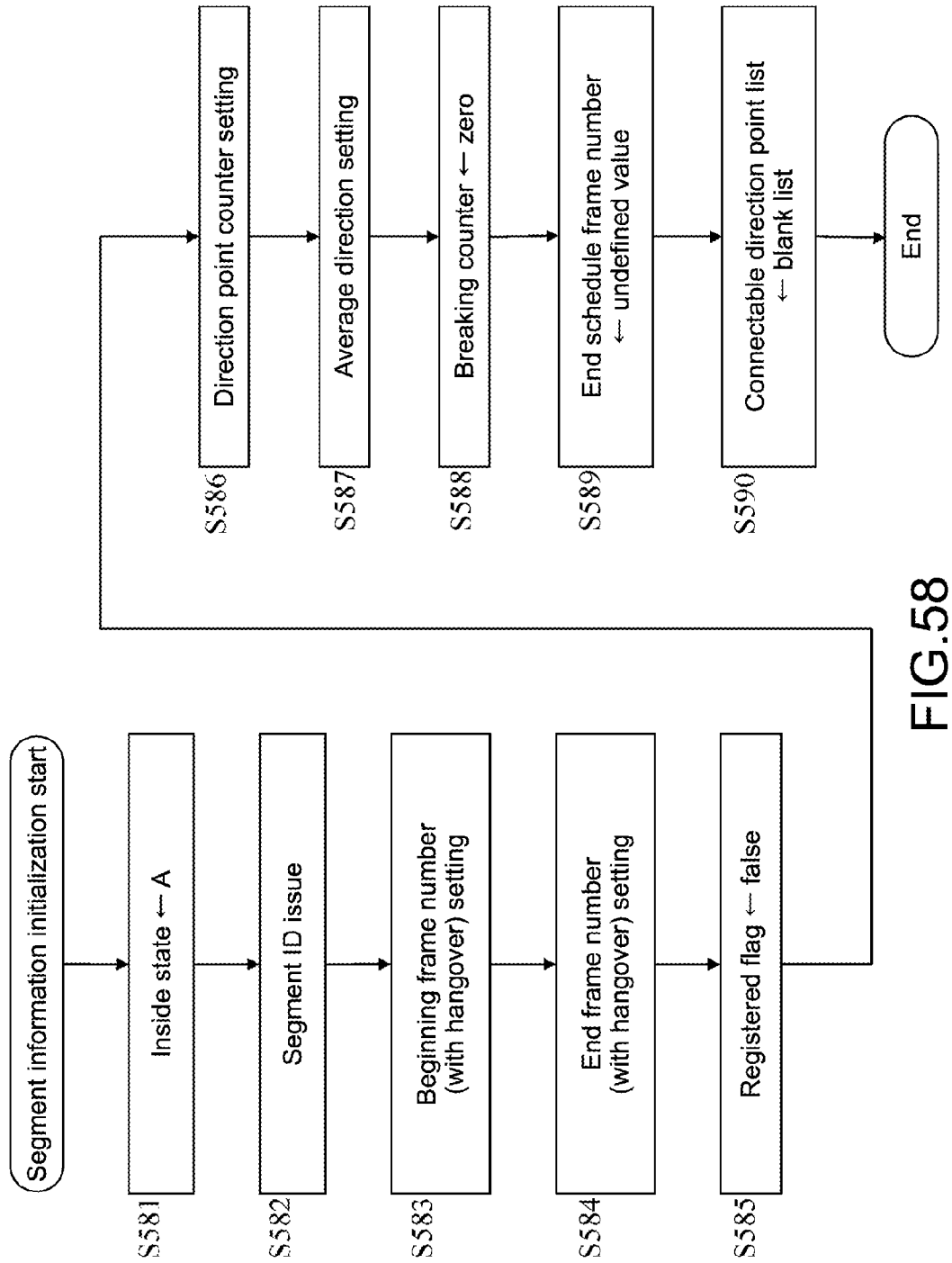
FIG. 58 A flow chart for showing a process sequence of a segment information initializing process.

Step S634 is the same process as step S581 in the segment information initialization process described referring to FIG. 58. To the inside state ((1) in FIG. 20), the state "A" is assigned.

Step S635 is the same flow as step S582 in FIG. 58. To the segment ID ((2) in FIG. 20), the predetermined identification value is assigned. For example, a value of the segment ID previously issued plus 1 may be used.

Note that the segment ID is increased by one every time step S582 or step S635 is executed.

In step S635, the beginning frame number is set. Dissimilar to the process in step S583 of FIG. 58, to both of the beginning frame number((3) in FIG. 20) and the beginning frame number with hangover ((4) in FIG. 20), the frame number determined in step S632, [frame_idx], is assigned.

In step S636, similar to the process in step S584 of FIG. 58, the end frame number ((5) in FIG. 20) and the end frame number with hangover ((6) in FIG. 20) are set. Specifically, to both, the current frame number 175 (see FIG. 18) is assigned.

In step S637, dissimilar to step S585 of FIG. 58, a value (true) showing that it is registered is assigned to the registered flag ((7) in FIG. 20), so as to represent that the segment being created by the beginning registration process has the "registered" attribute.

The processes in steps S638 to S642 are the same processes in step S586 to step S590 of the flow in FIG. 58, respectively. The segment being created by the beginning registration process is subjected to the end registration process. However, the end registration process is not yet invoked at this point of time. In step S641, an undefined value is assigned to the frame number to be ended ((11) in FIG. 20).

Figure 59:
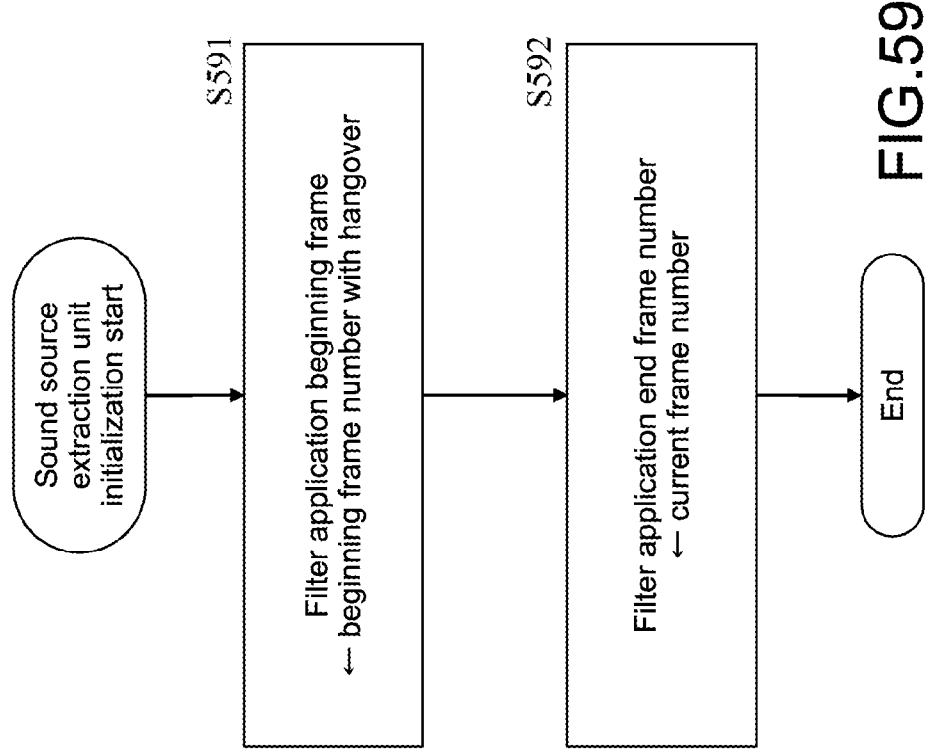
FIG. 59 A flow chart for showing a process sequence of a sound source extraction unit initializing process.
Figure 60:
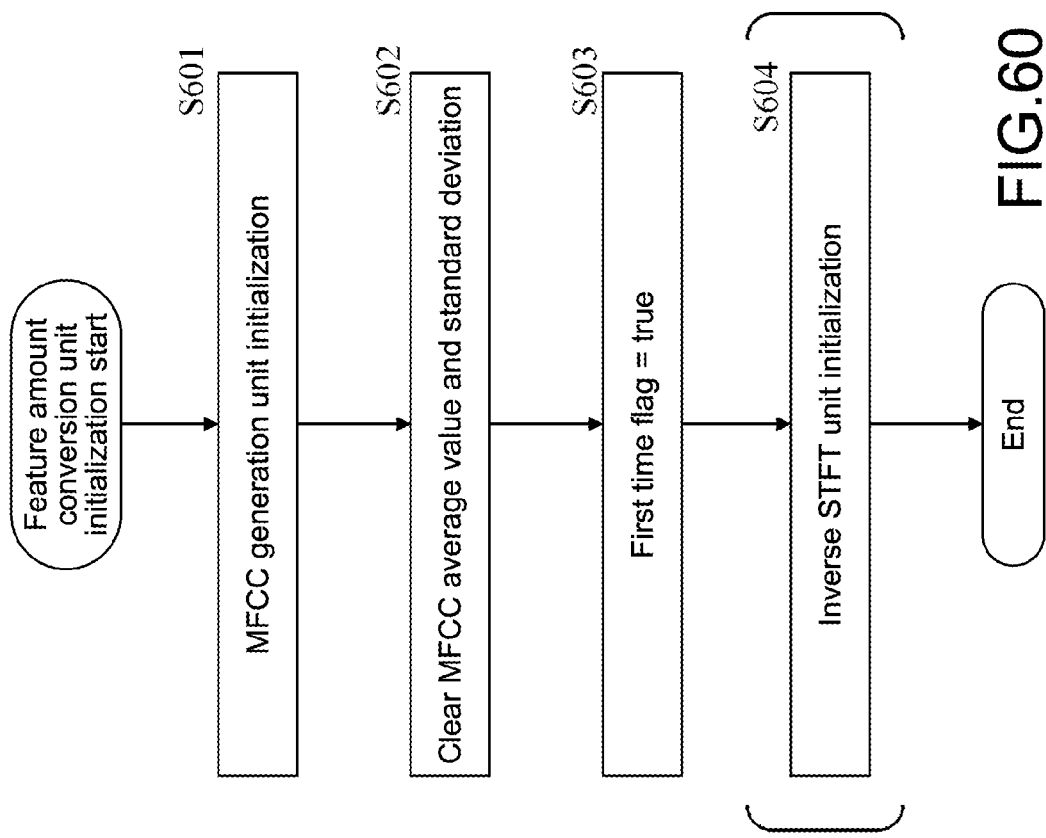
FIG. 60 A flow chart for showing a process sequence of a feature amount conversion unit initializing process.

At the end, initialization of the sound source extraction unit in step S643 and initialization of the feature amount conversion unit in step S644 are the same as the processes in step S575 and step S576 described referring to FIG. 57, i.e., the initialization of the sound source extraction unit described referring to FIG. 59 and the initialization of the feature amount conversion unit described referring to FIG. 60.

Figure 64:
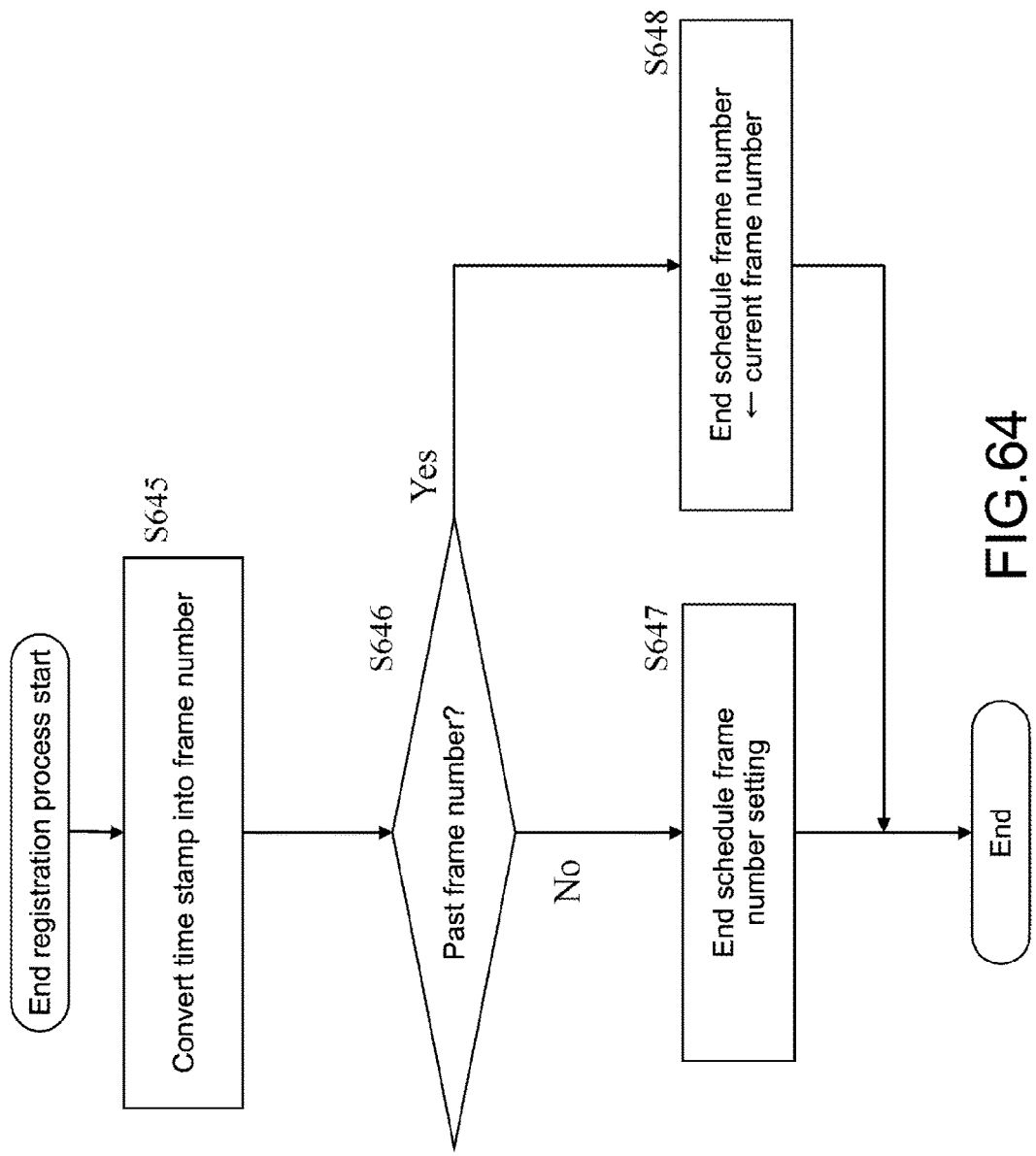
FIG. 64 A flow chart for showing a process sequence of an end registration process.

Next, the segment registration process in FIG. 62 in the end registration process in step SS624 will be described referring to the flow chart shown in FIG. 64.

Figure 63:
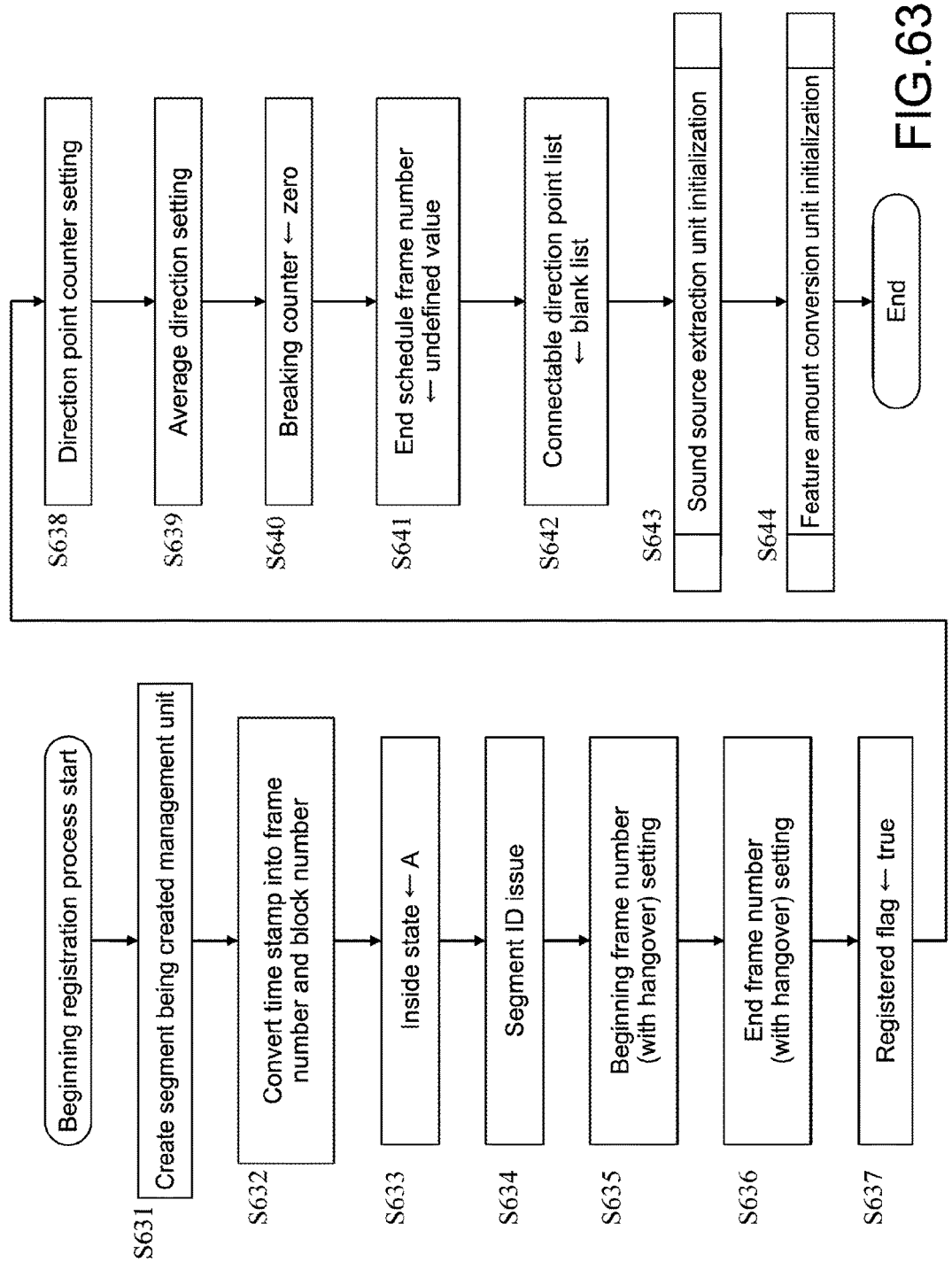
FIG. 63 A flow chart for showing a process sequence of a beginning registration process.

In step S645, the time stamp added to the notification transmitted from the hand image process unit 223 (FIG. 24) is converted into the frame number, similar to the process in step S632 of the flow shown in FIG. 63. The frame number determined here is [frame_idx].

In step S642, [frame_idx] set in step S641 is compared with the current frame number 175 held by the tracking unit 18 shown in FIG. 18. If [frame_idx] is smaller, it is regarded that the time stamp in the past is designated as the end, and it branches to step S644. If not, it is regarded that the time stamp at present or in the future is designated, it branches to step S643.

If it branches to step S643, [frame_idx] is assigned to the frame number to be ended ((11) in FIG. 20). In this way, when it reaches the predetermined frame number as the tracking process proceeds, the tracking of the segment is adequately ended.

On the other hand, it branches to step S644, the current frame number 175 (see FIG. 18) is assigned to the frame number to be ended ((111) in FIG. 20). This means that if the time stamp in the past is designated as the end, it is replaced with "immediately end".

The description about the segment registration process is ended.

4-5. Process of Voice Recognition Unit

Again, returning to the voice process in FIG. 25, the voice recognition process in step S255 will be described in detail referring to the flow chart shown in FIG. 65. This process is different from the general voice recognition, and has a feature that the voice is recognized sequentially and parallelly for overlapped segments using a plurality of decoders.

Figure 65:
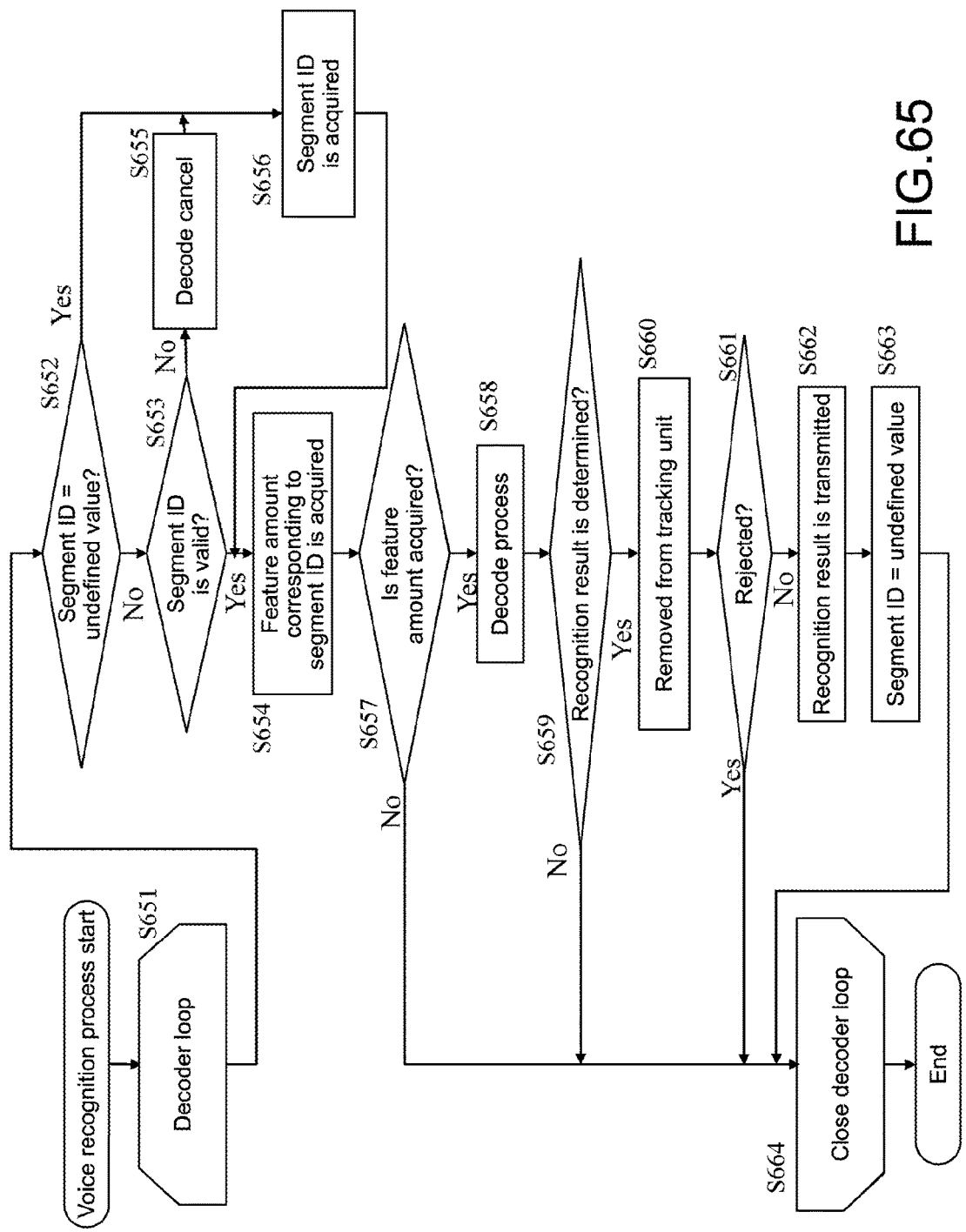
FIG. 65 A flow chart for showing a process sequence of a voice recognition process.

Note that the flow chart in FIG. 65 functions with even one decode. In addition, even though it is the parallel process, a multithread system or the like is unnecessary, and a sequential decode process may be executed per decoder in the order.

Steps S651 to S664 are a loop for each decoder. In other words, each of the decoders 212-1 to n in the voice recognition unit 156 performs the process in steps S652 to 663 shown in FIG. 23.

The respective decoders hold segments ID213-1 to n as shown in FIG. 23 in order to show that the extraction result (feature amount) of which segment is decoded. In the initial state, an undefined value is assigned, and it shows that "it is not decoded in any segment".

In step S652, it is determined whether or not the segment ID held by the decoder has an undefined value. If the segment ID has an undefined value, it branches to step S656. If the segment ID has not an undefined value, it branches to step S653.

If it branches to step S653, it is determined whether or not the segment ID held by the decoder is valid. The segment ID is valid if the feature amount is generated or may be generated in the future corresponding to the segment. Specifically, it is checked whether or not the segment specified by the segment ID is present within the management unit 171 for the segment being created in the tracking unit 165 or within the extraction result buffering unit 166 of the front end unit 153 shown in FIG. 16. If the segment is present in at least one of them, it is determined that the segment ID is valid, and it branches to step 654. If no segment is present in any of them, it is determined that the segment ID is invalid, and it branches to step S655.

The process in step S655 is described in first. The branch in step S655 represents that the segment ID213 held by the decoder 212 of the voice recognition unit 156 shown in FIG. 23 is no more valid. It may be the case that the segment being decoded is rejected on the way. In this case, as the decode result on the way is unnecessary, the decode is cancelled. After cancelling, it proceeds to step S656.

Next, the process in step S656 is described. This process is to correspond a new segment to the decoder. For this purpose, all segments present within the extraction result buffering unit 166 of the front end unit 153 shown in FIG. 16 are ranked.

For example, if the extraction result buffering unit 166 has the same configuration as the extraction result buffering unit 135 shown in FIG. 13, the segment data stored in the buffers 135a to c shown in FIG. 13 is ranked by the following scales:

(Scale 1) The segment having the "registered" attribute has a priority. If there are a plurality of the segments having the "registered" attribute, the segment having the earliest beginning has a priority.

(Scale 2) As to the segment having no "registered" attribute, the segment having the end already determined has priority. If there are a plurality of the segments having no "registered" attribute, the segment having the earliest end has priority.

(Scale 3) As to the segment having the end not determined, the segment having the earliest beginning has a priority.

(Scale 4) The segment already corresponding to the decoder is excluded from ranking.

The top of the segments ranked by the above-described scales is corresponded to the decoder. In other words, the segment ID is assigned to the segment ID213 held by the decoder 212 of the voice recognition unit 156 shown in FIG. 23. Note that if all segments present in the extraction result buffering unit 166 are already corresponded to the decoders, an undefined value is assigned. This phenomenon is generated if the number of the decoders is greater than the number of the segments being created.

In step S656, after the segments are corresponded to the decoders, it proceeds to step S654.

In step S654, the feature amount of the segment corresponding to the decoder is taken out from the extraction result buffering unit 166. As a result, in the extraction result buffering unit 166, the feature amount corresponding to the segment ID is tentatively lost.

If it tries to acquire the feature amount about the segment ID not present in the extraction result buffering unit 166, or if an undefined value is assigned as the segment ID in step S656, there is no corresponding feature amount, which fails to acquire the feature amount.

Next, in step S657, it is determined whether or not the feature amount is successfully acquired in step S654. If it succeeded, it proceeds to step S658. If it failed, the subsequent processes are skipped, and it proceeds to step S664.

In step S658, the feature amount acquired in the step S654 is subjected to the decode process, i.e., the voice recognition process. Thereafter, in step S659, it is determined whether or not the recognition result is determined. The recognition result is determined in the following two cases:

(a) A case that the feature amount acquired in step S654 includes any special one showing the "segment determination".

(b) A case that recognition hypothesis held by the decoder is no more changed.

As the case (a) is already described (see the description about step S562 in FIG. 56), the case (b) is described here. The decoder holds a plurality of candidates of the recognition results, which are called as hypotheses. The decode process using the plural hypotheses is similar to that described in Japanese Patent Application Laid-open No. 2001-242883.

As the feature amount is sequentially inputted, the hypotheses is changed. Once the feature amount inputted exceeds the predetermined amount, the hypotheses may not change any more. Under the condition, the recognition result is regarded as determined.

In step S659, if the recognition result is already determined, it proceeds to step S660. If the recognition result is not yet determined, the subsequent processes are skipped, and it proceeds to step S664.

Next, the process in step S660 is described. In step S659, if the recognition result is regarded as determined in the case (b), the segment corresponding to the decoder still remains in the tracking unit 165. However, it is unnecessary to track the segment any more. Then, the segment where the recognition result is determined is removed from the tracking unit even if the end is not determined. When the recognition result is determined in the case (a), as the segment is already removed from the tracking unit by the "unnecessary segments are erased" (step S295 of the flow in FIG. 29), nothing is done in step S660.

In step S661, it is determined whether or not the recognition result thus generated is rejected. The reason why the rejection determination is performed is that the segment to be processed in the apparatus according to the present disclosure includes not only the speech of the target sound, but also the disturbing sound (including the voice and the non-voice) sounded. In order to determine whether or not the segment is the target sound or the disturbing sound, the score and the reliability degree provided upon the decode are used. If the it is determined as the disturbing sound, the recognition result at this time is rejected. In other words, the subsequent processes are skipped, and it proceeds to step S664. If it is determined as the target sound, it proceeds to step S662.

In step S662, the recognition result is transmitted to later step process unit 157 as shown in FIG. 23.

At this point, as this decoder is not corresponding to any segment, an undefined value is assigned to the segment ID (segment ID213 shown in FIG. 23) in step S663.

Finally, in step S664, the loop of the decoder is closed.

The descriptions about the voice recognition process and the voice process are entirely ended.

4-6. Process by Image Process Unit

Figure 66:
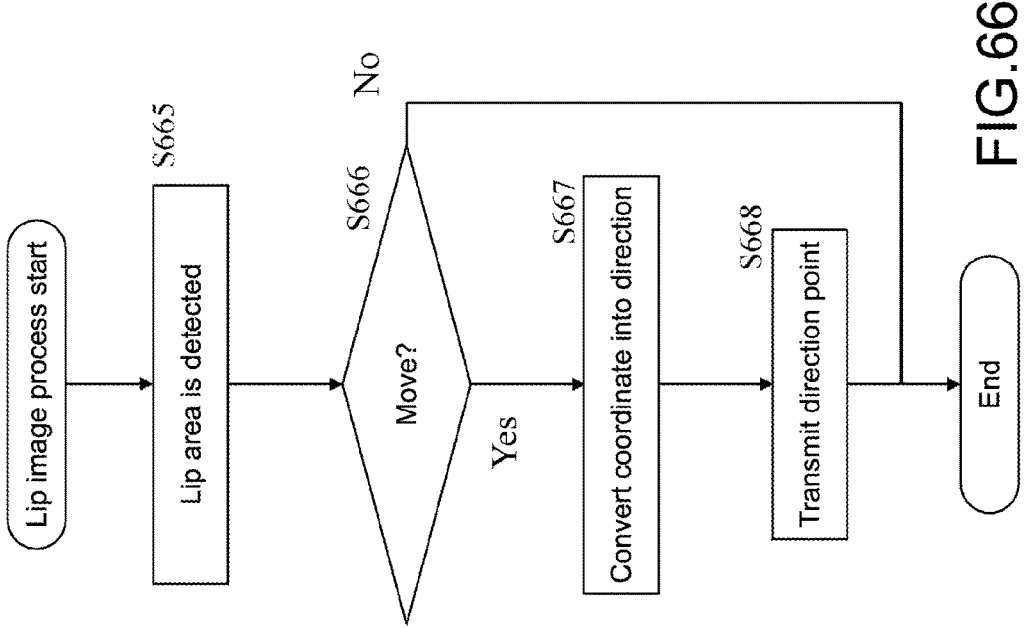
FIG. 66 A flow chart for showing a process sequence of a lip image process.

Next, returning to the image process described referring to FIG. 26, a lip image process in step S264 is described using the flow chart shown in FIG. 66.

This process is the speech segment detection using the lip image. To this process, the process described in Japanese Patent Application Laid-open No. 10-51889 can be applied, for example. In the below, only the outline is described.

Figure 24:
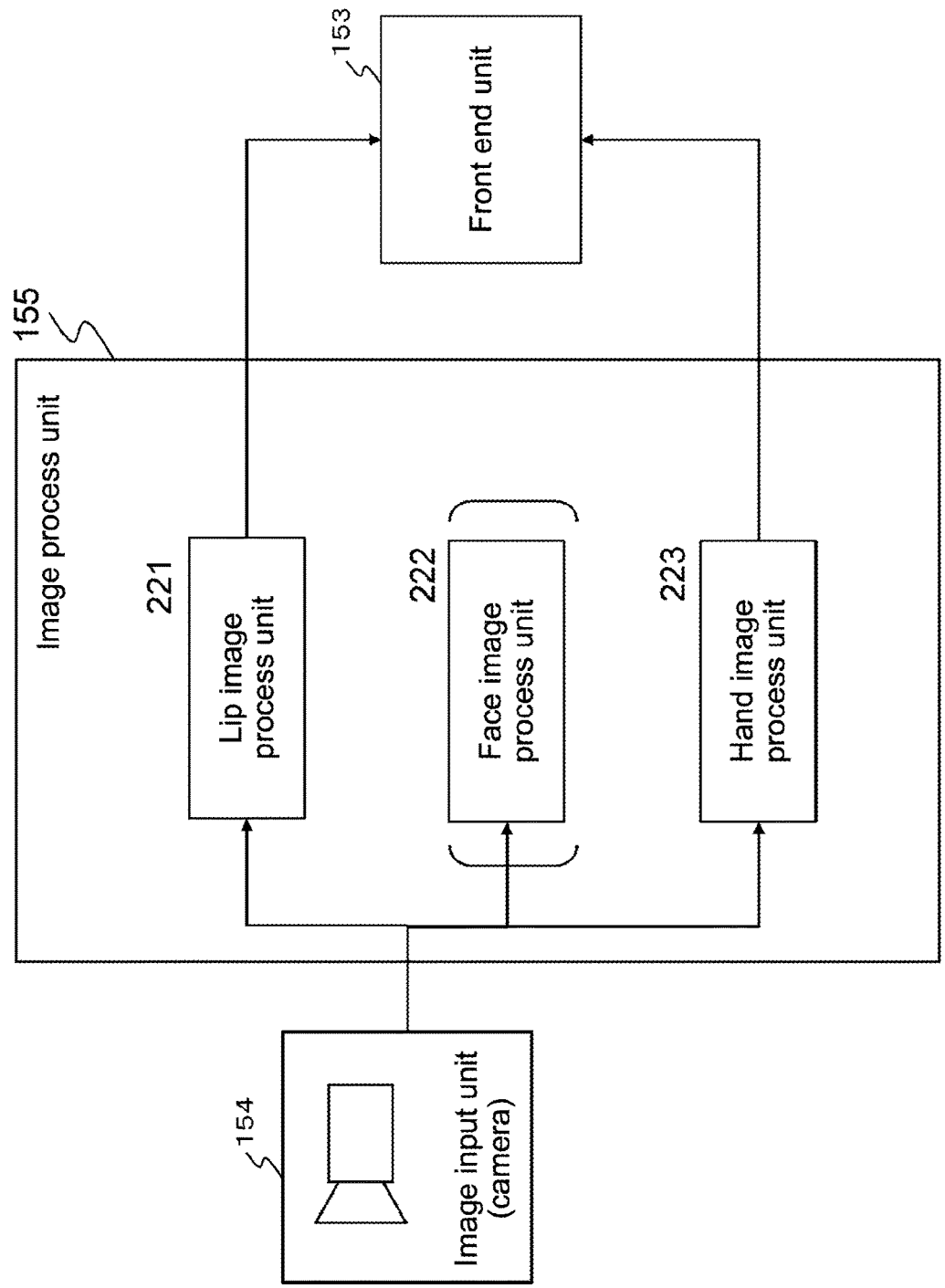
FIG. 24 A drawing for explaining an image process unit 155.

The lip image process unit 221 shown in FIG. 24 executes this process.

Firstly, in step S665, an area having a lip shape is detected from the input image inputted from the image input unit 154.

Next, in step S666, an update area detected from the former image frame is compared with the lip area detected from the image from this time to determine whether or not there is a movement. If it is determined that there is the movement, it proceeds to step S667. If it is determined that there is no movement or the lip area is not detected in step S665, the lip image process is ended.

In step S667, the coordinate of the lip area is converted into the sound source direction. In step S668, the direction point from the sound source direction is generated, and is transmitted to the front end unit 153.

Figure 67:
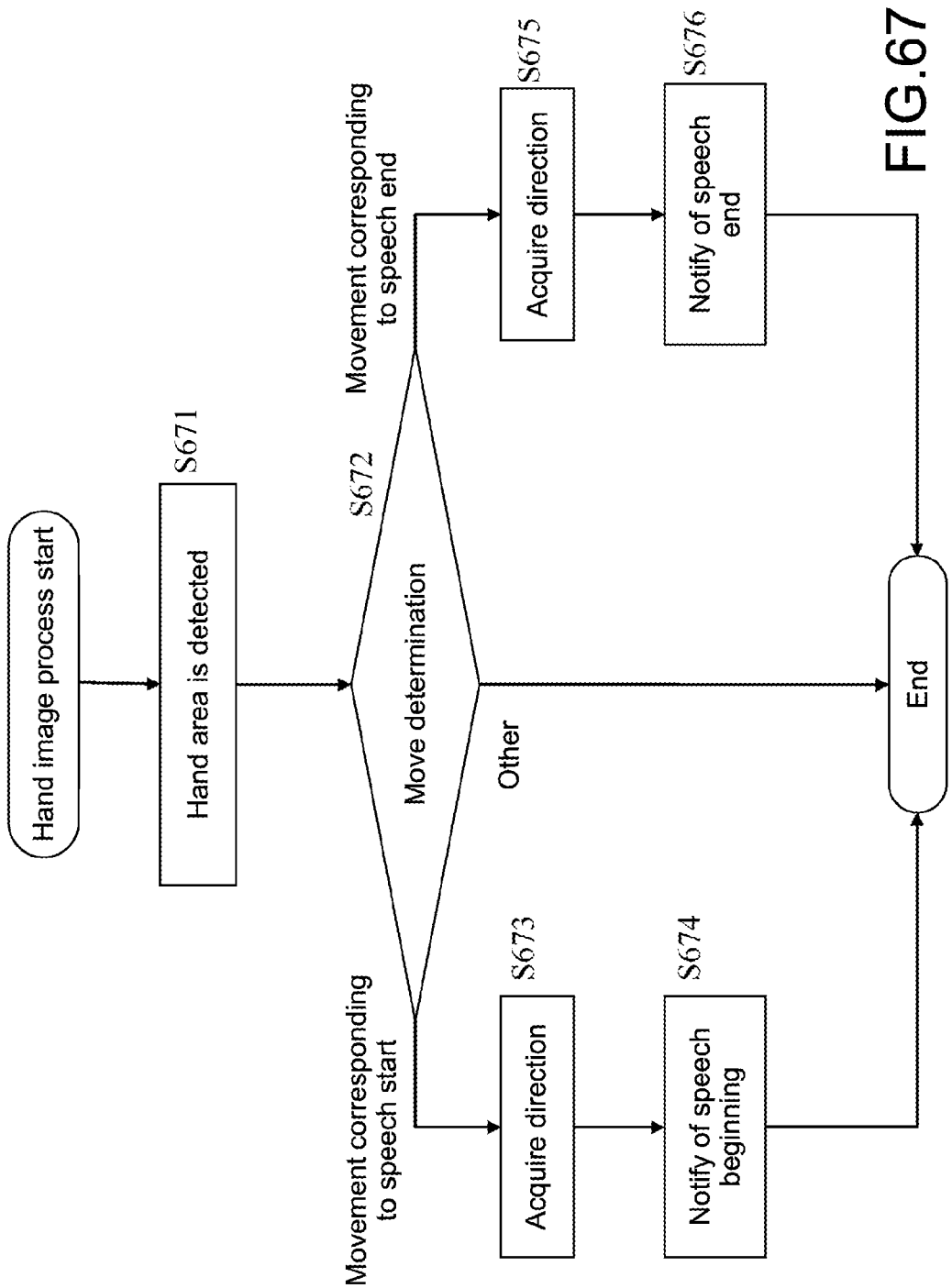
FIG. 67 A flow chart for showing a process sequence of a hand image process.

Next, a hand image process in step S265 in FIG. 26 is described using the flow chart shown in FIG. 67. This process is executed by the hand image process unit 223 of the image process unit 155 shown in FIG. 24. This is the process where if the hand shape is changed, it is determined that the speech is started or ended. Note that to the detection of the hand shape, the process described in Japanese Patent Application Laid-open No. 2012-203439 can be applied, for example.

In step S671, the hand area having the specific shape prescribed in advance as the information showing the start or end of the voice segment is detected from the input image inputted from the image input unit 154. The specific shape is Rock, Scissors or Paper, for example.

Next, in step S672, the hand area detected from the former image frame is compared with the hand area detected from the image from this time to determine whether or not it corresponds to the speech start or the speech end. For example, the setting is prescribed in advance: the change from Paper to Rock is the former, and the change from Rock to Paper is the latter, which are suggested to the user.

If the change in the shape of the hand area detected from the image corresponds to the movement of the speech start, it branches to step S673. If it correspond to the speech end, it branches to step S675. If it does not correspond to any movement or the hand is not detected in step S671, the hand image process is ended.

If it proceeds to step S673, the sound source direction is calculated. For example, the predetermined offsets (one offset is for a right hand, and the other offset is for left hand) are added in order to convert a coordinate of the hand area into a coordinate around the lip. The values are converted into the voice source direction similar to the process in step S667 described earlier in the flow in FIG. 66. Alternatively, the hand and the face are detected at the same time to determine a coordinate of the face nearest to the coordinate of the hand, and the values are converted into the sound source direction.

In step S674, using the sound source direction thus obtained and the time stamp added to the image, "the detection of the beginning of the speech" is notified to the front end unit 153.

Figure 62:
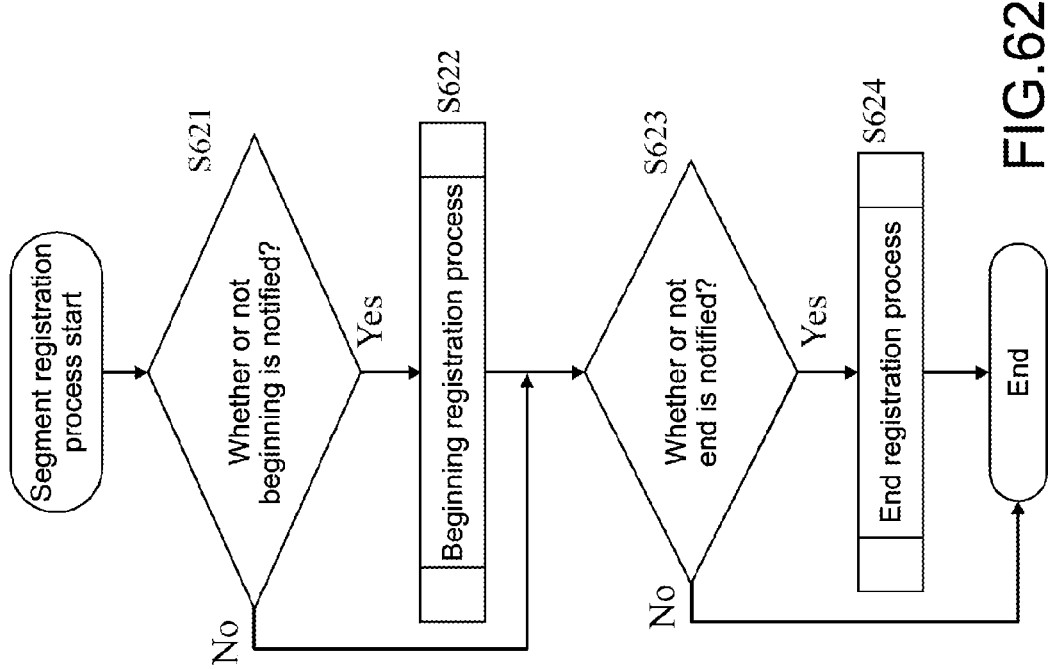
FIG. 62 A flow chart for showing a process sequence of a segment registration process.

The front end unit 153 receives the notification and performs the "beginning registration process" (in step S622 of the flow shown in FIG. 62).

On the other hand, if it proceeds to step S675, the sound source direction is also calculated similar to step S673. In step S676, using the sound source direction obtained and the time stamp added to the image, "the detection of the beginning of the speech" is notified to the front end unit 153.

The front end unit 153 receives the notification and performs the "end registration process" (in step S624 of the flow shown in FIG. 62).

The descriptions about the image process and all processes are ended.

5. Alternative Embodiments

Next, alternative embodiments of the voice recognition apparatus according to the present disclosure will be described.

The following two alternative embodiments are described in order.
Alternative Embodiment 1: Configuration Embodiment using Meaning Estimation instead of Voice Recognition
Alternative Embodiment 2: Configuration Embodiment using Hand Pointer as Voice Detection Method

5-1. Alternative Embodiment 1

Configuration Embodiment Using Meaning Estimation Instead of Voice Recognition

Firstly, a configuration embodiment using a meaning estimation instead of the voice recognition is described.

The meaning estimation is to estimate a meaning or an intension of the speech instead of determining the word (or a word string) corresponding to the speech voice. The details of the meaning estimation process is disclosed in Japanese Patent Application Laid-open No. 2006-53203 and Japanese Patent Application Laid-open No. 2011-33680, for example. Hereinafter, the meaning estimation is described briefly.

A set including a dictionary, a language model and a decoder is called as a task. By preparing a plurality of the tasks, a meaning estimation device calculates a score using each task for one speech. The task providing the highest score is defined as the meaning (intention) of the speech.

For example, in operating a television by a voice, the following tasks are prepared.
Task 1: A task of recognition of a speech relating to an increase of a volume of a sound.
(Example) "Increase a volume", "Increase a sound", "Increase a volume level" or the like
Task 2: A task of recognition of a speech relating to turn off
(Example) "Turn off", "Switch off", "Shut off television" or the like If the speech of the user is "Increase the volume", for example, the task 1 is likely to issue a higher score. Then, it considers that the speech represents "an increase of the volume". Similarly, if the speech is "Switch off", the task 2 issues the higher score. It considers that the speech represents "turn off".

As other task, a task covering a very large range such as a phonemic typewriter is prepared, which is set as a task 3. If the user's speech is different from any of the above-described task 1/task 2, the task 3 is likely to issue a higher score. In this case, the speech is considered as "non-related speech". Similarly, as to a sound that is not a voice, the task 3 is likely to issue a higher score. Thus, using the meaning estimation device, the sound that is not related to the user can be rejected.

The voice recognition unit 156 of the voice recognition apparatus 150 according to the present disclosure shown in FIG. 15 can be configured to execute the meaning estimation. In this regard, a new configuration is necessary. To execute the meaning estimation, a configuration embodiment that the voice recognition unit 156 of the voice recognition apparatus 150 according to the present disclosure shown in FIG. 15 is to execute the meaning estimation is described referring to FIG. 68.

Figure 68:
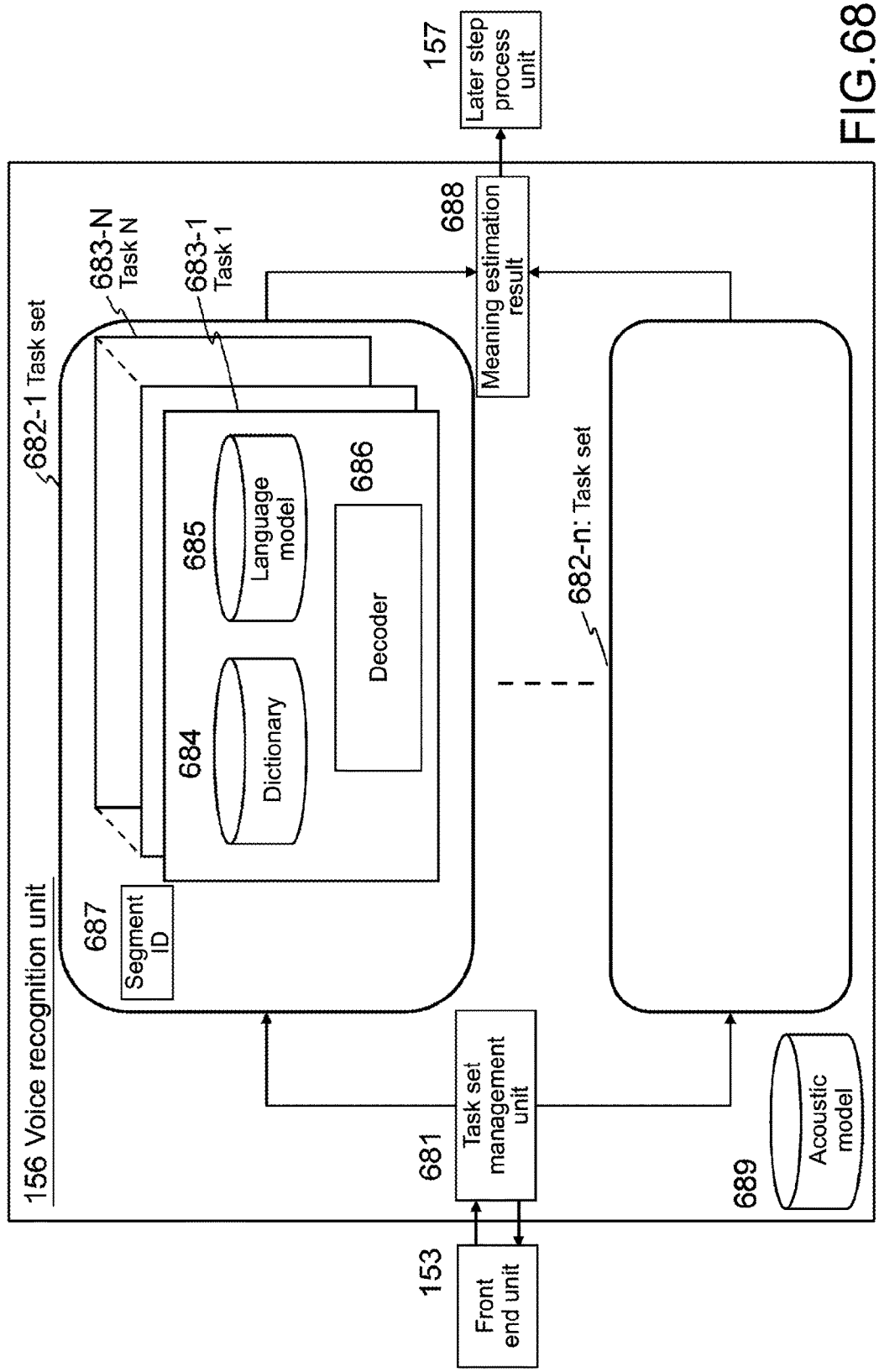
FIG. 68 A drawing for explaining a configuration of a voice recognition unit.

The voice recognition unit 156 shown in FIG. 68 is the voice recognition unit for executing the meaning estimation, and can be used instead of the former voice recognition unit 156 shown in FIG. 23.

As shown in FIG. 68, a set of a dictionary 684, a language model 685 and a decoder 686 is called as a task 683. A set of a plurality of different tasks 683-1 to N is called as a task set 682.

Japanese Patent Application Laid-open No. 2006-53203 and Japanese Patent Application Laid-open No. 2011-33680 use only one task set. In contrast, the present disclosure uses a plurality of task sets. In the embodiment shown in the figure, an n number of task sets 682-1 to n is included.

This corresponds to a configuration that a plurality of decoders are used as described earlier in FIG. 23, i.e., to the configuration having the decoders decoder 212-1 to n shown in FIG. 23.

As shown in FIG. 68, in order to represent which segment is being decoded for each of the task sets 682-1-n, a segment ID687 is held. Then, in order to feed extraction results (feature amounts) sequentially generated from the segment being created to each task set, a task set management unit 681 is prepared. This corresponds to the decode management unit 211 in the configuration shown in FIG. 23. To the task set management unit 681, the front end unit 153 is connected.

To the task set management unit 681, the following information is inputted similar to the decode management unit 211 shown in FIG. 25:

a feature amount outputted from the extraction result buffering unit 166 (the sound source extraction result generated by the tracking unit 165), priority information that is a ranking result in the segment outputted from the ranking unit 167, and segment update information such as a lost segment (or a rejected segment) outputted from the tracking unit 165.

The task set management unit 681 requests the extraction result buffering unit 166 to output the feature amount in the segment in the order of high priority based on the priority information of the voice segment inputted from the ranking unit 165, receives the feature amount of the segment corresponding to the request, and sends it to decoders 682-1 to n. In addition, the task set management unit 681 inquires whether or not the segment being decoded at present is invalid (lost or rejected) to the tracking unit 165, and cancels the corresponding decode, if invalid.

Outputs from the respective task sets 682-1 to n are meaning estimation results 688. The meaning estimation results 688 are sent to the later step process unit 157. As each decoder 686 within each task set 682 can generate a word string as the recognition result, the word string may be sent to the later step process, as necessary. Note that only one acoustic model 689 is held within the voice recognition unit 156.

The dictionary 684 and the language model 685 may be shared by a plurality of the task sets, as necessary. For example, if a task 1 included in a task set "a" and a task 1 included in a task set "b" use the same dictionary and the language model, the both tasks 1 can share the same dictionary and the language model. By sharing between the tasks, an increase in the memory use amount can be limited as low as possible, even if a plurality of the task sets is prepared.

If the voice recognition unit for executing the meaning estimation process shown in FIG. 68 is used, the sequence of the voice recognition process and the sequence described in the earlier embodiment (FIG. 65) are partly changed.

Change points are described.

Change point 1. "decoder loops" in steps S651 to S664 are changed to "a loop of a task set"

Change point 2. "recognition results" in step S659 and step S662 are changed to "meaning estimation results".

These points are changed. Other sequence is processed in accordance with the sequence shown in FIG. 65.

Advantages of Alternative Embodiment 1 utilizing the voice recognition unit for executing the meaning estimation are:

the meaning estimation device can be used under a noisy environment, and the non-related speech and the disturbing sound are easily rejected by preparing the tasks covering the large range.

The description about Alternative Embodiment 1 is ended.

5-2. Alternative Embodiment 2

Configuration Embodiment Using Hand Pointer as Voice Detection Method

Next, as Alternative Embodiment 2, a configuration embodiment using a hand pointer as the voice detection method will be described.

The hand pointer herein means a technology for moving a pointer by catching a user's hand movement with a camera, and is replaced with a hand pointer. In the present disclosure, as the voice segment detection method, there can be used a method of determining whether or not the hand pointer points a specific area on a screen.

Figure 69:
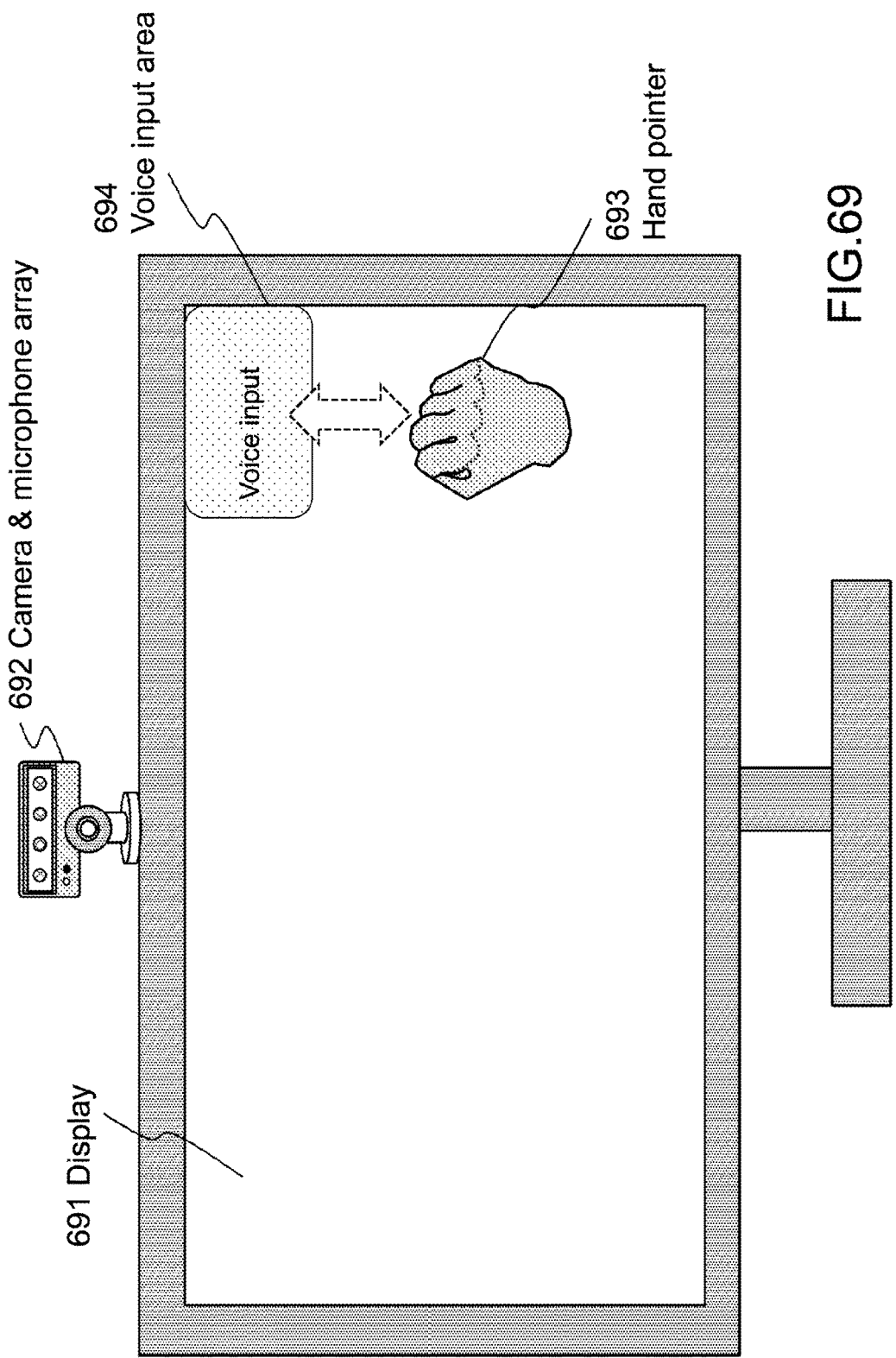
FIG. 69 A drawing for explaining an illustrative configuration utilizing a hand pointer.

FIG. 69 shows a configuration embodiment of a television system as an information process apparatus equipped with the voice recognition apparatus utilizing a hand pointer for the voice segment detection.

The television system has a display 691. On the display 691, a hand pointer 693, a voice input area 694 and a variety of information are displayed. On a display apparatus, a device where a camera and a microphone array are unified (camera & microphone array 692) is disposed. Using this, an image and a voice of a user in front of the display are acquired.

The hand pointer 693 acquires the user's hand movement with the camera of the camera & microphone array 692, and is changed its position along with the user's hand movement. In other words, the hand pointer is like a mouse pointer where the hand can be used instead of the mouse in PC. If the user desires to input the voice with certainty, the hand pointer is moved to inside of the voice input area 694 and then the speech is started. After the speech is ended, the and pointer is moved to outside of the voice input area 694.

Next, the voice segment detection process using the hand pointer 693 and the voice input area 694 will be described referring to the flow chart shown in FIG. 70. The hand pointer can be used instead of the voice segment detection based on the hand image in the above-described embodiments, for example.

In step S701, the hand area is detected from the camera captured image. Once the hand area is detected, its coordinate is converted into a coordinate of the hand pointer 693 on the screen, and the hand pointer 693 is displayed on the position in step S702.

Next, it is determined whether or not the position of the hand pointer 693 is inside of the voice input area 694 on the screen in step S703. If the position is inside, it branches to step S704. If it is outside, it branches to step S707.

In step S704, it is determined whether or not the hand pointer 693 enters the voice input area 694 for the first time. If the former position of the hand pointer 693 is inside of the voice input area 694, it is not the first time and the process is ended. If the former position is outside of the voice input area 694, it is the first time and it proceeds to step S705.

If it proceeds to step S705, the sound source direction is calculated. For example, similar to the process in step S673 described earlier referring to the flow in FIG. 67, the hand and the face are detected at the same time. A coordinate of the face nearest to a coordinate of the hand is determined, and its value is converted into the sound source direction.

In step S706, the sound source direction thus obtained and the time stamp added to the image are used to notify the front end unit 153 of "the detection of the beginning of the speech".

The front end unit 153 receives the notification, and performs the beginning registration process (step S622 of the flow shown in FIG. 62).

On the other hand, if it proceeds to step S707, it is determined whether or not it is the first time similar to the process in step S704. If the former position of the hand pointer 693 is inside of the voice input area 694, it is outside of the voice input area 694 for the first time. It proceeds to step S708. If the former position is also outside of the voice input area 694, it is not the first time and the hand image process is ended.

If it proceeds to step S708, the sound source direction is calculated similar to step S705.

In step S709, the sound source direction thus obtained and the time stamp added to the image are used to notify the front end unit 153 of "the detection of the end of the speech".

The front end unit 153 receives the notification and performs the end registration process (step S624 shown in FIG. 62).

Figure 70:
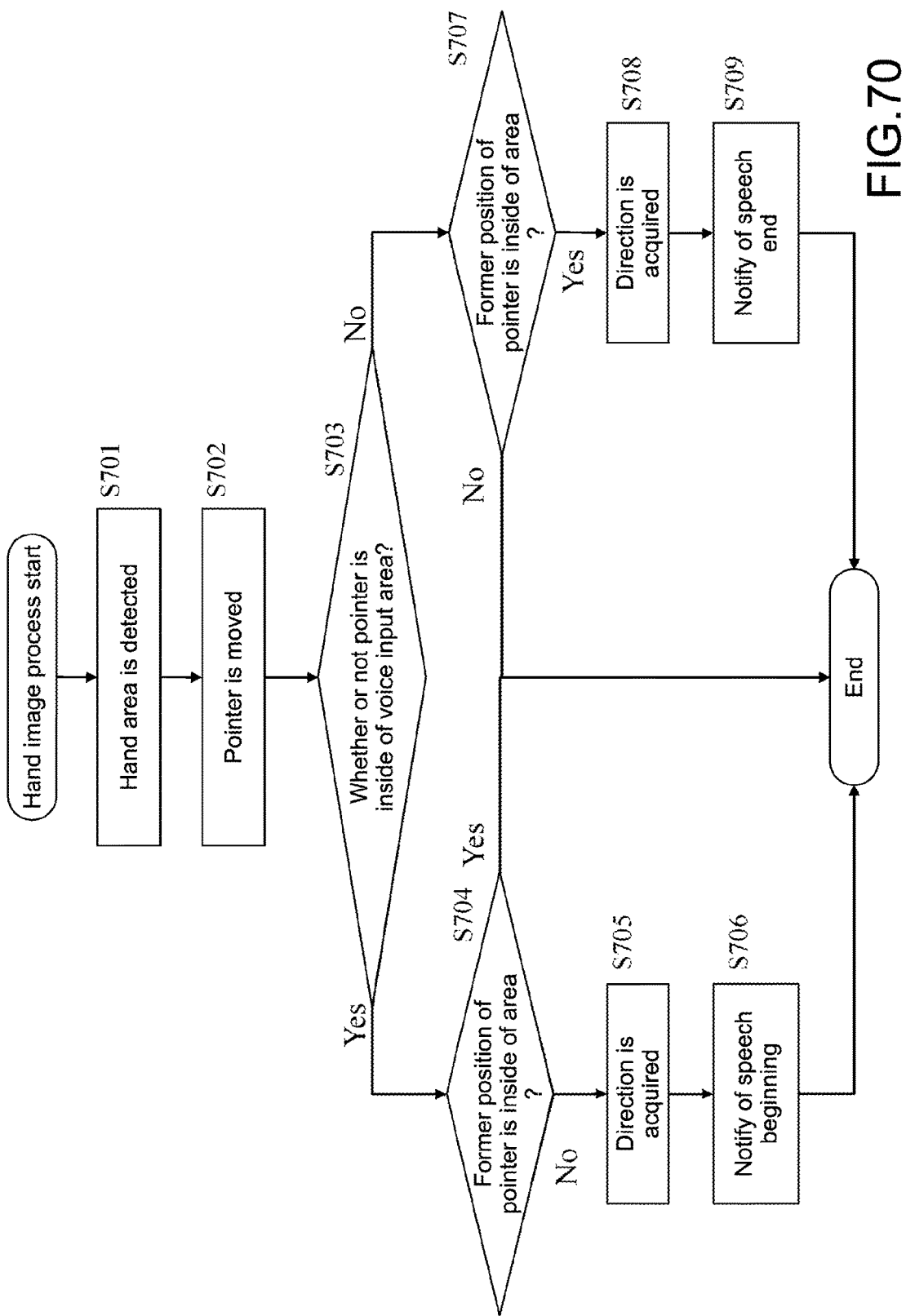
FIG. 70 A flow chart for showing a process sequence of a hand image process.

Note that in this Alternative Embodiment, it is assumed that the process in accordance with the flow in FIG. 70, i.e., the voice segment detection method using the hand pointer and the voice input area, is used instead of the process in accordance with the flow in FIG. 67, i.e., the voice segment detection method using the change in the hand shape. However, both methods are used in combination. In this case, the hand image process unit 223 of the image process unit 155 in FIG. 24 executes the process shown in FIG. 67 and the process shown in FIG. 70.

The description about Alternative Embodiment 2 is ended.

6. Summary of Features and Advantages about Configuration and Process of Voice Recognition Apparatus According to Present Disclosure Hereinafter, features and advantages about the configuration and the processes of the voice recognition apparatus according to the present disclosure are summarized.

1. One of the features of the voice recognition apparatus according to the present disclosure is that the voice segment detection and the sound source extraction are unified. In other words, at a time point when a fixed period of time is elapsed after the beginning of the speech is detected, the sound source extraction filter is estimated. From the time point to the speech end, the filter is applied to sequentially generate the extraction results.

As a result, before the speech end, the voice recognition process can be executed such that a delay from the speech end to the recognition result generation can be shortened.

In other words, the delay problem is solved while the extraction accuracy is kept high in the sound source extraction by the method of estimating the filter from the observation signal corresponding to the speech segment.

2. One of the features of the voice recognition apparatus according to the present disclosure is that the common tracking is performed utilizing a plurality of the voice segment detection methods. By the configuration, the multiple detection is avoided. On the other hand, as to the method where the assessment time is unnecessary for the beginning and the end, the dedicated beginning and end registration processes are performed, thereby preventing an increase of the end assessment time.

In other words, a plurality of the voice segment detection methods are used in combination to improve the detection accuracy as well as to prevent the increase of the end assessment time that is a part of the delay from the end of the speech to the generation of the recognition result.

3. One of the features of the voice recognition apparatus according to the present disclosure is that the present apparatus has a plurality of voice recognition decoders and that the decoders are corresponded to the speech segments based on a predetermined priority. By the configuration, even if the segments are overlapped temporally, a waiting time to generate a recognition result corresponding to the speech after the speech end can be shortest. As a result, the delay from the speech end to the recognition result generation can be shortened.

7. Summary of Configurations According to Present Disclosure

Hereinabove, referring to the specific embodiments, the present disclosure is described in detail. It is obvious that those skilled in the art can modify or substitute the embodiments without departing from the scope of the present disclosure. Specifically, the present disclosure is described for illustration only, and should not be construed in a limited way. The scope of the present disclosure should be determined by the claims.

The present disclosure may have the following configurations.

(1) A voice recognition apparatus, including:

a tracking unit for detecting a sound source direction and a voice segment to execute a sound source extraction process; and a voice recognition unit for inputting a sound source extraction result from the tracking unit to execute a voice recognition process, the tracking unit creating a segment being created management unit that creates and manages a voice segment per unit of sound source, each segment being created management unit created sequentially detecting a sound source direction to execute a voice segment creation process that sequentially updates a voice segment estimated by connecting a detection result to a time direction, creating an extraction filter for a sound source extraction after a predetermined time is elapsed from a voice segment beginning, and sequentially applying the extraction filter created to an input voice signal to sequentially create a partial sound source extraction result of a voice segment, the tracking unit sequentially outputting the partial sound source extraction result created by the segment being created management unit to the voice recognition unit, the voice recognition unit sequentially executing the voice recognition process to the partial sound source extraction result inputted from the tracking unit to output a voice recognition result.

(2) The voice recognition apparatus according to (1) above, in which the tracking unit executes a voice segment creation process to connect collectively a plurality of sound source direction information detected in accordance with a plurality of different methods to a time direction in each segment being created management unit.

(3) The voice recognition apparatus according to (1) or (2) above, in which the tracking unit immediately executes beginning or end determination process if it detects that a user's sign detected from an input image from an image input unit represents beginning or end of a voice segment.

(4) The voice recognition apparatus according to any of (1) to (3) above, in which the segment being created management unit of the tracking unit creates an extraction filter for preferentially extracting a voice of a specific sound source from an observation signal by utilizing an observation signal inputted from a time before beginning of a voice segment to a time when a filter is created.

(5) The voice recognition apparatus according to any of (1) to (4) above, in which
the segment being created management unit of the tracking unit applies an extraction filter for preferentially extracting a voice of a specific sound source from an observation signal, estimates a whole dead corner space filter that attenuates a voice of all sound sources included in the observation signal used in the estimation of the extraction filter, and subtracts a result of applying the whole dead corner space filter from a result of applying the extraction filter to remove a disturbing sound not included in the observation signal and to create a sound source extraction result.

(6) The voice recognition apparatus according to any of (1) to (5) above, in which
the segment being created management unit of the tracking unit changes a mask that decreases a transmittance of the observation signal for each frequency and each time as a proportion of a sound other than a target sound is higher than a target sound in the observation signal corresponding to the segment being created, executes time frequency masking process that sequentially applies the mask to the observation signal, and extracts a sound source of the target sound.

(7) The voice recognition apparatus according to any one of (1) to (6) above, further including:
an extraction result buffering unit for temporary storing the sound source extraction result generated by the tracking unit; and
a ranking unit for determining a priority to output a plurality of the sound source extraction results corresponding to the respective sound sources stored in the extraction result buffering unit,
the ranking unit setting a priority of the sound source extraction result corresponding to the voice segment having the beginning or the end determined based on a user's explicit sign.

(8) The voice recognition apparatus according to (7) above, in which
the tracking unit sets a "registered attribute" in order to identify a voice segment set based on a speaker's explicit sign provided based on an image analysis, and
the ranking unit executes a process that sets a priority of the voice segment to which the registered attribute is set to high.

(9) The voice recognition apparatus according to (8) above, in which
the ranking unit determines a priority by applying the following scales:
(Scale 1) the segment having the attribute of "registered" has a priority, if there are a plurality of the segments having the attribute of "registered", the segment having the earliest beginning has a priority;
(Scale 2) as to the segment not having the attribute of "registered", the segment having the end already determined has a priority, if there are a plurality of the segments having the ends already determined, the segment having the earliest end has a priority;
(Scale 3) as to the segment having the end not determined, the segment having the earliest beginning has a priority.

(10) The voice recognition apparatus according to (7) above, in which
the voice recognition unit has a plurality of decoders for executing a voice recognition process, requests an output of a sound source extraction result generated by the tracking unit in accordance with availability of the decoders, inputs a sound source extraction result in accordance with the priority, and preferentially executes a voice recognition on a sound source extraction result having a high priority.

(11) The voice recognition apparatus according to (1) above, in which
the tracking unit creates a feature amount adapted to a form used in a voice recognition of the voice recognition unit in each segment being created management unit, and outputs the feature amount created to the voice recognition unit.

(12) The voice recognition apparatus according to (11) above, in which
the feature amount is a Mel-Frequency Cepstral Coefficient.

(13) The voice recognition apparatus according to (1) above, further including:
a sound input unit including a microphone array;
an image input unit having a camera;
a sound source direction estimation unit for estimating a sound source direction based on an inputted sound from the sound input unit; and
an image process unit for analyzing a sound source direction based on an analysis of an inputted image from the image input unit,
the tracking unit creating one integrated sound source direction information by applying sound source direction information created by the sound source direction estimation unit and sound source direction information created by the image process unit.

(14) The voice recognition apparatus according to (13) above, in which
the image process unit includes
a lip image process unit for detecting a movement of a speaker's lip area based on an analysis of an input image from the image input unit; and
a hand image process unit for detecting a movement of a speaker's hand area.

(15) The voice recognition apparatus according to (13) above, in which
the tracking unit
sets an "registered attribute" in order to identify a voice segment set based on a speaker's explicit sign inputted from the image process unit, and
performs a merge process between a voice segment having a registered attribute and a voice segment not having a registered attribute for integrating other voice segment into the voice segment having a registered attribute.

(16) The voice recognition apparatus according to (15) above, in which
the tracking unit
in the voice segment having a registered attribute, if sound source direction information is not inputted, direction information is automatically generated to execute a voice segment extension process.

(17) The voice recognition apparatus according to any one of (1) to (16) above, in which
the voice recognition unit is configured to
include a plurality of recognition tasks each being a pair of a dictionary having a vocabulary to be recognized and a language model, and
execute a meaning estimation process for searching a task most adaptable to a user's speech among a plurality of difference tasks.

(18) The voice recognition apparatus according to any one of (1) to (17) above, further including:
a configuration that a pointer is moved on a display unit by synchronizing with a speaker's hand movement provided based on an analysis of a captured image of the speaker, and beginning or end of a speech segment is determined depending on a movement of the pointer.

A voice recognition method executed by a voice recognition apparatus, the voice recognition apparatus, including:
a tracking unit for detecting a sound source direction and a voice segment to execute a sound source extraction process; and
a voice recognition unit for inputting a sound source extraction result from the tracking unit to execute a voice recognition process,
the tracking unit creating a segment being created management unit that creates and manages a voice segment per unit of sound source,
each segment being created management unit created
sequentially detecting a sound source direction to execute a voice segment creation process that sequentially updates a voice segment by connecting a detection result to a time direction,
creating an extraction filter for a sound source extraction after a predetermined time is elapsed from a voice segment beginning, and
sequentially applying the extraction filter created to an input voice signal to sequentially create a partial sound source extraction result of a voice segment,
the tracking unit
sequentially outputting the partial sound source extraction result created by the segment being created management unit to the voice recognition unit,
the voice recognition unit
sequentially executing the voice recognition process to the partial sound source extraction result inputted from the tracking unit to output a voice recognition result.

A program for executing a voice recognition method executed by a voice recognition apparatus, the voice recognition apparatus, including:
a tracking unit for detecting a sound source direction and a voice segment to execute a sound source extraction process; and
a voice recognition unit for inputting a sound source extraction result from the tracking unit to execute a voice recognition process,
the program allows
the tracking unit to create a segment being created management unit that creates and manages a voice segment per unit of sound source,
each segment being created management unit created
to sequentially detect a sound source direction to execute a voice segment creation process that sequentially updates a voice segment by connecting a detection result to a time direction,
to create an extraction filter for a sound source extraction after a predetermined time is elapsed from a voice segment beginning, and
to sequentially apply the extraction filter created to an input voice signal to sequentially create a partial sound source extraction result of a voice segment,
the tracking unit
to sequentially output the partial sound source extraction result created by the segment being created management unit to the voice recognition unit,
the voice recognition unit
to sequentially execute the voice recognition process to the partial sound source extraction result inputted from the tracking unit to output a voice recognition result.

In addition, a series of processes described in the specification can be executed by hardware, software or a configuration combining the both. In a case where the processes are performed using software, it is possible to install and execute a program recording the process sequence in the memory in the computer built into dedicated hardware, or to install and execute a program in a general-purpose computer capable of executing various types of a process. For example, it is possible to record the program on a recording medium in advance. Other Than installation onto a computer from a recording medium, it is possible to transmit a program through a network such as a LAN (Local Area Network) or the Internet and perform installation onto a recording medium such as a built-in hard disk or the like.

Here, each type of a process described in the specification may be performed in parallel or individually according to necessity or the process power of the apparatus performing the processes, without only being performed in time series according to the description. In addition, the system in the present specification is a logical group configuration of a plurality of apparatuses, and none of the apparatuses of the configuration are limited to being provided in the same housing.

INDUSTRIAL APPLICABILITY

As described above, according to the embodiment of the present disclosure, there is achieved an apparatus and a method for rapidly extracting a target sound from a sound signal where a variety of sounds are mixed generated from a plurality of the sound sources.

Specifically, there is a voice recognition unit including a tracking unit for detecting a sound source direction and a voice segment to execute a sound source extraction process, and a voice recognition unit for inputting a sound source extraction result from the tracking unit to execute a voice recognition process. In the tracking unit, a segment being created management unit that creates and manages a voice segment per unit of sound source sequentially detects a sound source direction, sequentially updates a voice segment estimated by connecting a detection result to a time direction, creates an extraction filter for a sound source extraction after a predetermined time is elapsed, and sequentially creates a sound source extraction result by sequentially applying the extraction filter to an input voice signal. The voice recognition unit sequentially executes the voice recognition process to a partial sound source extraction result to output a voice recognition result.

By the above-described configuration, it is possible to rapidly generate and output the voice recognition result without waiting for the detection of a voice segment end.

DESCRIPTION OF SYMBOLS 31 microphone array
32 camera
33 voice segment detection unit
34 sound source extraction unit
35 voice recognition unit
135 extraction result buffering unit
135 a to c buffer
137 voice recognition unit
139 decoder
150 voice recognition apparatus
151 sound input unit
152 AD converter
153 front end unit
154 image input unit
155 image process unit 156 voice recognition unit
157 later step process unit
158 time stamp generation unit
159 control unit
161 SIFT unit
162 voice/non-voice determination unit
163 sound source direction estimation unit
164 observation signal buffering unit
165 tracking unit
166 extraction result buffering unit
167 ranking unit
171 management unit for segment being created
211 decoder management unit
212-1 to n decoder
213 segment ID
216 acoustic model
217 dictionary
218 language model
219 recognition result
221 lip image process unit
222 face image process unit
223 hand image process unit
681 task set management unit
682-1 to n task set
683-1 to N task
684 dictionary
685 language model
686 decoder
688 meaning estimation result
691 display
692 camera & microphone array
693 hand pointer
694 voice input area

The invention claimed is:

1. A voice recognition apparatus, comprising:
a tracking unit configured to:
detect a voice segment from a plurality of voice segments of an observation signal input from a microphone;
set a first registered attribute to identify the voice segment based on an explicit sign of a speaker, wherein the explicit sign is provided based on an image analysis;
create a management unit, wherein the management unit is configured to:
set the voice segment by connection of a detection result of the voice segment to a time direction;
detect a sound source direction of a sound source;
update the set voice segment based on the detection of the sound source direction;
create an extraction filter configured to extract the sound source after a time has elapsed from a beginning of the voice segment;
apply the extraction filter to the observation signal;
change a mask that decreases a transmittance of the observation signal for each frequency and each time, wherein the mask is changed when a proportion of a sound other than a target sound is higher than the target sound in the observation signal;
execute a time frequency masking process for application of the changed mask to the observation signal;
extract the sound source based on the execution of the time frequency masking process; and
create a partial sound source extraction result of the voice segment, based on the application of the extraction filter to the observation signal and the extraction of the sound source by the execution of the time frequency masking process; and
output the partial sound source extraction result to a voice recognition unit;
the voice recognition unit is configured to:
input the partial sound source extraction result from the tracking unit; and
execute a voice recognition process on the partial sound source extraction result input from the tracking unit to output a voice recognition result; and
a ranking unit configured to:
determine a priority of the voice segment of the plurality of voice segments; and
output a plurality of sound source extraction results to the voice recognition unit based on the determined priority.

2. The voice recognition apparatus according to claim 1, wherein
the tracking unit is further configured to connect a plurality of sound source direction information detected based on a plurality of methods to the time direction.

3. The voice recognition apparatus according to claim 1, wherein
the tracking unit is further configured to execute one of a beginning determination process or an end determination process based on a detection of a sign of a user,
the detection of the sign of the user is detected from an input image, and
the sign of the user represents one of the beginning of the voice segment or an end of the voice segment.

4. The voice recognition apparatus according to claim 1, wherein the management unit is further configured to extract a voice of a specific sound source from the observation signal based on the created extraction filter.

5. The voice recognition apparatus according to claim 1, wherein the management unit is further configured to:
extract, based on the extraction filter, a voice of a specific sound source from the observation signal;
set a whole dead corner space filter configured to attenuate a voice of a plurality of sound sources included in the observation signal;
subtract a result of the set whole dead corner space filter from a result of the extraction filter; and
create the partial sound source extraction result based on the subtraction.

6. The voice recognition apparatus according to claim 1, further comprising an extraction result buffering unit configured to temporarily store the created partial sound source extraction result,
wherein the ranking unit is further configured to set the priority of the partial sound source extraction result of the voice segment having one of a beginning or an end that is determined based on the explicit sign of the speaker.

7. The voice recognition apparatus according to claim 1, wherein
the ranking unit is further configured to set the priority of the voice segment based on the first registered attribute.

8. The voice recognition apparatus according to claim 1, wherein
the voice segment having an earliest beginning has the priority, when the plurality of voice segments has the first registered attribute,
the voice segment with an earliest end has the priority, when a first set of voice segments of the plurality of voice segments has a second attribute, or the voice segment having the earliest beginning has the priority, when a second set of voice segments of the plurality of voice segments have undetermined ends.

9. The voice recognition apparatus according to claim 1, wherein
the voice recognition unit has a plurality of decoders for voice recognition, the voice recognition unit is further configured to:
request an output of the partial sound source extraction result,
input the partial sound source extraction result based on the priority, and
execute voice recognition on the partial sound source extraction result having a high priority among the plurality of sound source extraction results.

10. The voice recognition apparatus according to claim 1, wherein
the tracking unit is further configured to:
create a feature amount for a form used in a voice recognition of the voice recognition unit in the management unit, and
output the feature amount to the voice recognition unit.

11. The voice recognition apparatus according to claim 10, wherein the feature amount is a Mel-Frequency Cepstral Coefficient.

12. The voice recognition apparatus according to claim 1, further comprising:
a sound input unit including a microphone array;
an image input unit including a camera, wherein the image input unit is configured to analyze an input image;
a sound source direction estimation unit configured to estimate the sound source direction based on an input sound from the sound input unit; and
an image process unit configured to analyze the sound source direction based on the analysis of the input image, wherein
the sound source direction estimation unit is further configured to create first sound source direction information,
the image process unit is further configured to acquire second sound source direction information, and
the tracking unit is further configured to create one integrated sound source direction information based on application of the first sound source direction information and the second sound source direction information.

13. The voice recognition apparatus according to claim 12, wherein the image process unit includes:
a lip image process unit configured to detect a movement of a lip area of the speaker based on the analysis of the input image; and
a hand image process unit configured to detect a movement of a hand area of the speaker.

14. The voice recognition apparatus according to claim 12, wherein the tracking unit is further configured to:
set a second registered attribute to identify the voice segment set based on the explicit sign of the speaker;
merge a first voice segment having the second registered attribute and a second voice segment having an attribute other than the second registered attribute to integrate the second voice segment into the first voice segment having the second registered attribute.

15. The voice recognition apparatus according to claim 14, wherein the tracking unit is further configured to generate, in the voice segment having the second registered attribute, direction information for a voice segment extension.

16. The voice recognition apparatus according to claim 1, wherein
the voice recognition unit includes a plurality of recognition tasks which are in a pair of a dictionary having a vocabulary and a language model,
the voice recognition unit is further configured to search a task that is adaptable to a speech of a user among the plurality of recognition tasks.

17. The voice recognition apparatus according to claim 1, wherein:
a pointer is moved on a display unit in synchronization with a hand movement of the speaker based on an analysis of a captured image of the speaker, and
the tracking unit is further configured to determine one of a beginning of the voice segment or an end of the voice segment based on the movement of the pointer on the display unit.

18. A voice recognition method, comprising:
detecting, by a tracking unit, a voice segment from a plurality of voice segments of an observation signal input from a microphone;
setting, by the tracking unit, a first registered attribute to identify the voice segment based on an explicit sign of a speaker, wherein the explicit sign is provided based on an image analysis;
creating, by the tracking unit, a management unit;
setting, by the management unit, the voice segment by connection of a detection result of the voice segment to a time direction;
detecting, by the management unit, a sound source direction of a sound source;
updating, by the management unit, the set voice segment based on the detection of the sound source direction;
creating, by the management unit, an extraction filter;
extracting, by the extraction filter, the sound source after a time has elapsed from a beginning of the voice segment;
applying, by the management unit, the extraction filter to the observation signal;
changing, by the management unit, a mask that decreases a transmittance of the observation signal for each frequency and each time, wherein the mask is changed when a proportion of a sound other than a target sound is higher than the target sound in the observation signal;
executing, by the management unit, a time frequency masking process for application of the changed mask to the observation signal;
extracting, by the management unit, the sound source based on the execution of the time frequency masking process;
creating, by the management unit, a partial sound source extraction result of the voice segment, based on the application of the extraction filter to the observation signal and the extraction of the sound source by the execution of the time frequency masking process;
outputting, by the tracking unit, the partial sound source extraction result to a voice recognition unit;
inputting, by the voice recognition unit, the partial sound source extraction result from the tracking unit;
executing, by the voice recognition unit, a voice recognition process on the partial sound source extraction result;
outputting, by the voice recognition unit, a voice recognition result based on the voice recognition process;

determining, by a ranking unit, a priority of the voice segment of the plurality of voice segments; and outputting, by the ranking unit, a plurality of sound source extraction results to the voice recognition unit based on the determined priority.

19. A non-transitory computer-readable medium having stored thereon computer-readable instructions, which when executed by a computer, cause the computer to execute operations, the operations comprising:

detecting a voice segment from a plurality of voice segments of an observation signal input from a microphone;

setting a first registered attribute to identify the voice segment based on an explicit sign of a speaker, wherein the explicit sign is provided based on an image analysis;

creating a management unit;

setting the voice segment by connection of a detection result of the voice segment to a time direction;

detecting a sound source direction of a sound source;

updating the set voice segment based on the detection of the sound source direction;

creating an extraction filter;

extracting the sound source after a time is elapsed from a beginning of the voice segment;

applying the extraction filter to the observation signal;

changing a mask that decreases a transmittance of the observation signal for each frequency and each time, wherein the mask is changed when a proportion of a sound other than a target sound is higher than the target sound in the observation signal;

executing a time frequency masking process for application of the changed mask to the observation signal;

extracting the sound source based on the execution of the time frequency masking process;

creating a partial sound source extraction result of the voice segment, based on the application of the extraction filter to the observation signal and the extraction of the sound source by the execution of the time frequency masking process;

outputting the partial sound source extraction result to a voice recognition unit;

inputting the partial sound source extraction result;

executing a voice recognition process on the partial sound source extraction result;

outputting a voice recognition result based on the voice recognition process;

determining a priority of the voice segment of the plurality of voice segments; and outputting a plurality of sound source extraction results to the voice recognition unit based on the determined priority.

20. The voice recognition apparatus according to claim 1, wherein the ranking unit is further configured to determine the priority of the voice segment among the plurality of voice segments based on at least one of the voice segment has the first registered attribute or the voice segment has an earliest end.

* * * * *